US012748618B2

(12) United States Patent
Sankaran et al.

(10) Patent No.: US 12,748,618 B2
(45) Date of Patent: Sep. 29, 2026

(54) SYSTEMS, METHODS, AND APPARATUSES FOR HETEROGENEOUS COMPUTING

(71) Applicant: Intel Corporation, Santa Clara, CA (US)

(72) Inventors: Rajesh M. Sankaran, Portland, OR (US); Gilbert Neiger, Hillsboro, OR (US); Narayan Ranganathan, Bangalore (IN); Stephen R. Van Doren, Portland, OR (US); Joseph Nuzman, Haifa (IL); Niall D. Mcdonnell, Limerick (IE); Michael A. O'Hanlon, Limerick (IE); Lokpraveen B. Mosur, Gilbert, AZ (US); Tracy Garrett Drysdale, Paradise Valley, AZ (US); Eriko Nurvitadhi, Hillsboro, OR (US); Asit K. Mishra, Hillsboro, OR (US); Ganesh Venkatesh, Hillsboro, OR (US); Deborah T. Marr, Portland, OR (US); Nicholas P. Carter, Somerville, MA (US); Jonathan D. Pearce, Hillsboro, OR (US); Edward T. Grochowski, San Jose, CA (US); Richard J. Greco, Hillsboro, OR (US); Robert Valentine, Kiryat Tivon (IL); Jesus Corbal, King City, OR (US); Thomas D. Fletcher, Sherwood, OR (US); Dennis R. Bradford, Portland, OR (US); Dwight P. Manley, Holliston, MA (US); Mark J. Charney, Lexington, MA (US); Jeffrey J. Cook, Portland, OR (US); Paul Caprioli, Hillsboro, OR (US); Koichi Yamada, Los Gatos, CA (US); Kent D. Glossop, Merrimack, NH (US); David B. Sheffield, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 110 days.

(21) Appl. No.: 18/927,065

(22) Filed: Oct. 25, 2024

(65) Prior Publication Data

US 2025/0123881 A1 Apr. 17, 2025

Related U.S. Application Data

(63) Continuation of application No. 18/207,870, filed on Jun. 9, 2023, now Pat. No. 12,135,981, which is a (Continued)

(51) Int. Cl.

| | |
|---|---|
| ***G06F 9/48*** | (2006.01) |
| ***G06F 9/30*** | (2018.01) |
| ***G06F 9/38*** | (2018.01) |

(52) U.S. Cl.

CPC .............. *G06F 9/48* (2013.01); *G06F 9/3001* (2013.01); *G06F 9/30036* (2013.01);

(Continued)

(58) Field of Classification Search

CPC ...... G06F 9/48; G06F 9/3001; G06F 9/30036; G06F 9/30038; G06F 9/3004;

(Continued)

(56) References Cited

U.S. PATENT DOCUMENTS

| | | | |
|---|---|---|---|
| 5,721,945 | A | 2/1998 | Mills et al. |
| 6,697,076 | B1 | 2/2004 | Trivedi et al. |

(Continued)

FOREIGN PATENT DOCUMENTS

| | | | |
|---|---|---|---|
| CN | 1825961 | A | 8/2006 |
| CN | 102012803 | A | 4/2011 |

(Continued)

OTHER PUBLICATIONS

Office Action, KR App. No. 10-2022-7020558, Mar. 18, 2025, 10 pages (05 pages of English Translation and 05 pages of Original Document).

(Continued)

*Primary Examiner* — Farley Abad

(74) *Attorney, Agent, or Firm* — Nicholson De Vos Webster & Elliott LLP

(57) ABSTRACT

Embodiments of systems, methods, and apparatuses for heterogeneous computing are described. In some embodiments, a hardware heterogeneous scheduler dispatches instructions for execution on one or more plurality of heterogeneous processing elements, the instructions corresponding to a code fragment to be processed by the one or more of the plurality of heterogeneous processing elements, (Continued)

wherein the instructions are native instructions to at least one of the one or more of the plurality of heterogeneous processing elements.

15 Claims, 135 Drawing Sheets

Related U.S. Application Data continuation of application No. 17/381,521, filed on Jul. 21, 2021, now Pat. No. 11,693,691, which is a continuation of application No. 16/913,265, filed on Jun. 26, 2020, now Pat. No. 11,093,277, which is a continuation of application No. 16/474,978, filed as application No. PCT/US2016/069640 on Dec. 31, 2016, now Pat. No. 11,416,281.

(52) U.S. Cl.
CPC ........ *G06F 9/30038* (2023.08); *G06F 9/3004* (2013.01); *G06F 9/383* (2013.01); *G06F 9/3851* (2013.01); *G06F 9/3854* (2023.08); *G06F 9/3858* (2023.08); *G06F 9/3887* (2013.01); *G06F 9/3888* (2023.08)

(58) Field of Classification Search
CPC ...... G06F 9/383; G06F 9/3851; G06F 9/3854; G06F 9/3858; G06F 9/3887; G06F 9/3888; G06F 9/30181; G06F 9/5027; G06F 9/30087; G06F 9/3009; G06F 9/30189; G06F 9/3834; G06F 9/3836; G06F 9/3842; G06F 9/3863; G06F 9/3877; G06F 9/4411; G06F 9/4881; G06F 9/30014; G06F 9/30047; G06F 9/30076; G06F 9/38585; G06F 9/45504; G06F 8/41; G06F 9/3017; Y02D 10/00
See application file for complete search history.

(56) References Cited

U.S. PATENT DOCUMENTS

| | | | | |
|---|---|---|---|---|
| 6,944,747 | B2 | 9/2005 | Nair et al. | |
| 6,956,818 | B1* | 10/2005 | Thodiyil | H04L 47/50 370/395.42 |
| 7,447,873 | B1 | 11/2008 | Nordquist | |
| 7,765,543 | B1 | 7/2010 | Weissman et al. | |
| 8,860,741 | B1 | 10/2014 | Juffa et al. | |
| 9,703,603 | B1 | 7/2017 | Roy et al. | |
| 9,761,564 | B1 | 9/2017 | Shibata | |
| 10,042,673 | B1 | 8/2018 | Espy et al. | |
| 2003/0110322 | A1 | 6/2003 | Wolrich et al. | |
| 2003/0120878 | A1 | 6/2003 | Andreassen et al. | |
| 2003/0147409 | A1* | 8/2003 | Wolrich | H04L 49/90 370/412 |
| 2005/0148358 | A1 | 7/2005 | Lin et al. | |
| 2005/0240625 | A1* | 10/2005 | Chang | G06Q 10/08 |
| 2006/0069869 | A1 | 3/2006 | Lakshmanamurthy et al. | |
| 2007/0008985 | A1* | 1/2007 | Lakshmanamurthy | H04L 49/901 370/412 |
| 2008/0074433 | A1 | 3/2008 | Jiao et al. | |
| 2008/0222317 | A1* | 9/2008 | Go | G06F 13/28 710/22 |
| 2008/0288691 | A1 | 11/2008 | Bie et al. | |
| 2008/0301414 | A1 | 12/2008 | Pitsianis et al. | |
| 2009/0024685 | A1 | 1/2009 | Salama et al. | |
| 2009/0031070 | A1 | 1/2009 | Purcell et al. | |
| 2009/0037641 | A1 | 2/2009 | Bresniker | |
| 2009/0070553 | A1 | 3/2009 | Wallach et al. | |
| 2009/0094431 | A1 | 4/2009 | Sarkar et al. | |
| 2009/0216910 | A1* | 8/2009 | Duchesneau | H04L 41/00 709/250 |
| 2009/0240860 | A1 | 9/2009 | Coon et al. | |
| 2010/0257524 | A1 | 10/2010 | Weissman et al. | |
| 2010/0259296 | A1 | 10/2010 | Or-Bach | |
| 2012/0023295 | A1 | 1/2012 | Nemawarkar | |
| 2012/0242672 | A1 | 9/2012 | Larson | |
| 2012/0246657 | A1 | 9/2012 | Abdallah | |
| 2012/0272224 | A1 | 10/2012 | Brackman | |
| 2012/0291040 | A1 | 11/2012 | Breternitz et al. | |
| 2013/0159665 | A1 | 6/2013 | Kashyap | |
| 2013/0160016 | A1 | 6/2013 | Gummaraju et al. | |
| 2013/0167154 | A1 | 6/2013 | Peng et al. | |
| 2013/0312007 | A1* | 11/2013 | Millman | G06F 9/526 718/106 |
| 2014/0082630 | A1 | 3/2014 | Ginzburg et al. | |
| 2014/0177626 | A1 | 6/2014 | Thottethodi et al. | |
| 2014/0223166 | A1 | 8/2014 | Wu et al. | |
| 2014/0244888 | A1 | 8/2014 | Kallickal | |
| 2014/0258643 | A1 | 9/2014 | Ganapathi et al. | |
| 2014/0281008 | A1 | 9/2014 | Muthiah et al. | |
| 2014/0281457 | A1 | 9/2014 | Weissmann et al. | |
| 2014/0289483 | A1 | 9/2014 | Hosoda et al. | |
| 2014/0304491 | A1 | 10/2014 | Kasahara et al. | |
| 2014/0359633 | A1 | 12/2014 | Breternitz et al. | |
| 2015/0007196 | A1 | 1/2015 | Toll et al. | |
| 2015/0009743 | A1 | 1/2015 | Chung | |
| 2015/0019713 | A1 | 1/2015 | Bugenhagen | |
| 2015/0035840 | A1* | 2/2015 | Koker | G06F 9/3861 345/502 |
| 2015/0109024 | A1 | 4/2015 | Abdelfattah et al. | |
| 2015/0234679 | A1 | 8/2015 | Moyer | |
| 2015/0254207 | A1 | 9/2015 | Kessler | |
| 2015/0277532 | A1 | 10/2015 | Mishaeli et al. | |
| 2015/0278516 | A1 | 10/2015 | Caprioli | |
| 2015/0286410 | A1* | 10/2015 | Park | G06F 3/064 711/154 |
| 2016/0055922 | A1 | 2/2016 | Yang et al. | |
| 2016/0111406 | A1 | 4/2016 | Mak | |
| 2016/0116965 | A1 | 4/2016 | Wu et al. | |
| 2016/0191420 | A1 | 6/2016 | Nagarajan et al. | |
| 2016/0246599 | A1* | 8/2016 | Johnson | G06F 9/3016 |
| 2016/0306415 | A1 | 10/2016 | Herdrich et al. | |
| 2017/0315847 | A1 | 11/2017 | Chen et al. | |
| 2018/0095751 | A1 | 4/2018 | Aminot et al. | |
| 2019/0073217 | A1 | 3/2019 | Basher | |
| 2020/0411064 | A1 | 12/2020 | Jeddeloh et al. | |

FOREIGN PATENT DOCUMENTS

| | | | |
|---|---|---|---|
| CN | 104025045 | A | 9/2014 |
| EP | 1242869 | A1 | 9/2002 |
| EP | 3109766 | A2 | 12/2016 |
| JP | 06-175986 | A | 6/1994 |
| JP | 2007-317179 | | 12/2007 |
| JP | 2007-328416 | A | 12/2007 |
| JP | 2009-026308 | A | 2/2009 |
| JP | 2012-073741 | A | 4/2012 |
| JP | 2012-508418 | | 4/2012 |
| JP | 2014-513373 | A | 5/2014 |
| JP | 2014-528115 | A | 10/2014 |
| JP | 2014-225242 | A | 12/2014 |
| JP | 2016-502287 | A | 1/2016 |
| JP | 2016-516224 | A | 6/2016 |
| JP | 2016-123076 | A | 7/2016 |
| TW | 201344695 | A | 11/2013 |
| TW | 201405422 | A | 2/2014 |
| TW | 201437828 | A | 10/2014 |
| TW | 201508635 | A | 3/2015 |
| TW | 201515176 | A | 4/2015 |
| TW | I499908 | B | 9/2015 |
| TW | 201543360 | A | 11/2015 |
| TW | 201616352 | A | 5/2016 |
| TW | I550413 | B | 9/2016 |
| WO | 01/16703 | A1 | 3/2001 |
| WO | 2005/006556 | A2 | 1/2005 |
| WO | 2005/034240 | A1 | 4/2005 |
| WO | 2005/064355 | A1 | 7/2005 |

(56) References Cited

FOREIGN PATENT DOCUMENTS

| | | | |
|---|---|---|---|
| WO | 2011/068091 | A1 | 6/2011 |
| WO | 2012/053188 | A1 | 4/2012 |
| WO | 2013/101139 | A1 | 7/2013 |
| WO | 2013/101216 | A1 | 7/2013 |
| WO | 2015/099719 | A1 | 7/2015 |
| WO | 2015/150342 | A1 | 10/2015 |
| WO | 2016/068999 | A1 | 5/2016 |
| WO | 2016/173766 | A1 | 11/2016 |
| WO | 2016/195839 | A1 | 12/2016 |

OTHER PUBLICATIONS

Second Office Action, CN App. No. 202011423114.9, Sep. 25, 2024, 10 pages of Original Document only.
Third Office Action, CN App. No. 202011423114.9, Dec. 31, 2024, 03 pages of Original Document only.
Decision to Grant, EP App. No. 24178028.7, Nov. 13, 2025, 2 pages.
Extended European Search Report, EP App. No. 25215338.2, Feb. 26, 2026, 08 pages.
Intention to Grant, EP App. No. 24178028.7, Jun. 30, 2025, 6 pages.
Notice of Reasons for Refusal, Japanese App. No. 2024-108777, Jan. 6, 2026, 7 pages (4 pages of English Translation and 3 pages of Original Document).
Akin, Berkin, et al., "Data Reorganization in Memory Using 3D-stacked DRAM", 2015 ACM/IEEE 42nd Annual International Symposium on Computer Architecture (ISCA), Jun. 13-17, 2015, 13 pages.
Allowance Decision of Examination, TW App. No. 109144238, Jul. 28, 2021, 3 pages (1 page of English Translation and 2 pages of Original Document).
Allowance Decision of Examination, TW App. No. 111122993, Oct. 17, 2023, 3 pages (1 page of English Translation and 2 pages of Original Document).
Allowance Decision of Re-Examination, TW App. No. 106140258, Apr. 11, 2023, 3 pages (1 page English Translation and 2 pages of Original Document).
Decision of Rejection, TW App. No. 106140258, Jun. 23, 2022, 11 pages (5 pages of English Translation and 6 pages of Original Document).
Decision to grant a European patent, EP App. No. 16925260.8, Sep. 8, 2022, 2 pages.
Decision to Grant a Patent, JP App. No. 2019-524974, Nov. 2, 2021, 3 pages (2 pages of English Translation and 1 page of Original Document).
Decision to grant, EP App. No. 20207505.7, Nov. 3, 2023, 2 pages.
Decision to Grant, EP App. No. 22180798.5, May 31, 2024, 2 pages.
Decision to Grant, EP App. No. 22193012.6, Apr. 5, 2024, 2 pages.
European Communication pursuant to Article 94(3) EPC, EP App. No. 20207505.7, Jun. 14, 2022, 4 pages.
European Search Report and Search Opinion, EP App. No. 16925260.8, Jul. 24, 2020, 6 pages.
European Search Report and Search Opinion, EP App. No. 20207505.7, Mar. 31, 2021, 7 pages.
European Search Report and Search Opinion, EP App. No. 22180798.5, Oct. 13, 2022, 7 pages.
European search report and Search Opinion, EP App. No. 24178028.7, Oct. 7, 2024, 08 pages.
Examination Report, IN App. No. 201947023217, Dec. 14, 2021, 6 pages.
Examination Report, IN App. No. 202048051332, Dec. 15, 2021, 7 pages.
Examination Report, IN App. No. 202248034014, Jan. 18, 2023, 6 pages.
Extended European Search Report for Application No. 22193012.6, Dec. 19, 2022, 05 pages.
Extended European Search Report, EP App. No. 17207175.5, May 16, 2018, 8 pages.
Final Office Action, U.S. Appl. No. 16/474,978, Feb. 25, 2021, 23 pages.
First Office Action, CN App. No. 201680091968.7, Nov. 18, 2022, 22 pages (11 pages of English Translation and 11 pages of Original Document).
First Office Action, CN App. No. 202011423114.9, Feb. 29, 2024, 16 pages of Original Document Only.
Intention to grant, EP App. No. 16925260.8, Apr. 20, 2022, 6 pages.
Intention to Grant, EP App. No. 16925260.8, Jul. 30, 2021, 10 pages.
Intention to grant, EP App. No. 20207505.7, Jun. 19, 2023, 7 pages.
Intention to Grant, EP App. No. 22180798.5, Feb. 1, 2024, 6 pages.
International Preliminary Report on Patentability, PCT App. No. PCT/US2016/069640, Jul. 11, 2019, 13 pages.
International Search Report and the Written Opinion, PCT App. No. PCT/US2016/069640, Sep. 20, 2017, 16 pages.
Loh et al., "Interconnect-Memory Challenges for Multi-chip, Silicon Interposer Systems", MEMSYS '15: Proceedings of the 2015 International Symposium on Memory Systems, Oct. 5, 2015, pp. 1-3.
Non Final Office Action, U.S. Appl. No. 16/474,978, Aug. 12, 2021, 24 pages.
Non Final Office Action, U.S. Appl. No. 16/474,978, Sep. 14, 2020, 24 pages.
Non-Final Office Action, U.S. Appl. No. 15/396,509, Feb. 12, 2018, 10 pages.
Non-Final Office Action, U.S. Appl. No. 15/396,509, Nov. 15, 2018, 16 pages.
Non-Final Office Action, U.S. Appl. No. 16/913,265, Nov. 30, 2020, 27 pages.
Non-Final Office Action, U.S. Appl. No. 17/381,521, Sep. 14, 2022, 10 pages.
Non-Final Office Action, U.S. Appl. No. 18/207,870, Jan. 16, 2024, 10 pages.
Notice of Allowance, U.S. Appl. No. 15/396,509, Apr. 16, 2019, 7 pages.
Notice of Allowance, U.S. Appl. No. 15/396,509, Aug. 2, 2018, 7 pages.
Notice of Allowance, U.S. Appl. No. 16/474,978, Feb. 16, 2022, 10 pages.
Notice of Allowance, U.S. Appl. No. 16/913,265, Mar. 18, 2021, 10 pages.
Notice of Allowance, U.S. Appl. No. 17/381,521, Feb. 9, 2023, 8 pages.
Notice of Allowance, U.S. Appl. No. 18/207,870, Jul. 5, 2024, 12 pages.
Notice of Allowance, U.S. Appl. No. 18/207,870, Jun. 17, 2024, 15 pages.
Notice of Reasons for Refusal, JP App. No. 2019-524974, Mar. 2, 2021, 13 pages (8 pages of English Translation and 5 pages of Original Document).
Notice of Reasons for Refusal, JP App. No. 2020-202851, Mar. 29, 2022, 7 pages (4 pages of English Translation and 3 pages of Original Document).
Notice of Reasons for Refusal, JP App. No. 2020-202851, Nov. 2, 2021, 7 pages (4 pages of English Translation and 3 pages of Original Document).
Nurvitadhi et al., "A sparse matrix vector multiply accelerator for support vector machine," 2015 International Conference on Compilers, Architecture and Synthesis for Embedded Systems (CASES), IEEE, Oct. 4, 2015, pp. 109-116.
Nurvitadhi et al., "Hardware Accelerator for Analytics of Sparse Data", Proceedings of the 2016 Design, Automation & Test in Europe Conference & Exhibition (DATE), IEEE, Mar. 2016, pp. 1616-1621.
Office Action , TW App. No. 112129758, Apr. 8, 2024, 08 pages (03 pages of English Translation and 05 pages of Original Document).
Office Action, BR App. No. 112019010679-0, Jul. 21, 2020, 5 pages (1 page of English Translation and 4 pages of Original Document).
Office Action, BR App. No. 112019010679-0, Mar. 30, 2023, 9 pages (5 pages of English Translation and 4 pages of Original Document).
Office Action, BR App. No. 112019010679-0, Apr. 29, 2024, 04 pages of Original Document only.

(56) References Cited

OTHER PUBLICATIONS

Office Action, BR App. No. 112019010679-0, Aug. 6, 2024, 10 pages (06 pages of English Translation and 03 pages of Original Document).
Office Action, EP App. No. 20207505.7, Jan. 20, 2023, 5 pages.
Office Action, EP App. No. 22180798.5, Jun. 20, 2023, 5 pages.
Office Action, KR App. No. 10-2019-7015660, Aug. 28, 2023, 19 pages (10 pages of English Translation and 9 pages of Original Document).
Office Action, KR App. No. 10-2019-7015660, May 31, 2024, 09 pages (04 pages of English Translation and 05 pages of Original Document).
Office Action, KR App. No. 10-2020-7034869, Jun. 23, 2022, 8 pages (4 pages of English Translation and 4 pages of Original Document).
Office Action, TW App. No. 106140258, Jan. 19, 2022, 27 pages (13 pages of English Translation and 14 pages of Original Document).
Office Action, TW App. No. 106140258, Sep. 28, 2021, 27 pages (13 pages of English Translation and 14 pages of Office Action).
Office Action, TW App. No. 109144238, Apr. 29, 2021, 13 pages (06 pages of English Translation and 07 pages of Original Document).
Office Action, TW App. No. 111122993, Nov. 21, 2022, 17 pages (9 pages of English Translation and 8 pages of Original Document).
Office Action, TW App. No. 112129758, Jun. 13, 2024, 06 pages (3 pages of English Translation and 03 pages of Original Document).
Yuji et al., "Review on the determination system of Optimum Parallel Processing in", Information Processing Society of Japan, 2016, 78 (28), 8 pages of Original Document Only.

* cited by examiner

| MEMORY DEPENDENCY TYPE 2301 | SEMANTICS 2303 | ORDERING 2305 | USE 2307 |
|---|---|---|---|
| INDEPENDENT | PROGRAMMER GUARANTEES THERE ARE NO STORE →LOAD OR STORE → STORE DEPENDENCIES BETWEEN THESE LOADS AND STORES, OR WITH ANY OTHER LOADS AND STORES WTIHIN THE BLOCK. | THESE LOADS AND STORES MAY APPEAR TO EXECUTE IN ANY ORDER WITHIN THE BLOCK. THEY ARE FENCED BY THE ABEGIN/AEND INSTRUCTIONS. | WHEN PARALLELISM IS DESIRED. THIS IS THE DEFAULT. |
| POTENTIALLY DEPENDENT ACCESSES TO LOCAL STORAGE AREA | LOADS AND STORES TO LOCAL STORAGE MAY BE DEPENDENT ON EACH OTHER, BUT ARE GUARANTEED TO BE INDEPENDENT FROM ALL OTHER LOADS AND STORES. | LOADS AND STORES TO THE LOCAL STORAGE AREA ARE ORDERED WITH RESPECT EACH OTHER. THEY ARE NOT ORDERED WITH RESPECT TO ANY OTHER LOADS OR STORES. | TO ACCESS TEMPORARY VARIABLES IN LOCAL STORAGE. THESE LOADS AND STORES USE R9 AS A BASE REGISTER. |
| POTENTIALLY DEPENDENT | HARDWARE WILL DYNAMICALLY CHECK AND ENFORCE DEPENDENCIES AMONG THESE INSTRUCTIONS | THESE LOADS AND STORES ARE ORDERED WITH RESPECT TO EACH OTHER. THEY APPEAR TO EXECUTE IN THE SAME ORDER AS IN SERIAL EXECUTION OF THE BLOCK. | LOADS AND STORES THAT MAY ALIAS. THESE ARE DENOTED BY A PREFIX. |
| ATOMIC | MAY BE DEPENDENT AMONG THEMSELVES. MEMORY IS UPDATED ATOMICALLY. | LOCKED LOAD-OPSTORE INSTRUCTIONS MAY APPEAR TO EXECUTE IN ANY ORDER WITHIN THE BLOCK. THEY ARE FENCED BY THE ABEGIN/AEND INSTRUCTIONS. | REDUCTION. |

FIG. 23

4902

Apply Delta Record Descriptor 4901

| Byte 7 | Byte 6 | Byte 5 | Byte 4 | Byte 3 | Byte 2 | Byte 1 | Byte 0 | bytes |
|---|---|---|---|---|---|---|---|---|
| Operation | Flags | | | U/S Reserved | | PASID | | 0 |
| Completion Record Address | | | | | | | | 8 |
| Delta Record Address 4904 | | | | | | | | 16 |
| Destination Address 4903 | | | | | | | | 24 |
| Reserved | | Completion Interrupt Handle | | Transfer Size 4906 | | | | 32 |
| Reserved | | | | Delta Record Size 4905 | | | | 40 |
| Reserved | | | | | | | | 48 |
| Reserved | | | | | | | | 56 |

FIG. 49

5104

Memory Copy with Dualcast Descriptor 5100

| Byte 7 | Byte 6 | Byte 5 | Byte 4 | Byte 3 | Byte 2 | Byte 1 | Byte 0 | bytes |
|---|---|---|---|---|---|---|---|---|
| Operation | Flags | | | Reserved | | PASID | | 0 |
| Completion Record Address | | | | | | | | 8 |
| Source Address 5105 | | | | | | | | 16 |
| Destination1 Address 5106 | | | | | | | | 24 |
| Reserved | | Completion Interrupt Handle | | Transfer Size 5108 | | | | 32 |
| Destination2 Address 5107 | | | | | | | | 40 |
| Reserved | | | | | | | | 48 |
| | | | | | | | | 56 |

Memory Copy with Dualcast Completion Record 5102

| Byte 7 | Byte 6 | Byte 5 | Byte 4 | Byte 3 | Byte 2 | Byte 1 | Byte 0 | bytes |
|---|---|---|---|---|---|---|---|---|
| Bytes Completed 5111 | | | | Index | Direction | Fault Code | Status | 0 |
| Fault Address | | | | | | | | 8 |
| Reserved | | | | | | | | 16 |
| | | | | | | | | 24 |

5110

FIG. 51

Copy with CRC Generation Descriptor 5300

5305

| Byte 7 | Byte 6 | Byte 5 | Byte 4 | Byte 3 | Byte 2 | Byte 1 | Byte 0 | bytes |
|---|---|---|---|---|---|---|---|---|
| Operation | Flags | | | Reserved | | PASID | | 0 |
| Completion Record Address | | | | | | | | 8 |
| Source Address 5302 | | | | | | | | 16 |
| Destination Address 5303 | | | | | | | | 24 |
| Reserved | | Completion Interrupt Handle | | Transfer Size 5304 | | | | 32 |
| | | | | CRC Seed | | | | 40 |
| | | | | | | | | 48 |
| | | | | | | | | 56 |

FIG. 53

5605

DIF Update Descriptor 5600

| Byte 7 | Byte 6 | Byte 5 | Byte 4 | Byte 3 | Byte 2 | Byte 1 | Byte 0 | bytes |
|---|---|---|---|---|---|---|---|---|
| Operation | Flags | | | u s Reserved | | PASID | | 0 |
| Completion Record Address | | | | | | | | 8 |
| Source Address 5602 | | | | | | | | 16 |
| Destination Address 5603 | | | | | | | | 24 |
| Reserved | | Completion Interrupt Handle | | Transfer Size 5606 | | | | 32 |
| Reserved | | | | | DIF Flags | Dest DIF Flags | Source DIF Flags | 40 |
| Source Application Tag Seed | | Source Application Tag Mask | | Source Reference Tag Seed | | | | 48 |
| Destination Application Tag Seed | | Destination Application Tag Mask | | Destination Reference Tag Seed | | | | 56 |

DIF Update Completion Record 5601

| Byte 7 | Byte 6 | Byte 5 | Byte 4 | Byte 3 | Byte 2 | Byte 1 | Byte 0 | bytes |
|---|---|---|---|---|---|---|---|---|
| Bytes Completed | | | | Index | DIF Status | Fault Code | Status | 0 |
| Fault Address | | | | | | | | 8 |
| Source Application Tag | | Source Application Tag Mask | | Source Reference Tag | | | | 16 |
| Destination Application Tag | | Destination Application Tag Mask | | Destination Reference Tag | | | | 24 |

FIG. 56

| Operation Type | Input operand1 7110 | Input operand2 7111 | Output 7112 | Matrix Data Format 7113 | Operation Identifier 7114 |
|---|---|---|---|---|---|
| Multiply **7100** | Sparse matrix | Sparse vector | Dense vector | Compressed sparse row (CSR) | mul_spMspV_row |
| | | | | Compressed sparse column (CSC) | mul_spMspV_col |
| | | Dense vector | Dense vector | Compressed sparse row (CSR) | mul_spMdV_row |
| | | | | Compressed sparse column (CSC) | mul_spMdV_col |
| Multiply **7101** | Dense matrix | Sparse vector | Dense vector | Row-oriented | mul_dMspV_row |
| | | | | Column-oriented | mul_dMspV_col |
| | | Dense vector | Dense vector | Row-oriented | mul_dMdV_row |
| | | | | Column-oriented | mul_dMdV_col |
| Scale & Update **7102** | Sparse matrix | Dense vector | Dense vector | Row-oriented | sau_spMdV |
| | Sparse vector | | | | sau_spVdV |
| Dot product **7103** | Sparse vector | Sparse vector | Scalar | N/A | dot_spVspV |
| | Dense vector | Sparse vector | | | dot_dVspV |
| | Sparse vector | Dense vector | | | dot_spVdV |
| | Dense vector | Dense vector | | | dot_dVdV |

FIG. 71

```
spMdV_csr(A, x, y) {
  for each row r of A {
    y[r.idx] = dot_product(r, x)
  }
}
```

*FIG. 73a*

```
spMspV_csc(A, x, y) {
  for each element x_e in vector x {
    col = get column(x_e.idx) of A

    for each element col_e in col
      y[col_e.idx] += x_e.val * col_e.val
}
```

*FIG. 73b*

```
scale_update(A, x, y) {

  for each row r of A {
    for each element r_e in r
      y[r_e.idx] += r_e.val * x[r.idx]
  }

}
```

*FIG. 73c*

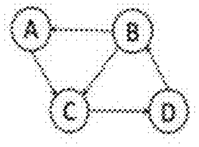

FIG. 76a $$G = \begin{array}{c c} & \begin{array}{cccc} A & B & C & D \end{array} \\ \begin{array}{c} A \\ B \\ C \\ D \end{array} & \begin{bmatrix} 0 & 0 & 1 & 0 \\ 1 & 0 & 1 & 0 \\ 0 & 0 & 0 & 1 \\ 0 & 1 & 0 & 0 \end{bmatrix} \end{array}$$

FIG. 76b

```
struct vdata  { /*user defined vertex data*/}
struct mdata  { /*user defined msg data*/  }
struct edata  { /*user defined edge data*/ }
struct tdata  { /*user defined tmp data*/  }

tdata PROCES_MSG(mdata m, edata e, vdata v) {
    // User defined
}
tdata REDUCE(tdata t, tdata r) {
 // User defined
}
vdata APPLY(vdata v, tdata t) {
 // User defined
}
mdata SEND_MSG(vdata v) {
 // User defined
}
```

FIG. 76c

```
RunVertexProgram(matrix <edata> A, vector<vdata> y)
  for i=1 to Max_Iteration
     x=new vector<mdata>
     for i in y if i is active  { x.insert(SEND_MSG(i)) }
     t = GSPMV(A, x, y)
     reset all members of y to non-active
     for i in t where t is updated
       new_val=APPLY(y_i,t_i);
       If new_val != y_i  {y_i=new_val; set y_i active}
    If number of active y == 0 break
```

FIG. 76d

```
GSPMV( matrix <edata> A, vector<mdata> x, vector <vdata> y)
 t =new vector <tdata>
 for j in A^T.column  if j found in x
    for k in A^T.column
       tmp = PROCESS_MSG(x_j, A^T.column[k], y_k)
       t_k = REDUCE( t_k, tmp );  set t_k to updated
 return t
```

FIG. 76e

| CATEGORY | DETAILS |
| --- | --- |
| RAMs, BUFFERS | SIZE, PORTS, NUMBER OF BANKS, SHARED/PRIVATE BANKS |
| CACHE | SIZE, ASSOCIATIVITY, INCLUDE/EXCLUDE |
| SCALING | NUMBER OF TILES, NUMBER OF PEs/TILE |
| MEMORY INTERFACE | NUMBER OF INTERFACES, WIDTH, BURST SIZE |
| COMPUTE BLOCKS (PROCESS_MSG, REDUCE, SEND_MSG, APPLY) | CONTENT GENERATION STRATEGY (e.g., PIPELINED, MULTI-CYCLE), INTERFACE PRUNING |
| PE SCHEDULING | SCHEDULING SCHEME (e.g., ROW/BLOCK INTERLEAVED, DYNAMIC) |
| DATA STORAGE FORMAT | ARRAY OF STRUCTURES, STRUCTURE OF ARRAYS, DOUBLY COMPRESSED, UNIQUE VALUE COMPRESSED |
| PACK/UNPACK LOGIC | GENERATION STRATEGY, COMPRESSION ON/OFF |
| ACTIVE VERTEX HANDLING | BITVECTOR, N-LEVEL COMPRESSED |

FIG. 80a

| TUNING CONSIDERATIONS | EXAMPLE OF AFFECTED TEMPLATE PARAMETERS |
| --- | --- |
| LOCALITY OF DATA (x VECTOR) FROM GRAPH DATA PROPERTIES | CACHE, INTERFACE WIDTH |
| GRAPH DATA SIZES | SIZE OF ON-CHIP STORAGE, PACK/UNPACK |
| GRAPH COMPUTE FUNCTIONS | COMPUTE BLOCKS, ACTIVE VERTEX HANDLING |
| GRAPH DATA STRUCTURE (NON-ZEROS DISTRIBUTION IN ADJACENCY MATRIX) | SCALING TILES AND PEs, MEMORY INTERFACES, PE SCHEDULING, DATA STORAGE FORMAT |
| GRAPH DATA ACCESS ATTRIBUTES (READ-ONLY, WRITE-ONLY, READ/WRITE) | ON-CHIP STRUCTURES (PORTS, BANKS), ACTIVE VERTEX HANDLING |
| GRAPH DATA TYPES | ON-CHIP STRUCTURES (PORTS, BANKS), PACK/UNPACK |
| GRAPH DATA PATTERNS (e.g., COMMONLY RECURRING VALUES) | DATA STORAGE FORMAT, PACK/UNPACK LOGIC |

FIG. 80b

| | DDR4 | LPDDR4 | PICO | HBM2 | WIO3 | ITRI | DiRAM |
|---|---|---|---|---|---|---|---|
| Capacity per stack/DIMM (GB) | 16 | 4-8 | 4-8 | 8 | 12 | 4 | 16 |
| BW at stack/DIMM (GB/sec) | 24 | 68 | 25 | 256 | 273 | 256 | 2048 |
| BW to CPU (GB/sec) | 24 | 68 | 25 | 256 | 273 | 128 | 512 |
| Energy/bit (pJ) | 40 | 12 | 24 | 6.4 | 2.5 | 2 | 2.5 |
| Latency (ns) | 31 | 45 | unk. | 35 | 40 | 10 | 9 |
| Data signals per stack | 64 | 32 | 64 | 1024 | 512 | 2048 | unk. |
| Integration w/logic | Off-Package | Off-Package | Beside-Die | Beside-Die | On-Die | On-Die | On-Die |
| Cost/GB | Low | Low | Med. | Med. | Med. | High | High |
| Risk | Low | Low | Low | Low | Med. | Med. | High |

*FIG. 97*

```
def bfs(M, v, lv):
    cl = 1
    while True:
        v = M.dot(v)
        lold = lv.copy()
        lv = map(lambda x, y: min(x, cl) if y != 0 else x, lv, v)
        cl = cl + 1
        d = lold - lv;
        d = d.dot(d);
        if(d == 0):
            break
    return lv
```

```
basicblock 0:
  x.55=load.i32(); //format=scalar, shape=(1), color=1026
  y.56=load.i32(); //format=scalar, shape=(1), color=1027
  cl.57=load.i32(); //format=scalar, shape=(1), color=1024
  @t0.58=constant.i32(0); //format=scalar, shape=(1), color=1025
  @t1.59=compare.ne.i32(y.56, @t0.58); //format=scalar, color=1028
  @t2.60=min.i32(x.55, cl.57); //format=scalar, shape=(1), color=1025
  @t3.61=cmov.i32(@t2.60, x.55, @t1.59); //format=scalar, shape=(1), color=1025
  @ret.62=ret.i32(@t3.61); //format=scalar, shape=(1), color=1025
```

FIG. 99

| Instruction | Pseudo-code | Description | Operand Description |
|---|---|---|---|
| add.f32 | $\$r2 = \$r1 + \$r0$ | Single-precision floating point addition | 2 from GRF |
| add.i32 | $\$f2 = \$f1 + \$f0$ | Signed integer addition | 2 from GRF |
| and.i1 | $\$r2 = \$r1\&\$r0$ | Bitwise AND of single-bit value | 2 from PRF |
| cast.f32 | $\$f1 = (float)\$r0$ | Cast 32-bit signed integer to 32-bit floating point | 1 from GRF |
| cast.i32 | $\$r1 = (int32\_t)\$f0$ | Cast 32-bit single-precision float to signed integer | 1 from GRF |
| cmov.f32 | $\$f2 = \$p0?\$f1 : \$f0$ | Conditionally move single-precision float | 2 from GRF, 1 from PRF |
| cmov.i32 | $\$r2 = \$p0?\$r1 : \$r0$ | Conditionally move 32-bit integer | 2 from GRF, 1 from PRF |
| compare.f32 | $\$p0 = cmp.xx(\$f1, \$f0)$ | Compare single-precision values | 2 from GRF |
| compare.i32 | $\$p0 = cmp.xx(\$r1, \$r0)$ | Compare 32-bit signed integers | 2 from GRF |
| constant.f32 | $\$f0 = const\_tbl[\$c0]$ | Access 32-bit single-precision float constant | 1 from CRF |
| constant.i32 | $\$r0 = const\_tbl[\$c0]$ | Access 32-bit integer constant | 1 from CRF |
| div.f32 | $\$f2 = \$f0/\$f1$ | 32-bit single-precision division | 2 from GRF |
| load.f32 | $\$f1 = *(imm + \$index)$ | Load 32-bit single-precision float from buffer | 1 from λ-controller |
| load.i32 | $\$r1 = *(imm + \$index)$ | Load 32-bit integer from buffer | 1 from λ-controller |
| log.f32 | $\$f1 = ln(\$f0)$ | Natural logarithm of single-precision value | 1 from GRF |
| max.f32 | $\$f2 = max(\$f1, \$f0)$ | Maximum of 2 single-precision floats | 2 from GRF |
| max.i32 | $\$r2 = max(\$r1, \$r0)$ | Maximum of 2 signed integers | 2 from GRF |
| min.f32 | $\$f2 = min(\$f1, \$f0)$ | Minimum of 2 single-precision floats | 2 from GRF |
| min.i32 | $\$r2 = min(\$r1, \$r0)$ | Minimum of 2 signed integers | 2 from GRF |
| mult.f32 | $\$f2 = \$f1 * \$f0$ | Single-precision floating-point multiplication | 2 from GRF |
| mult.i32 | $\$r2 = \$r1 * \$r0$ | Signed integer multiplication | 2 from GRF |
| neg.f32 | $\$f1 = -\$f0$ | Negate sign of single-precision float | 1 from GRF |
| neg.i32 | $\$r1 = -\$r0$ | Negate sign of signed integer | 1 from GRF |
| nop | N/A | No operation | Does not read register files |
| not.i1 | $\$r1 = \$r0$ | Bitwise NOT | 1 from GRF |
| or.i1 | $\$r2 = \$r1\|\$r0$ | Bitwise OR of single-bit value | 2 from PRF |
| pow.f32 | $\$f2 = \$f1^{\$f0}$ | Raise $\$f1$ to the $\$f0$ power | 2 from the GRF |
| store.f32 | $*(imm + \$id) = \$f1$ | Store single-precision float to buffer | 1 from the GRF, 1 from λ-controller |
| store.i32 | $*(imm + \$id) = \$r1$ | Store signed integer to buffer | 1 from the GRF, 1 from λ-controller |
| sub.f32 | $\$r2 = \$r1 - \$r0$ | Single-precision floating point subtraction | 2 from GRF |
| sub.i32 | $\$f2 = \$f1 - \$f0$ | Signed integer subtraction | 2 from GRF |

FIG. 105

| Predicate | Mnemonic | Bit encoding |
| --- | --- | --- |
| Equal | eq | 6′b000000 |
| Greater than | gt | 6′b000001 |
| Greater than equal | gte | 6′b000010 |
| Less than | lt | 6′b000011 |
| Less than equal | lte | 6′b000100 |
| Not equal | ne | 6′b000101 |

FIG. 106

FIG. 126A
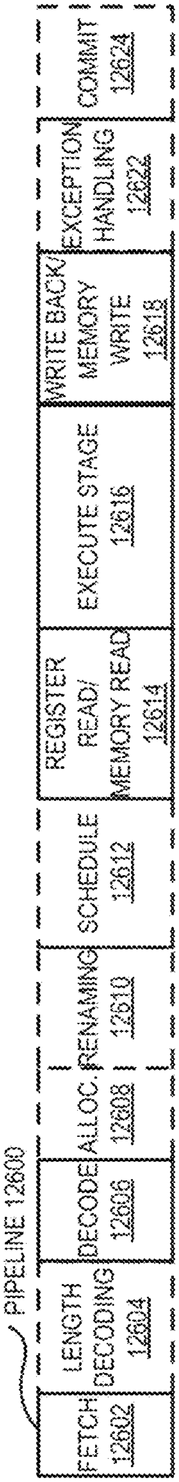
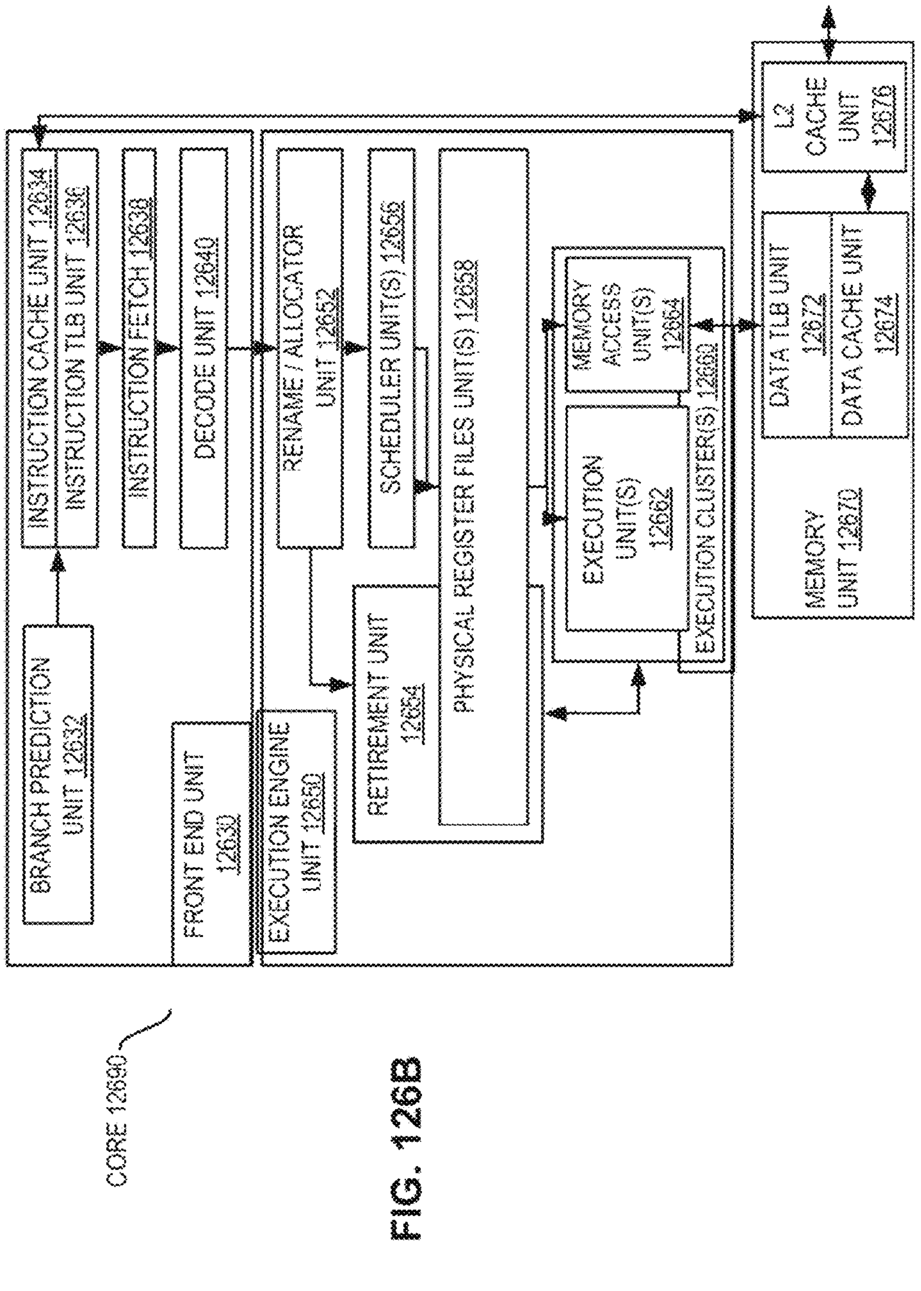
FIG. 126B

SYSTEMS, METHODS, AND APPARATUSES FOR HETEROGENEOUS COMPUTING

TECHNICAL FIELD

The present disclosure relates generally to the field of computing devices and, more particularly, to heterogeneous computing methods, devices, and systems.

BACKGROUND

In today's computers, CPUs perform general-purpose computing tasks such as running application software and operating systems. Specialized computing tasks, such as graphics and image processing, are handled by graphics processors, image processors, digital signal processors, and fixed-function accelerators. In today's heterogeneous machines, each type of processor is programmed in a different manner.

The era of big data processing demands higher performance at lower energy as compared with today's general purpose processors. Accelerators (either custom fixed function units or tailored programmable units, for example) are helping meet these demands. As this field is undergoing rapid evolution in both algorithms and workloads the set of available accelerators is difficult to predict a priori and is extremely likely to diverge across stock units within a product generation and evolve along with product generations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 23 illustrates different types of memory dependencies, their semantics, ordering requirements, and use cases;

FIG. 49 illustrates an exemplary apply delta record descriptor;

FIG. 51 illustrates an exemplary memory copy with dual cast descriptor and memory copy with dual cast completion record;

FIG. 53 illustrates an exemplary copy with CRC generation descriptor;

FIG. 56 illustrates an exemplary DIF update descriptor and DIF update completion record;

FIG. 71 illustrates an exemplary set of operations performed by the processing elements;

FIGS. 73A, 73B, and 73C illustrate pseudo code of each compute pattern;

FIGS. 76*a-b* show an example of representing a graph as an adjacency matrix;

FIG. 76*c* illustrates a vertex program;

FIG. 76*d* illustrates exemplary program code for executing a vertex program;

FIG. 76*e* shows the GSPMV formulation;

FIG. 80*a* summarizes the customizable parameters of one implementation of the template;

FIG. 80*b* illustrates tuning considerations;

FIG. 97 compares seven DRAM technologies;

FIG. 99 illustrates breadth-first search (BFS) listing;

FIG. 105 illustrates encodings for one particular set of instructions;

FIG. 106 illustrates encodings of exemplary comparison predicates;

FIG. 111 illustrates an embodiment of method performed by a processor to process a multiply add instruction;

FIG. 112 illustrates an embodiment of method performed by a processor to process a multiply add instruction;

Figure 113A:
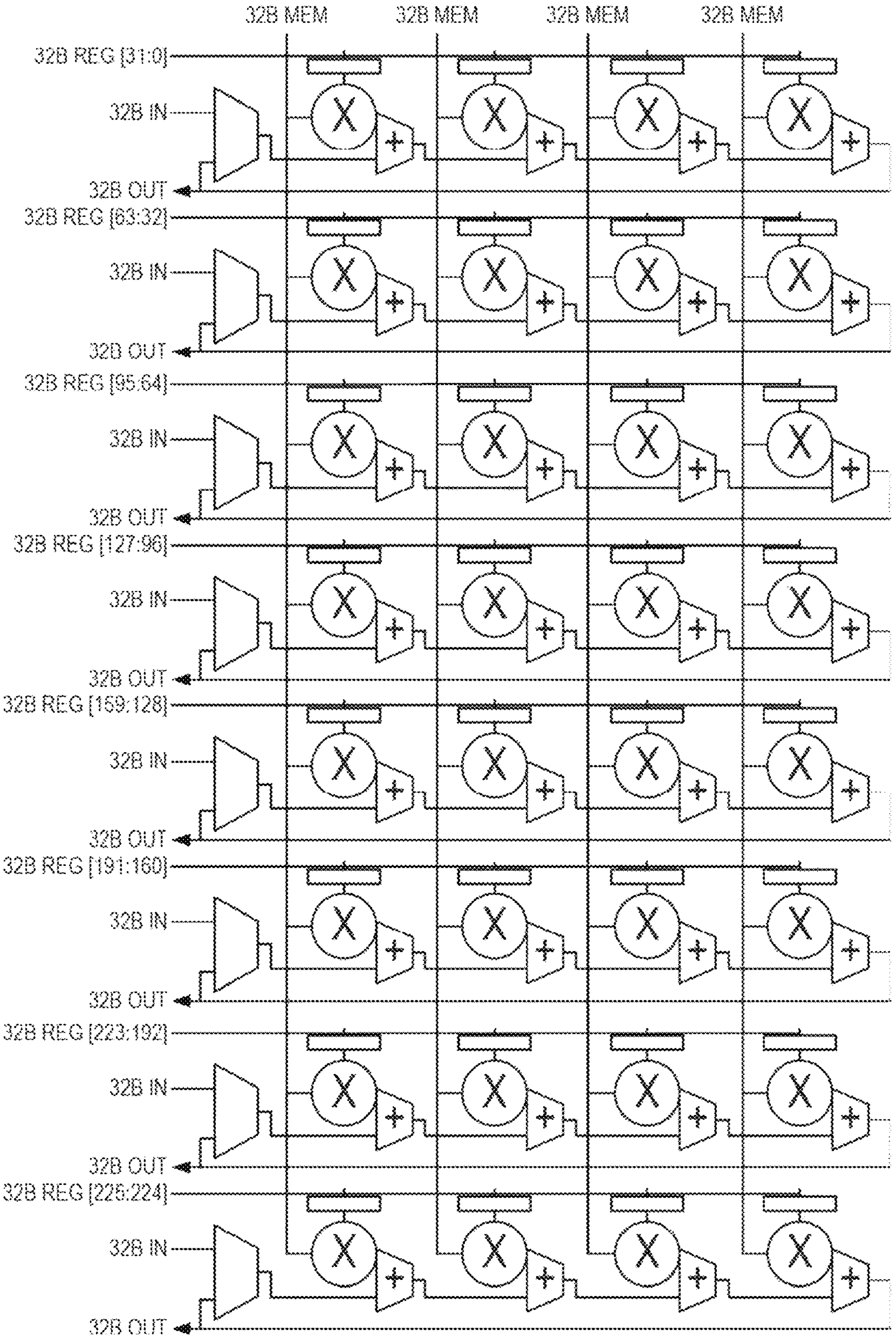
Figure 113B:
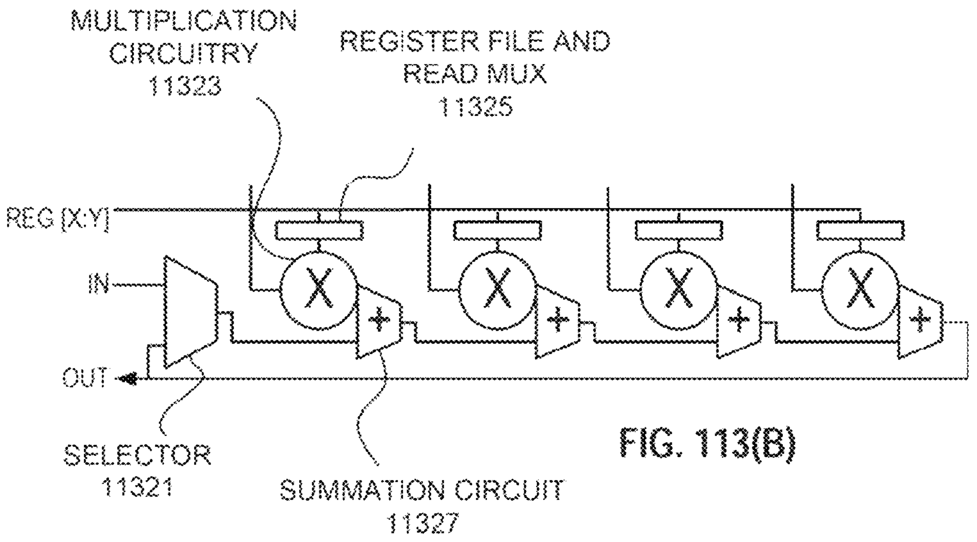
Figure 113C:
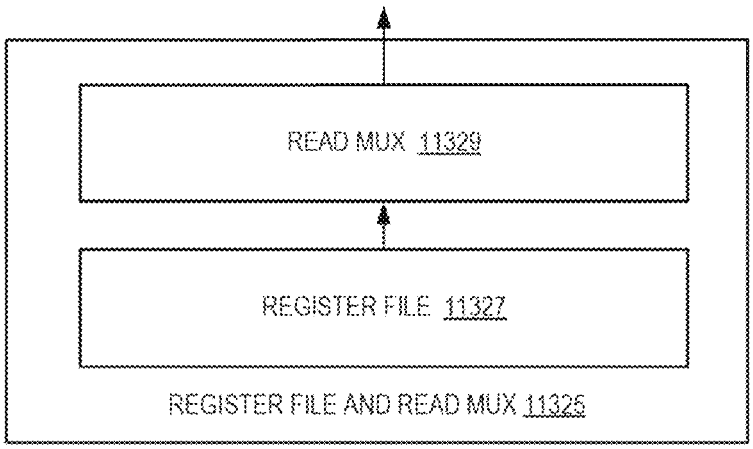
Figure 114:
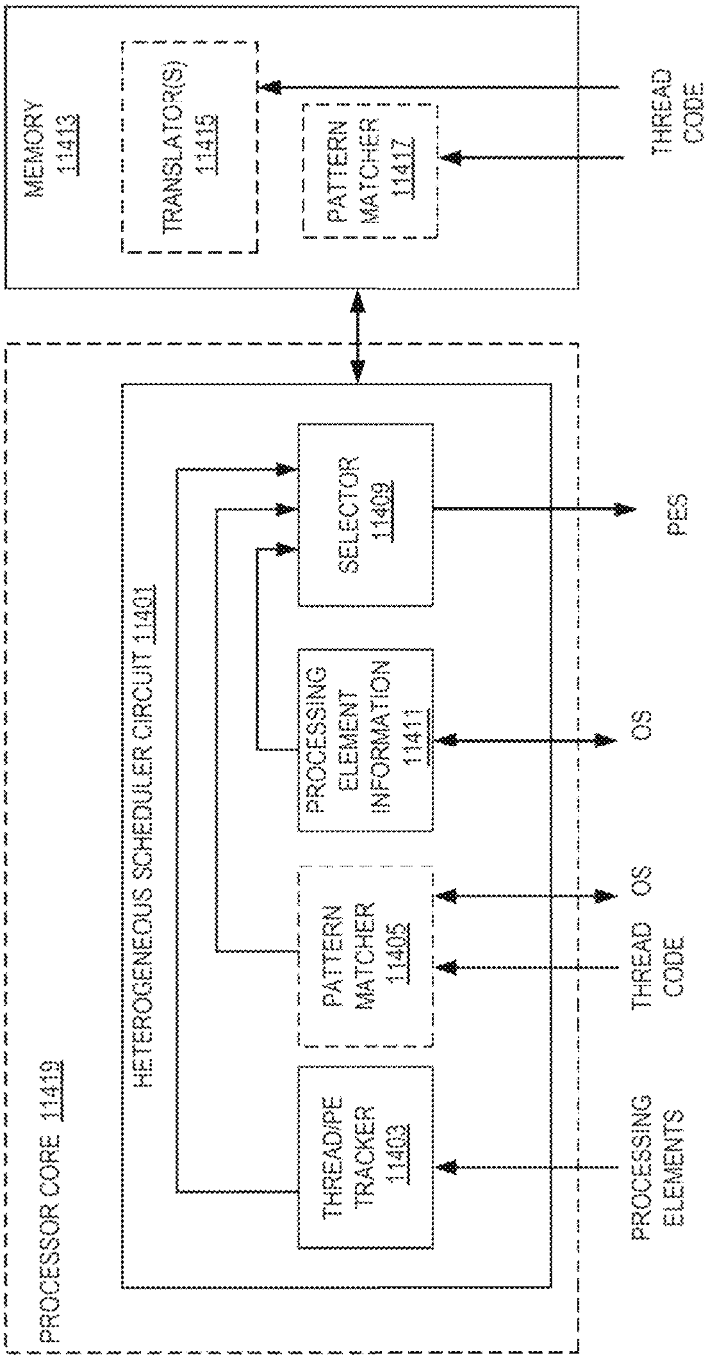
Figure 115:
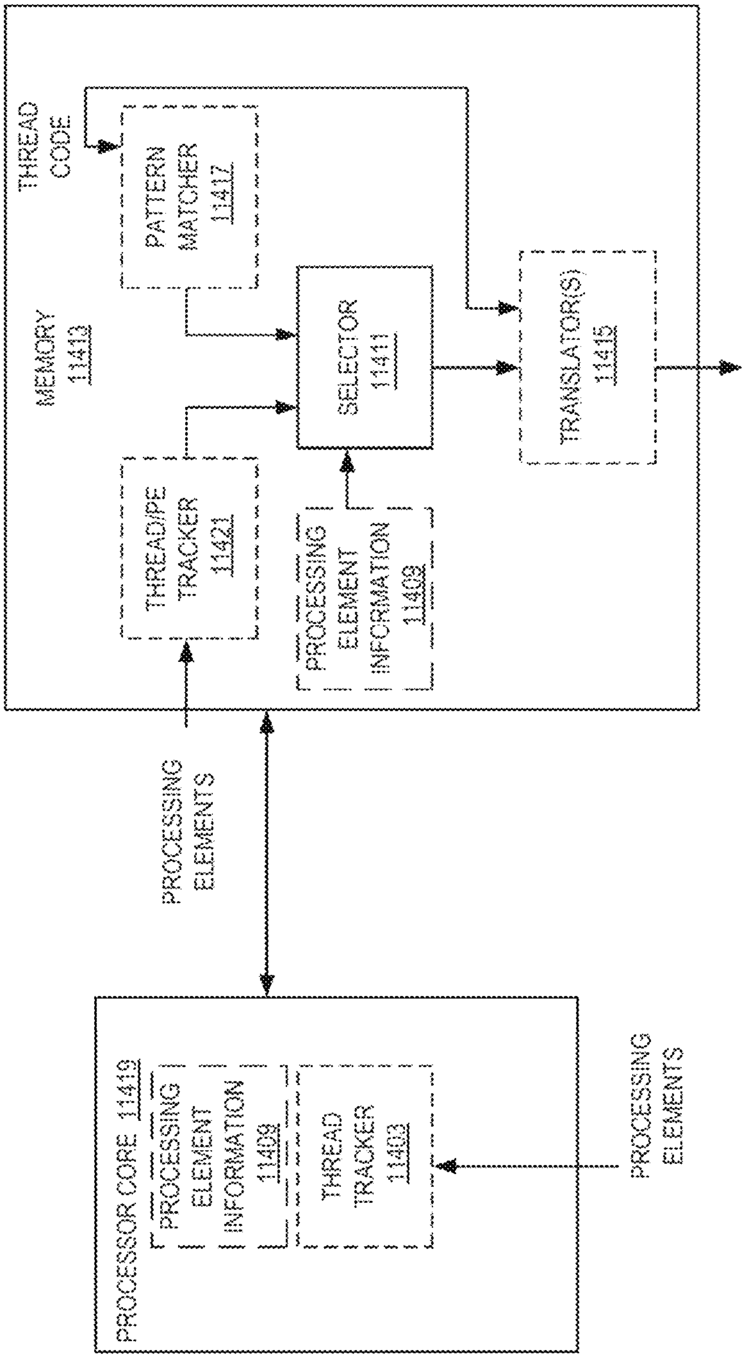
Figure 116:
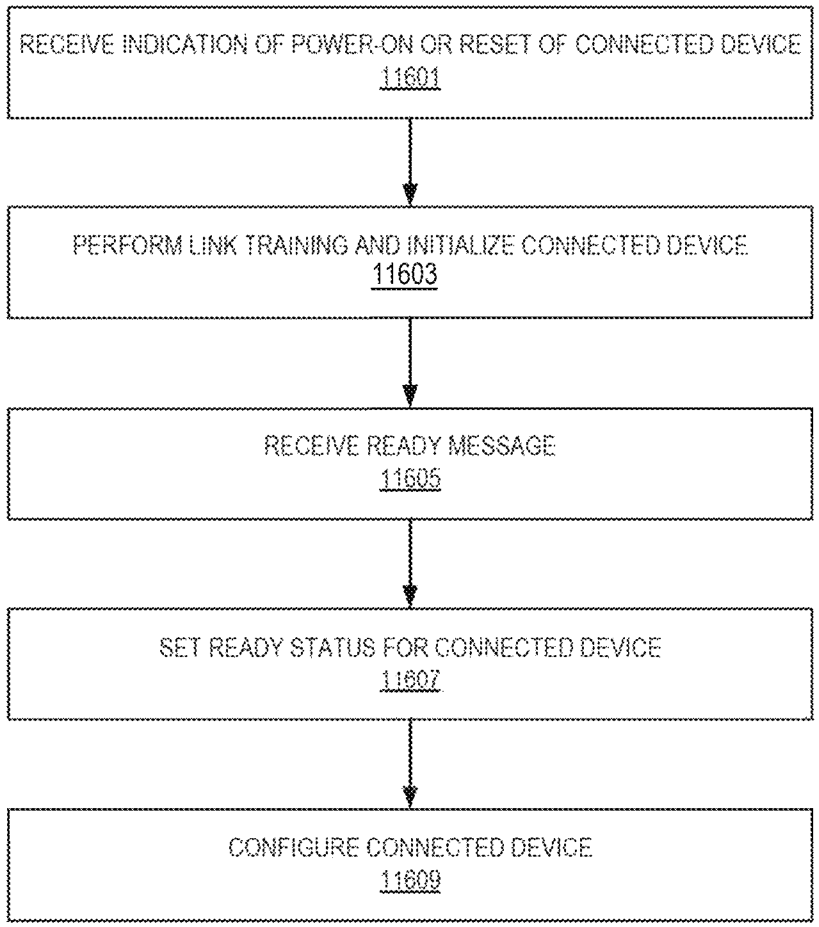
Figure 117A:
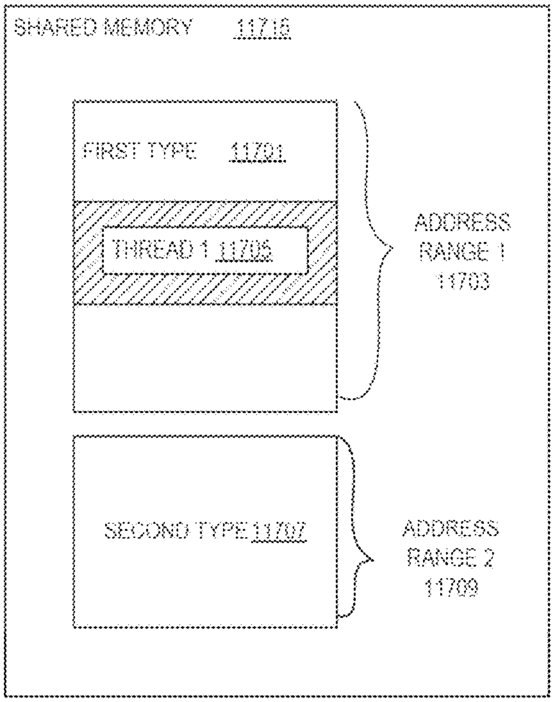
Figure 117B:
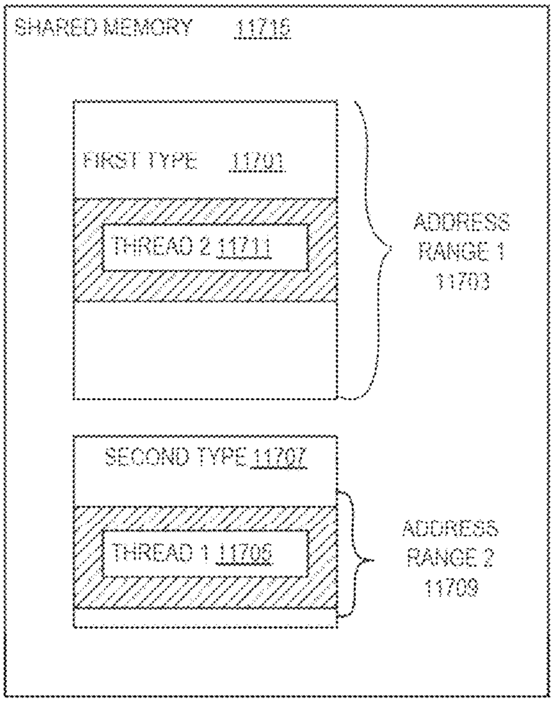
Figure 118:
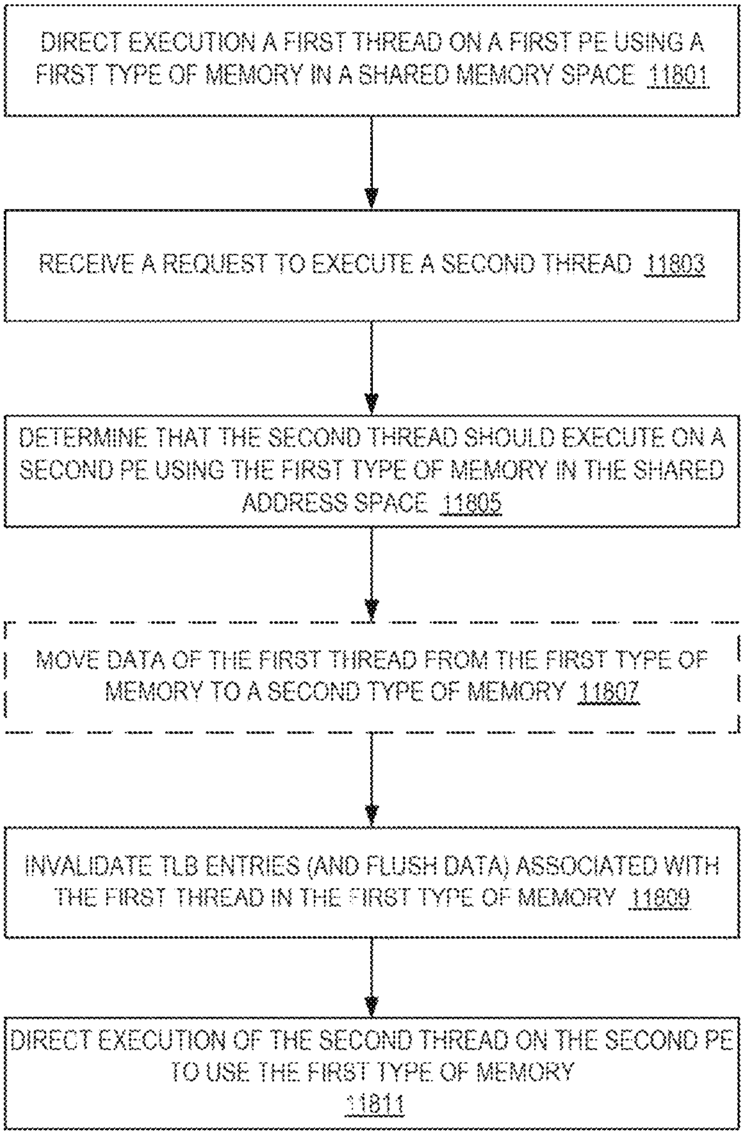
Figure 119:
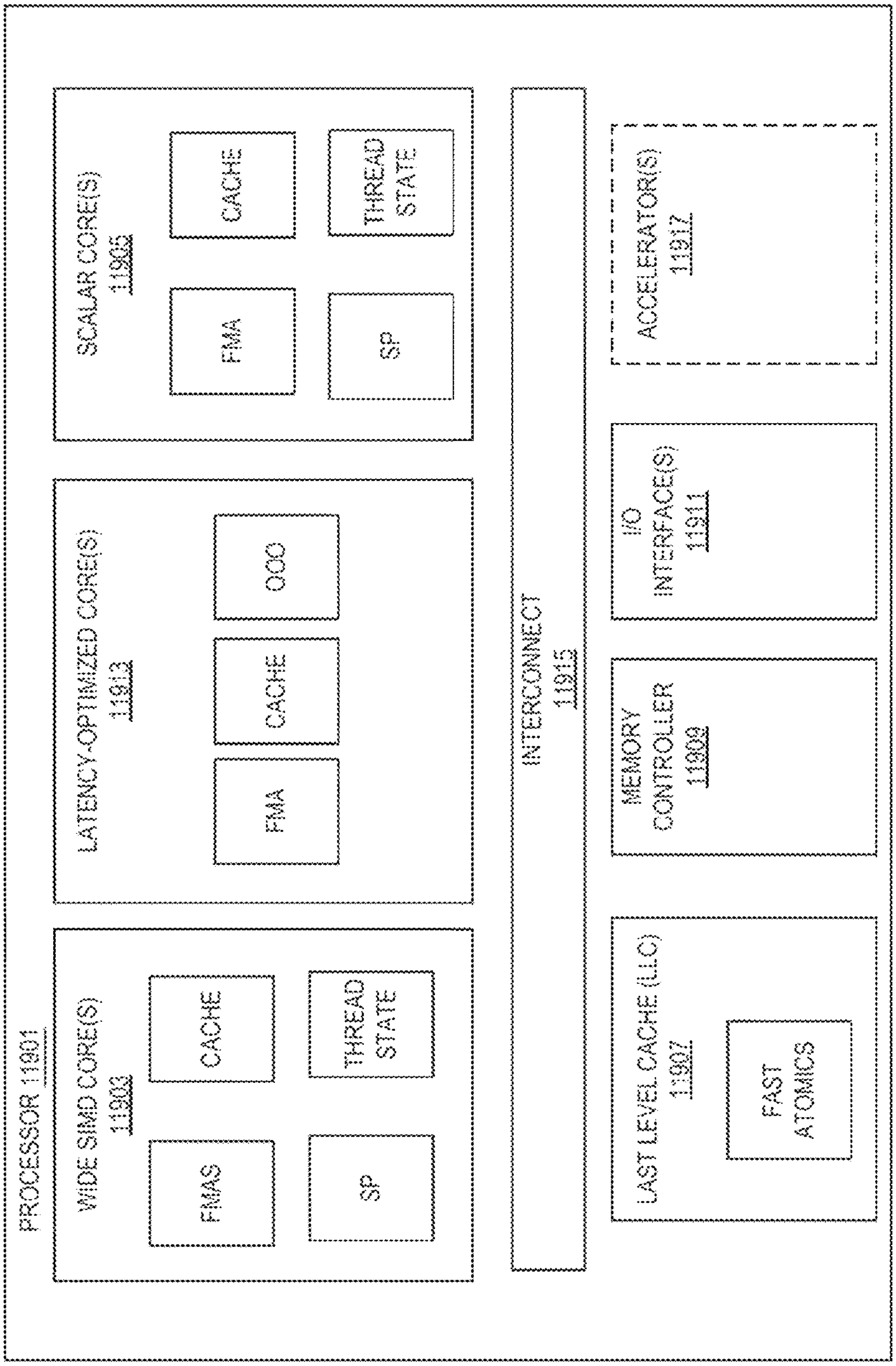
Figure 120:
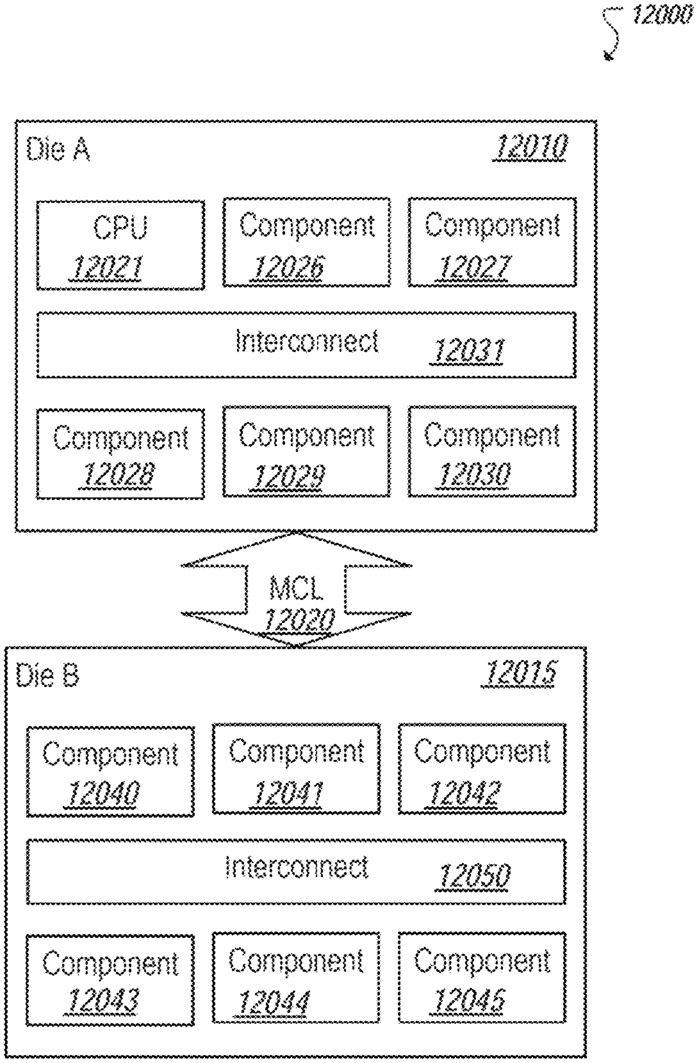
Figure 121:
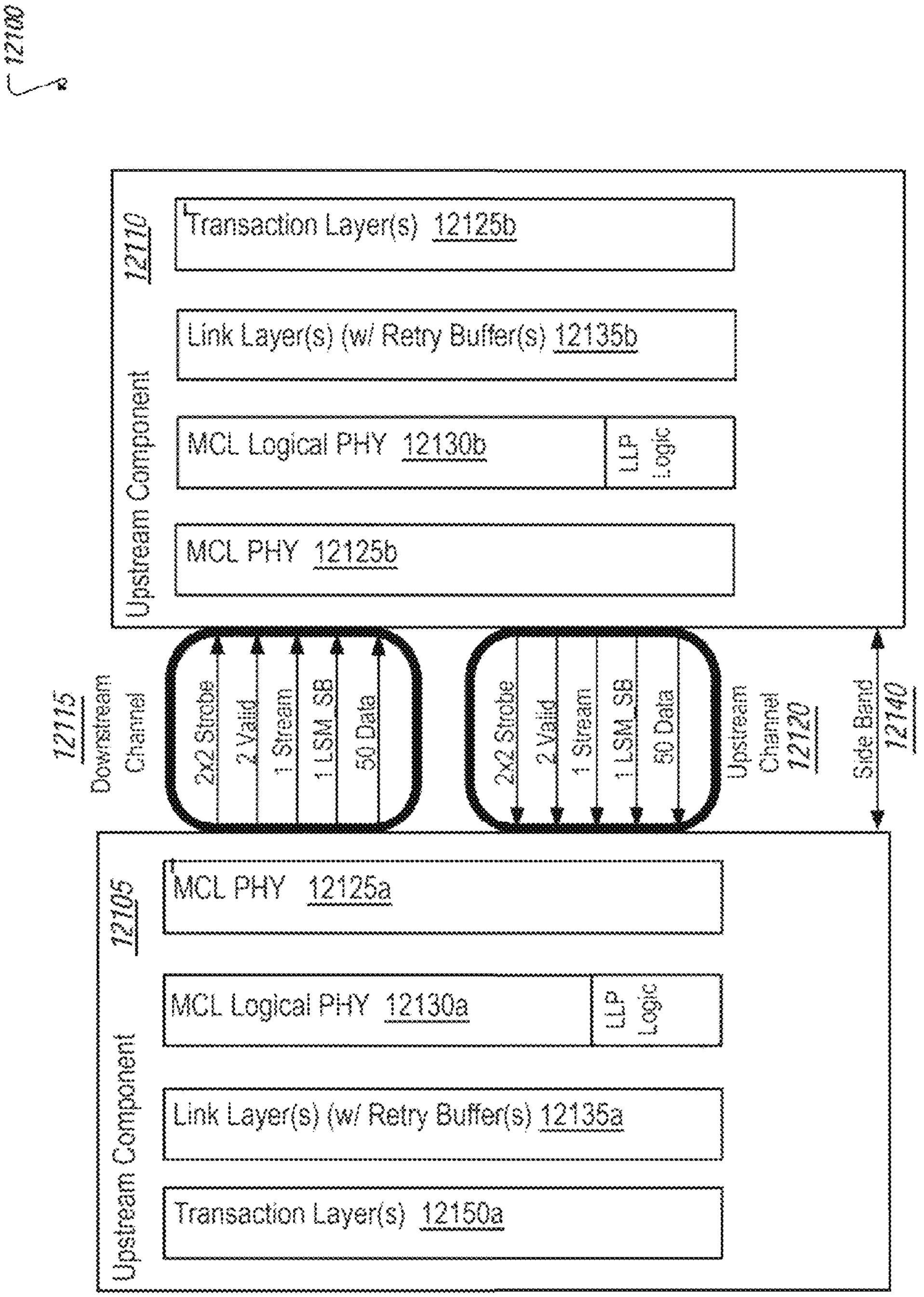
Figure 122:
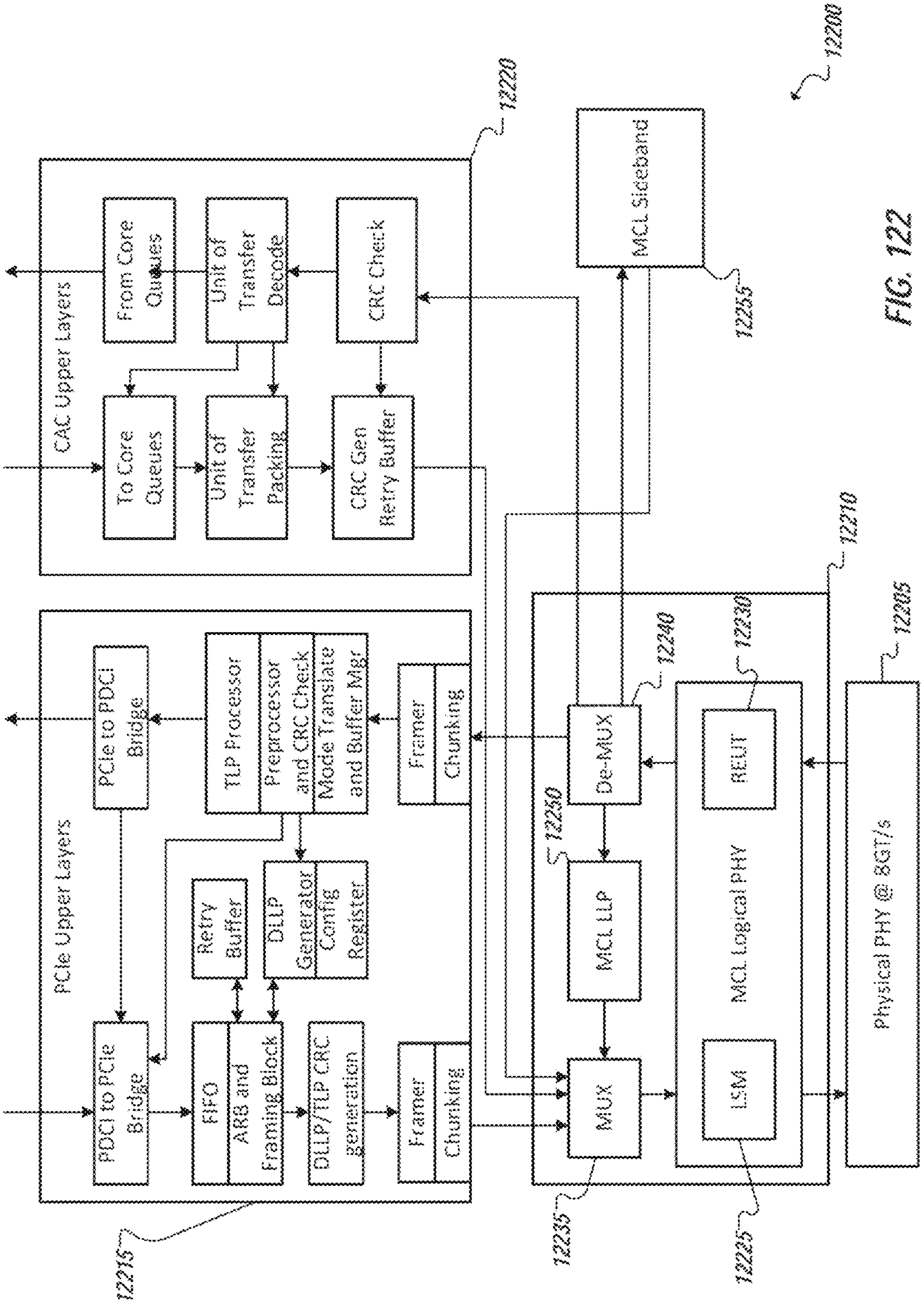
Figure 123:
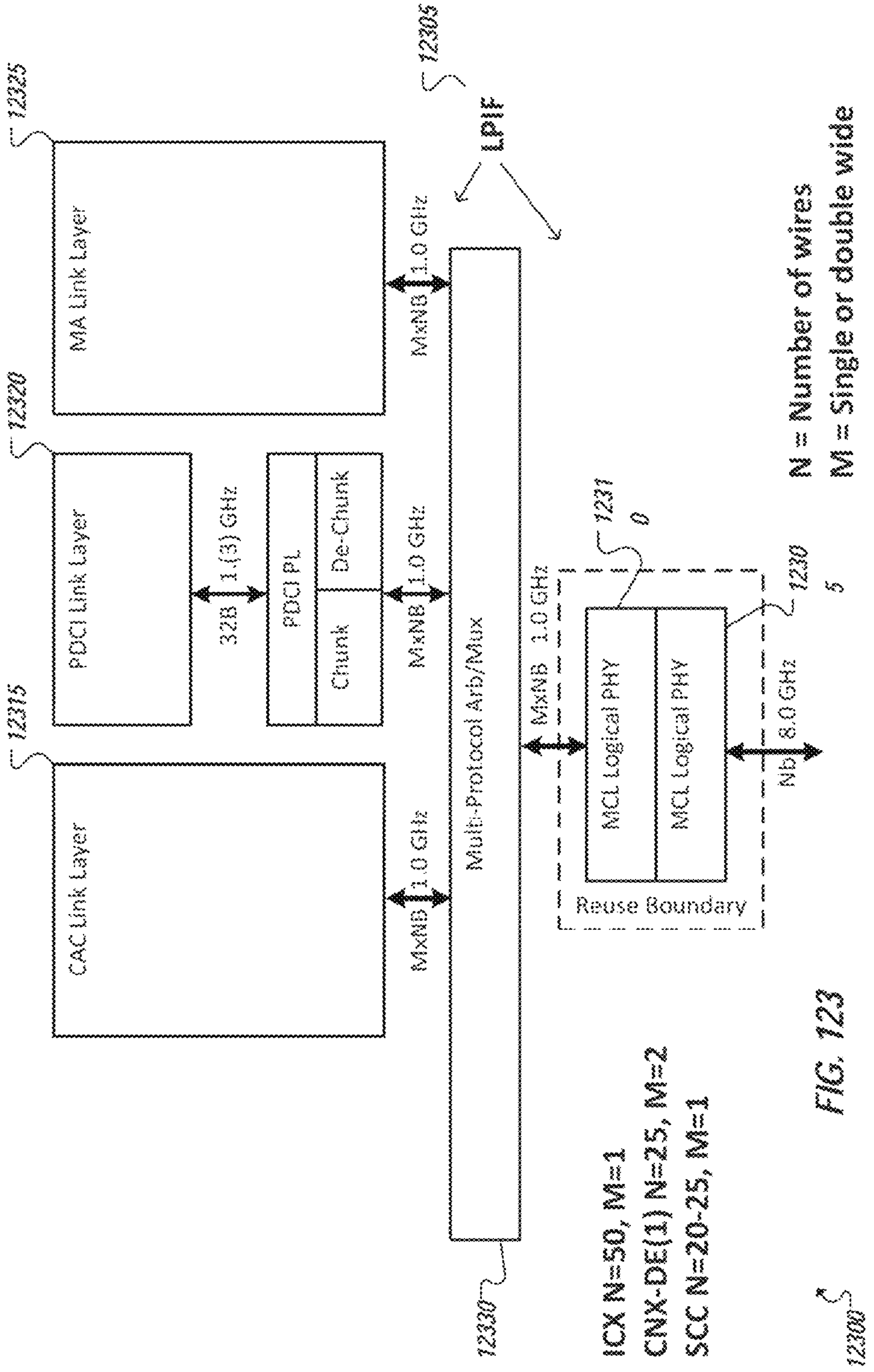
Figure 124:
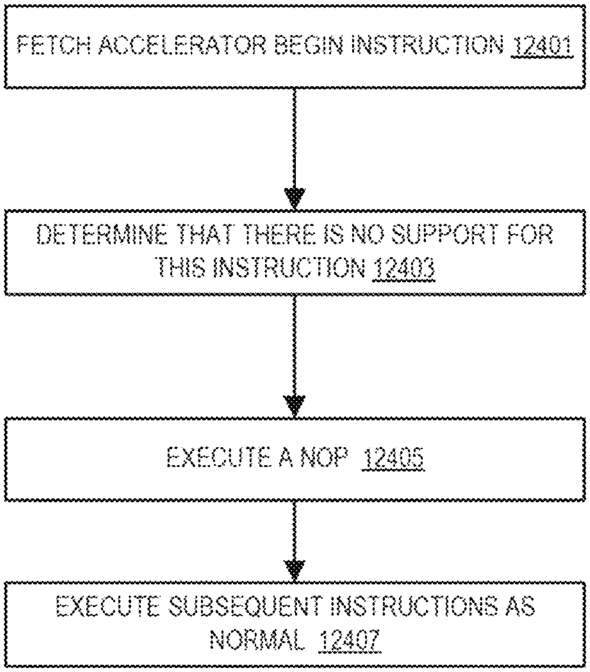
Figure 125:
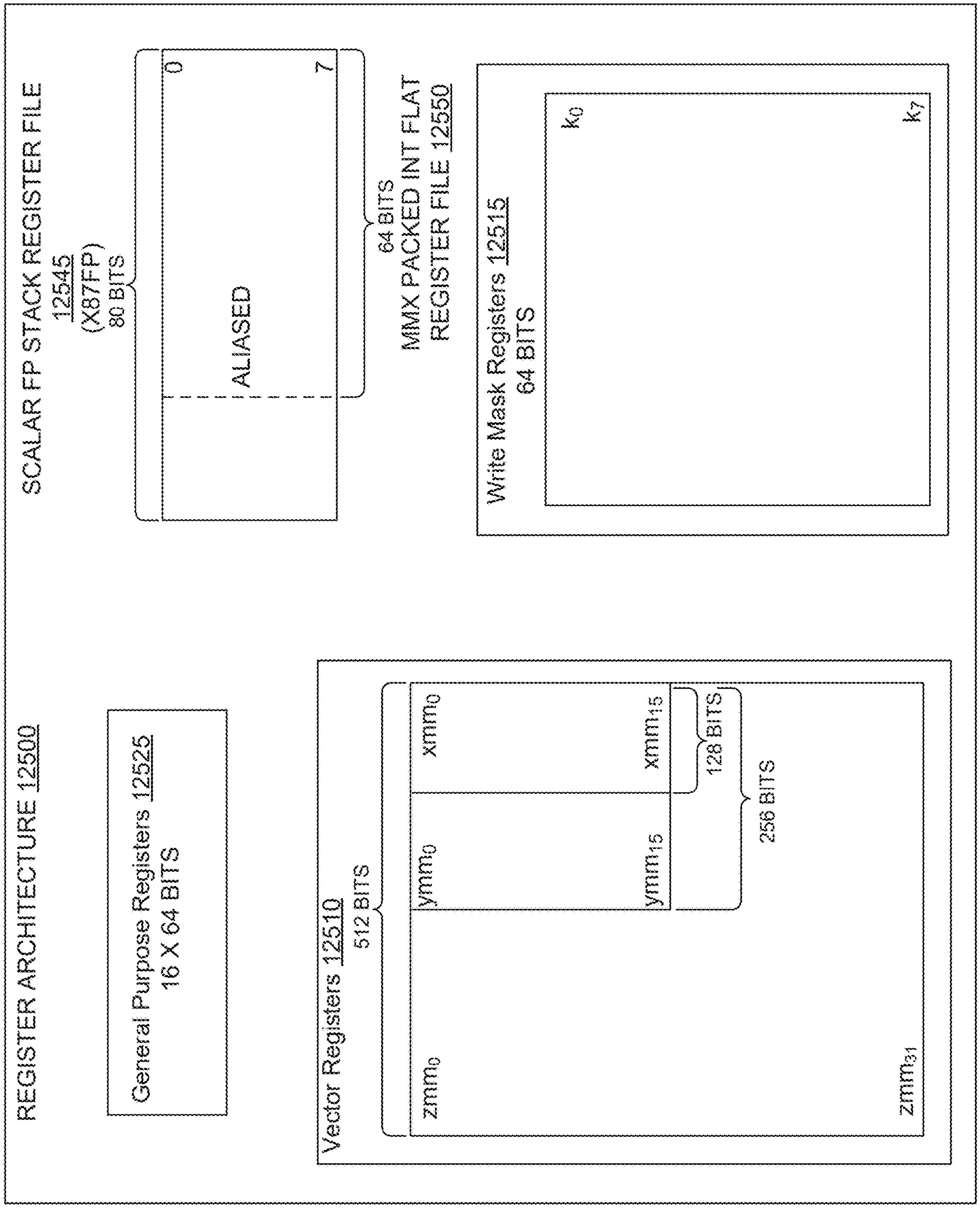
Figure 127A:
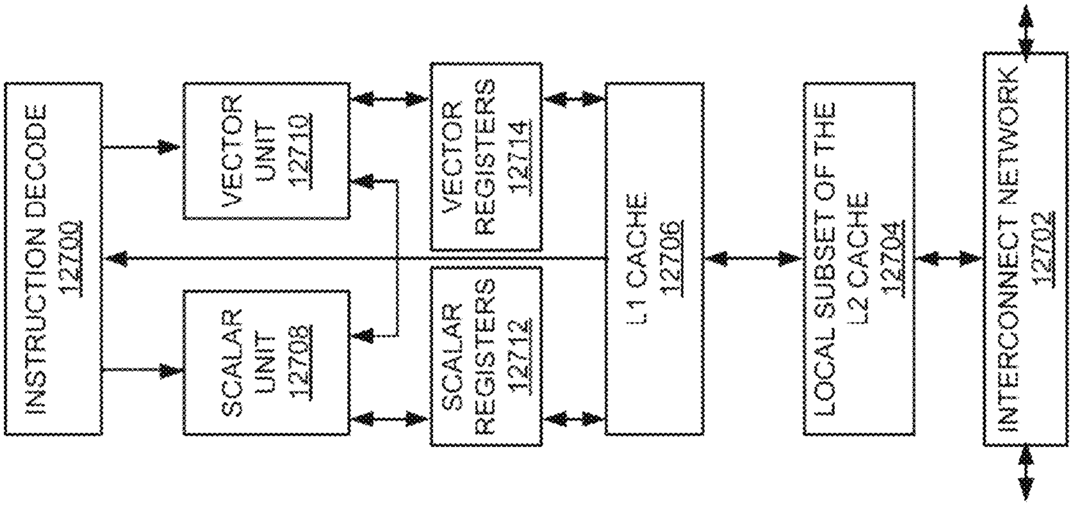
Figure 127B:
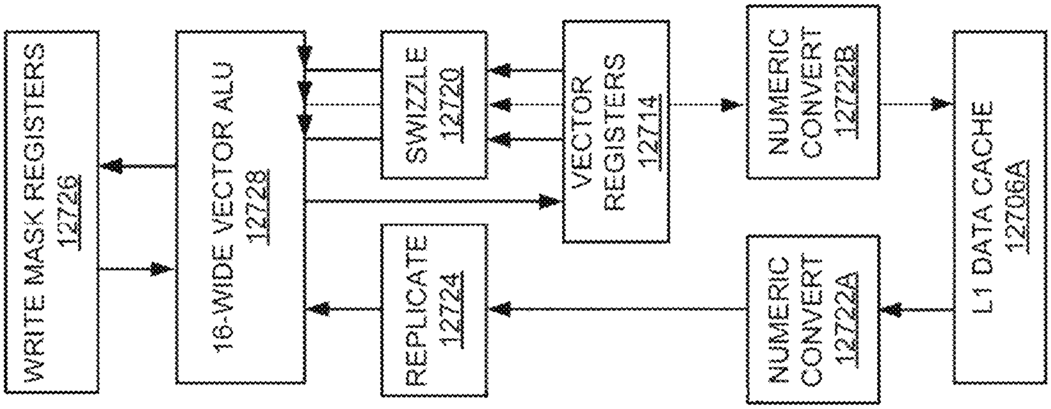
Figure 128:
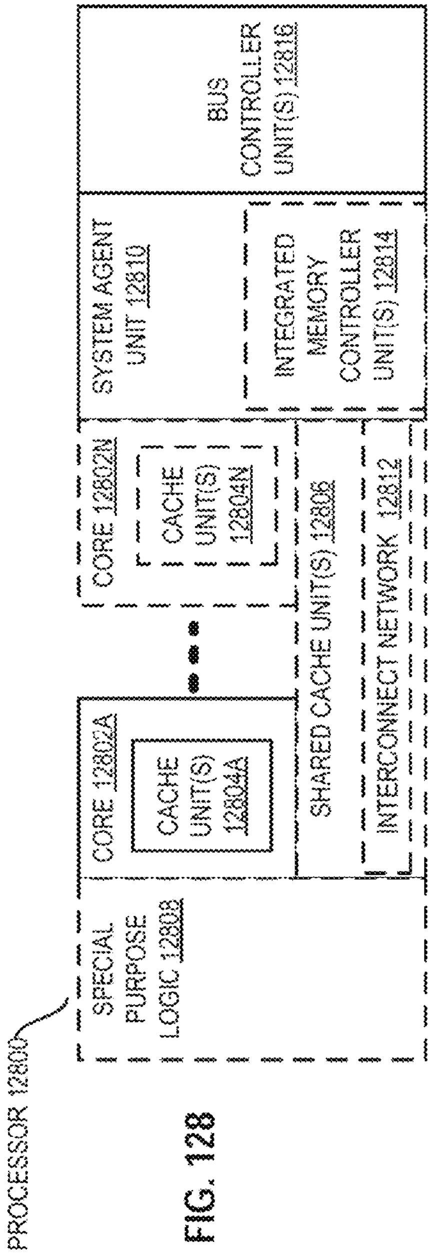
Figure 129:
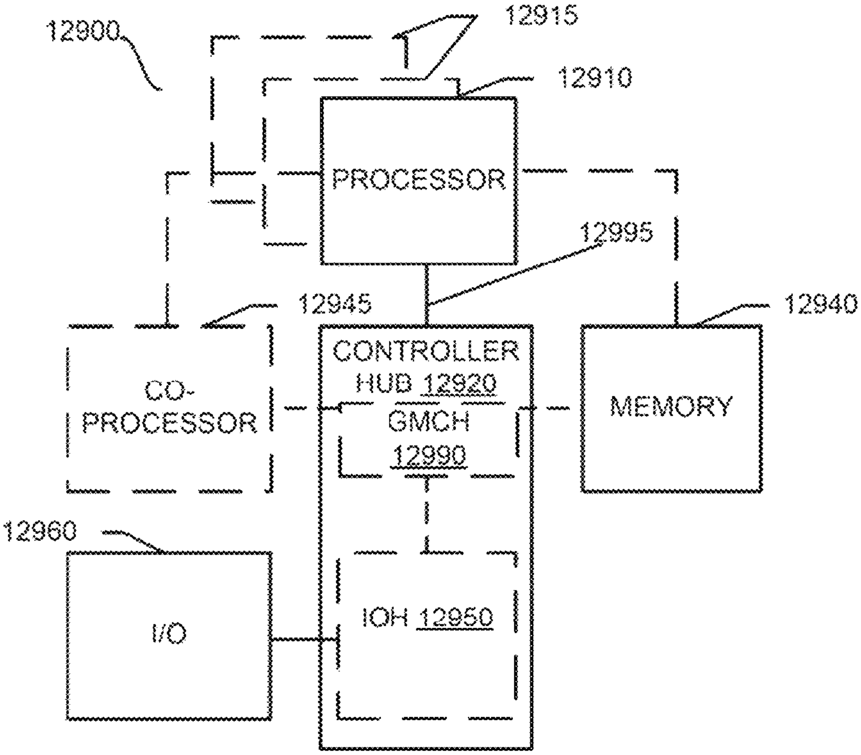
Figure 130:
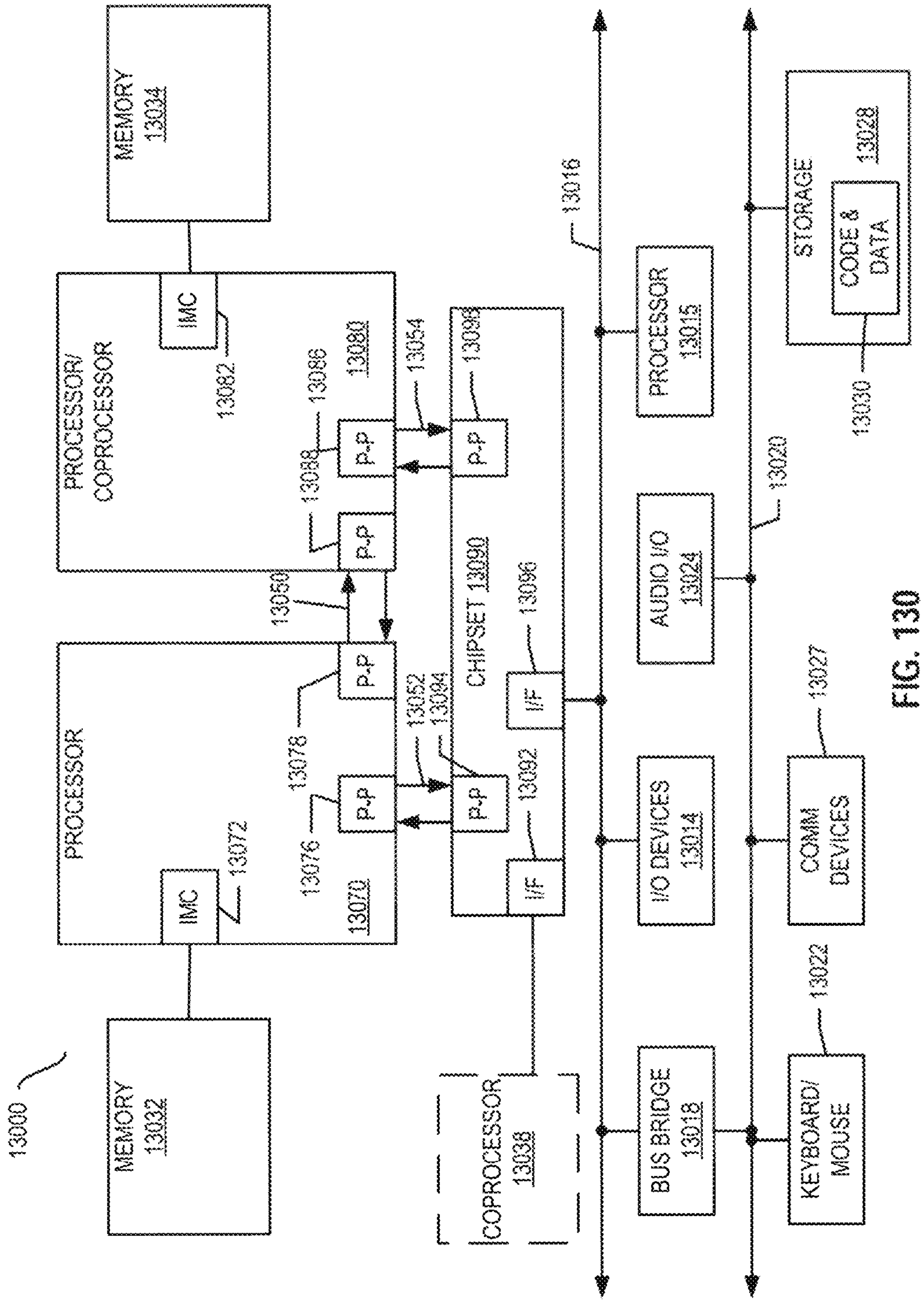
Figure 131:
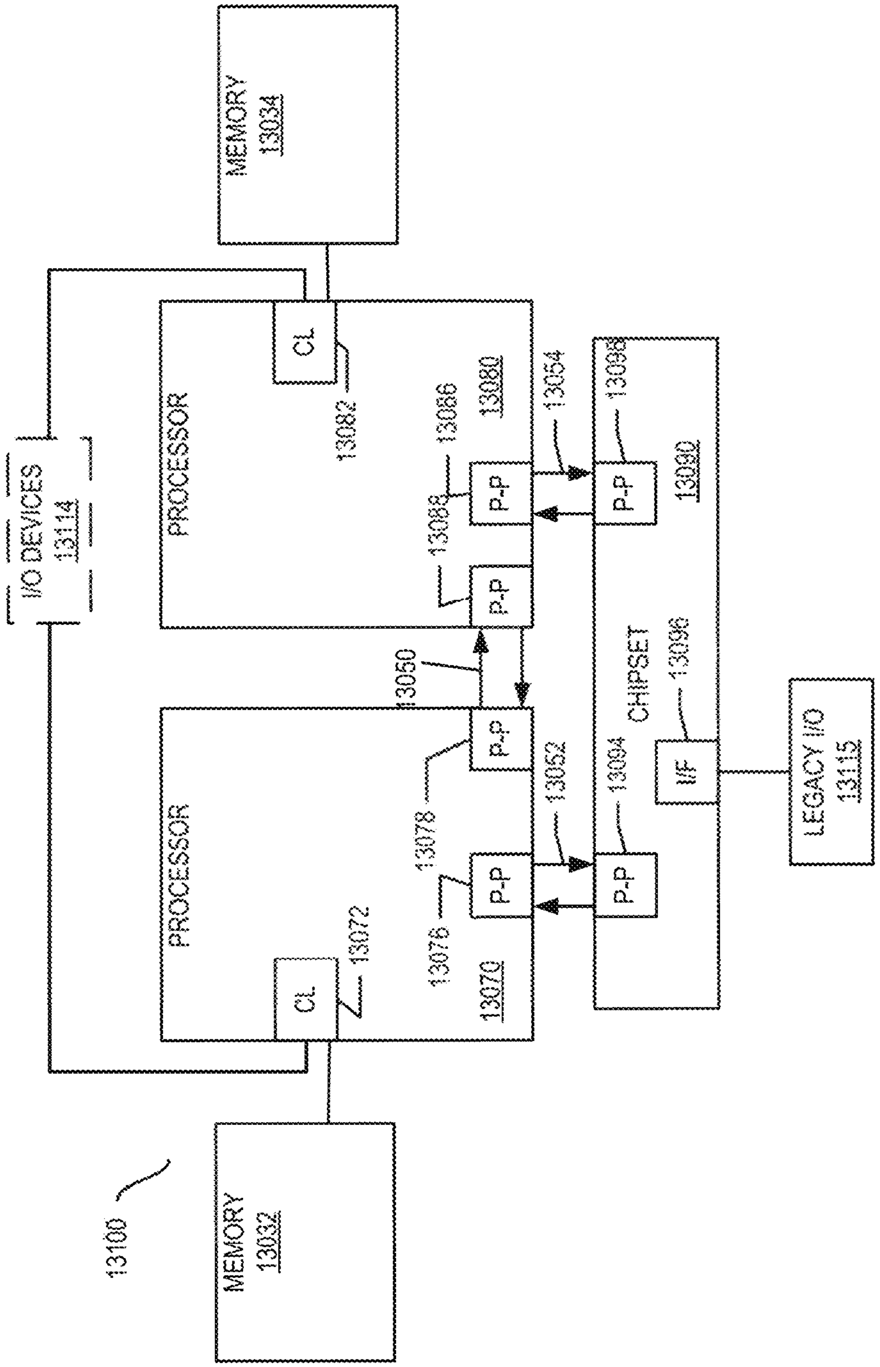
Figure 132:
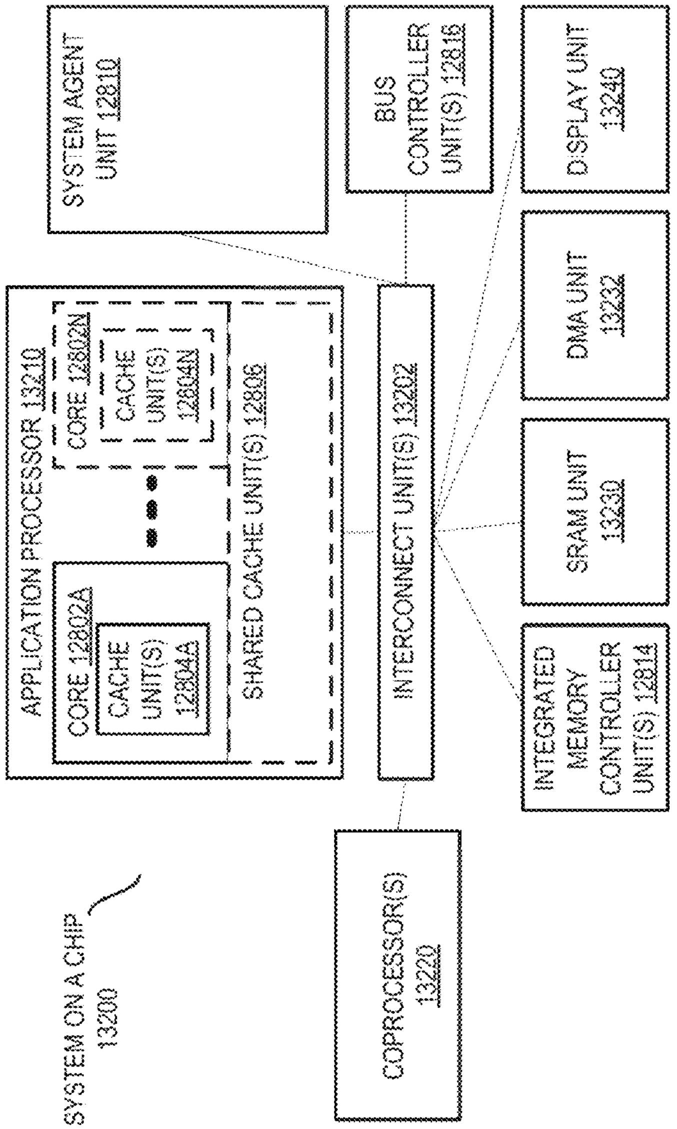
Figure 133:
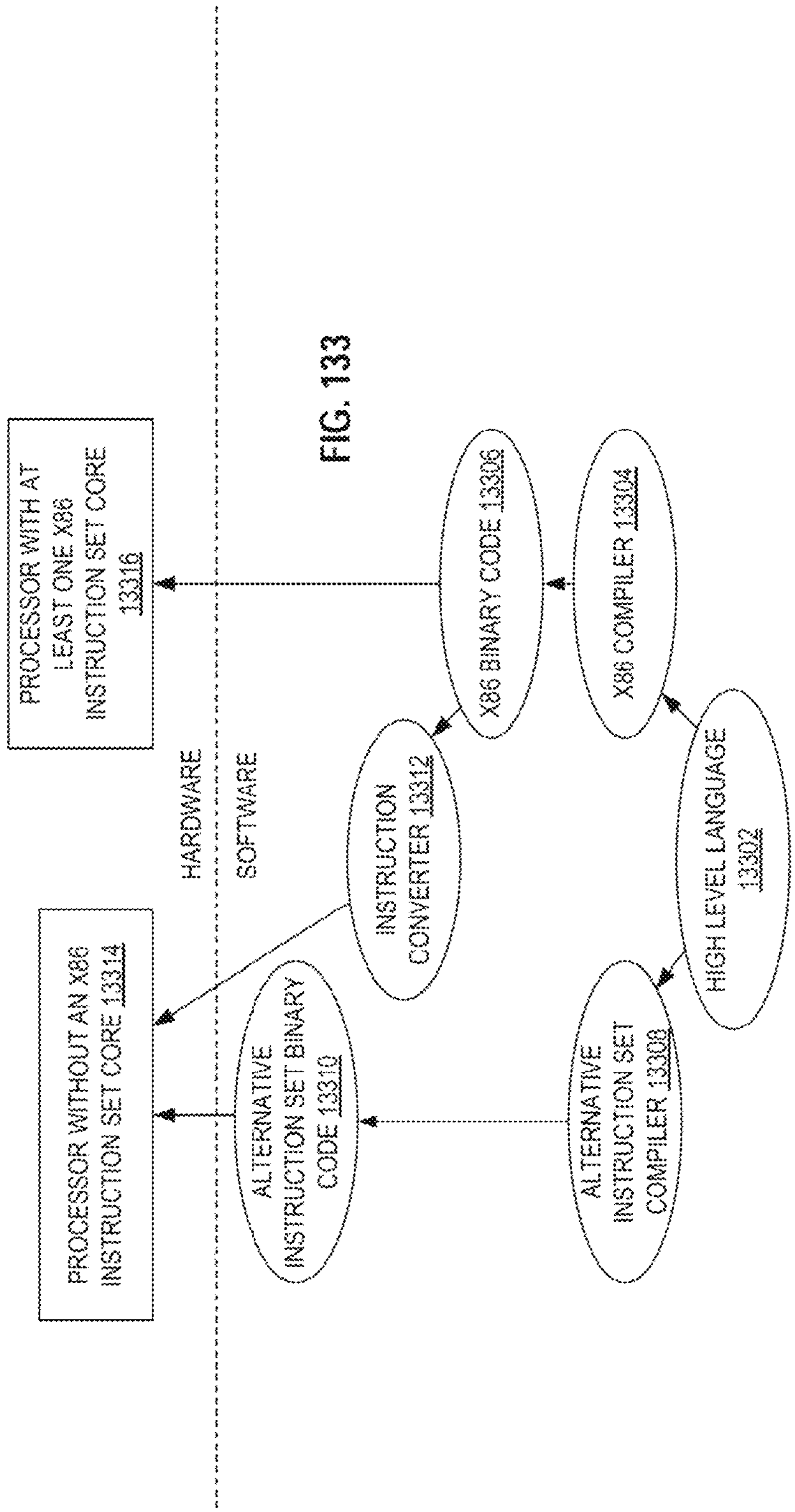

FIGS. 113A-C illustrate exemplary hardware for performing a MADD instruction;

FIG. 114 illustrates an example of hardware heterogeneous scheduler circuit and its interactions with memory;

FIG. 115 illustrates an example of a software heterogeneous scheduler;

FIG. 116 illustrates an embodiment of a method for post-system boot device discovery;

FIGS. 117(A)-(B) illustrate an example of movement for a thread in shared memory;

FIG. 118 illustrates an exemplary method for thread movement which may be performed by the heterogeneous scheduler;

FIG. 119 is a block diagram of a processor configured to present an abstract execution environment as detailed above;

FIG. 120 is a simplified block diagram illustrating an exemplary multi-chip configuration;

FIG. 121 illustrates a block diagram representing at least a portion of a system including an example implementation of a multichip link (MCL);

FIG. 122 illustrates a block diagram of an example logical PHY of an example MCL;

FIG. 123 illustrates a simplified block diagram is shown illustrating another representation of logic used to implement a MCL;

FIG. 124 illustrates an example of execution when ABEGIN/AEND is not supported;

FIG. 125 is a block diagram of a register architecture according to one embodiment of the invention;

FIG. 126A is a block diagram illustrating both an exemplary in-order pipeline and an exemplary register renaming, out-of-order issue/execution pipeline according to embodiments of the invention;

FIG. 126B is a block diagram illustrating both an exemplary embodiment of an in-order architecture core and an exemplary register renaming, out-of-order issue/execution architecture core to be included in a processor according to embodiments of the invention;

FIGS. 127A-B illustrate a block diagram of a more specific exemplary in-order core architecture, which core would be one of several logic blocks (including other cores of the same type and/or different types) in a chip;

FIG. 128 is a block diagram of a processor that may have more than one core, may have an integrated memory controller, and may have integrated graphics according to embodiments of the invention;

FIG. 129 shown a block diagram of a system in accordance with one embodiment of the present invention;

FIG. 130 is a block diagram of a first more specific exemplary system in accordance with an embodiment of the present invention;

FIG. 131 is a block diagram of a second more specific exemplary system in accordance with an embodiment of the present invention;

FIG. 132 is a block diagram of a SoC in accordance with an embodiment of the present invention; and FIG. 133 is a block diagram contrasting the use of a software instruction converter to convert binary instructions in a source instruction set to binary instructions in a target instruction set according to embodiments of the invention.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed in the background, it can be challenging to deploy accelerator solutions and manage the complexity of portably utilizing accelerators as there is a wide spectrum of stock units and platforms which implement different mixes of accelerators. Furthermore, given the multiplicity of operating systems (and versions, patches, etc.), deploying accelerators via the device driver model has limitations including hurdles to adoption due to developer effort, non-portability, and the strict performance requirements of big data processing. Accelerators are typically hardware devices (circuits) that perform functions more efficiently than software running on a general purpose processor. For example, hardware accelerators may be used to improve the execution of a specific algorithm/tasks (such as video encoding or decoding, specific hash functions, etc.) or classes of algorithms/tasks (such as machine learning, sparse data manipulation, cryptography, graphics, physics, regular expression, packet processing, artificial intelligence, digital signal processing, etc.). Examples of accelerators include, but are not limited graphics processing units ("GPUs"), fixed-function field-programmable gate array ("FPGA") accelerators, and fixed-function application specific integrated circuits ("ASICs"). Note that an accelerator, in some implementations, may be general purpose central processing unit ("CPU") if that CPU is more efficient than other processors in the system.

The power budget of a given system (e.g., system-on-a-chip ("SOC"), processor stock unit, rack, etc.) can be consumed by processing elements on only a fraction of the available silicon area. This makes it advantageous to build a variety of specialized hardware blocks that reduce energy consumption for specific operations, even if not all of the hardware blocks may be active simultaneously.

Embodiments of systems, methods, and apparatuses for selecting a processing element (e.g., a core or an accelerator) to process a thread, interfacing with the processing element, and/or managing power consumption within a heterogeneous multiprocessor environment are detailed. For example, in various embodiments, heterogeneous multiprocessors are configured (e.g., by design or by software) to dynamically migrate a thread between different types of processing elements of the heterogeneous multiprocessors based on characteristics of a corresponding workload of the thread and/or processing elements, to provide a programmatic interface to one or more of the processing elements, to translate code for execution on a particular processing element, to select a communication protocol to use with the selected processing element based on the characteristics of the workload and the selected processing element, or combinations thereof.

In a first aspect, a workload dispatch interface, i.e., a heterogeneous scheduler, presents a homogeneous multiprocessor programming model to system programmers. In particular, this aspect may enable programmers to develop software targeted for a specific architecture, or an equivalent abstraction, while facilitating continuous improvements to the underlying hardware without requiring corresponding changes to the developed software.

In a second aspect, a multiprotocol link allows a first entity (such as a heterogeneous scheduler) to communicate with a multitude of devices using a protocol associated with the communication. This replaces the need to have separate links for device communication. In particular, this link has three or more protocols dynamically multiplexed on it.

For example, the common link supports protocols consisting of: 1) a producer/consumer, discovery, configuration, interrupts (PDCI) protocol to enable device discovery, device configuration, error reporting, interrupts, DMA-style data transfers and various services as may be specified in one or more proprietary or industry standards (such as, e.g., a PCI Express specification or an equivalent alternative); 2) a caching agent coherence (CAC) protocol to enable a device to issue coherent read and write requests to a processing element; and 3) a memory access (MA) protocol to enable a processing element to access a local memory of another processing element.

In a third aspect, scheduling, migration, or emulation of a thread, or portions thereof, is done based on a phase of the thread. For example, a data parallel phase of the thread is typically scheduled or migrated to a SIMD core; a thread parallel phase of the thread is typically scheduled or migrated to one or more scalar cores; a serial phase is typically scheduled or migrated to an out-of-order core. Each of the core types either minimize energy or latency both of which are taken into account for the scheduling, migration, or emulation of the thread. Emulation may be used if scheduling or migration is not possible or advantageous.

In a fourth aspect, a thread, or portions thereof, are offloaded to an accelerator opportunistically. In particular, an accelerator begin (ABEGIN) instruction and an accelerator end (AEND) instruction of the thread, or portions thereof, bookend instructions that may be executable on an accelerator. If an accelerator is not available, then the instructions between ABEGIN and AEND are executed as normal. However, when an accelerator is available, and it is desirable to use the accelerator (use less power, for example), then the instructions between the ABEGIN and AEND instructions are translated to execute on that accelerator and scheduled for execution on that accelerator. As such, the use of the accelerator is opportunistic.

In a fifth aspect, a thread, or portions thereof, is analyzed for (opportunistic) offload to an accelerator without the use of ABEGIN or AEND. A software, or hardware, pattern match is run against the thread, or portions thereof, for code that may be executable on an accelerator. If an accelerator is not available, or the thread, or portions thereof, does not lend itself to accelerator execution, then the instructions of the thread are executed as normal. However, when an accelerator is available, and it is desirable to use the accelerator (use less power, for example), then the instructions are translated to execute on that accelerator and scheduled for execution on that accelerator. As such, the use of the accelerator is opportunistic.

In a sixth aspect, a translation of a code fragment (portion of a thread) to better fit a selected destination processing element is performed. For example, the code fragment is: 1) translated to utilize a different instruction set, 2) made more parallel, 3) made less parallel (serialized), 4) made data parallel (e.g., vectorized), and/or 5) made less data parallel (e.g., non-vectorized).

In a seventh aspect, a work queue (either shared or dedicated) receives descriptors which define the scope of work to be done by a device. Dedicated work queues store descriptors for a single application while shared work queues store descriptors submitted by multiple applications. A hardware interface/arbiter dispatches descriptors from the work queues to the accelerator processing engines in accordance with a specified arbitration policy (e.g., based on the processing requirements of each application and QoS/fairness policies).

In an eighth aspect, an improvement for dense matrix multiplication allows for two-dimensional matrix multiplication with the execution of a single instruction. A plurality of packed data (SIMD, vector) sources are multiplied against a single packed data source. In some instances, a binary tree is used for the multiplications.

Figure 1:
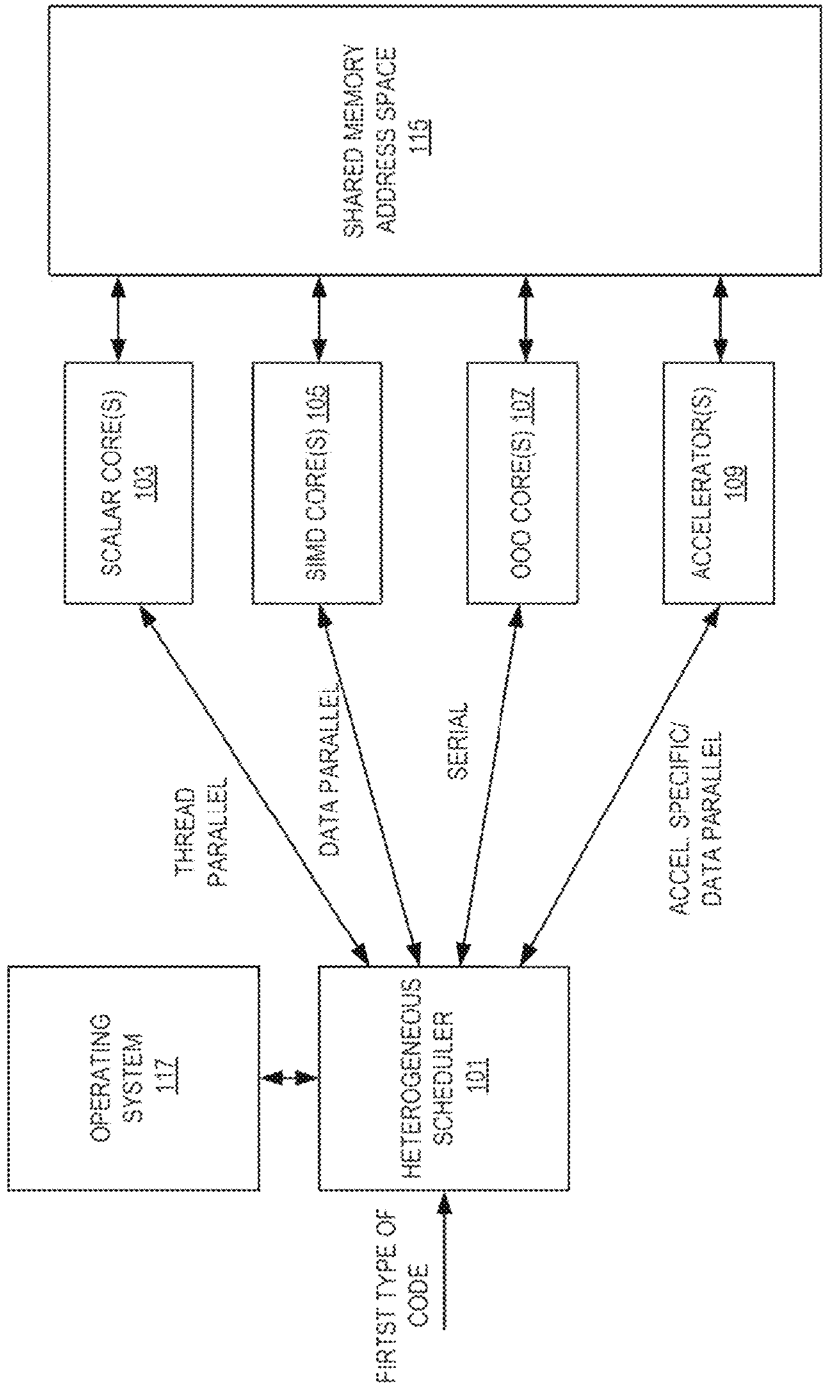
FIG. 1 is a representation of a heterogeneous multiprocessing execution environment.

FIG. 1 is a representation of a heterogeneous multiprocessing execution environment. In this example, a code fragment (e.g., one or more instructions associated with a software thread) of a first type is received by heterogeneous scheduler 101. The code fragment may be in the form of any number of source code representations, including, for example, machine code, an intermediate representation, bytecode, text based code (e.g., assembly code, source code of a high-level language such as C++), etc. Heterogeneous scheduler 101 presents a homogeneous multiprocessor programming model (e.g., such that all threads appears as if they are executing on a scalar core to a user and/or operating system and determines a workload type (program phase) for the received code fragment, selects a type of processing element (scalar, out-of-order (OOO), single instruction, multiple data (SIMD), or accelerator) corresponding to the determined workload type to process the workload (e.g., scalar for thread parallel code, OOO for serial code, SIMD for data parallel, and an accelerator for data parallel), and schedules the code fragment for processing by the corresponding processing element. In the specific implementation shown in FIG. 1, the processing element types include scalar core(s) 103 (such as in-order cores), single-instruction-multiple-data (SIMD) core(s) 105 that operate on packed data operands wherein a register has multiple data elements stored consecutively, low latency, out-of-order core(s) 107, and accelerator(s) 109. In some embodiments, scalar core(s) 103, single-instruction-multiple-data (SIMD) core(s) 105, low latency, out-of-order core(s) 107 are in a heterogeneous processor and accelerator(s) 109 are external to this heterogeneous processor. It should be noted, however, that various different arrangements of processing elements may be utilized. In some implementations, the heterogeneous scheduler 101 translates or interprets the received code fragment or a portion thereof into a format corresponding to the selected type of processing element.

The processing elements 103-109 may support different instruction set architectures (ISAs). For example, an out-of-order core may support a first ISA and an in-order core may support a second ISA. This second ISA may be a set (sub or super) of the first ISA, or be different. Additionally, the processing elements may have different microarchitectures. For example, a first out-of-order core supports a first microarchitecture and an in-order core a different, second microarchitecture. Note that even within a particular type of processing element the ISA and microarchitecture may be different. For example, a first out-of-order core may support a first microarchitecture and a second out-of-order core may support a different microarchitecture. Instructions are "native" to a particular ISA in that they are a part that ISA. Native instructions execute on particular microarchitectures without needing external changes (e.g., translation).

In some implementations, one or more of the processing elements are integrated on a single die, e.g., as a system-on-chip (SoC). Such implementations may benefit, e.g., from improved communication latency, manufacturing/costs, reduced pin count, platform miniaturization, etc. In other implementations, the processing elements are packaged together, thereby achieving one or more of the benefits of the SoC referenced above without being on a single die. These implementations may further benefit, e.g., from different process technologies optimized per processing element type, smaller die size for increased yield, integration of proprietary intellectual property blocks, etc. In some conventional multi-package limitations, it may be challenging to communicate with disparate devices as they are added on. The multi-protocol link discussed herein minimizes, or alleviates, this challenge by presenting to a user, operating system ("OS"), etc. a common interface for different types of devices.

In some implementations, heterogeneous scheduler 101 is implemented in software stored in a computer readable medium (e.g., memory) for execution on a processor core (such as OOO core(s) 107). In these implementations, the heterogeneous scheduler 101 is referred to as a software heterogeneous scheduler. This software may implement a binary translator, a just-in-time ("JIT") compiler, an OS 117 to schedule the execution of threads including code fragments, a pattern matcher, a module component therein, or a combination thereof.

In some implementations, heterogeneous scheduler 101 is implemented in hardware as circuitry and/or finite state machines executed by circuitry. In these implementations, the heterogeneous scheduler 101 is referred to as a hardware heterogeneous scheduler.

Figure 2:
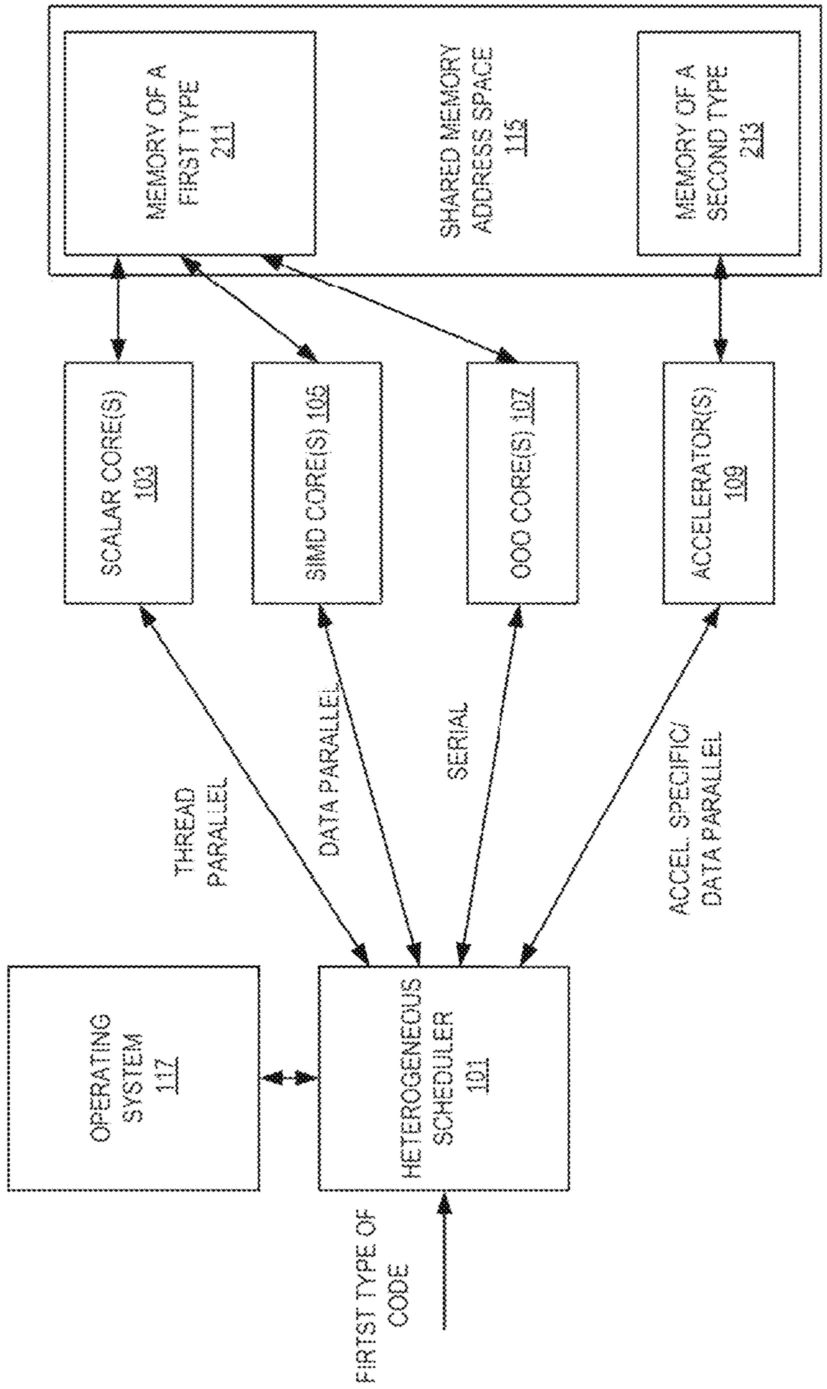
FIG. 2 is a representation of a heterogeneous multiprocessing execution environment.

From a programmatic (e.g., OS 117, emulation layer, hypervisor, secure monitor, etc.) point of view, each type of processing element 103-109 utilizes a shared memory address space 115. In some implementations, shared memory address space 115 optionally comprises two types of memory, memory 211 and memory 213, as illustrated in FIG. 2. In such implementations, types of memories may be distinguished in a variety of ways, including, but not limited to: differences in memory locations (e.g., located on different sockets, etc.), differences in a corresponding interface standards (e.g., DDR4, DDR5, etc.), differences in power requirements, and/or differences in the underlying memory technologies used (e.g., High Bandwidth Memory (HBM), synchronous DRAM, etc.).

Shared memory address space 115 is accessible by each type of processing element. However, in some embodiments, different types of memory may be preferentially allocated to different processing elements, e.g., based on workload needs. For example, in some implementations, a platform firmware interface (e.g., BIOS or UEFI) or a memory storage includes a field to indicate types of memory resources available in the platform and/or a processing element affinity for certain address ranges or memory types.

The heterogeneous scheduler 101 utilizes this information when analyzing a thread to determine where the thread should be executed at a given point in time. Typically, the thread management mechanism looks to the totality of information available to it to make an informed decision as to how to manage existing threads. This may manifest itself in a multitude of ways. For example, a thread executing on a particular processing element that has an affinity for an address range that is physically closer to the processing element may be given preferential treatment over a thread that under normal circumstances would be executed on that the processing element.

Another example is that a thread which would benefit from a particular memory type (e.g., a faster version of DRAM) may have its data physically moved to that memory type and memory references in the code adjusted to point to that portion of the shared address space. For example, while a thread on the SIMD core 205 may utilize the second memory type 213, it may get moved from this usage when an accelerator 209 is active and needs that memory type 213 (or at least needs the portion allocated to the SIMD core's 205 thread).

An exemplary scenario is when a memory is physically closer to one processing element than others. A common case is an accelerator being directly connected to a different memory type than the cores.

In these examples, typically it is the OS that initiates the data movement. However, there is nothing preventing a lower level (such as the heterogeneous scheduler) from performing this function on its own or with assistance from another component (e.g., the OS). Whether or not the data of the previous processing element is flushed and the page table entry invalidated depends on the implementation and the penalty for doing the data movement. If the data is not likely to be used immediately, it may be more feasible to simply copy from storage rather than moving data from one memory type to another.

FIGS. 117(A)-(B) illustrate an example of movement for a thread in shared memory. In this example, two types of memory share an address space with each having its own range of addresses within that space. In 117(A), shared memory 11715 includes a first type of memory 11701 and a second type of memory 11707. The first type of memory 11701 has a first address range 11703 and within that range are addresses dedicated to thread 1 11705. The second type of memory 11707 has a second address range 11709.

At some point during execution of thread 1 11705, a heterogeneous scheduler makes a decision to move thread 1 11705 so that a second thread 11711 uses the addresses in the first type of memory 11701 previously assigned to thread 1 11705. This is shown in FIG. 117(B). In this example, thread 1 11705 is reassigned into the second type of memory 11707 and given a new set of addresses to use; however, this does not need to be the case. Note that the differences between types of memory may be physical or spatial (e.g., based on distance to a PE).

FIG. 118 illustrates an exemplary method for thread movement which may be performed by the heterogeneous scheduler. At 11801, a first thread is directed to execute on a first processing element ("PE") such as a core or accelerator using a first type of memory in a shared memory space. For example, in FIG. 117(A) this is thread 1.

At some point later in time, a request to execute a second thread is received at 11803. For example, an application, OS, etc., requests a hardware thread be executed.

A determination that the second thread should execute on a second PE using the first type of memory in the shared address space is made at 11805. For example, the second thread is to run on an accelerator that is directly coupled to the first type of memory and that execution (including freeing up the memory the first thread is using) is more efficient than having the second thread use a second type of memory.

In some embodiments, the data of the first thread is moved from the first type of memory to a second type memory at 11807. This does not necessarily happen if it is more efficient to simply halt execution of the execution of the first thread and start another thread in its place.

Translation lookaside buffer (TLB) entries associated with the first thread are invalidated at 11809. Additionally, in most embodiments, a flush of the data is performed.

At 11811, the second thread is directed to the second PE and is assigned a range of addresses in the first type of memory that were previously assigned to the first thread.

Figure 3:
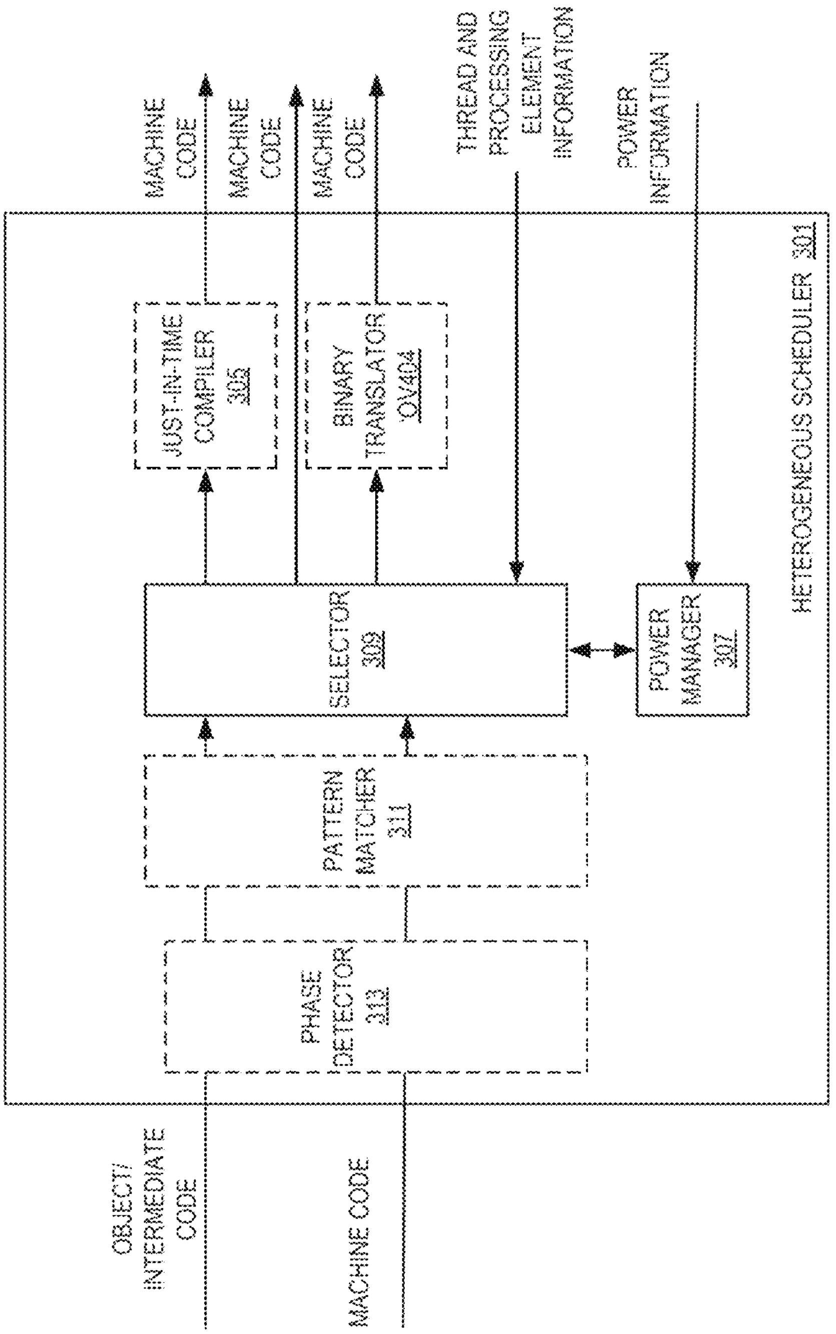
FIG. 3 illustrates an example implementation of a heterogeneous scheduler.

FIG. 3 illustrates an example implementation of a heterogeneous scheduler 301. In some instances, scheduler 301 is part of a runtime system. As illustrated, program phase detector 313 receives a code fragment, and identifies one or more characteristics of the code fragment to determine whether the corresponding program phase of execution is best characterized as serial, data parallel, or thread parallel. Examples of how this is determined are detailed below. As detailed with respect to FIG. 1, the code fragment may be in the form of any number of source code representations.

For recurring code fragments, pattern matcher 311 identifies this "hot" code and, in some instances, also identifies corresponding characteristics that indicate the workload associated with the code fragment may be better suited for processing on a different processing element. Further details related to pattern matcher 311 and its operation are set forth below in the context of FIG. 20, for example.

A selector 309 selects a target processing element to execute the native representation of the received code fragment based, at least in part, on characteristics of the processing element and thermal and/or power information provided by power manager 307. The selection of a target processing element may be as simple as selecting the best fit for the code fragment (i.e., a match between workload characteristics and processing element capabilities), but may also take into account a current power consumption level of the system (e.g., as may be provided by power manager 307), the availability of a processing element, the amount of data to move from one type of memory to another (and the associated penalty for doing so), etc. In some embodiments, selector 309 is a finite state machine implemented in, or executed by, hardware circuitry.

In some embodiments, selector 309 also selects a corresponding link protocol for communicating with the target processing element. For example, in some implementations, processing elements utilize corresponding common link interfaces capable of dynamically multiplexing or encapsulating a plurality of protocols on a system fabric or point-to-point interconnects. For example, in certain implementations, the supported protocols include: 1) a producer/consumer, discovery, configuration, interrupts (PDCI) protocol to enable device discovery, device configuration, error reporting, interrupts, DMA-style data transfers and various services as may be specified in one or more proprietary or industry standards (such as, e.g., a PCI Express specification or an equivalent alternative); 2) a caching agent coherence (CAC) protocol to enable a device to issue coherent read and write requests to a processing element; and 3) a memory access (MA) protocol to enable a processing element to access a local memory of another processing element. Selector 309 makes a choice between these protocols based on the type of request to be communicated to the processing element. For example, a producer/consumer, discovery, configuration, or interrupt request uses the PDCI protocol, a cache coherence request uses the CAC protocol, and a local memory access request uses the MA protocol.

In some implementations, a thread includes markers to indicate a phase type and as such the phase detector is not utilized. In some implementations, a thread includes hints or explicit requests for a processing element type, link protocol, and/or memory type. In these implementations, the selector 309 utilizes this information in its selection process. For example, a choice by the selector 309 may be overridden by a thread and/or user.

Depending upon the implementation, a heterogeneous scheduler may include one or more converters to process received code fragments and generate corresponding native encodings for the target processing elements. For example, the heterogeneous scheduler may include a translator to convert machine code of a first type into machine code of a second type and/or a just-in-time compiler to convert an intermediate representation to a format native to the target processing element. Alternatively, or in addition, the heterogeneous scheduler may include a pattern matcher to identify recurring code fragments (i.e., "hot" code) and cache one or more native encodings of the code fragment or corresponding micro-operations. Each of these optional components is illustrated in FIG. 3. In particular, heterogeneous scheduler 301 includes translator 303 and just-in-time compiler 305. When heterogeneous scheduler 301 operates on object code or an intermediate representation, just-in-time compiler 305 is invoked to convert the received code fragment into a format native to one or more of the target processing elements 103, 105, 107, 109. When heterogeneous scheduler 301 operates on machine code (binary), binary translator 303 converts the received code fragment into machine code native to one or more of the target processing elements (such as, for example, when translating from one instruction set to another). In alternate embodiments, heterogeneous scheduler 301 may omit one or more of these components.

For example, in some embodiments, there is no binary translator included. This may result in increased programming complexity as a program will need to take into account potentially available accelerators, cores, etc. instead of having the scheduler take care of this. For example, a program may need to include code for a routine in different formats. However, in some embodiments, when there is no binary translator there is a JIT compiler that accepts code at a higher level and the JIT compiler performs the necessary translation. When a pattern matcher is present, hot code may still be detected to find code that should be run on a particular processing element.

For example, in some embodiments, there is no JIT compiler included. This may also result in increased programming complexity as a program will need to be first compiled into machine code for a particular ISA instead of having the scheduler take care of this. However, in some embodiments, when there is a binary translator and no JIT compiler, the scheduler may translate between ISAs as detailed below. When a pattern matcher is present, hot code may still be detected to find code that should be run on a particular processing element.

For example, in some embodiments, there is no pattern matcher included. This may also result in decreased efficiency as code that could have been moved is more likely to stay on a less efficient core for the particular task that is running.

In some embodiments, there is no binary translator, JIT compiler, or pattern matcher. In these embodiments, only phase detection or explicit requests to move a thread are utilized in thread/processing element assignment/migration.

Referring again to FIGS. 1-3, heterogeneous scheduler 101 may be implemented in hardware (e.g., circuitry), software (e.g., executable program code), or any combination thereof. FIG. 114 illustrates an example of hardware heterogeneous scheduler circuit and its interactions with memory. The heterogeneous scheduler may be made in many different fashions, including, but not limited to, as a field programmable gate array (FPGA)-based or application specific integrated circuit (ASIC)-based state machine, as an embedded microcontroller coupled to a memory having stored therein software to provide functionality detailed herein, logic circuitry comprising other subcomponents (e.g., data hazard detection circuitry, etc.), and/or as software (e.g., a state machine) executed by an out-of-order core, as software (e.g., a state machine) executed by a scalar core, as software (e.g., a state machine) executed by a SIMD core, or a combination thereof. In the illustrated example, the heterogeneous scheduler is circuitry 11401 which includes one or more components to perform various functions. In some embodiments, this circuit 11401 is a part of a processor core 11419, however, it may be a part of a chipset.

A thread/processing element (PE) tracker 11403 maintains status for each thread executing in the system and each PE (for example, the availability of the PE, its current power consumption, etc.). For example, the tracker 11403 maintains a status of active, idle, or inactive in a data structure such as a table.

In some embodiments, a pattern matcher 11405 identifies "hot" code, accelerator code, and/or code that requests a PE allocation. More details about this matching are provided later.

PE information 11409 stores information about what PEs (and their type) are in the system and could be scheduled by an OS, etc.

While the above are detailed as being separate components within a heterogeneous scheduler circuit 11401, the components may be combined and/or moved outside of the heterogeneous scheduler circuit 11401.

Memory 11413 coupled to the heterogeneous scheduler circuit 11401 may include software to execute (by a core and/or the heterogeneous scheduler circuit 11401) which provides additional functionality. For example, a software pattern matcher 11417 may be used that identifies "hot" code, accelerator code, and/or code that requests a PE allocation. For example, the software pattern matcher 11417 compares the code sequence to a predetermined set of patterns stored in memory. The memory may also store a translator to translate code from one instruction set to another (such as from one instruction set to accelerator based instructions or primitives).

These components feed a selector 11411 which makes a selection of a PE to execute a thread, what link protocol to use, what migration should occur if there is a thread already executing on that PE, etc. In some embodiments, selector 11411 is a finite state machine implemented in, or executed by, hardware circuitry.

Memory 11413 may also include, for example, in some implementations, one or more translators 11415 (e.g., binary, JIT compiler, etc.) are stored in memory to translate thread code into a different format for a selected PE.

FIG. 115 illustrates an example of a software heterogeneous scheduler. The software heterogeneous scheduler may be made in many different fashions, including, but not limited to, as a field programmable gate array (FPGA)-based or application specific integrated circuit (ASIC)-based state machine, as an embedded microcontroller coupled to a memory having stored therein software to provide functionality detailed herein, logic circuitry comprising other subcomponents (e.g., data hazard detection circuitry, etc.), and/or as software (e.g., a state machine) executed by an out-of-order core, as software (e.g., a state machine) executed by a scalar core, as software (e.g., a state machine) executed by a SIMD core, or a combination thereof. In the illustrated example, the software heterogeneous scheduler is stored in memory 11413. As such, memory 11413 coupled to a processor core 11419 include software to execute (by a core) for scheduling threads. In some embodiments, the software heterogeneous scheduler is part of an OS.

Depending upon the implementation, a thread/processing element (PE) tracker 11403 in a core maintains status for each thread executing in the system and each PE (for example, the availability of the PE, its current power consumption, etc.), or this is performed in software using thread/PE tracker 11521. For example, the tracker maintains a status of active, idle, or inactive in a data structure such as a table.

In some embodiments, a pattern matcher 11405 identifies "hot" code and/or code that requests a PE allocation. More details about this matching are provided later.

PE information 11409 and/or 11509 stores information about what PEs are in the system and could be scheduled by an OS, etc.

A software pattern matcher 11417 may be used identifies "hot" code, accelerator code, and/or code that requests a PE allocation.

The thread/PE tracker, processing element information, and/or pattern matches are fed to a selector 11411 which makes a selection of a PE to execute a thread, what link protocol to use, what migration should occur if there is a thread already executing on that PE, etc. In some embodiments, selector 11411 is a finite state machine implemented executed by the processor core 11419.

Memory 11413 may also include, for example, in some implementations, one or more translators 11415 (e.g., binary, JIT compiler, etc.) are stored in memory to translate thread code into a different format for a selected PE.

In operation, an OS schedules and causes threads to be processed utilizing a heterogeneous scheduler (such as, e.g. heterogeneous schedulers 101, 301), which presents an abstraction of the execution environment.

The table below summarizes potential abstraction features (i.e., what a program sees), potential design freedom and architectural optimizations (i.e., what is hidden from the programmer), and potential benefits or reasons for providing the particular feature in an abstraction.

TABLE

| Program Sees | Hidden from Programmer by Translation | Reasons |
|---|---|---|
| Symmetric multiprocessor | Heterogeneous multiprocessor | Heterogeneity changes over time |
| All threads on scalar cores | Fewer threads on SIMD and latency cores. Thread migration. | The programmer creates threads, but the details of where the threads are executed is hidden. |
| Full instruction set | Full ISA not implemented in hardware | |
| Dense arithmetic instructions | May not be implemented in hardware in all cores | Need programmer, compiler, or library to specifically use these instructions |
| Shared memory with memory ordering | | Memory ordering is not a problem for in-order cores. |

In some example implementations, the heterogeneous scheduler, in combination with other hardware and software resources, presents a full programming model that runs everything and supports all programming techniques (e.g., compiler, intrinsics, assembly, libraries, JIT, offload, device). Other example implementations present alternative execution environments conforming to those provided by other processor development companies, such as ARM Holdings, Ltd., MIPS, IBM, or their licensees or adopters.

FIG. 119 is a block diagram of a processor configured to present an abstract execution environment as detailed above. In this example, the processor 11901 includes several different core types such as those detailed in FIG. 1. Each (wide) SIMD core 11903 includes fused multiply accumulate/add (FMA) circuitry supporting dense arithmetic primitives), its own cache (e.g., L1 and L2), special purpose execution circuitry, and storage for thread states.

Each latency-optimized (OOO) core 11913 includes fused multiply accumulate/add (FMA) circuitry, its own cache (e.g., L1 and L2), and out-of-order execution circuitry.

Each scalar core 11905 includes fused multiply accumulate/add (FMA) circuitry, its own cache (e.g., L1 and L2), special purpose execution, and stores thread states. Typically, the scalar cores 11905 support enough threads to cover memory latency. In some implementations, the number of SIMD cores 11903 and latency-optimized cores 11913 is small in comparison to the number of scalar cores 11905.

In some embodiments, one or more accelerators 11905 are included. These accelerators 11905 may be fixed function or FPGA based. Alternatively, or in addition to these accelerators 11905, in some embodiments accelerators 11905 are external to the processor.

The processor 11901 also includes last level cache (LLC) 11907 shared by the cores and potentially any accelerators that are in the processor. In some embodiments, the LLC 11907 includes circuitry for fast atomics.

One or more interconnects 11915 couple the cores and accelerators to each other and external interfaces. For example, in some embodiments, a mesh interconnect couples the various cores.

A memory controller 11909 couples the cores and/or accelerators to memory.

A plurality of input/output interfaces (e.g., PCIe, common link detailed below) 11911 connect the processor 11901 to external devices such as other processors and accelerators.

Figure 4:
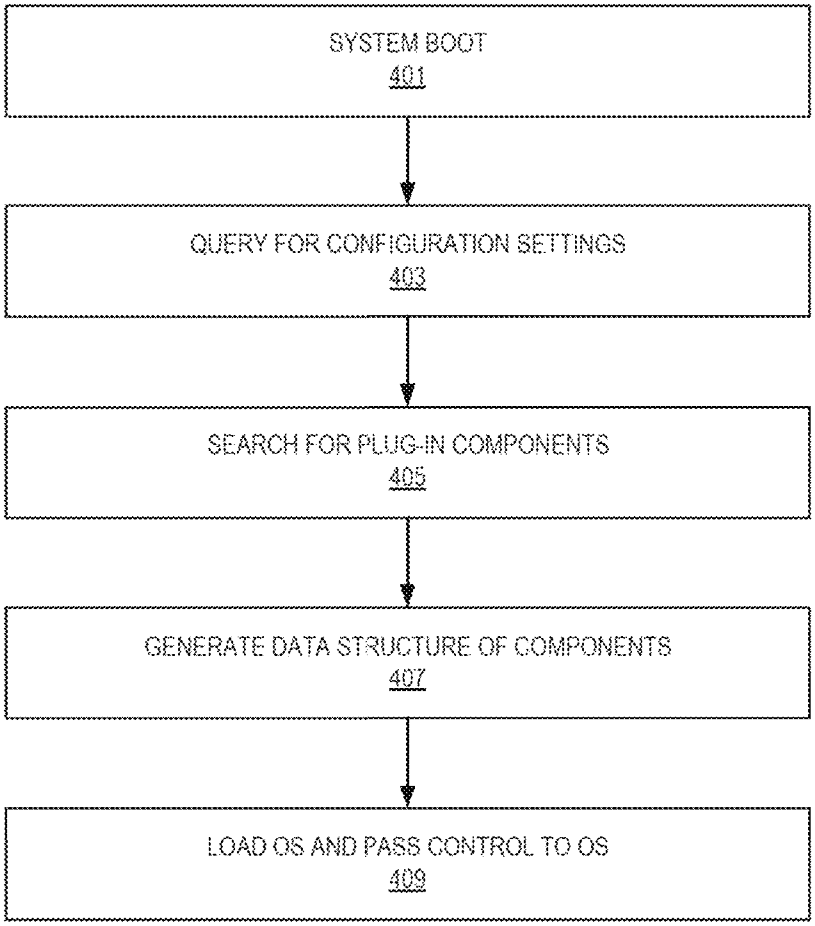
FIG. 4 illustrates an embodiment of system boot and device discovery of a computer system.

FIG. 4 illustrates an embodiment of system boot and device discovery of a computer system. Knowledge of the system including, for example, what cores are available, how much memory is available, memory locations relative to the cores, etc. is utilized by the heterogeneous scheduler. In some embodiments, this knowledge is built using an Advanced Configuration and Power Interface (ACPI).

At 401, the computer system is booted.

A query for configuration settings is made at 403. For example, in some BIOS based systems, when booted, the BIOS tests the system and prepares the computer for operation by querying its own memory bank for drive and other configuration settings.

A search for plugged-in components is made at 405. For example, the BIOS searches for any plug-in components in the computer and sets up pointers (interrupt vectors) in memory to access those routines. The BIOS accepts requests from device drivers as well as application programs for interfacing with hardware and other peripheral devices.

At 407, a data structure of system components (e.g., cores, memory, etc.) is generated. For example, the BIOS typically generates hardware device and peripheral device configuration information from which the OS interfaces with the attached devices. Further, ACPI defines a flexible and extensible hardware interface for the system board, and enables a computer to turn its peripherals on and off for improved power management, especially in portable devices such as notebook computers. The ACPI specification includes hardware interfaces, software interfaces (APIs), and data structures that, when implemented, support OS-directed configuration and power management. Software designers can use ACPI to integrate power management features throughout a computer system, including hardware, the operating system, and application software. This integration enables the OS to determine which devices are active and handle all of the power management resources for computer subsystems and peripherals.

At 409, the operating system (OS) is loaded and gains control. For example, once the BIOS has completed its startup routines it passes control to the OS. When an ACPI BIOS passes control of a computer to the OS, the BIOS exports to the OS a data structure containing the ACPI name space, which may be graphically represented as a tree. The name space acts as a directory of ACPI devices connected to the computer, and includes objects that further define or provide status information for each ACPI device. Each node in the tree is associated with a device, while the nodes, subnodes, and leaves represent objects that, when evaluated by the OS, will control the device or return specified information to the OS, as defined by the ACPI specification. The OS, or a driver accessed by the OS, may include a set of functions to enumerate and evaluate name space objects.

When the OS calls a function to return the value of an object in the ACPI name space, the OS is said to evaluate that object.

In some instances, available devices change. For example, an accelerator, memory, etc. are added. An embodiment of a method for post-system boot device discovery is illustrated in FIG. 116. For example, embodiments of this method may be used to discover an accelerator that has been added to a system post boot. An indication of a connected device being powered-on or reset is received at 11601. For example, the endpoint device is plugged in to a PCIe slot, or reset, for example, by an OS.

At 11603, link training is performed with the connected device and the connected device is initialized. For example, PCIe link training is performed to establish link configuration parameters such as link width, lane polarities, and/or maximum supported data rate. In some embodiments, capabilities of the connected device are stored (e.g., in an ACPI table).

When the connected device completes initialization, a ready message is sent from the connected device to the system at 11605.

At 11607, a connected device ready status bit is set to indicate the device is ready for configuration.

The initialized, connected device is configured at 11609. In some embodiments, the device and OS agree on an address for the device (e.g., a memory mapped I/O (MMIO) address). The device provides a device descriptor which includes one or more of: a vendor identification number (ID), a device ID, model number, serial number, characteristics, resource requirements, etc. The OS may determine additional operating and configuration parameters for the device based on the descriptor data and system resources. The OS may generate configuration queries. The device may respond with device descriptors. The OS then generates configuration data and sends this data to the device (for example, through PCI hardware). This may include the setting of base address registers to define the address space associated with the device.

After knowledge of the system is built, the OS schedules and causes threads to be processed utilizing a heterogeneous scheduler (such as, e.g. heterogeneous schedulers 101, 301). The heterogeneous scheduler then maps code fragments of each thread, dynamically and transparently (e.g., to a user and/or an OS), to the most suitable type of processing element, thereby potentially avoiding the need to build hardware for legacy architecture features, and potentially, the need to expose details of the microarchitecture to the system programmer or the OS.

In some examples, the most suitable type of processing element is determined based on the capabilities of the processing elements and execution characteristics of the code fragment. In general, programs and associated threads may have different execution characteristics depending upon the workload being processed at a given point in time. Exemplary execution characteristics, or phases of execution, include, for example, data parallel phases, thread parallel phases, and serial phases. The table below identifies these phases and summarizes their characteristics. The table also includes example workloads/operations, exemplary hardware useful in processing each phase type, and a typical goal of the phase and hardware used.

TABLE

| Phase | Characteristic(s) | Examples | Hardware | Goal |
|---|---|---|---|---|
| Data parallel | Many data elements may be processed simultaneously using the same control flow | Image processing<br>Matrix multiplication<br>Convolution<br>Neural networks | Wide SIMD<br>Dense arithmetic primitives | Minimize energy |
| Thread parallel | Data-dependent branches use unique control flows | Graph traversal<br>Search | Array of small scalar cores | Minimize energy |
| Serial | Not much work to do | Serial phases between parallel phases<br>Critical sections<br>Small data sets | Deep speculation<br>Out-of-order | Minimize latency |

In some implementations, a heterogeneous scheduler is configured to choose between thread migration and emulation. In configurations where each type of processing element can process any type of workload (sometimes requiring emulation to do so), the most suitable processing element is selected for each program phase based on one or more criteria, including, for example, latency requirements of the workload, an increased execution latency associated with emulation, power and thermal characteristics of the processing elements and constraints, etc. As will be detailed later, the selection of a suitable processing element, in some implementations, is accomplished by considering the number of threads running and detecting the presence of SIMD instructions or vectorizable code in the code fragment.

Moving a thread between processing elements is not penalty free. For example, data may need to be moved into lower level cache from a shared cache and both the original processing element and the recipient processing element will have their pipelines flushed to accommodate the move. Accordingly, in some implementations, the heterogeneous scheduler implements hysteresis to avoid too-frequent migrations (e.g., by setting threshold values for the one or more criteria referenced above, or a subset of the same). In some embodiments, hysteresis is implemented by limiting thread migrations to not exceed a pre-defined rate (e.g., one migration per millisecond). As such, the rate of migration is limited to avoid excessive overload due to code generation, synchronization, and data migration.

In some embodiments, for example when migration is not chosen by the heterogeneous scheduler as being the preferred approach for a particular thread, the heterogeneous scheduler emulates missing functionality for the thread in the allocated processing element. For example, in an embodiment in which the total number of threads available to the operating system remains constant, the heterogeneous scheduler may emulate multithreading when a number of hardware threads available (e.g., in a wide simultaneous multithreading core) is oversubscribed. On a scalar or latency core, one or more SIMD instructions of the thread are converted into scalar instructions, or on a SIMD core more threads are spawned and/or instructions are converted to utilize packed data.

Figure 5:
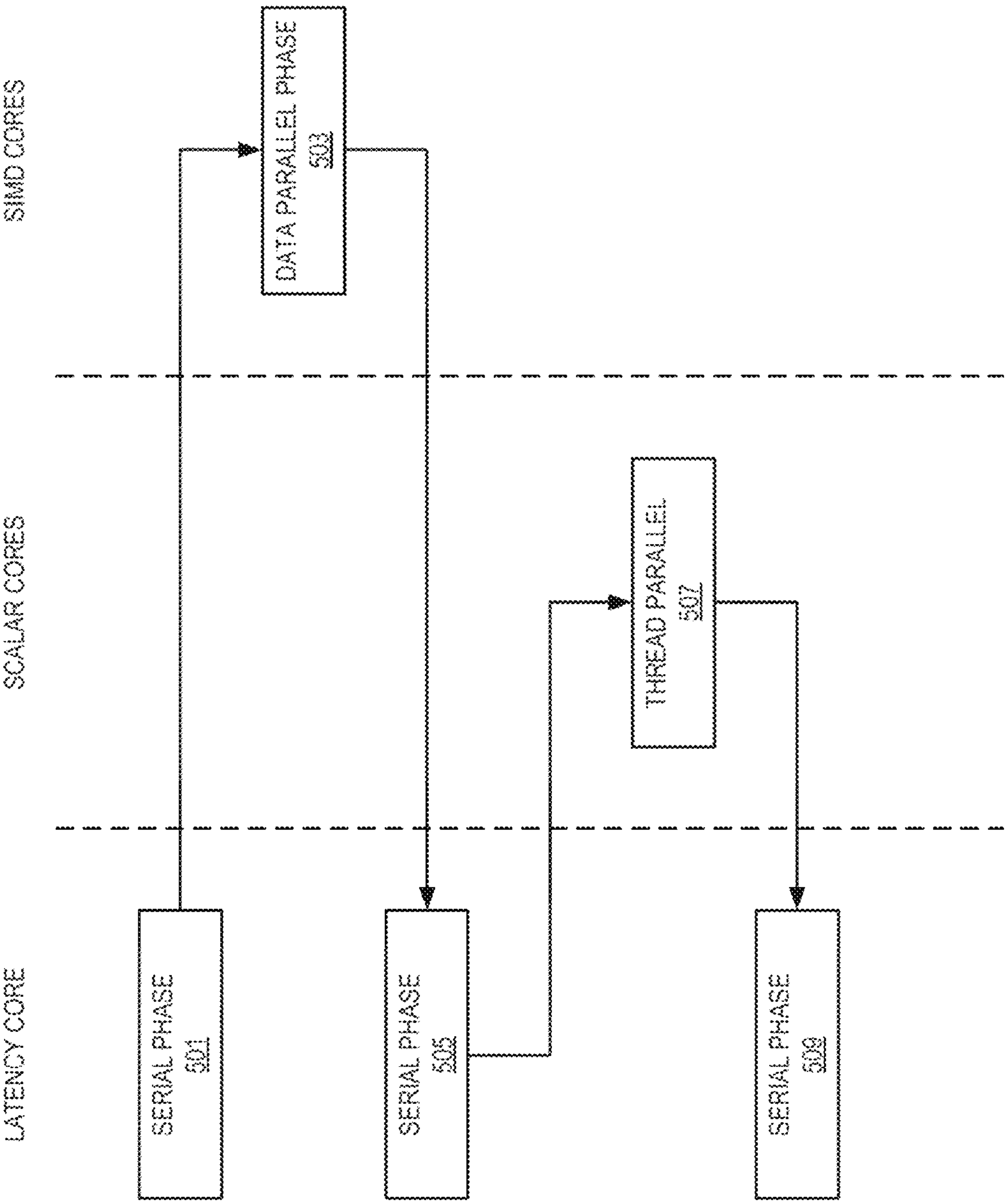
FIG. 5 illustrates an example of thread migration based on mapping of program phases to three types of processing elements.

FIG. 5 illustrates an example of thread migration based on mapping of program phases to three types of processing elements. As illustrated, the three types of processing elements include latency-optimized (e.g., an out-of-order core, an accelerator, etc.), scalar (processing one data item at a time per instruction), and SIMD (processing a plurality of data elements per instruction). Typically, this mapping is performed by the heterogeneous scheduler in a manner that is transparent to the programmer and operating system on a per thread or code fragment basis.

One implementation uses a heterogeneous scheduler to map each phase of the workload to the most suitable type of processing element. Ideally, this mitigates the need to build hardware for legacy features and avoids exposing details of the microarchitecture in that the heterogeneous scheduler presents a full programming model that supports multiple code types such as compiled code (machine code), intrinsics (programing language constructs that map direct to processor or accelerator instructions), assembly code, libraries, intermediate (JIT based), offload (move from one machine type to another), and device specific.

In certain configurations, a default choice for a target processing element is a latency-optimized processing element.

Referring again to FIG. 5, a serial phase of execution 501 for a workload is initially processed on one or more latency-optimized processing elements. Upon a detection of a phase shift (e.g., in a dynamic fashion as the code becomes more data parallel or in advance of execution, as seen by, for example, the type of instructions found in the code prior to, or during, execution), the workload is migrated to one or more SIMD processing elements to complete a data parallel phase of execution 503. Additionally, execution schedules and/or translations are typically cached. Thereafter, the workload is migrated back to the one or more latency-optimized processing elements, or to a second set of one or more latency-optimized processing elements, to complete the next serial phase of execution 505. Next, the workload is migrated to one or more scalar cores to process a thread parallel phase of execution 507. Then, the workload is migrated back to one or more latency-optimized processing elements for completion of the next serial phase of execution 509.

While this illustrative example shows a return to a latency-optimized core, the heterogeneous scheduler may continue execution of any subsequent phases of execution on one or more corresponding types of processing elements until the thread is terminated. In some implementations, a processing element utilizes work queues to store tasks that are to be completed. As such, tasks may not immediately begin, but are executed as their spot in the queue comes up.

Figure 6:
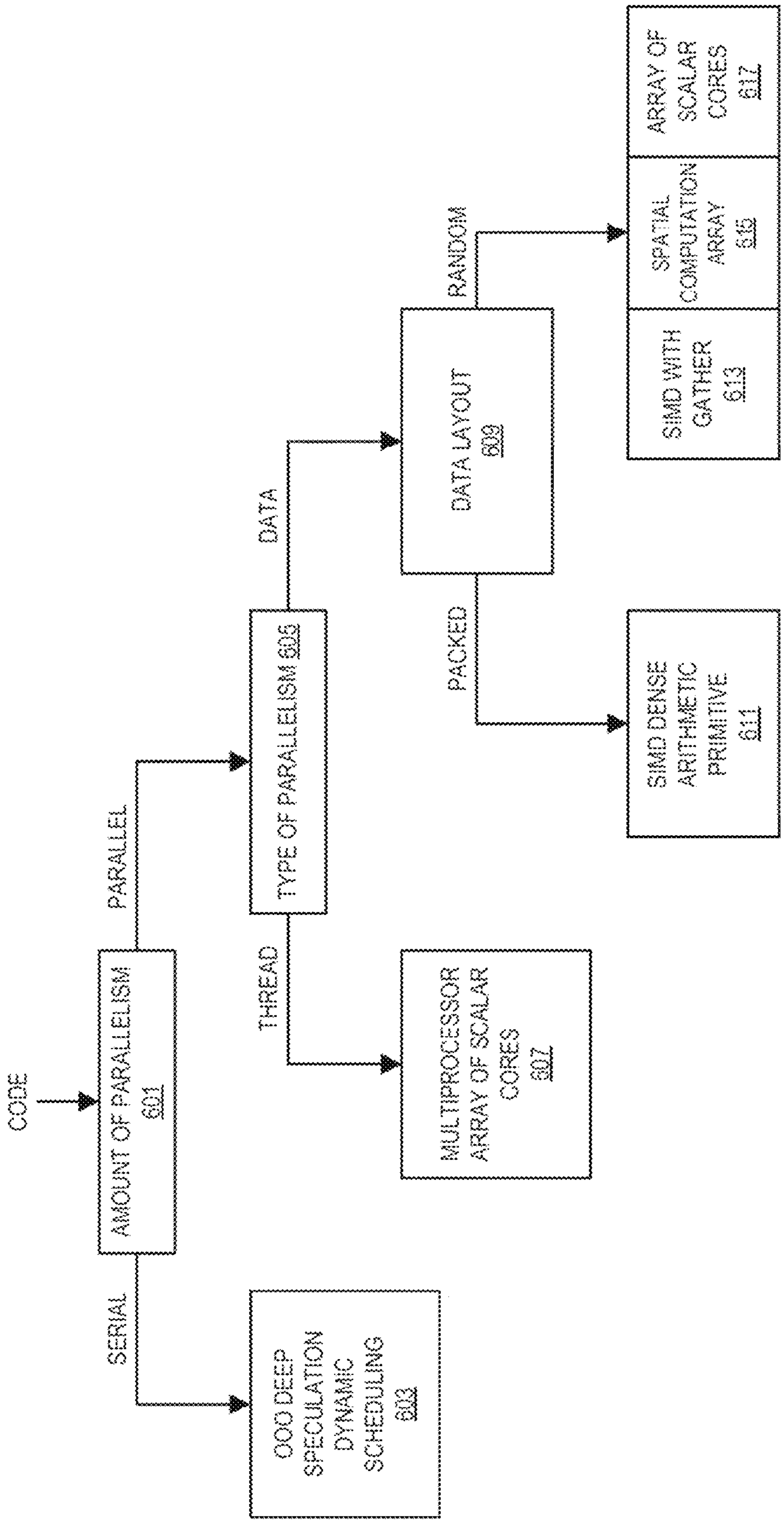
FIG. 6 is an example implementation flow performed by of a heterogeneous scheduler.

FIG. 6 is an example implementation flow performed by of a heterogeneous scheduler, such as heterogeneous scheduler 101, for example. This flow depicts the selection of a processing element (e.g., a core). As illustrated, a code fragment is received by the heterogeneous scheduler. In some embodiments, an event has occurred including, but are not limited to: thread wake-up command; a write to a page directory base register; a sleep command; a phase change in the thread; and one or more instructions indicating a desired reallocation.

At 601, the heterogeneous scheduler determines if there is parallelism in the code fragment (e.g., is the code fragment in a serial phase or a parallel phase), for example, based on detected data dependencies, instruction types, and/or control flow instructions. For example, a thread full of SIMD code would be considered parallel. If the code fragment is not amenable to parallel processing, the heterogeneous scheduler selects one or more latency sensitive processing elements (e.g., OOO cores) to process the code fragment in serial phase of execution 603. Typically, OOO cores have (deep) speculation and dynamic scheduling and usually have lower performance per watt compared to simpler alternatives.

In some embodiments, there is no latency sensitive processing element available as they typically consume more power and die space than scalar cores. In these embodiments, only scalar, SIMD, and accelerator cores are available.

For parallel code fragments, parallelizable code fragments, and/or vectorizable code fragments, the heterogeneous scheduler determines the type of parallelism of the code at 605. For thread parallel code fragments, heterogeneous scheduler selects a thread parallel processing element (e.g., multiprocessor scalar cores) at 607. Thread parallel code fragments include independent instruction sequences that can be simultaneously executed on separate scalar cores.

Data parallel code occurs when each processing element executes the same task on different pieces of data. Data parallel code can come in different data layouts: packed and random. The data layout is determined at 609. Random data may be assigned to SIMD processing elements, but requires the utilization of gather instructions 613 to pull data from disparate memory locations, a spatial computing array 615 (mapping a computation spatially onto an array of small programmable processing elements, for example, an array of FPGAs), or an array of scalar processing elements 617. Packed data is assigned to SIMD processing elements or processing elements that use dense arithmetic primitives at 611.

In some embodiments, a translation of the code fragment to better fit the selected destination processing element is performed. For example, the code fragment is: 1) translated to utilize a different instruction set, 2) made more parallel, 3) made less parallel (serialized), 4) made data parallel (e.g., vectorized), and/or 5) made less data parallel (e.g., non-vectorized).

After a processing element is selected, the code fragment is transmitted to one of the determined processing elements for execution.

Figure 7:
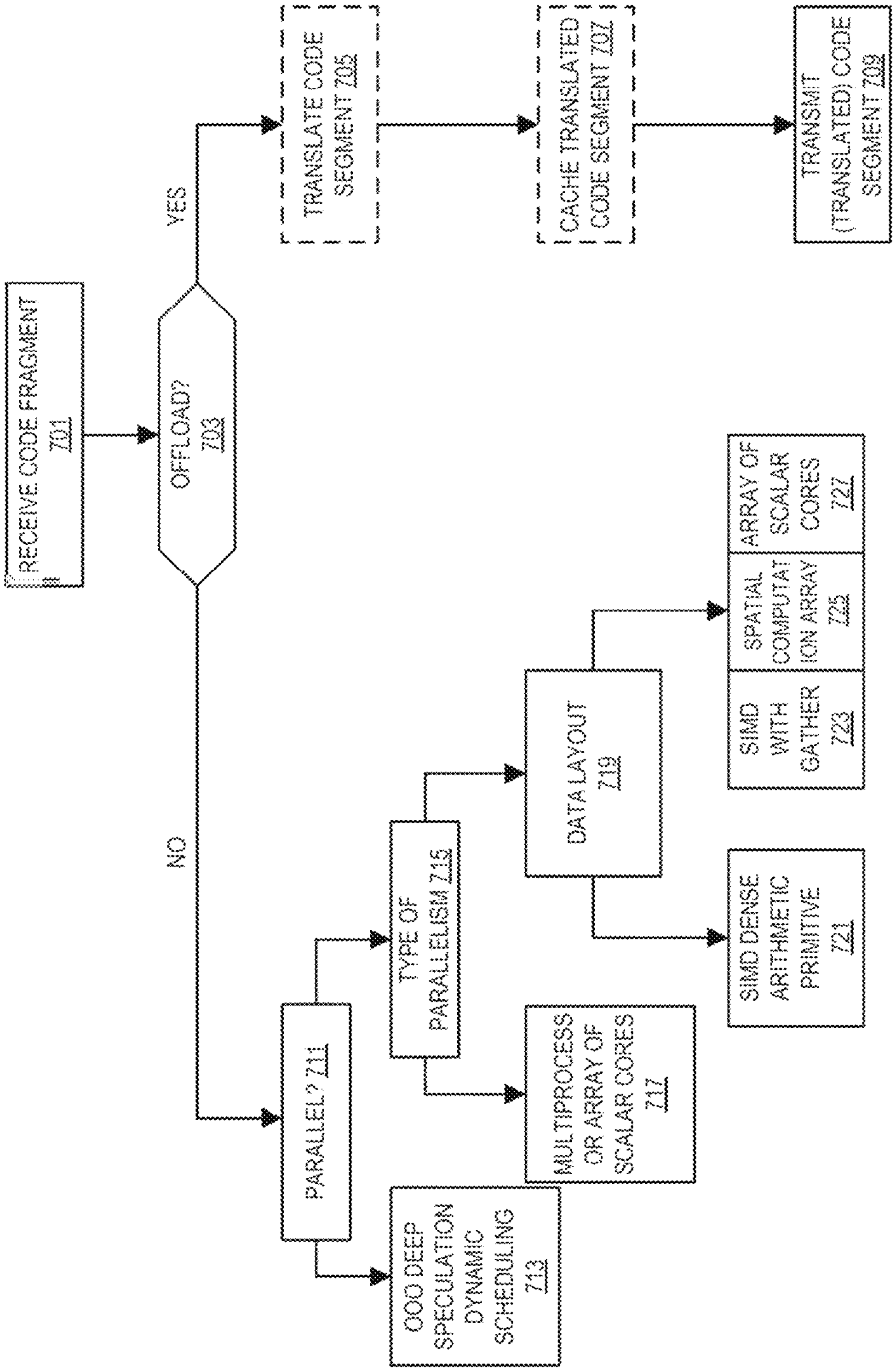
FIG. 7 illustrates an example of a method for thread destination selection by a heterogeneous scheduler.

FIG. 7 illustrates an example of a method for thread destination selection by a heterogeneous scheduler. In some embodiments, this method is performed by a binary translator. At 701, a thread, or a code fragment thereof, to be evaluated is received. In some embodiments, an event has occurred including, but are not limited to: thread wake-up command; a write to a page directory base register; a sleep command; a phase change in the thread; and one or more instructions indicating a desired reallocation.

A determination of if the code fragment is to be offloaded to an accelerator is made at 703. For example, is the code fragment to be sent to an accelerator. The heterogeneous scheduler may know that this is the correct action when the code includes code identifying a desire to use an accelerator.

This desire may be an identifier that indicates a region of code may be executed on an accelerator or executed natively (e.g., ABEGIN/AEND described herein) or an explicit command to use a particular accelerator.

In some embodiments, a translation of the code fragment to better fit the selected destination processing element is performed at 705. For example, the code fragment is: 1) translated to utilize a different instruction set, 2) made more parallel, 3) made less parallel (serialized), 4) made data parallel (e.g., vectorized), and/or 5) made less data parallel (e.g., non-vectorized).

Typically, a translated thread is cached at 707 for later use. In some embodiments, the binary translator caches the translated thread locally such that it is available for the binary translator's use in the future. For example, if the code becomes "hot" (repeatedly executed), the cache provides a mechanism for future use without a translation penalty (albeit there may be a transmission cost).

The (translated) thread is transmitted (e.g., offloaded) to the destination processing element at 709 for processing. In some embodiments, the translated thread is cached by the recipient such that it is locally available for future use. Again, if the recipient or the binary translator determines that the code is "hot," this caching will enable faster execution with less energy used.

At 711, the heterogeneous scheduler determines if there is parallelism in the code fragment (e.g., is the code fragment in a serial phase or a parallel phase), for example, based on detected data dependencies, instruction types, and/or control flow instructions. For example, a thread full of SIMD code would be considered parallel. If the code fragment is not amenable to parallel processing, the heterogeneous scheduler selects one or more latency sensitive processing elements (e.g., OOO cores) to process the code fragment in serial phase of execution 713. Typically, OOO cores have (deep) speculation and dynamic scheduling and therefore may have better performance per watt compared to scalar alternatives.

In some embodiments, there is no latency sensitive processing element available as they typically consume more power and die space than scalar cores. In these embodiments, only scalar, SIMD, and accelerator cores are available.

For parallel code fragments, parallelizable code fragments, and/or vectorizable code fragments, the heterogeneous scheduler determines the type of parallelism of the code at 715. For thread parallel code fragments, heterogeneous scheduler selects a thread parallel processing element (e.g., multiprocessor scalar cores) at 717. Thread parallel code fragments include independent instruction sequences that can be simultaneously executed on separate scalar cores.

Data parallel code occurs when each processing element executes the same task on different pieces of data. Data parallel code can come in different data layouts: packed and random. The data layout is determined at 719. Random data may be assigned to SIMD processing elements, but requires the utilization of gather instructions 723, a spatial computing array 725, or an array of scalar processing elements 727. Packed data is assigned to SIMD processing elements or processing elements that use dense arithmetic primitives at 721.

In some embodiments, a translation of a non-offloaded code fragment to better fit the determined destination processing element is performed. For example, the code fragment is: 1) translated to utilize a different instruction set, 2) made more parallel, 3) made less parallel (serialized), 4) made data parallel (e.g., vectorized), and/or 5) made less data parallel (e.g., non-vectorized).

After a processing element is selected, the code fragment is transmitted to one of the determined processing elements for execution.

An OS sees a total number of threads that are potentially available, regardless of what cores and accelerators are accessible. In the following description, each thread is enumerated by a thread identifier (ID) called LogicalID. In some implementations, the operating system and/or heterogeneous scheduler utilizes logical IDs to map a thread to a particular processing element type (e.g., core type), processing element ID, and a thread ID on that processing element (e.g., a tuple of core type, coreID, threadID). For example, a scalar core has a core ID and one or more thread IDs; a SIMD core has core ID and one or more thread IDs; an OOO core has a core ID and one or more thread IDs; and/or an accelerator has a core ID and one or more thread IDs.

Figure 8:
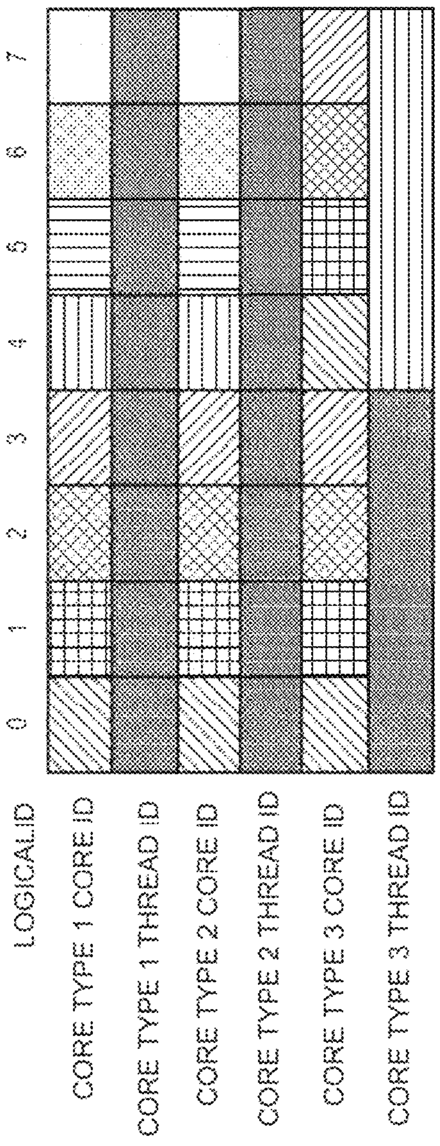
FIG. 8 illustrates a concept of using striped mapping for logical IDs.

FIG. 8 illustrates a concept of using striped mapping for logical IDs. Striped mapping may be used by a heterogeneous scheduler. In this example, there are 8 logical IDs and three core types each having one or more threads. Typically, the mapping from LogicalID to (coreID, threadID) is computed via division and modulo and may be fixed to preserve software thread affinity. The mapping from LogicalID to (core type) is performed flexibly by the heterogeneous scheduler to accommodate future new core types accessible to the OS.

Figure 9:
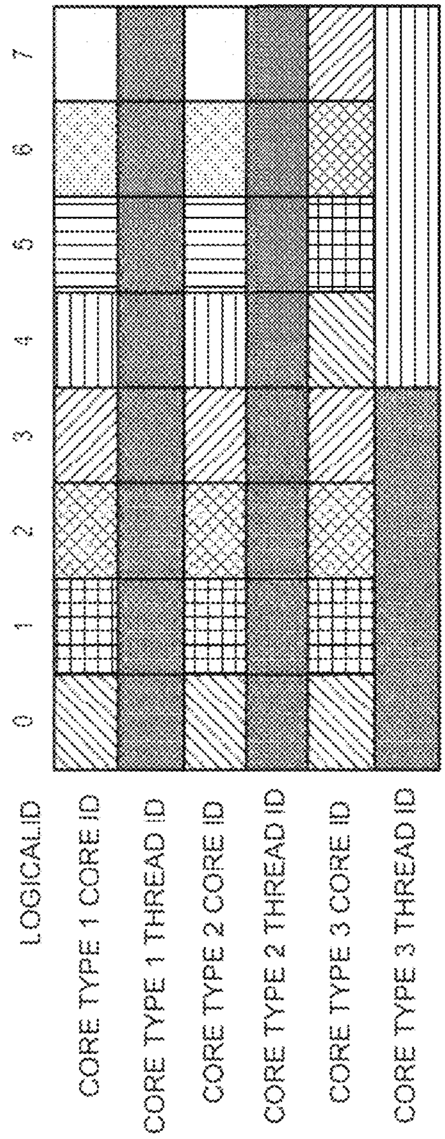
FIG. 9 illustrates an example of using striped mapping for logical IDs.

FIG. 9 illustrates an example of using striped mapping for logical IDs. In the example, LogicalIDs 1, 4, and 5 are mapped to a first core type and all other LogicalIDs are mapped to a second core type. The third core type is not being utilized.

Figure 10:
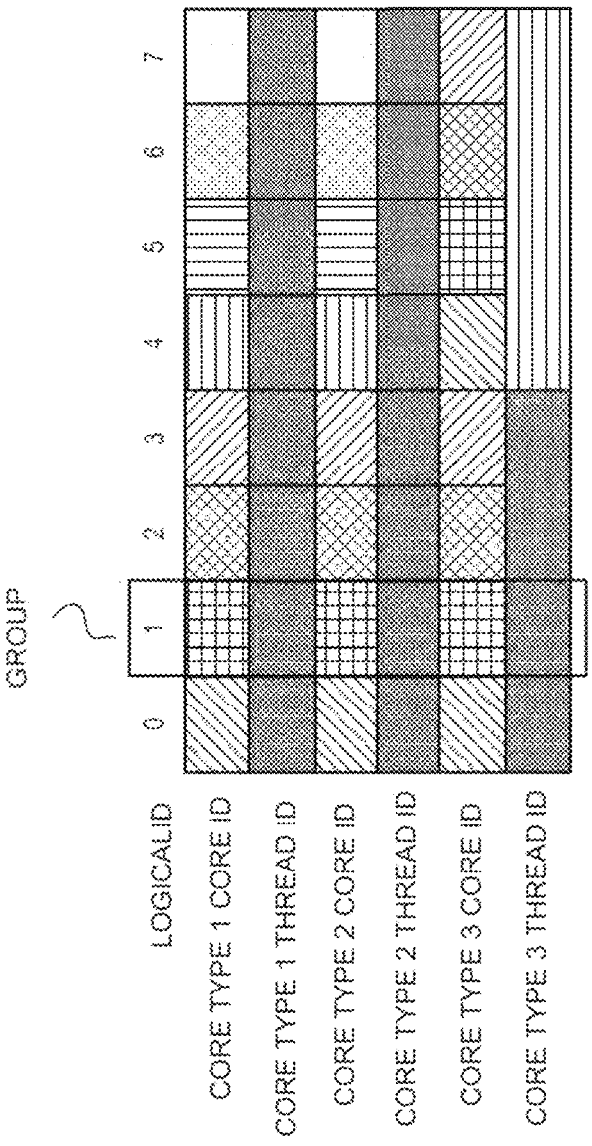
FIG. 10 illustrates an example of a core group.

In some implementations, groupings of core types are made. For example, a "core group" tuple may consist of one OOO tuple and all scalar, SIMD, and accelerator core tuples whose logical IDs map to the same OOO tuple. FIG. 10 illustrates an example of a core group. Typically, serial phase detection and thread migration are performed within the same core group.

Figure 11:
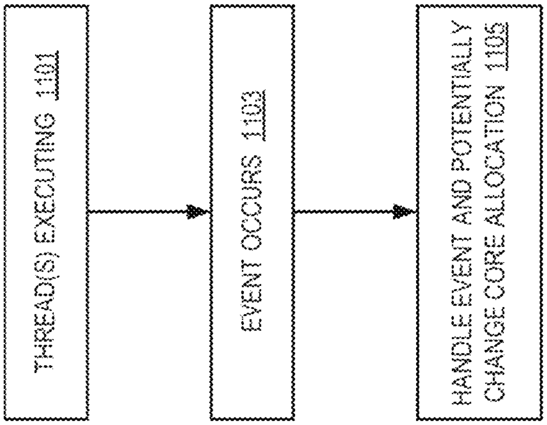
FIG. 11 illustrates an example of a method of thread execution in a system utilizing a binary translator switching mechanism.

FIG. 11 illustrates an example of a method of thread execution in a system utilizing a binary translator switching mechanism. At 1101, a thread is executing on a core. The core may be any of the types detailed herein including an accelerator.

At some point in time during the thread's execution, a potential core reallocating event occurs at 1103. Exemplary core reallocating events include, but are not limited to: thread wake-up command; a write to a page directory base register; a sleep command; a phase change in the thread; and one or more instructions indicating a desired reallocation to a different core.

At 1105, the event is handled and a determination as to whether there is to be a change in the core allocation is made. Detailed below are exemplary methods related to the handling of one particular core allocation.

In some embodiments, core (re) allocation is subjected to one or more limiting factors such as migration rate limiting and power consumption limiting. Migration rate limiting is tracked per core type, coreID, and threadID. Once a thread has been assigned to a target (Core type, coreID, threadID) a timer is started and maintained by the binary translator. No other threads are to be migrated to the same target until the timer has expired. As such, while a thread may migrate away from its current core before timer expires, the inverse is not true.

As detailed, power consumption limiting is likely to have an increasing focus as more core types (including accelerators) are added to a computing system (either on- or off-die). In some embodiments, instantaneous power consumed by all running threads on all cores is computed. When the calculated power consumption exceeds a threshold, new threads are only allocated to lower power cores such as SIMD, scalar, and dedicated accelerator cores, and one or more threads are forcefully migrated from an OOO core the lower power cores. Note that in some implementations, power consumption limiting takes priority over migration rate limiting.

Figure 12:
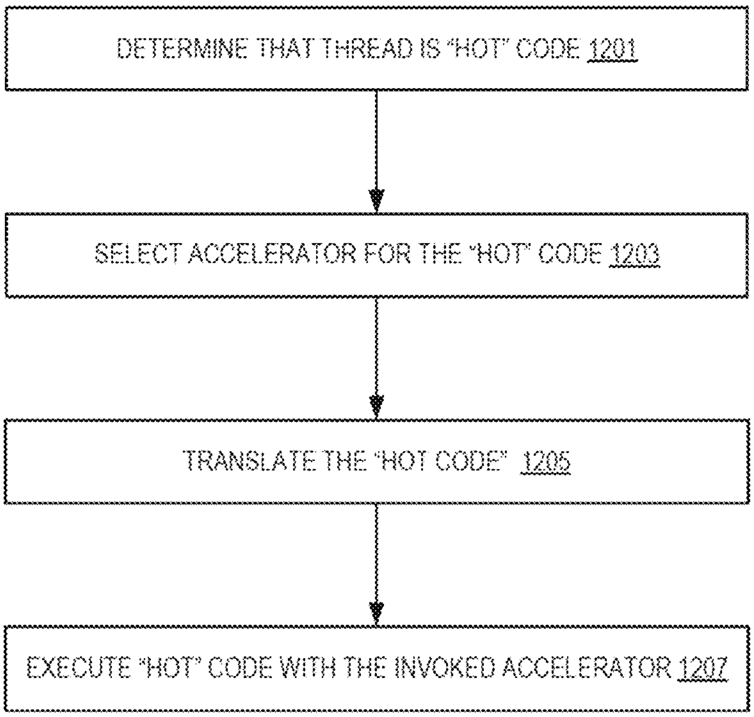
FIG. 12 illustrates an exemplary method of core allocation for hot code to an accelerator.

FIG. 12 illustrates an exemplary method of core allocation for hot code to an accelerator. At 1203, a determination is made that the code is "hot." A hot portion of code may refer to a portion of code that is better suited to execute on one core over the other based on considerations, such as power, performance, heat, other known processor metric(s), or a combination thereof. This determination may be made using any number of techniques. For example, a dynamic binary optimizer may be utilized to monitor the execution of the thread. Hot code may be detected based on counter values that record the dynamic execution frequency of static code during program execution, etc. In the embodiment where a core is an OOO core and another core is an in-order core, then a hot portion of code may refer to a hot spot of the program code that is better suited to be executed on serial core, which potentially has more available resources for execution of a highly-recurrent section. Often a section of code with a high-recurrence pattern may be optimized to be executed more efficiently on an in-order core. Essentially, in this example, cold code (low-recurrence) is distributed to native, OOO core, while hot code (high-recurrence) is distributed to a software-managed, in-order core. A hot portion of code may be identified statically, dynamically, or a combination thereof. In the first case, a compiler or user may determine a section of program code is hot code. Decode logic in a core, in one embodiment, is adapted to decode a hot code identifier instruction from the program code, which is to identify the hot portion of the program code. The fetch or decode of such an instruction may trigger translation and/or execution of the hot section of code on core. In another example, code execution is profiled execution, and based on the characteristics of the profile-power and/or performance metrics associated with execution—a region of the program code may be identified as hot code. Similar to the operation of hardware, monitoring code may be executed on one core to perform the monitoring/profiling of program code being executed on the other core. Note that such monitoring code may be code held in storage structures within the cores or held in a system including processor. For example, the monitoring code may be microcode, or other code, held in storage structures of a core. As yet another example, a static identification of hot code is made as a hint. But dynamic profiling of the program code execution is able to ignore the static identification of a region of code as hot; this type of static identification is often referred to as a compiler or user hint that dynamic profiling may take into account in determining which core is appropriate for code distribution. Moreover, as is the nature of dynamic profiling, identification of a region of code as hot doesn't restrict that section of code to always being identified as hot. After translation and/or optimization, a translated version of the code section is executed.

An appropriate accelerator is selected at 1203. The binary translator, a virtual machine monitor, or operating system makes this selection based on available accelerators and desired performance. In many instances, an accelerator is more appropriate to execute hot code at a better performance per watt than a larger, more general core.

The hot code is transmitted to the selected accelerator at 1205. This transmission utilizes an appropriate connection type as detailed herein.

Finally, the hot code is received by the selected accelerator and executed at 1207. While executing, the hot code may be evaluated for an allocation to a different core.

Figure 13:
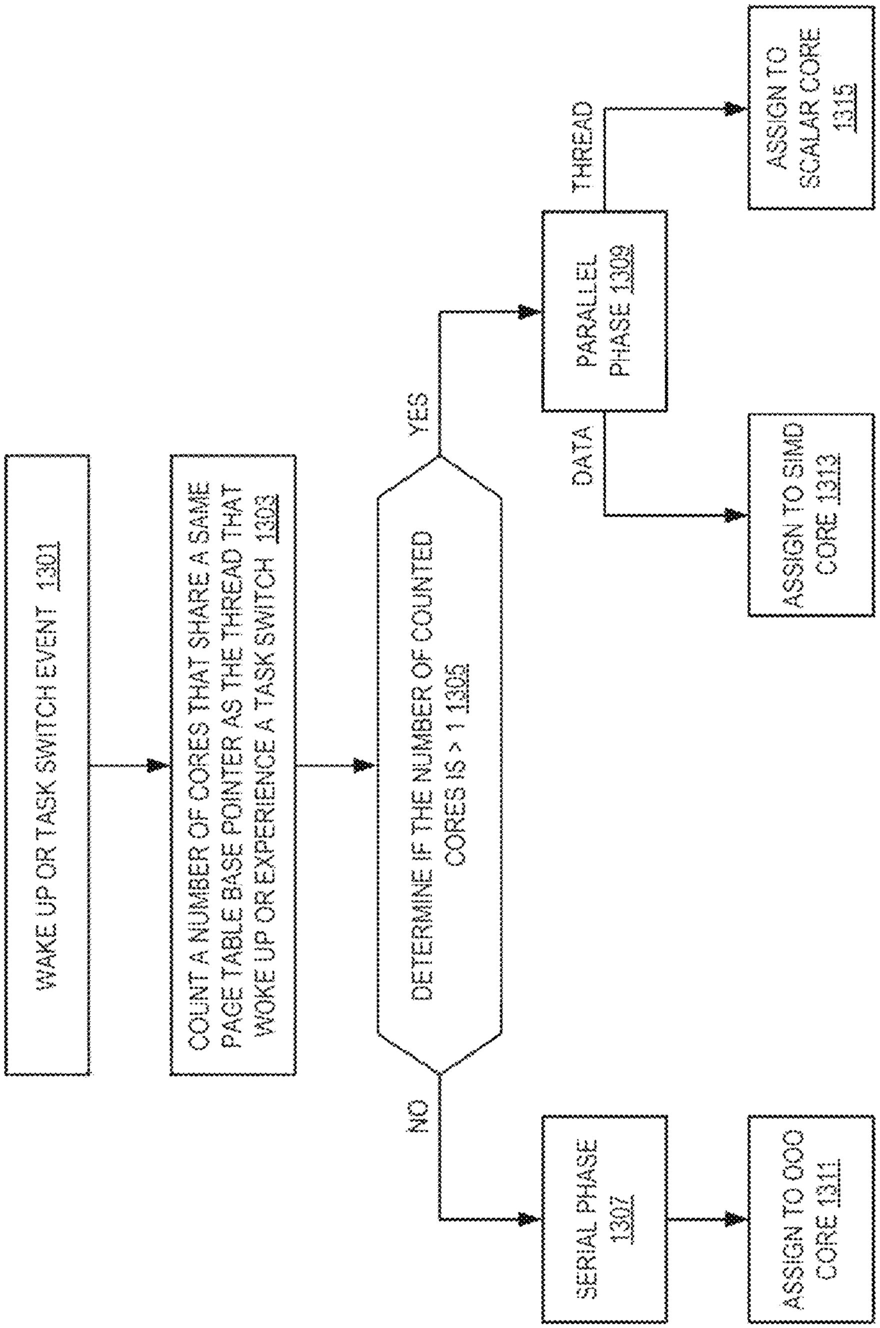
FIG. 13 illustrates an exemplary method of potential core allocation for a wake-up or write to a page directory base register event.

FIG. 13 illustrates an exemplary method of potential core allocation for a wake-up or write to a page directory base register event. For example, this illustrates determining a phase of a code fragment. At 1301, either a wake-up event or page directory base register (e.g., task switch) event is detected. For example, a wake-up event occurs for an interrupt being received by a halted thread or a wait state exit. A write to a page directory base register may indicate the start or stop of a serial phase. Typically, this detection occurs on the core executing the binary translator.

A number of cores that share a same page table base pointer as the thread that woke up, or experienced a task switch, is counted at 1303. In some implementations, a table is used to map logicalIDs to particular heterogeneous cores. The table is indexed by logicalID. Each entry of the table contains a flag indicating whether the logicalID is currently running or halted, a flag indicating whether to prefer the SIMD or scalar cores, the page table base address (e.g., CR3), a value indicating the type of core that that the logicalID is currently mapped to, and counters to limit migration rate.

Threads that belong to the same process share the same address space, page tables, and page directory base register value.

Figure 14:
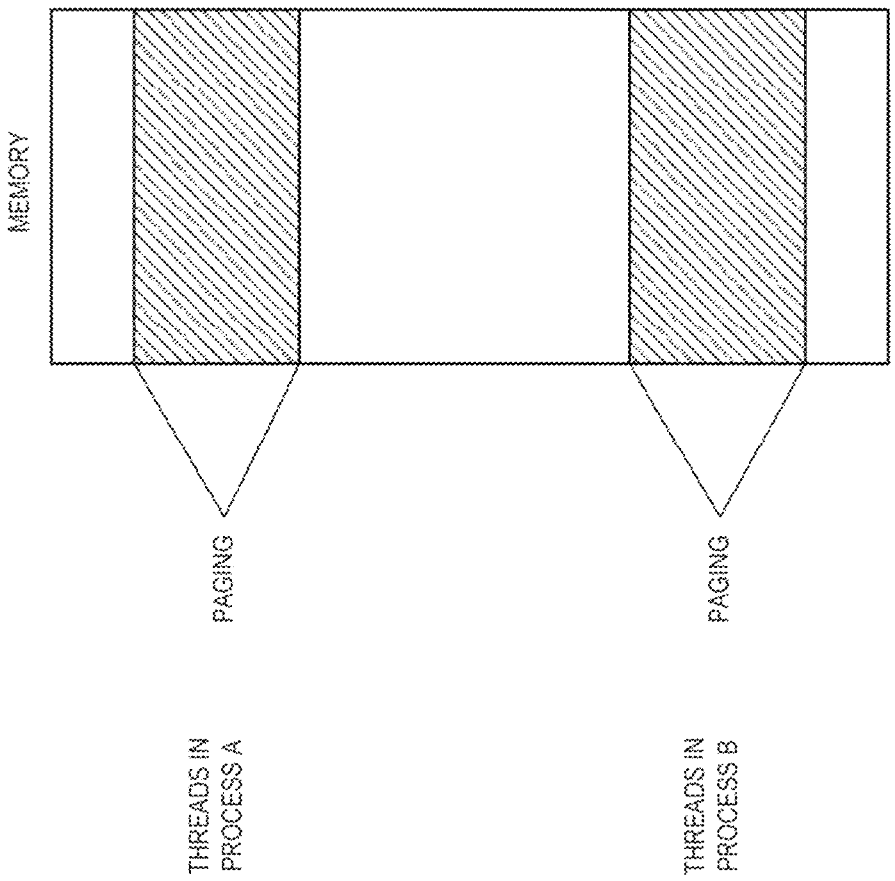
FIG. 14 illustrates an example of serial phase threads.

A determination as to whether the number of counted cores is greater than 1 is made at 1305. This count determines if the thread is in a serial or parallel phase. When the count is 1, then the thread experiencing the event is in a serial phase 1311. As such, a serial phase thread is a thread that has a unique page directory base register value among all threads in the same core group. FIG. 14 illustrates an example of serial phase threads. As illustrated, a process has one or more threads and each process has its own allocated address.

When the thread experiencing the event is not assigned to an OOO core, it is migrated to an OOO core and an existing thread on the OOO core is migrated to a SIMD or scalar core at 1313 or 1315. When the thread experiencing the event is assigned to an 000 core, it stays there in most circumstances.

When the count is greater than 1, then the thread experiencing the event is in a parallel phase and a determination of the type of parallel phase is made at 1309. When the thread experiencing the event is in a data parallel phase, if the thread is not assigned to a SIMD core it is assigned to a SIMD core, otherwise it remains on the SIMD core if it is already there at 1313.

When the thread experiencing the event is in a data parallel phase, if the thread is not assigned to SIMD core it is assigned to a SIMD core, otherwise it remains on the SIMD core if it is already there at 1313.

When the thread experiencing the event is in a thread-parallel phase, if the thread is not assigned to scalar core it is assigned to one, otherwise it remains on the scalar core if it is already there at 1315.

Additionally, in some implementations, a flag indicating the thread is running is set for the logicalID of the thread.

Figure 15:
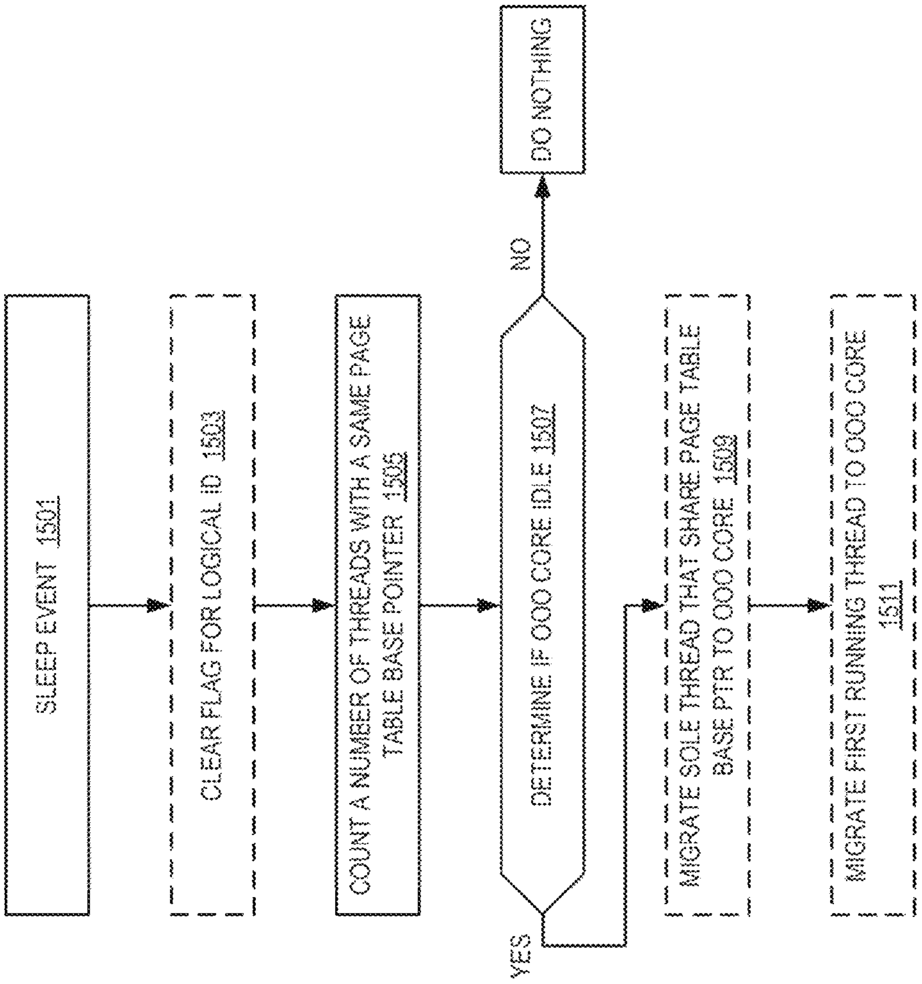
FIG. 15 illustrates an exemplary method of potential core allocation for a thread response to a sleep command event.

FIG. 15 illustrates an exemplary method of potential core allocation for a thread response to a sleep command event.

For example, this illustrates determining a phase of a code fragment. At 1501, a sleep event affecting the thread is detected. For example, a halt, wait entry and timeout, or pause command have occurred. Typically, this detection occurs on the core executing the binary translator.

In some embodiments, a flag indicating the thread is running is cleared for the logicalID of the thread at 1503.

A number of threads of cores that share the same page table base pointer as the sleeping thread are counted at 1505. In some implementations, a table is used to map logicalIDs to particular heterogeneous cores. The table is indexed by logicalID. Each entry of the table contains a flag indicating whether the logicalID is currently running or halted, a flag indicating whether to prefer the SIMD or scalar cores, the page table base address (e.g., CR3), a value indicating the type of core that that the logicalID is currently mapped to, and counters to limit migration rate. A first running thread (with any page table base pointer) from the group is noted.

A determination as to whether an OOO core in the system is idle is made at 1507. An idle OOO core has no OS threads that are actively executing.

When the page table base pointer is shared by exactly one thread in the core group, then that sharing thread is moved from a SIMD or scalar core to the 000 core at 1509. When the page table base pointer is shared by more than one thread, then the first running thread of the group, that was noted earlier, is thread migrated from a SIMD or scalar core to the OOO core at 1511 to make room for the awoken thread (which executes in the first running thread's place).

Figure 16:
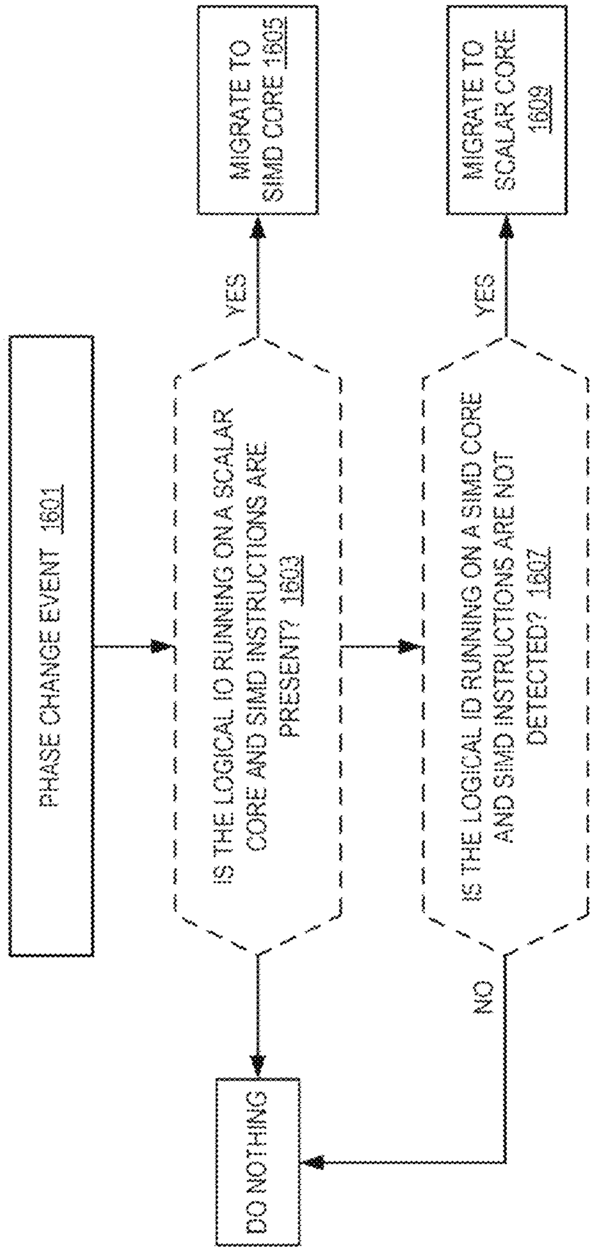
FIG. 16 illustrates an exemplary method of potential core allocation for a thread in response to a phase change event.

FIG. 16 illustrates an exemplary method of potential core allocation for a thread in response to a phase change event. For example, this illustrates determining a phase of a code fragment. At 1601, a potential phase change event is detected. Typically, this detection occurs on the core executing the binary translator.

A determination as to whether the logicalID of the thread is running on a scalar core and SIMD instructions are present is made at 1603. If there are no such SIMD instructions, then the thread continues to execute as normal. However, when there are SIMD instructions present in the thread running on a scalar core, then the thread is migrated to a SIMD core at 1605.

A determination as to whether the logicalID of the thread is running on a SIMD core and SIMD instructions are not present is made at 1607. If there are SIMD instructions, then the thread continues to execute as normal. However, when there are no SIMD instructions present in the thread running on a SIMD core, then the thread is migrated to a scalar core at 1609.

As noted throughout this description, accelerators accessible from a binary translator may provide for more efficient execution (including more energy efficient execution). However, being able to program for each potential accelerator available may be a difficult, if not impossible, task.

Detailed herein are embodiments using delineating instructions to explicitly mark the beginning and end of potential accelerator based execution of a portion of a thread. When there is no accelerator available, the code between the delineating instructions is executed as without the use of an accelerator. In some implementations, the code between these instructions may relax some semantics of the core that it runs on.

Figure 17:
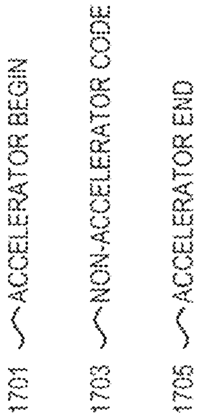
FIG. 17 illustrates an example of a code that delineates an acceleration region.

FIG. 17 illustrates an example of a code that delineates an acceleration region. The first instruction of this region is an Acceleration Begin (ABEGIN) instruction 1701. In some embodiments, the ABEGIN instruction gives permission to enter into a relaxed (sub-) mode of execution with respect to non-accelerator cores. For example, an ABEGIN instruction in some implementations allows a programmer or compiler to indicate in fields of the instruction which features of the sub-mode are different from a standard mode. Exemplary features include, but are not limited to, one or more of: ignoring self-modifying code (SMC), weakening memory consistency model restrictions (e.g., relaxing store ordering requirements), altering floating point semantics, changing performance monitoring (perfmon), altering architectural flag usage, etc. In some implementations, SMC is a write to a memory location in a code segment that is currently cached in the processor causes the associated cache line (or lines) to be invalidated. If the write affects a prefetched instruction, the prefetch queue is invalidated. This latter check is based on the linear address of the instruction. A write or a snoop of an instruction in a code segment, where the target instruction is already decoded and resident in the trace cache, invalidates the entire trace cache. SMC may be ignored by turning of SMC detection circuitry in a translation lookaside buffer. For example, memory consistency model restrictions may be altered by changing a setting in one or more registers or tables (such as a memory type range register or page attribute table). For example, when changing floating point semantics, how a floating point execution circuit performs a floating point calculation is altered through the use of one or more control registers (e.g., setting a floating point unit (FPU) control word register) that control the behavior of these circuits. Floating point semantics that may change include, but are not limited to, rounding mode, how exception masks and status flags are treated, flush-to-zero, setting denormals, and precision (e.g., single, double, and extended) control. Additionally, in some embodiments, the ABEGIN instruction allows for explicit accelerator type preference such that if an accelerator of a preferred type is available it will be chosen.

Non-accelerator code 1703 follows the ABEGIN instruction 1701. This code is native to the processor core(s) of the system. At worst, if there is no accelerator available, or ABEGIN is not supported, this code is executed on the core as-is. However, in some implementations the sub-mode is used for the execution.

By having an Acceleration End (AEND) instruction 1705 execution is gated on the processor core until the accelerator appears to have completed its execution. Effectively, the use of ABEGIN and AEND allows a programmer to opt-in/out of using an accelerator and/or a relaxed mode of execution.

Figure 18:
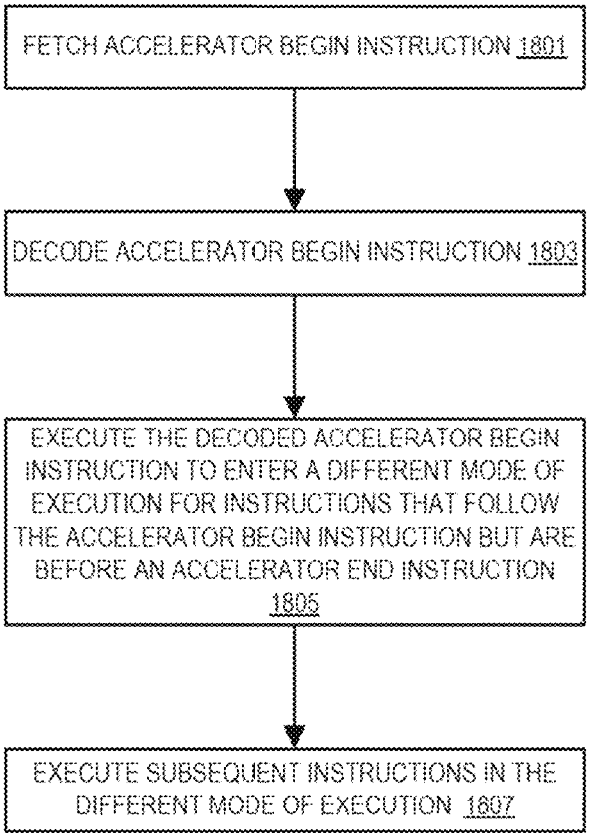
FIG. 18 illustrates an embodiment of a method of execution using ABEGIN in a hardware processor core.

FIG. 18 illustrates an embodiment of a method of execution using ABEGIN in a hardware processor core. At 1801, an ABEGIN instruction of a thread is fetched. As noted earlier, the ABEGIN instruction typically includes one or more fields used to define a different (sub-) mode of execution.

The fetched ABEGIN instruction is decoded using decode circuitry at 1803. In some embodiments, the ABEGIN instruction is decoded into microoperations.

The decoded ABEGIN instruction is executed by execution circuitry to enter the thread into a different mode (which may be explicitly defined by one or more fields of the ABEGIN instruction) for instructions that follow the ABEGIN instruction, but are before an AEND instruction at 1805. This different mode of execution may be on an accelerator, or on the existing core, depending upon accelerator availability and selection. In some embodiments, the accelerator selection is performed by a heterogeneous scheduler.

The subsequent, non-AEND, instructions are executed in the different mode of execution at 1807. The instructions may first be translated into a different instruction set by a binary translator when an accelerator is used for execution.

Figure 19:
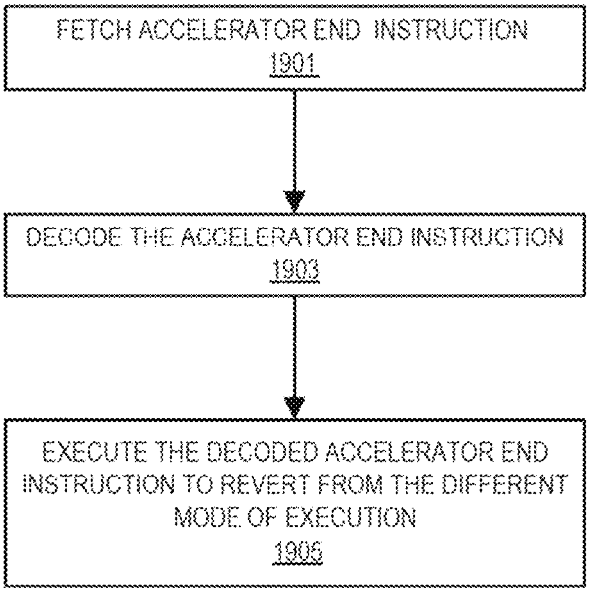
FIG. 19 illustrates an embodiment of a method of execution using AEND in a hardware processor core.

FIG. 19 illustrates an embodiment of a method of execution using AEND in a hardware processor core. At 1901, an AEND instruction is fetched.

The fetched AEND instruction is decoded using decode circuitry at 1903. In some embodiments, the AEND is decoded into microoperations.

The decoded AEND instruction is executed by execution circuitry to revert from the different mode of execution previously set by an ABEGIN instruction at 1905. This different mode of execution may be on an accelerator, or on the existing core, depending upon accelerator availability and selection.

The subsequent, non-AEND, instructions are executed in the original mode of execution at 1807. The instructions may first be translated into a different instruction set by a binary translator when an accelerator is used for execution.

FIG. 124 illustrates an example of execution when ABEGIN/AEND is not supported. At 12401, an ABEGIN instruction is fetched. A determination is made at 12403 that ABEGIN is not supported. For example, the CPUID indicates that there is no support.

When there is no support, typically a no operation (nop) is executed at 12405 which does not change the context associated with the thread. Because there is no change in the execution mode, instructions that follow an unsupported ABEGIN execute as normal at 12407.

Figure 20:
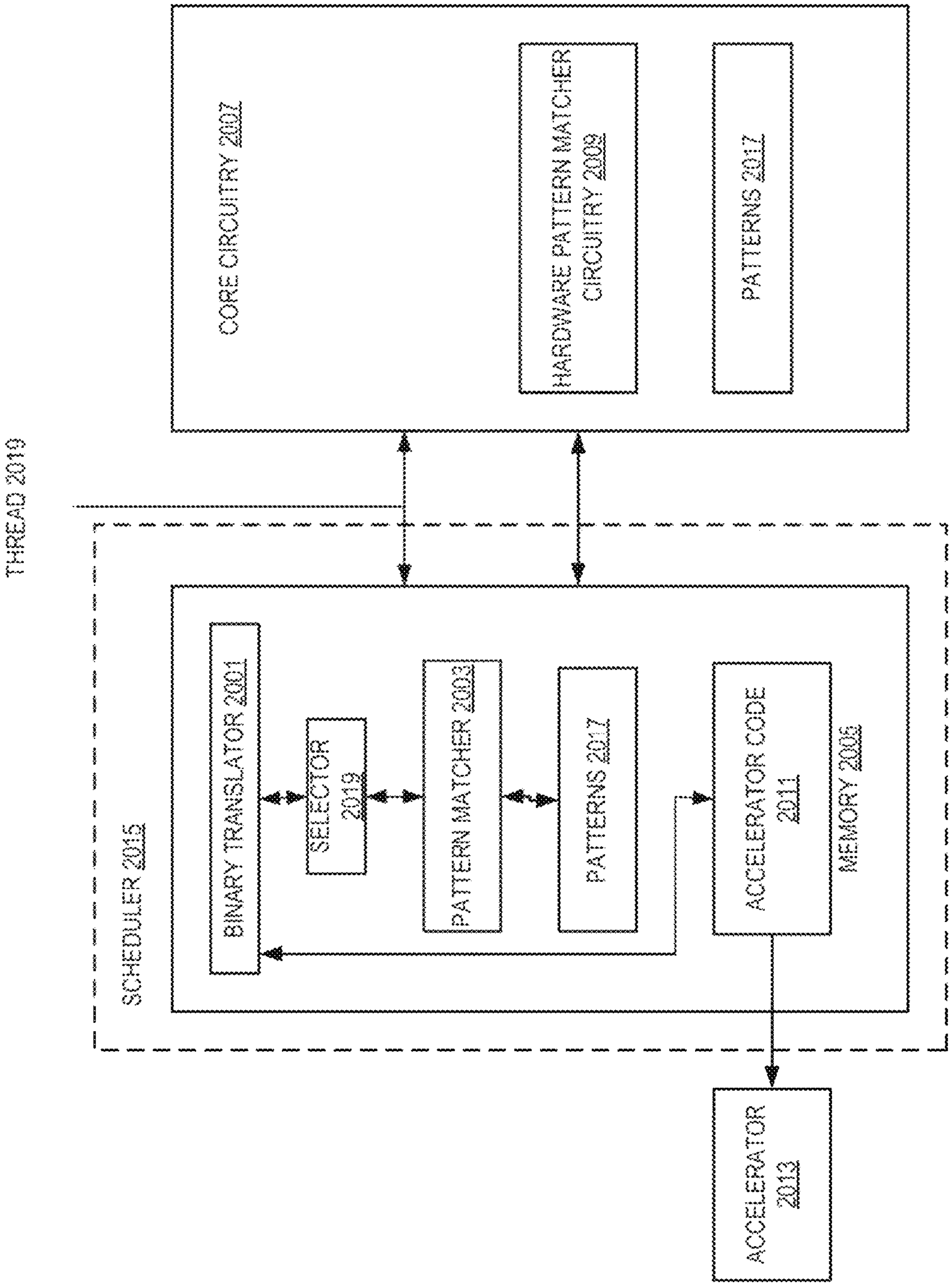
FIG. 20 illustrates a system that provides ABEGIN/AEND equivalency using pattern matching.

In some embodiments, an equivalent usage of ABEGIN/AEND is accomplished using at least pattern matching. This pattern matching may be based in hardware, software, and/or both. FIG. 20 illustrates a system that provides ABEGIN/AEND equivalency using pattern matching. The illustrated system includes a scheduler 2015 (e.g., a heterogeneous scheduler as detailed above) including a translator 2001 (e.g., binary translator, JIT, etc.) stored in memory 2005. Core circuitry 2007 executes the scheduler 2015. The scheduler 2015 receives a thread 2019 that may or may not have explicit ABEGIN/AEND instructions.

The scheduler 2015 manages a software based pattern matcher 2003, performs traps and context switches during offload, manages a user-space save area (detailed later), and generates or translates to accelerator code 2011. The pattern matcher 2003 recognizes (pre-defined) code sequences stored in memory that are found in the received thread 2019 that may benefit from accelerator usage and/or a relaxed execution state, but that are not delineated using ABEGIN/AEND. Typically, the patterns themselves are stored in the translator 2001, but, at the very least, are accessible to the pattern matcher 2003. A selector 2019 functions as detailed earlier.

The scheduler 2015 may also provide performance monitoring features. For example, if code does not have a perfect pattern match, scheduler 2015 recognizes that the code may still need relaxation of requirements to be more efficient and adjusts an operating mode associated with the thread accordingly. Relation of an operation mode have been detailed above.

The scheduler 2015 also performs one or more of: cycling a core in an ABEGIN/AEND region, cycling an accelerator to be active or stalled, counting ABEGIN invocations, delaying queuing of accelerators (synchronization handling), and monitoring of memory/cache statistics. In some embodiments, the binary translator 2001 includes accelerator specific code used to interpret accelerator code which may be useful in identifying bottlenecks. The accelerator executes this translated code.

In some embodiments, core circuitry 2007 includes a hardware pattern matcher 2009 to recognize (pre-defined) code sequences in the received thread 2019 using stored patterns 2017. Typically, this pattern matcher 2009 is lightweight compared to the software pattern matcher 2003 and looks for simple to express regions (such as rep movs). Recognized code sequences may be translated for use in accelerator by the scheduler 2015 and/or may result in a relaxation of the operating mode for the thread.

Coupled to the system are one or more accelerators 2013 which receive accelerator code 2011 to execute.

Figure 21:
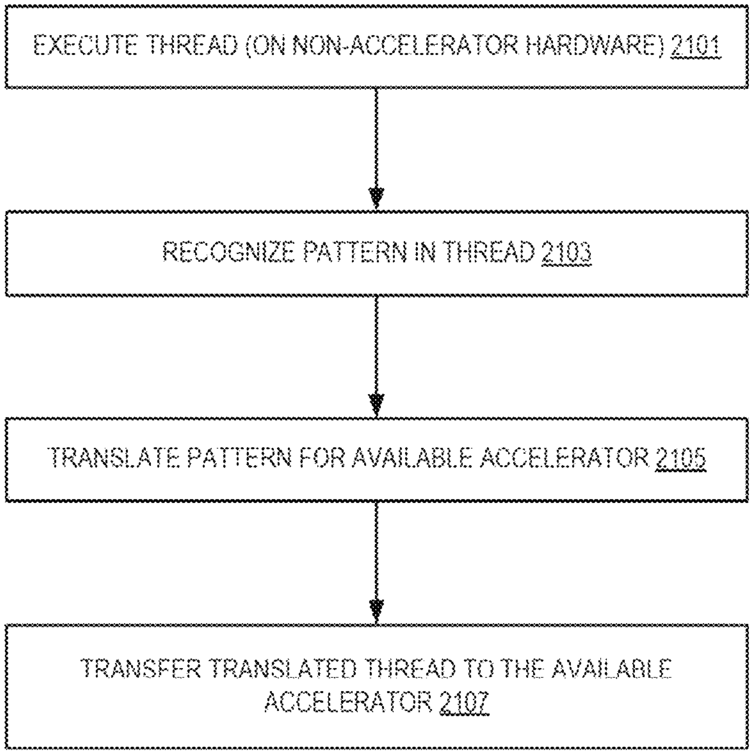
FIG. 21 illustrates an embodiment of a method of execution of a non-accelerated delineating thread exposed to pattern recognition.

FIG. 21 illustrates an embodiment of a method of execution of a non-accelerated delineating thread exposed to pattern recognition. This method is performed by a system that includes at least one type of pattern matcher.

In some embodiments, a thread is executed at 2101. Typically, this thread is executed on a non-accelerator core. Instructions of the executing thread are fed into a pattern matcher. However, the instructions of the thread may be fed into a pattern matcher prior to any execution.

At 2103, a pattern within the thread is recognized (detected). For example, a software-based pattern matcher, or a hardware pattern matcher circuit, finds a pattern that is normally associated with an available accelerator.

The recognized pattern is translated for an available accelerator at 2105. For example, a binary translator translates the pattern to accelerator code.

The translated code is transferred to the available accelerator at 2107 for execution.

Figure 22:
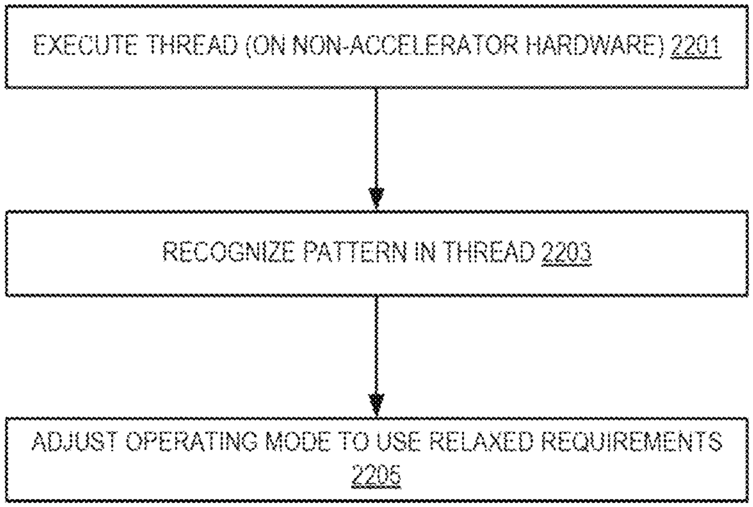
FIG. 22 illustrates an embodiment of a method of execution of a non-accelerated delineating thread exposed to pattern recognition.

FIG. 22 illustrates an embodiment of a method of execution of a non-accelerated delineating thread exposed to pattern recognition. This method is performed by a system that includes at least one type of pattern matcher as in the system of FIG. 20.

In some embodiments, a thread is executed at 2201. Typically, this thread is executed on a non-accelerator core. Instructions of the executing thread are fed into a pattern matcher. However, the instructions of the thread may be fed into a pattern matcher prior to any execution.

At 2203, a pattern within the thread is recognized (detected). For example, a software-based pattern matcher, or a hardware pattern matcher circuit, finds a pattern that is normally associated with an available accelerator.

The binary translator adjusts the operating mode associated with the thread to use relaxed requirements based on the recognized pattern at 2205. For example, a binary translator utilizes settings associated with the recognized pattern.

As detailed, in some embodiments, parallel regions of code are delimited by the ABEGIN and AEND instructions. Within the ABEGIN/AEND block, there is a guarantee of independence of certain memory load and store operations. Other loads and stores allow for potential dependencies. This enables implementations to parallelize a block with little or no checking for memory dependencies. In all cases, serial execution of the block is permitted since the serial case is included among the possible ways to execute the block. The binary translator performs static dependency analysis to create instances of parallel execution, and maps these instances to the hardware. The static dependency analysis may parallelize the iterations of an outer, middle, or inner loop. The slicing is implementation-dependent. Implementations of ABEGIN/AEND extract parallelism in sizes most appropriate for the implementation.

The ABEGIN/AEND block may contain multiple levels of nested loops. Implementations are free to choose the amount of parallel execution supported, or to fall back on serial execution. ABEGIN/AEND provides parallelism over much larger regions than SIMD instructions. For certain types of code, ABEGIN/AEND allows more efficient hardware implementations than multithreading.

Through the use of ABEGIN/AEND, a programmer and/or compiler can fall back on conventional serial execution by a CPU core if the criteria for parallelization are not met. When executed on a conventional out-of-order CPU core, ABEGIN/AEND reduces the area and power requirements of the memory ordering buffer (MOB) as a result of the relaxed memory ordering.

Within an ABEGIN/AEND block, the programmer specifies memory dependencies. FIG. 23 illustrates different types of memory dependencies 2301, their semantics 2303, ordering requirements 2305, and use cases 2307. In addition, some semantics apply to instructions within the ABEGIN/AEND block depending upon the implementation. For example, in some embodiments, register dependencies are allowed, but modifications to registers do not persist beyond AEND. Additionally, in some embodiments, an ABEGIN/AEND block must be entered at ABEGIN and exited at AEND (or entry into a similar state based on pattern recognition) with no branches into/out of the ABEGIN/AEND block. Finally, typically, the instruction stream cannot be modified.

In some implementations, an ABEGIN instruction includes a source operand which includes a pointer to a memory data block. This data memory block includes many pieces of information utilized by the runtime and core circuitry to process code within an ABEGIN/AEND block.

Figure 24:
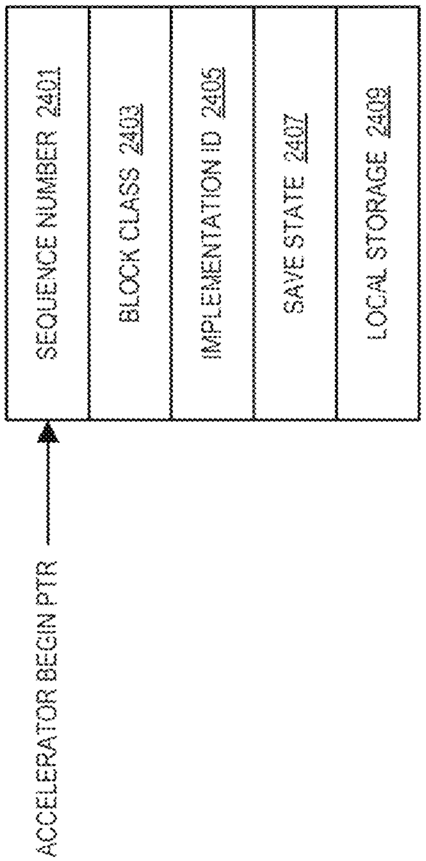
FIG. 24 illustrates an example of a memory data block pointed to by an ABEGIN instruction.

FIG. 24 illustrates an example of a memory data block pointed to by an ABEGIN instruction. As illustrated, depending upon the implementation, the memory data block includes are fields for a sequence number 2401, a block class 2403, an implementation identifier 2405, save state area size 2407, and local storage area size 2409.

The sequence number 2401 indicates how far through (parallel) computation the processor has gone before an interrupt. Software initializes the sequence number 2401 to zero prior to execution of the ABEGIN. The execution of ABEGIN will write non-zero values to the sequence number 2401 to track progress of execution. Upon completion, the execution of AEND will write zero to re-initialize the sequence number 2401 for its next use.

The pre-defined block class identifier 2403 (i.e. GUID) specifies a predefined ABEGIN/AEND block class. For example, DMULADD and DGEMM can be pre-defined as block classes. With a pre-defined class, the binary translator does not need to analyze the binary to perform mapping analysis for heterogeneous hardware. Instead, the translator (e.g., binary translator) executes the pre-generated translations for this ABEGIN/AEND class by just taking the input values. The code enclosed with ABEGIN/AEND merely serves as the code used for executing this class on a non-specialized core.

The implementation ID field 2405 indicates the type of execution hardware being used. The execution of ABEGIN will update this field 2405 to indicate the type of heterogeneous hardware being used. This helps an implementation migrate the ABEGIN/AEND code to a machine that has a different acceleration hardware type or does not have an accelerator at all. This field enables a possible conversion of the saved context to match the target implementation. Or, an emulator is used to execute the code until it exits AEND after migration when the ABEGIN/AEND code is interrupted and migrated to a machine that does not have the same accelerator type. This field 2405 may also allow the system to dynamically re-assign ABEGIN/AEND block to a different heterogeneous hardware within the same machine even when it is interrupted in the middle of ABEGIN/AEND block execution.

The state save area field 2407 indicates the size and format of the state save area which are implementation-specific. An implementation will guarantee that the implementation-specific portion of the state save area will not exceed some maximum specified in the CPUID. Typically, the execution of an ABEGIN instruction causes a write to the state save area of the general purpose and packed data registers that will be modified within the ABEGIN/AEND block, the associated flags, and additional implementation-specific state. To facilitate parallel execution, multiple instances of the registers may be written.

The local storage area 2409 is allocated as a local storage area. The amount of storage to reserve is typically specified as an immediate operand to ABEGIN. Upon execution of an ABEGIN instruction, a write to a particular register (e.g., R9) is made with the address of the local storage 2409. If there is a fault, this register is made to point to the sequence number.

Each instance of parallel execution receives a unique local storage area 2409. The address will be different for each instance of parallel execution. In serial execution, one storage area is allocated. The local storage area 2409 provides temporary storage beyond the architectural general purpose and packed-data registers. The local storage area 2409 should not be accessed outside of the ABEGIN/AEND block.

Figure 25:
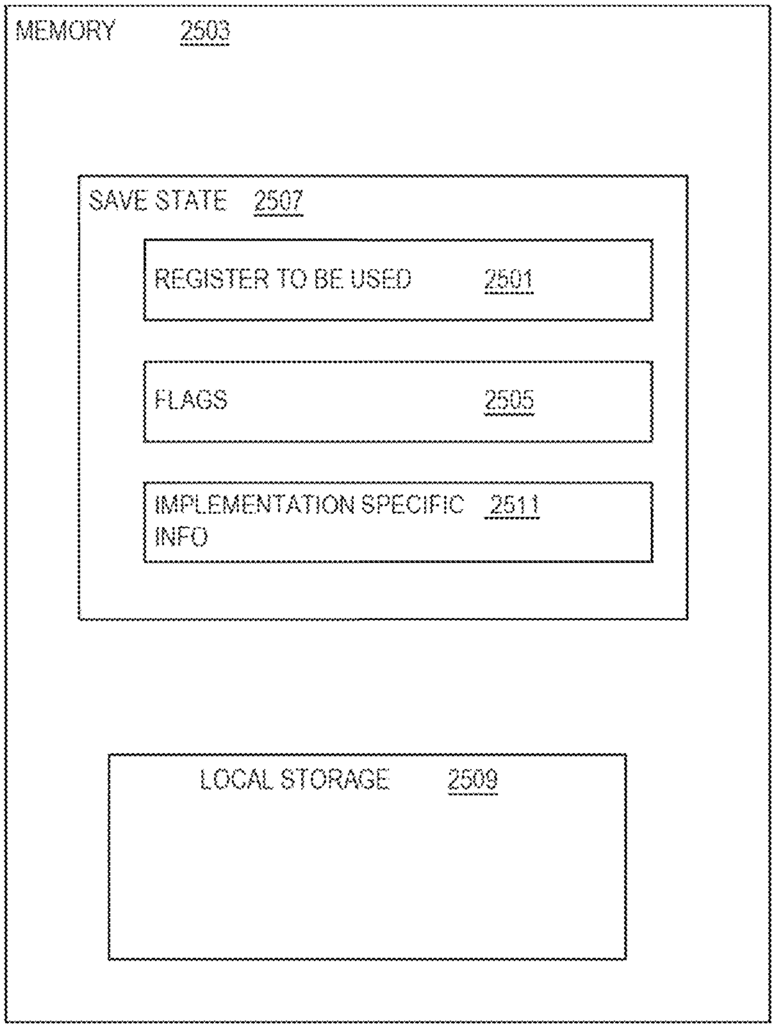
FIG. 25 illustrates an example of memory 2503 that is configured to use ABEGIN/AEND semantics.

FIG. 25 illustrates an example of memory 2503 that is configured to use ABEGIN/AEND semantics. Not illustrated is hardware (such as the various processing elements described herein) which support ABEGIN/AEND and utilize this memory 2503. As detailed, the memory 2503 includes a save state area 2507 which includes an indication of registers to be used 2501, flags 2505, and implementation specific information 2511. Additionally, local storage 2509 per parallel execution instance is stored in memory 2503.

Figure 26:
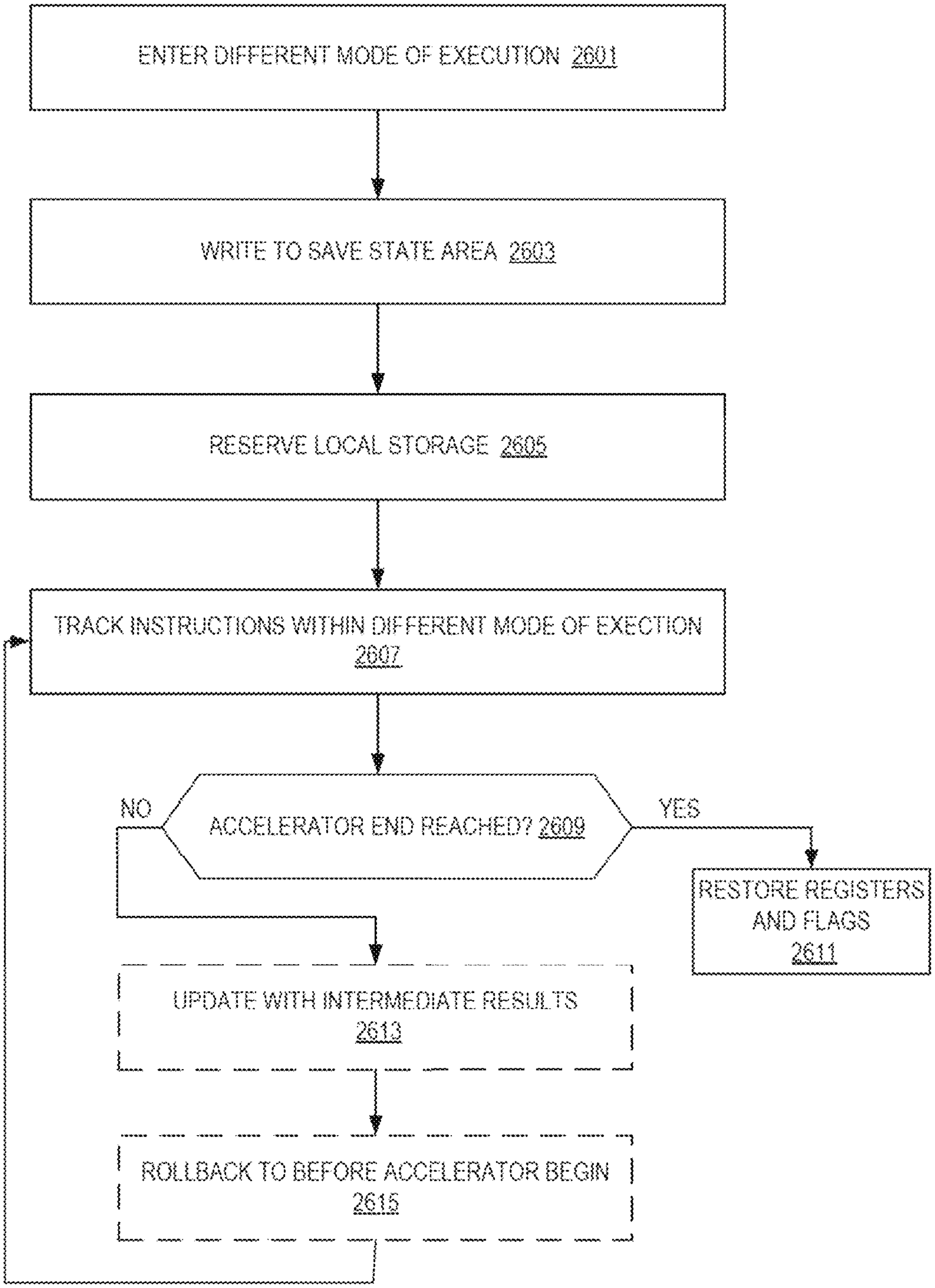
FIG. 26 illustrates an example of a method of operating in a different mode of execution using ABEGIN/AEND.

FIG. 26 illustrates an example of a method of operating in a different mode of execution using ABEGIN/AEND. Typically, this method is performed by a combination of entities such as a translator and execution circuitry. In some embodiments, the thread is translated before entering this mode.

At 2601, a different mode of execution is entered, such as, for example, a relaxed mode of execution (using an accelerator or not). This mode is normally entered from the execution of an ABEGIN instruction; however, as detailed above, this mode may also be entered because of a pattern match. The entering into this mode includes a reset of the sequence number.

A write to the save state area is made at 2603. For example, the general purpose and packed data registers that will be modified, the associated flags, and additional implementation-specific information is written. This area allows for restart of the execution, or rollback, if something goes wrong in the block (e.g., an interrupt).

A local storage area per parallel execution instance is reserved at 2605. The size of this area is dictated by the state save area field detailed above.

During execution of the block, the progress of the block is tracked at 2607. For example, as an instruction successfully executes and is retired, the sequence number of the block is updated.

A determination as to whether the AEND instruction has been reached is made at 2609 (e.g., to determine whether the block completed). If not, then the local storage area is updated with the intermediate results at 2613. If possible, execution picks up from these results; however, in some instances a rollback to before the ABEGIN/AEND occurs at 2615. For example, if an exception or interrupt occurs during the execution of the ABEGIN/AEND block, the instruction pointer will point to the ABEGIN instruction, and the R9 register will point to the memory data block which is updated with intermediate results. Upon resumption, the state saved in the memory data block will be used to resume at the correct point. Additionally, a page fault is raised if the initial portion of the memory data block, up to and including the state save area, is not present or not accessible. For loads and stores to the local storage area, page faults are reported in the usual manner, i.e. on first access to the not-present or not-accessible page. In some instances, a non-accelerator processing element will be used on restart.

If the block was successfully completed, then the registers that were set aside are restored along with the flags at 2611. Only the memory state will be different after the block.

Figure 27:
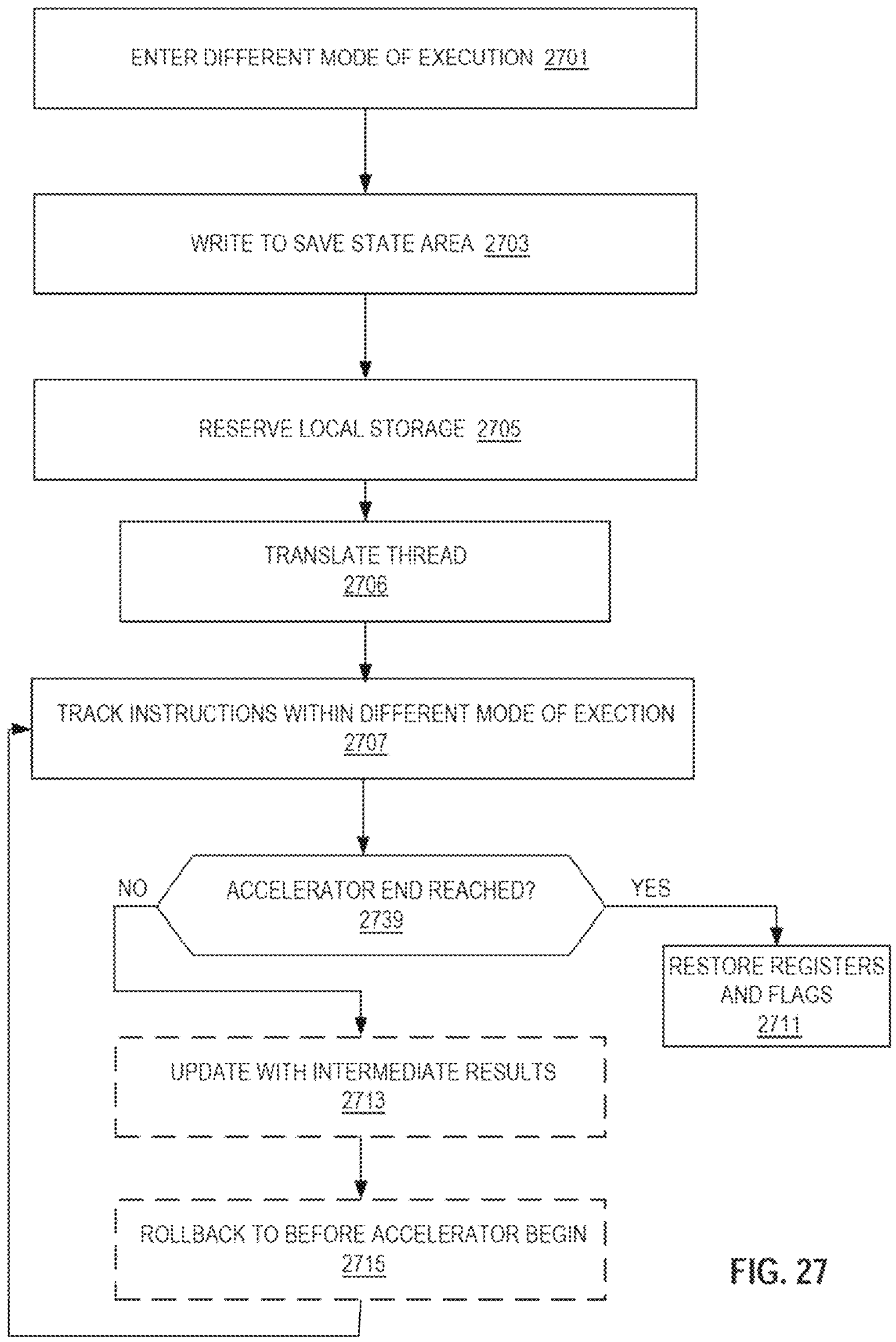
FIG. 27 illustrates an example of a method of operating in a different mode of execution using ABEGIN/AEND.

FIG. 27 illustrates an example of a method of operating in a different mode of execution using ABEGIN/AEND. Typically, this method is performed by a combination of entities such as a binary translator and execution circuitry.

At 2701, a different mode of execution is entered such as, for example, a relaxed mode of execution (using an accelerator or not). This mode is normally entered from the execution of an ABEGIN instruction; however, as detailed above, this mode may also be entered because of a pattern match. The entering into this mode includes a reset of the sequence number.

A write to the save state area is made at 2703. For example, the general purpose and packed data registers that will be modified, the associated flags, and additional implementation-specific information are written. This area allows for restart of the execution, or rollback, if something goes wrong in the block (e.g., an interrupt).

A local storage area per parallel execution instance is reserved at 2705. The size of this area is dictated by the state save area field detailed above.

At 2706, the code within the block is translated for execution.

During execution of the translated block, the progress of the block is tracked at 2707. For example, as an instruction successfully executes and is retired, the sequence number of the block is updated.

A determination as to whether the AEND instruction has been reached is made at 2709 (e.g., to determine if the block completed). If not, then the local storage area is updated with the intermediate results at 2713. If possible, execution picks up from these results, however, in some instances a rollback to before ABEGIN/AEND occurs at 2715. For example, if an exception or interrupt occurs during the execution of the ABEGIN/AEND block, the instruction pointer will point to the ABEGIN instruction, and the R9 register will point to the memory data block which is updated with intermediate results. Upon resumption, the state saved in the memory data block will be used to resume at the correct point. Additionally, a page fault is raised if the initial portion of the memory data block, up to and including the state save area, is not present or not accessible. For loads and stores to the local storage area, page faults are reported in the usual manner, i.e., on first access to the not-present or not-accessible page. In some instances, a non-accelerator processing element will be used on restart.

If the block was successfully completed, then the registers that were set aside are restored along with the flags at 2711. Only the memory state will be different after the block.

As noted above, in some implementations, a common link (called a multiprotocol common link (MCL)) is used to reach devices (such as the processing elements described in FIGS. 1 and 2). In some embodiments, these devices are seen as PCI Express (PCIe) devices. This link has three or more protocols dynamically multiplexed on it. For example, the common link supports protocols consisting of: 1) a producer/consumer, discovery, configuration, interrupts (PDCI) protocol to enable device discovery, device configuration, error reporting, interrupts, DMA-style data transfers and various services as may be specified in one or more proprietary or industry standards (such as, e.g., a PCI Express specification or an equivalent alternative); 2) a caching agent coherence (CAC) protocol to enable a device to issue coherent read and write requests to a processing element; and 3) a memory access (MA) protocol to enable a processing element to access a local memory of another processing element. While specific examples of these protocols are provided below (e.g., Intel On-Chip System Fabric (IOSF), In-die Interconnect (IDI), Scalable Memory Interconnect 3+ (SMI3+)), the underlying principles of the invention are not limited to any particular set of protocols.

FIG. 120 is a simplified block diagram 12000 illustrating an exemplary multi-chip configuration 12005 that includes two or more chips, or dies, (e.g., 12010, 12015) communicatively connected using an example multi-chip link (MCL) 12020. While FIG. 120 illustrates an example of two (or more) dies that are interconnected using an example MCL 12020, it should be appreciated that the principles and features described herein regarding implementations of an MCL can be applied to any interconnect or link connecting a die (e.g., 12010) and other components, including connecting two or more dies (e.g., 12010, 12015), connecting a die (or chip) to another component off-die, connecting a die to another device or die off-package (e.g., 12005), connecting the die to a BGA package, implementation of a Patch on Interposer (POINT), among potentially other examples.

In some instances, the larger components (e.g., dies 12010, 12015) can themselves be IC systems, such as systems on chip (SoC), multiprocessor chips, or other components that include multiple components such cores, accelerators, etc. (12025-12030 and 12040-12045) on the device, for instance, on a single die (e.g., 12010, 12015). The MCL 12020 provides flexibility for building complex and varied systems from potentially multiple discrete components and systems. For instance, each of dies 12010, 12015 may be manufactured or otherwise provided by two different entities. Further, dies and other components can themselves include interconnect or other communication fabrics (e.g., 12035, 12050) providing the infrastructure for communication between components (e.g., 12025-12030 and 12040-12045) within the device (e.g., 12010, 12015 respectively). The various components and interconnects (e.g., 12035, 12050) support or use multiple different protocols. Further, communication between dies (e.g., 12010, 12015) can potentially include transactions between the various components on the dies over multiple different protocols.

Embodiments of the multichip link (MCL) support multiple package options, multiple I/O protocols, as well as Reliability, Availability, and Serviceability (RAS) features. Further, the physical layer (PHY) can include a physical electrical layer and logic layer and can support longer channel lengths, including channel lengths up to, and in some cases exceeding, approximately 45 mm. In some implementations, an example MCL can operate at high data rates, including data rates exceeding 8-10 Gb/s.

In one example implementation of an MCL, a PHY electrical layer improves upon traditional multi-channel interconnect solutions (e.g., multi-channel DRAM I/O), extending the data rate and channel configuration, for instance, by a number of features including, as examples, regulated mid-rail termination, low power active crosstalk cancellation, circuit redundancy, per bit duty cycle correction and deskew, line coding, and transmitter equalization, among potentially other examples.

In one example implementation of an MCL, a PHY logical layer is implemented such that it further assists (e.g., electrical layer features) in extending the data rate and channel configuration while also enabling the interconnect to route multiple protocols across the electrical layer. Such implementations provide and define a modular common physical layer that is protocol agnostic and architected to work with potentially any existing or future interconnect protocol.

Turning to FIG. 121, a simplified block diagram 12100 is shown representing at least a portion of a system including an example implementation of a multichip link (MCL). An MCL can be implemented using physical electrical connections (e.g., wires implemented as lanes) connecting a first device 12105 (e.g., a first die including one or more subcomponents) with a second device 12110 (e.g., a second die including one or more other subcomponents). In the particular example shown in the high-level representation of diagram 12100, all signals (in channels 12115, 12120) can be unidirectional and lanes can be provided for the data signals to have both an upstream and downstream data transfer. While the block diagram 12100 of FIG. 121, refers to the first component 12105 as the upstream component and the second component 12110 as the downstream components, and physical lanes of the MCL used in sending data as a downstream channel 12115 and lanes used for receiving data (from component 12110) as an upstream channel 12120, it should be appreciated that the MCL between devices 12105, 12110 can be used by each device to both send and receive data between the devices.

In one example implementation, an MCL can provide a physical layer (PHY) including the electrical MCL PHY 12125*a,b* (or, collectively, 12125) and executable logic implementing MCL logical PHY 12130*a,b* (or, collectively, 12130). Electrical, or physical, PHY 12125 provides the physical connection over which data is communicated between devices 12105, 12110. Signal conditioning components and logic can be implemented in connection with the physical PHY 12125 to establish high data rate and channel configuration capabilities of the link, which in some applications involves tightly clustered physical connections at lengths of approximately 45 mm or more. The logical PHY 12130 includes circuitry for facilitating clocking, link state management (e.g., for link layers 12135*a*, 12135*b*), and protocol multiplexing between potentially multiple, different protocols used for communications over the MCL.

In one example implementation, physical PHY 12125 includes, for each channel (e.g., 12115, 12120) a set of data lanes, over which in-band data is sent. In this particular example, 50 data lanes are provided in each of the upstream and downstream channels 12115, 12120, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 12140, which, in some examples, can be a bi-directional lower frequency control signal link used to coordinate state transitions and other attributes of the MCL connecting devices 12105, 12110, among other examples.

As noted above, multiple protocols are supported using an implementation of MCL. Indeed, multiple, independent transaction layers 12150*a*, 12150*b* can be provided at each device 12105, 12110. For instance, each device 12105, 12110 may support and utilize two or more protocols, such as PCI, PCIe, CAC, among others. CAC is a coherent protocol used on-die to communicate between cores, Last Level Caches (LLCs), memory, graphics, and I/O controllers. Other protocols can also be supported including Ethernet protocol, Infiniband protocols, and other PCIe fabric based protocols. The combination of the Logical PHY and physical PHY can also be used as a die-to-die interconnect to connect a SerDes PHY (PCIe, Ethernet, Infiniband or other high speed SerDes) on one Die to its upper layers that are implemented on the other die, among other examples.

Logical PHY 12130 supports multiplexing between these multiple protocols on an MCL. For instance, the dedicated stream lane can be used to assert an encoded stream signal that identifies which protocol is to apply to data sent substantially concurrently on the data lanes of the channel. Further, logical PHY 12130 negotiates the various types of link state transitions that the various protocols may support or request. In some instances, LSM_SB signals sent over the channel's dedicated LSM_SB lane can be used, together with side band link 12140 to communicate and negotiate link state transitions between the devices 12105, 12110. Further, link training, error detection, skew detection, deskewing, and other functionality of traditional interconnects can be replaced or governed, in part using logical PHY 12130. For instance, valid signals sent over one or more dedicated valid signal lanes in each channel can be used to signal link activity, detect skew, link errors, and realize other features, among other examples. In the particular example of FIG. 121, multiple valid lanes are provided per channel. For instance, data lanes within a channel can be bundled or clustered (physically and/or logically) and a valid lane can be provided for each cluster. Further, multiple strobe lanes can be provided, in some cases, to provide a dedicated strobe signal for each cluster in a plurality of data lane clusters in a channel, among other examples.

As noted above, logical PHY 12130 negotiates and manages link control signals sent between devices connected by the MCL. In some implementations, logical PHY 12130 includes link layer packet (LLP) generation circuitry 12160 to send link layer control messages over the MCL (i.e., in band). Such messages can be sent over data lanes of the channel, with the stream lane identifying that the data is link layer-to-link layer messaging, such as link layer control data, among other examples. Link layer messages enabled using LLP module 12160 assist in the negotiation and performance of link layer state transitioning, power management, loopback, disable, re-centering, scrambling, among other link layer features between the link layers 12135*a*, 12135*b* of devices 12105, 12110 respectively.

Turning to FIG. 122, a simplified block diagram 12200 is shown illustrating an example logical PHY of an example MCL. A physical PHY 12205 can connect to a die that includes logical PHY 12210 and additional logic supporting a link layer of the MCL. The die, in this example, can further include logic to support multiple different protocols on the MCL. For instance, in the example of FIG. 122, PCIe logic 12215 is provided as well as CAC logic 12220, such that the dies can communicate using either PCIe or CAC over the same MCL connecting the two dies, among potentially many other examples, including examples where more than two protocols or protocols other than PCIe and CAC are supported over the MCL. Various protocols supported between the dies can offer varying levels of service and features.

Logical PHY 12210 can include link state machine management logic 12225 for negotiating link state transitions in connection with requests of upper layer logic of the die (e.g., received over PCIe or CAC). Logical PHY 12210 can further include link testing and debug logic (e.g., 12230) in some implementations. As noted above, an example MCL can support control signals that are sent between dies over the MCL to facilitate protocol agnostic, high performance, and power efficiency features (among other example features) of the MCL. For instance, logical PHY 12210 can support the generation and sending, as well as the receiving and processing of valid signals, stream signals, and LSM sideband signals in connection with the sending and receiving of data over dedicated data lanes, such as described in examples above.

In some implementations, multiplexing (e.g., 12235) and demultiplexing (e.g., 12240) logic can be included in, or be otherwise accessible to, logical PHY 12210. For instance, multiplexing logic (e.g., 12235) can be used to identify data (e.g., embodied as packets, messages, etc.) that is to be sent out onto the MCL. The multiplexing logic 12235 can identify the protocol governing the data and generate a stream signal that is encoded to identify the protocol. For instance, in one example implementation, the stream signal can be encoded as a byte of two hexadecimal symbols (e.g., CAC: FFh; PCIe: F0h; LLP: AAh; sideband: 55h; etc.), and can be sent during the same window (e.g., a byte time period window) of the data governed by the identified protocol. Similarly, demultiplexing logic 12240 can be employed to interpret incoming stream signals to decode the stream signal and identify the protocol that is to apply to data concurrently received with the stream signal on the data lanes. The demultiplexing logic 12240 can then apply (or ensure) protocol-specific link layer handling and cause the data to be handled by the corresponding protocol logic (e.g., PCIe logic 12215 or CAC logic 12220).

Logical PHY 12210 can further include link layer packet logic 12250 that can be used to handle various link control functions, including power management tasks, loopback, disable, re-centering, scrambling, etc. LLP logic 12250 can facilitate link layer-to-link layer messages over MCLP, among other functions. Data corresponding to the LLP signaling can be also be identified by a stream signal sent on a dedicated stream signal lane that is encoded to identify that the data lanes LLP data. Multiplexing and demultiplexing logic (e.g., 12235, 12240) can also be used to generate and interpret the stream signals corresponding to LLP traffic, as well as cause such traffic to be handled by the appropriate die logic (e.g., LLP logic 12250). Likewise, as some implementations of an MCLP can include a dedicated sideband (e.g., sideband 12255 and supporting logic), such as an asynchronous and/or lower frequency sideband channel, among other examples.

Logical PHY logic 12210 can further include link state machine management logic that can generate and receive (and use) link state management messaging over a dedicated LSM sideband lane. For instance, an LSM sideband lane can be used to perform handshaking to advance link training state, exit out of power management states (e.g., an L1 state), among other potential examples. The LSM sideband signal can be an asynchronous signal, in that it is not aligned with the data, valid, and stream signals of the link, but instead corresponds to signaling state transitions and align the link state machine between the two die or chips connected by the link, among other examples. Providing a dedicated LSM sideband lane can, in some examples, allow for traditional squelch and received detect circuits of an analog front end (AFE) to be eliminated, among other example benefits.

Turning to FIG. 123, a simplified block diagram 12300 is shown illustrating another representation of logic used to implement an MCL. For instance, logical PHY 12210 is provided with a defined logical PHY interface (LPIF) 12305 through which any one of a plurality of different protocols (e.g., PCIe, CAC, PDCI, MA, etc.) 12315, 12320, 12325 and signaling modes (e.g., sideband) can interface with the physical layer of an example MCL. In some implementations, multiplexing and arbitration logic 12330 can also be provided as a layer separate from the logical PHY 12210. In one example, the LPIF 12305 can be provided as the interface on either side of this MuxArb layer 1230. The logical PHY 12210 can interface with the physical PHY (e.g., the analog front end (AFE) 12205 of the MCL PHY) through another interface.

The LPIF can abstract the PHY (logical and electrical/analog) from the upper layers (e.g., 12315, 12320, 12325) such that a completely different PHY can be implemented under LPIF transparent to the upper layers. This can assist in promoting modularity and re-use in design, as the upper layers can stay intact when the underlying signaling technology PHY is updated, among other examples. Further, the LPIF can define a number of signals enabling multiplexing/demultiplexing, LSM management, error detection and handling, and other functionality of the logical PHY. For instance, the table below summarizes at least a portion of signals that can be defined for an example LPIF:

| Signal Name | Description |
|---|---|
| Rst | Reset |
| Lclk | Link Clock-8UI of PHY clock |
| Pl_trdy | Physical Layer is ready to accept data, data is accepted by Physical layer when Pl_trdy and Lp_valid are both asserted. |
| Pl_data[N-1:0][7:0] | Physical Layer-to-Link Layer data, where N equals the number of lanes. |
| Pl_valid | Physical Layer-to-Link Layer signal indicating data valid |
| Pl_Stream[7:0] | Physical Layer-to-Link Layer signal indicating the stream ID received with received data |
| Pl_error | Physical layer detected an error (e.g., framing or training) |
| Pl_AlignReq | Physical Layer request to Link Layer to align packets at LPIF width boundary |
| Pl_in_L0 | Indicates that link state machine (LSM) is in L0 |
| Pl_in_retrain | Indicates that LSM is in Retrain/Recovery |
| Pl_rejectL1 | Indicates that the PHY layer has rejected entry into L1. |

-continued

| Signal Name | Description |
|---|---|
| Pl_in_L12 | Indicates that LSM is in L1 or L2. |
| PI_LSM (3:0) | Current LSM state information |
| Lp_data[N-1:0][7:0] | Link Layer-to-Physical Layer Data, where N equals number of lanes. |
| Lp_Stream[7:0] | Link Layer-to-Physical Layer signal indicating the stream ID to use with data |
| Lp_AlignAck | Link Layer to Physical layer indicates that the packets are aligned LPIF width boundary |
| Lp_valid | Link Layer-to-Physical Layer signal indicating data valid |
| Lp_enterL1 | Link Layer Request to Physical Layer to enter L1 |
| Lp_enterL2 | Link Layer Request to Physical Layer to enter L2 |
| Lp_Retrain | Link Layer Request to Physical Layer to Retrain the PHY |
| Lp_exitL12 | Link Layer Request to Physical Layer to exit L1, L2 |
| Lp_Disable | Link Layer Request to Physical Layer to disable PHY |

As noted in the table, in some implementations, an alignment mechanism can be provided through an AlignReq/AlignAck handshake. For example, when the physical layer enters recovery, some protocols may lose packet framing. Alignment of the packets can be corrected, for instance, to guarantee correct framing identification by the link layer. The physical layer can assert a StallReq signal when it enters recovery, such that the link layer asserts a Stall signal when a new aligned packet is ready to be transferred. The physical layer logic can sample both Stall and Valid to determine if the packet is aligned. For instance, the physical layer can continue to drive trdy to drain the link layer packets until Stall and Valid are sampled asserted, among other potential implementations, including other alternative implementations using Valid to assist in packet alignment.

Various fault tolerances can be defined for signals on the MCL. For instance, fault tolerances can be defined for valid, stream, LSM sideband, low frequency side band, link layer packets, and other types of signals. Fault tolerances for packets, messages, and other data sent over the dedicated data lanes of the MCL can be based on the particular protocol governing the data. In some implementations, error detection and handling mechanisms can be provided, such as cyclic redundancy check (CRC), retry buffers, among other potential examples. As examples, for PCIe packets sent over the MCL, 32-bit CRC can be utilized for PCIe transaction layer packets (TLPs) (with guaranteed delivery (e.g., through a replay mechanism)) and 16-bit CRC can be utilized for PCIe link layer packets (which may be architected to be lossy (e.g., where replay is not applied)). Further, for PCIe framing tokens, a particular hamming distance (e.g., hamming distance of four (4)) can be defined for the token identifier; parity and 4-bit CRC can also be utilized, among other examples. For CAC packets, on the other hand, 16-bit CRC can be utilized.

In some implementations, fault tolerances are defined for link layer packets (LLPs) that utilize a valid signal to transition from low to high (i.e., 0-to-1) (e.g., to assist in assuring bit and symbol lock). Further, in one example, a particular number of consecutive, identical LLPs can be defined to be sent and responses can be expected to each request, with the requestor retrying after a response timeout, among other defined characteristics that can be used as the basis of determining faults in LLP data on the MCL. In further examples, fault tolerance can be provided for a valid signal, for instance, through extending the valid signal across an entire time period window, or symbol (e.g., by keeping the valid signal high for eight UIs). Additionally, errors or faults in stream signals can be prevented by maintaining a hamming distance for encodings values of the stream signal, among other examples.

Implementations of a logical PHY include error detection, error reporting, and error handling logic. In some implementations, a logical PHY of an example MCL can include logic to detect PHY layer de-framing errors (e.g., on the valid and stream lanes), sideband errors (e.g., relating to LSM state transitions), errors in LLPs (e.g., that are critical to LSM state transitions), among other examples. Some error detection/resolution can be delegated to upper layer logic, such as PCIe logic adapted to detect PCIe-specific errors, among other examples.

In the case of de-framing errors, in some implementations, one or more mechanisms can be provided through error handling logic. De-framing errors can be handled based on the protocol involved. For instance, in some implementations, link layers can be informed of the error to trigger a retry. De-framing can also cause a realignment of the logical PHY de-framing. Further, re-centering of the logical PHY can be performed and symbol/window lock can be reacquired, among other techniques. Centering, in some examples, can include the PHY moving the receiver clock phase to the optimal point to detect the incoming data. "Optimal," in this context, can refer to where it has the most margin for noise and clock jitter. Re-centering can include simplified centering functions, for instance, performed when the PHY wakes up from a low power state, among other examples.

Other types of errors can involve other error handling techniques. For instance, errors detected in a sideband can be caught through a time-out mechanism of a corresponding state (e.g., of an LSM). The error can be logged and the link state machine can then be transitioned to Reset. The LSM can remain in Reset until a restart command is received from software. In another example, LLP errors, such as a link control packet error, can be handled with a time-out mechanism that can re-start the LLP sequence if an acknowledgement to the LLP sequence is not received.

In some embodiments, each of the above protocols is a variant of PCIe.

PCIe devices communicate using a common address space that is associated with the bus. This address space is a bus address space or PCIe address space. In some embodiments, PCIe devices use addresses in an internal address space that may be different from the PCIe address space.

The PCIe specifications define a mechanism by which a PCIe device may expose its local memory (or part thereof) to the bus and thus enable the CPU or other devices attached to the bus to access its memory directly. Typically, each PCIe device is assigned a dedicated region in the PCIe address space that is referred to as a PCI base address register (BAR). In addition, addresses that the device exposes are mapped to respective addresses in the PCI BAR.

In some embodiments, a PCIe device (e.g., HCA) translates between its internal addresses and the PCIe bus addresses using an input/output memory mapping unit (IOMMU). In other embodiments, the PCIe device may perform address translation and resolution using a PCI address translation service (ATS). In some embodiments, tags such as process address space ID (PASID) tags, are used for specifying the addresses to be translated as belonging to the virtual address space of a specific process.

Figure 28:
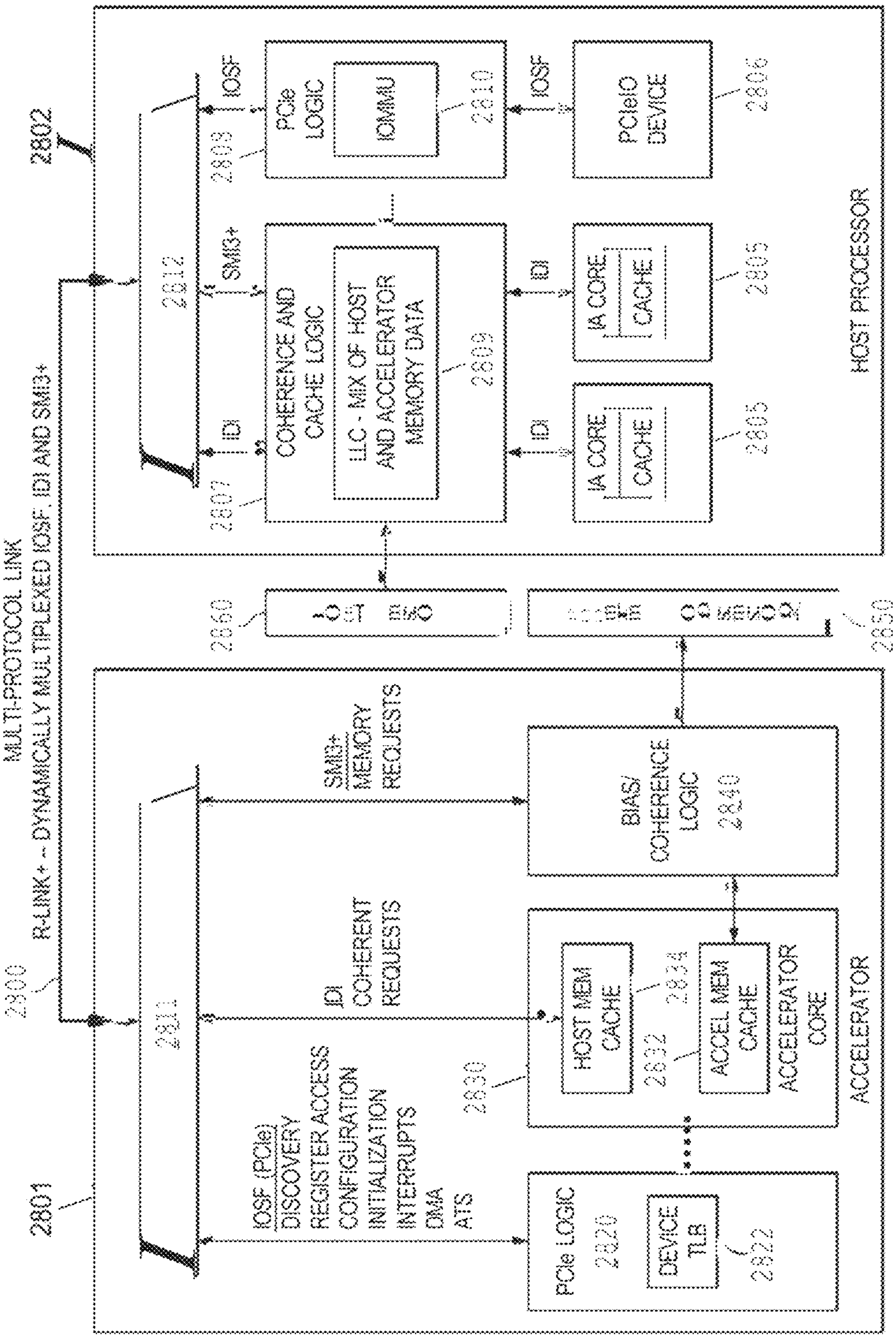
FIG. 28 illustrates additional details for one implementation.

FIG. 28 illustrates additional details for one implementation. As in the implementations described above, this implementation includes an accelerator 2801 with an accelerator memory 2850 coupled over a multi-protocol link 2800 to a host processor 2802 with a host memory 2860. As mentioned, the accelerator memory 2850 may utilize a different memory technology than the host memory 2860 (e.g., the accelerator memory may be HBM or stacked DRAM while the host memory may be SDRAM).

Multiplexors 2811 and 2812 are shown to highlight the fact that the multi-protocol link 2800 is a dynamically multiplexed bus which supports PCDI, CAC, and MA protocol (e.g., SMI3+) traffic, each of which may be routed to different functional components within the accelerator 2801 and host processor 2802. By way of example, and not limitation, these protocols may include IOSF, IDI, and SMI3+. In one implementation, the PCIe logic 2820 of the accelerator 2801 includes a local TLB 2822 for caching virtual to physical address translations for use by one or more accelerator cores 2830 when executing commands. As mentioned, the virtual memory space is distributed between the accelerator memory 2850 and host memory 2860. Similarly, PCIe logic on the host processor 2802 includes an I/O memory management unit (IOMMU) 2810 for managing memory accesses of PCIe I/O devices 2806 and, in one implementation, the accelerator 2801. As illustrated in the PCIe logic 2820 on the accelerator and the PCIe logic 2808 on the host processor communicate using the PCDI protocol to perform functions such as device discovery, register access, device configuration and initialization, interrupt processing, DMA operations, and address translation services (ATS). As mentioned, IOMMU 2810 on the host processor 2802 may operate as the central point of control and coordination for these functions.

In one implementation, the accelerator core 2830 includes the processing engines (elements) which perform the functions required by the accelerator. In addition, the accelerator core 2830 may include a host memory cache 2834 for locally caching pages stored in the host memory 2860 and an accelerator memory cache 2832 for caching pages stored in the accelerator memory 2850. In one implementation, the accelerator core 2830 communicates with coherence and cache logic 2807 of the host processor 2802 via the CAC protocol to ensure that cache lines shared between the accelerator 2801 and host processor 2802 remain coherent.

Bias/coherence logic 2840 of the accelerator 2801 implements the various device/host bias techniques described herein (e.g., at page-level granularity) to ensure data coherence while reducing unnecessary communication over the multi-protocol link 2800. As illustrated, the bias/coherence logic 2840 communicates with the coherence and cache logic 2807 of the host processor 2802 using MA memory transactions (e.g., SMI3+). The coherence and cache logic 2807 is responsible for maintaining coherency of the data stored in its LLC 2809, host memory 2860, accelerator memory 2850 and caches 2832, 2834, and each of the individual caches of the cores 2805.

In summary, one implementation of the accelerator 2801 appears as a PCIe device to software executed on the host processor 2802, being accessed by the PDCI protocol (which is effectively the PCIe protocol reformatted for a multiplexed bus). The accelerator 2801 may participate in shared virtual memory using an accelerator device TLB and standard PCIe address translation services (ATS). The accelerator may also be treated as a coherence/memory agent. Certain capabilities (e.g., ENQCMD, MOVDIR described below) are available on PDCI (e.g., for work submission) while the accelerator may use CAC to cache host data at the accelerator and in certain bias transition flows. Accesses to accelerator memory from the host (or host bias accesses from the accelerator) may use the MA protocol as described.

Figure 29:
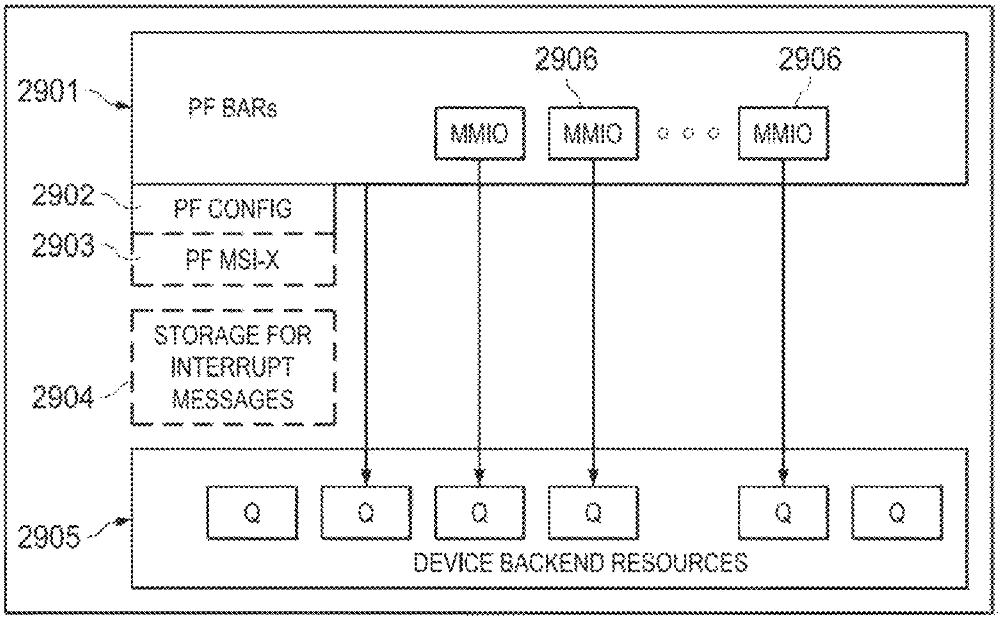
FIG. 29 illustrates an embodiment of an accelerator.

As illustrated in FIG. 29, in one implementation, an accelerator includes PCI configuration registers 2902 and MMIO registers 2906 which may be programmed to provide access to device backend resources 2905. In one implementation, the base addresses for the MMIO registers 2906 are specified by a set of Base Address Registers (BARs) 2901 in PCI configuration space. Unlike previous implementations, one implementation of the data streaming accelerator (DSA) described herein does not implement multiple channels or PCI functions, so there is only one instance of each register in a device. However, there may be more than one DSA device in a single platform.

An implementation may provide additional performance or debug registers that are not described here. Any such registers should be considered implementation specific.

The PCI configuration space accesses are performed as aligned 1-, 2-, or 4-byte accesses. See the PCI Express Base Specification for rules on accessing unimplemented registers and reserved bits in PCI configuration space.

MMIO space accesses to the BAR0 region (capability, configuration, and status registers) is performed as aligned 1-, 2-, 4- or 8-byte accesses. The 8-byte accesses should only be used for 8-byte registers. Software should not read or write unimplemented registers. The MMIO space accesses to the BAR 2 and BAR 4 regions should be performed as 64-byte accesses, using the ENQCMD, ENQCMDS, or MOVDIR64B instructions (described in detail below). ENQCMD or ENQCMDS should be used to access a work queue that is configured as shared (SWQ), and MOVDIR64B must be used to access a work queue that is configured as dedicated (DWQ).

One implementation of the DSA PCI configuration space implements three 64-bit BARs 2901. The Device Control Register (BAR0) is a 64-bit BAR that contains the physical base address of device control registers. These registers provide information about device capabilities, controls to configure and enable the device, and device status. The size of the BAR0 region is dependent on the size of the Interrupt Message Storage 2904. The size is 32 KB plus the number of Interrupt Message Storage entries 2904 times 16, rounded up to the next power of 2. For example, if the device supports 1024 Interrupt Message Storage entries 2904, the Interrupt Message Storage is 16 KB, and the size of BAR0 is 64 KB.

BAR2 is a 64-bit BAR that contains the physical base address of the Privileged and Non-Privileged Portals. Each portal is 64-bytes in size and is located on a separate 4 KB page. This allows the portals to be independently mapped into different address spaces using CPU page tables. The portals are used to submit descriptors to the device. The Privileged Portals are used by kernel-mode software, and the Non-Privileged Portals are used by user-mode software. The number of Non-Privileged Portals is the same as the number of work queues supported. The number of Privileged Portals is Number-of-Work Queues (WQs)×(MSI-X-table-size−1). The address of the portal used to submit a descriptor allows the device to determine which WQ to place the descriptor in, whether the portal is privileged or non-privileged, and which MSI-X table entry may be used for the completion interrupt. For example, if the device supports 8 WQs, the WQ for a given descriptor is (Portal-address>>12) & 0x7. If Portal-address>>15 is 0, the portal is non-privileged; otherwise it is privileged and the MSI-X 2903 table index used for the completion interrupt is Portal-address>>15. Bits 5:0 must be 0. Bits 11:6 are ignored; thus any 64-byte-aligned address on the page can be used with the same effect.

Descriptor submissions using a Non-Privileged Portal are subject to the occupancy threshold of the WQ, as configured using a work queue configuration (WQCFG) register. Descriptor submissions using a Privileged Portal are not subject to the threshold. Descriptor submissions to a SWQ must be submitted using ENQCMD or ENQCMDS. Any other write operation to a SWQ portal is ignored. Descriptor submissions to a DWQ must be submitted using a 64-byte write operation. Software uses MOVDIR64B, to guarantee a non-broken 64-byte write. An ENQCMD or ENQCMDS to a disabled or dedicated WQ portal returns Retry. Any other write operation to a DWQ portal is ignored. Any read operation to the BAR2 address space returns all 1s. Kernel-mode descriptors should be submitted using Privileged Portals in order to receive completion interrupts. If a kernel-mode descriptor is submitted using a Non-Privileged Portal, no completion interrupt can be requested. User-mode descriptors may be submitted using either a Privileged or a Non-Privileged Portal.

The number of portals in the BAR2 region is the number of WQs supported by the device times the MSI-X 2903 table size. The MSI-X table size is typically the number of WQs plus 1. So, for example, if the device supports 8 WQs, the useful size of BAR2 would be 8×9×4 KB=288 KB. The total size of BAR2 would be rounded up to the next power of two, or 512 KB.

BAR4 is a 64-bit BAR that contains the physical base address of the Guest Portals. Each Guest Portal is 64-bytes in size and is located in a separate 4 KB page. This allows the portals to be independently mapped into different address spaces using CPU extended page tables (EPT). If the Interrupt Message Storage Support field in GENCAP is 0, this BAR is not implemented.

The Guest Portals may be used by guest kernel-mode software to submit descriptors to the device. The number of Guest Portals is the number of entries in the Interrupt Message Storage times the number of WQs supported. The address of the Guest Portal used to submit a descriptor allows the device to determine the WQ for the descriptor and also the Interrupt Message Storage entry to use to generate a completion interrupt for the descriptor completion (if it is a kernel-mode descriptor, and if the Request Completion Interrupt flag is set in the descriptor). For example, if the device supports 8 WQs, the WQ for a given descriptor is (Guest-portal-address>>12) & 0x7, and the interrupt table entry index used for the completion interrupt is Guest-portal-address>>15.

In one implementation, MSI-X is the only PCIe interrupt capability that DSA provides and DSA does not implement legacy PCI interrupts or MSI. Details of this register structure are in the PCI Express specification.

In one implementation, three PCI Express capabilities control address translation. Only certain combinations of values for these capabilities may be supported, as shown in Table A. The values are checked at the time the Enable bit in General Control Register (GENCTRL) is set to 1.

TABLE A

| PASID | ATS | PRS | Operation |
|---|---|---|---|
| 1 | 1 | 1 | Virtual or physical addresses may be used, depending on IOMMU configuration. Addresses are translated using the PASID in the descriptor. This is the recommended mode. This mode must be used to allow user-mode access to the device or to allow sharing among multiple guests in a virtualized system. |
| 0 | 1 | 0 | Only physical addresses may be used. Addresses are translated using the BDF of the device and may be GPA or HPA, depending on IOMMU configuration. The PASID in the descriptor is ignored. This mode may be used when address translation is enabled in the IOMMU but the device is only used by the kernel or by a single guest kernel in a virtualized platform. |
| 0 | 0 | 0 | All memory accesses are Untranslated Accesses. Only physical addresses may be used. This mode should be used only if IOMMU address translation is disabled. |
| 0 | 0 | 1 | Not allowed. If software attempts to enable |
| 0 | 1 | 1 | the device with one of these configurations, |
| 1 | 0 | 0 | an error is reported and the device is |
| 1 | 0 | 1 | not enabled. |
| 1 | 1 | 0 | |

If any of these capabilities are changed by software while the device is enabled, the device may halt and an error is reported in the Software Error Register.

In one implementation, software configures the PASID capability to control whether the device uses PASID to perform address translation. If PASID is disabled, only physical addresses may be used. If PASID is enabled, virtual or physical addresses may be used, depending on IOMMU configuration. If PASID is enabled, both address translation services (ATS) and page request services (PRS) should be enabled.

In one implementation, software configures the ATS capability to control whether the device should translate addresses before performing memory accesses. If address translation is enabled in the IOMMU 2810, ATS must be enabled in the device to obtain acceptable system performance. If address translation is not enabled in the IOMMU 2810, ATS must be disabled. If ATS is disabled, only physical addresses may be used and all memory accesses are performed using Untranslated Accesses. ATS must be enabled if PASID is enabled.

In one implementation, software configures the PRS capability to control whether the device can request a page when an address translation fails. PRS must be enabled if PASID is enabled, and must be disabled if PASID is disabled.

Some implementations utilize a virtual memory space that is seamlessly shared between one or more processor cores, accelerator devices, and/or other types of processing devices (e.g., I/O devices). In particular, one implementation utilizes a shared virtual memory (SVM) architecture in which the same virtual memory space is shared between cores, accelerator devices, and/or other processing devices. In addition, some implementations include heterogeneous forms of physical system memory which are addressed using a common virtual memory space. The heterogeneous forms of physical system memory may use different physical interfaces for connecting with the DSA architectures. For example, an accelerator device may be directly coupled to local accelerator memory such as a high bandwidth memory (HBM) and each core may be directly coupled to a host physical memory such as a dynamic random access memory (DRAM). In this example, the shared virtual memory (SVM) is mapped to the combined physical memory of the HBM and DRAM so that the accelerator, processor cores, and/or other processing devices can access the HBM and DRAM using a consistent set of virtual memory addresses.

These and other features accelerators are described in detail below. By way of a brief overview, different implementations may include one or more of the following infrastructure features:

Shared Virtual Memory (SVM): some implementations support SVM which allows user level applications to submit commands to DSA directly with virtual addresses in the descriptors. DSA may support translating virtual addresses to physical addresses using an input/output memory management unit (IOMMU) including handling page faults. The virtual address ranges referenced by a descriptor may span multiple pages spread across multiple heterogeneous memory types. Additionally, one implementation also supports the use of physical addresses, as long as data buffers are contiguous in physical memory.

Partial descriptor completion: with SVM support, it is possible for an operation to encounter a page fault during address translation. In some cases, the device may terminate processing of the corresponding descriptor at the point where the fault is encountered and provide a completion record to software indicating partial completion and the faulting information to allow software to take remedial actions and retry the operation after resolving the fault.

Batch processing: some implementations support submitting descriptors in a "batch." A batch descriptor points to a set of virtually contiguous work descriptors (i.e., descriptors containing actual data operations). When processing a batch descriptor, DSA fetches the work descriptors from the specified memory and processes them.

Stateless device: descriptors in one implementation are designed so that all information required for processing the descriptor comes in the descriptor payload itself. This allows the device to store little client-specific state which improves its scalability. One exception is the completion interrupt message which, when used, is configured by trusted software.

Cache allocation control: this allows applications to specify whether to write to cache or bypass the cache and write directly to memory. In one implementation, completion records are always written to cache.

Shared Work Queue (SWQ) support: as described in detail below, some implementations support scalable work submission through Shared Work Queues (SWQ) using the Enqueue Command (ENQCMD) and Enqueue Commands (ENQCMDS) instructions. In this implementation, the SWQ is shared by multiple applications.

Dedicated Work Queue (DWQ) support: in some implementations, there is support for high-throughput work submission through Dedicated Work queues (DWQ) using MOVDIR64B instruction. In this implementation the DWQ is dedicated to one particular application.

QoS support: some implementations allow a quality of service (QOS) level to be specified for each work queue (e.g., by a Kernel driver). It may then assign different work queues to different applications, allowing the work from different applications to be dispatched from the work queues with different priorities. The work queues can be programmed to use specific channels for fabric QoS.

Biased Cache Coherence Mechanisms

One implementation improves the performance of accelerators with directly attached memory such as stacked DRAM or HBM, and simplifies application development for applications which make use of accelerators with directly attached memory. This implementation allows accelerator attached memory to be mapped as part of system memory, and accessed using Shared Virtual Memory (SVM) technology (such as that used in current IOMMU implementations), but without suffering the typical performance drawbacks associated with full system cache coherence.

The ability to access accelerator attached memory as part of system memory without onerous cache coherence overhead provides a beneficial operating environment for accelerator offload. The ability to access memory as part of the system address map allows host software to setup operands, and access computation results, without the overhead of traditional I/O DMA data copies. Such traditional copies involve driver calls, interrupts and memory mapped I/O (MMIO) accesses that are all inefficient relative to simple memory accesses. At the same time, the ability to access accelerator attached memory without cache coherence overheads can be critical to the execution time of an offloaded computation. In cases with substantial streaming write memory traffic, for example, cache coherence overhead can cut the effective write bandwidth seen by an accelerator in half. The efficiency of operand setup, the efficiency of results access and the efficiency of accelerator computation all play a role in determining how well accelerator offload will work. If the cost of offloading work (e.g., setting up operands; getting results) is too high, offloading may not pay off at all, or may limit the accelerator to only very large jobs. The efficiency with which the accelerator executes a computation can have the same effect.

One implementation applies different memory access and coherence techniques depending on the entity initiating the memory access (e.g., the accelerator, a core, etc.) and the memory being accessed (e.g., host memory or accelerator memory). These techniques are referred to generally as a "Coherence Bias" mechanism which provides for accelerator attached memory two sets of cache coherence flows, one optimized for efficient accelerator access to its attached memory, and a second optimized for host access to accelerator attached memory and shared accelerator/host access to accelerator attached memory. Further, it includes two techniques for switching between these flows, one driven by application software, and another driven by autonomous hardware hints. In both sets of coherence flows, hardware maintains full cache coherence.

Figure 30:
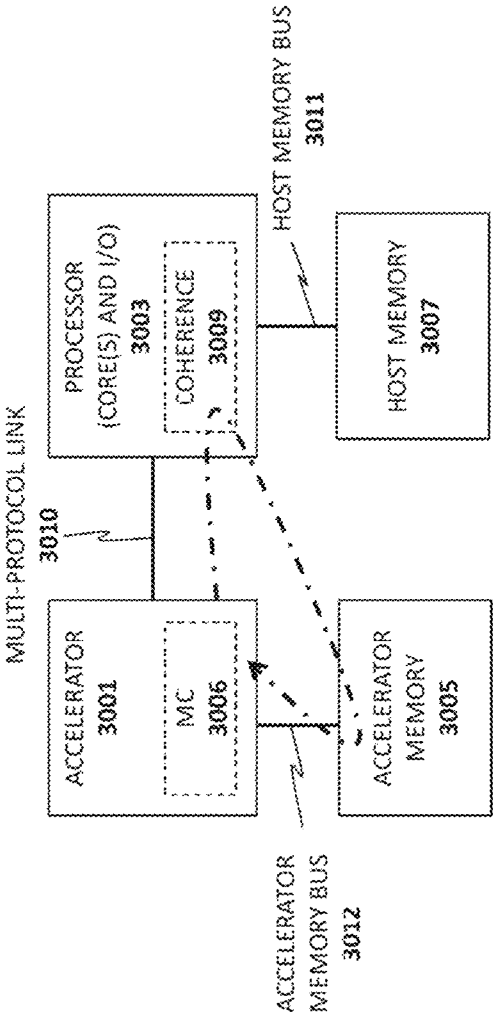
FIG. 30 illustrates computer systems which includes an accelerator and one or more computer processor chips coupled to the processor over a multi-protocol link.

As illustrated generally in FIG. 30, one implementation applies to computer systems which include an accelerator 3001 and one or more computer processor chips with processor cores and I/O circuitry 3003, where the accelerator 3001 is coupled to the processor over a multi-protocol link 2800. In one implementation, the multi-protocol link 3010 is a dynamically multiplexed link supporting a plurality of different protocols including, but not limited to those detailed above. It should be noted, however, that the underlying principles of the invention are not limited to any particular set of protocols. In addition, note that the accelerator 3001 and Core I/O 3003 may be integrated on the same semiconductor chip or different semiconductor chips, depending on the implementation.

In the illustrated implementation, an accelerator memory bus 3012 couples the accelerator 3001 to an accelerator memory 3005 and a separate host memory bus 3011 couples the core I/O 3003 to a host memory 3007. As mentioned, the accelerator memory 3005 may comprise a High Bandwidth Memory (HBM) or a stacked DRAM (some examples of which are described herein) and the host memory 3007 may comprise a DRAM such as a Double-Data Rate synchronous dynamic random access memory (e.g., DDR3 SDRAM, DDR4 SDRAM, etc.). However, the underlying principles of the invention are not limited to any particular types of memory or memory protocols.

In one implementation, both the accelerator 3001 and "host" software running on the processing cores within the processor chips 3003 access the accelerator memory 3005 using two distinct sets of protocol flows, referred to as "Host Bias" flows and "Device Bias" flows. As described below, one implementation supports multiple options for modulating and/or choosing the protocol flows for specific memory accesses.

The Coherence Bias flows are implemented, in part, on two protocol layers on the multi-protocol link 2800 between the accelerator 3001 and one of the processor chips 3003: a CAC protocol layer and a MA protocol layer. In one implementation, the Coherence Bias flows are enabled by: (a) using existing opcodes in the CAC protocol in new ways, (b) the addition of new opcodes to an existing MA standard and (c) the addition of support for the MA protocol to a multi-protocol link 3001 (prior links include only CAC and PCDI). Note that the multi-protocol link is not limited to supporting just CAC and MA; in one implementation, it is simply required to support at least those protocols.

As used herein, the "Host Bias" flows, illustrated in FIG. 30 are a set of flows that funnel all requests to accelerator memory 3005 through the standard coherence controller 3009 in the processor chip 3003 to which the accelerator 3001 is attached, including requests from the accelerator itself. This causes the accelerator 3001 to take a circuitous route to access its own memory, but allows accesses from both the accelerator 3001 and processor core I/O 3003 to be maintained as coherent using the processor's standard coherence controllers 3009. In one implementation, the flows use CAC opcodes to issues requests over the multi-protocol link to the processor's coherence controllers 3009, in the same or similar manner to the way processor cores 3009 issue requests to the coherence controllers 3009. For example, the processor chip's coherence controllers 3009 may issue UPI and CAC coherence messages (e.g., snoops) that result from requests from the accelerator 3001 to all peer processor core chips (e.g., 3003) and internal processor agents on the accelerator's behalf, just as they would for requests from a processor core 3003. In this manner, coherency is maintained between the data accessed by the accelerator 3001 and processor cores I/O 3003.

In one implementation, the coherence controllers 3009 also conditionally issue memory access messages to the accelerator's memory controller 3006 over the multi-protocol link 2800. These messages are similar to the messages that the coherence controllers 3009 send to the memory controllers that are local to their processor die, and include new opcodes that allow data to be returned directly to an agent internal to the accelerator 3001, instead of forcing data to be returned to the processor's coherence controller 3009 of the multi-protocol link 2800, and then returned to the accelerator 3001 as a CAC response over the multi-protocol link 2800.

In one implementation of "Host Bias" mode shown in FIG. 30, all requests from processor cores 3003 that target accelerator attached memory 3005 are sent directly to the processors coherency controllers 3009, just as they were they targeting normal host memory 3007. The coherence controllers 3009 may apply their standard cache coherence algorithms and send their standard cache coherence messages, just as they do for accesses from the accelerator 3001, and just as they do for accesses to normal host memory 3007. The coherence controllers 3009 also conditionally send MA commands over the multi-protocol link 2800 for this class of requests, though in this case, the MA flows return data across the multiprotocol link 2800.

Figure 31:
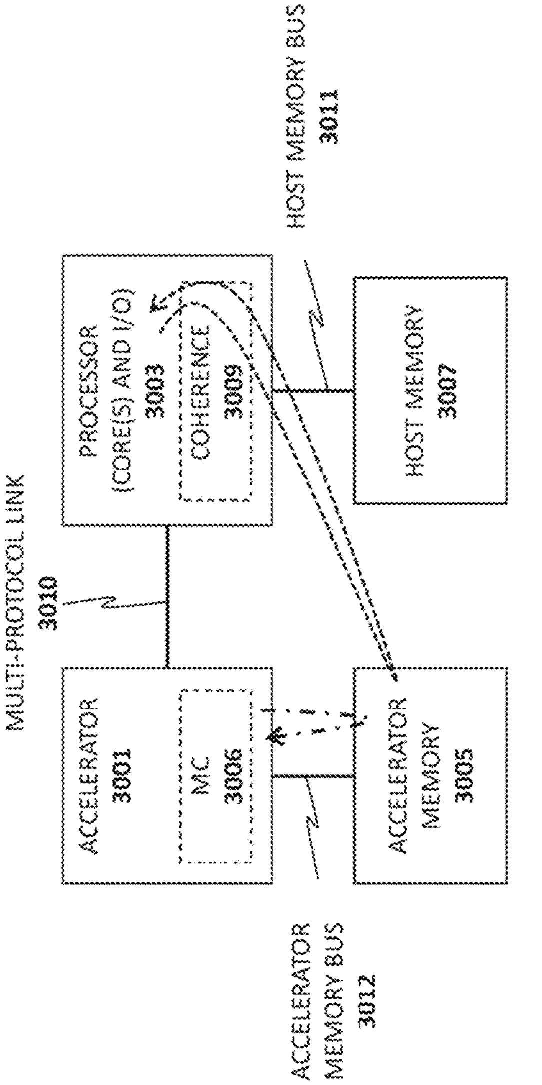
FIG. 31 illustrates device bias flows according to an embodiment.

The "Device Bias" flows, illustrated in FIG. 31, are flows that allow the accelerator 3001 to access its locally attached memory 3005 without consulting the host processor's cache coherence controllers 3007. More specifically, these flows allow the accelerator 3001 to access its locally attached memory via memory controller 3006 without sending a request over the multi-protocol link 2800.

In "Device Bias" mode, requests from processor cores I/O 3003 are issued as per the description for "Host Bias" above, but are completed differently in the MA portion of their flow. When in "Device Bias", processor requests to accelerator attached memory 3005 are completed as though they were issued as "uncached" requests. This "uncached" convention is employed so that data that is subject to the Device Bias flows can never be cached in the processor's cache hierarchy. It is this fact that allows the accelerator 3001 to access Device Biased data in its memory 3005 without consulting the cache coherence controllers 3009 on the processor.

In one implementation, the support for the "uncached" processor core 3003 access flow is implemented with a globally observed, use once ("GO-UO") response on the processors' CAC bus. This response returns a piece of data to a processor core 3003, and instructs the processor to use the value of the data only once. This prevents the caching of the data and satisfies the needs of the "uncached" flow. In systems with cores that do not support the GO-UO response, the "uncached" flows may be implemented using a multi-message response sequence on the MA layer of the multi-protocol link 2800 and on the processor core's 3003 CAC bus.

Specifically, when a processor core is found to target a "Device Bias" page at the accelerator 3001, the accelerator sets up some state to block future requests to the target cache line from the accelerator, and sends a special "Device Bias Hit" response on the MA layer of the multi-protocol link 2800. In response to this MA message, the processor's cache coherence controller 3009 returns data to the requesting processor core 3003 and immediately follows the data return with a snoop-invalidate message. When the processor core 3003 acknowledges the snoop-invalidate as complete, the cache coherence controller 3009 sends another special MA "Device Bias Bock Complete" message back to the accelerator 3001 on the MA layer of the multi-protocol link 2800. This completion message causes the accelerator 3001 to clear the aforementioned blocking state.

Figure 107:
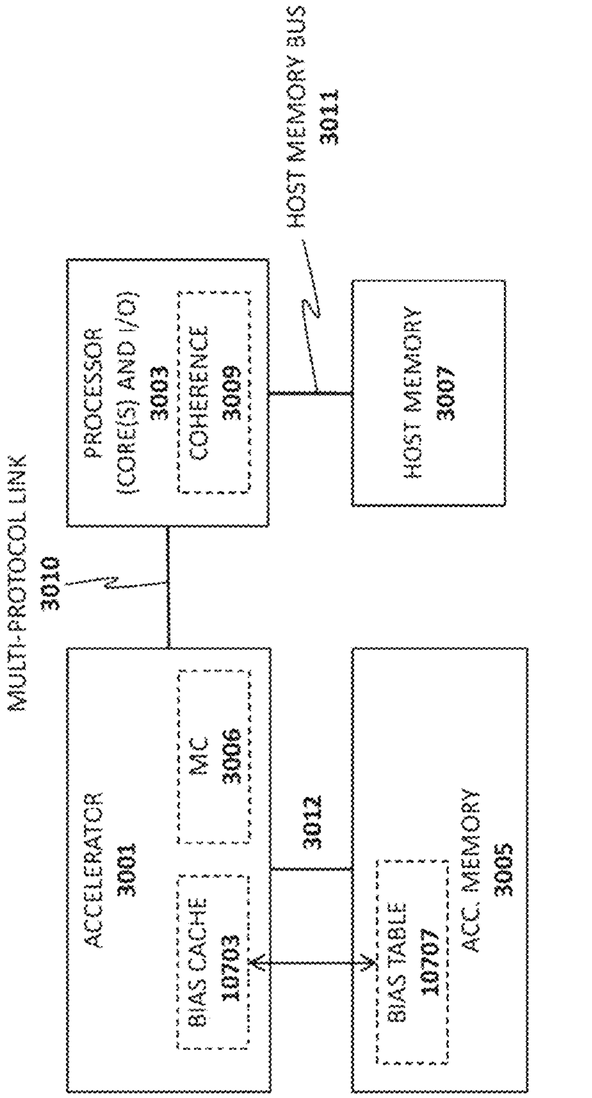
FIG. 107 illustrates an embodiment using biasing.

FIG. 107 illustrates an embodiment using biasing. In one implementation, the selection of between Device and Host Bias flows is driven by a Bias Tracker data structure which may be maintained as a Bias Table 10707 in the accelerator memory 3005. This Bias Table 10707 may be a page-granular structure (i.e., controlled at the granularity of a memory page) that includes 1 or 2 bits per accelerator-attached memory page. The Bias Table 10707 may be implemented in a stolen memory range of the accelerator attached memory 3005, with or without a Bias Cache 10703 in the accelerator (e.g., to cache frequently/recently used entries of the Bias table 10707). Alternatively, the entire Bias Table 10707 may be maintained within the accelerator 3001.

In one implementation, the Bias Table entry associated with each access to the accelerator attached memory 3005 is accessed prior the actual access to the accelerator memory, causing the following operations:

- Local requests from the accelerator 3001 that find their page in Device Bias are forwarded directly to accelerator memory 3005.
- Local requests from the accelerator 3001 that find their page in Host Bias are forwarded to the processor 3003 over as a CAC request on the multi-protocol link 2800.
- MA requests from the processor 3003 that find their page in Device Bias complete the request using the "uncached" flow described above.
- MA requests from the processor 3003 that find their page in Host Bias complete the request like a normal memory read.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the accelerator's device driver which, in turn, sends a message (or enqueues a command descriptor) to the accelerator 3001 directing it to change the bias state and, for some transitions, perform a cache flushing operation in the host. The cache flushing operation is required for a transition from Host Bias to Device Bias, but is not required for the opposite transition.

In some cases, it is too difficult for software to determine when to make the bias transition API calls and to identify the pages requiring bias transition. In such cases, the accelerator may implement a bias transition "hint" mechanism, where it detects the need for a bias transition and sends a message to its driver indicating as much. The hint mechanism may be as simple as a mechanism responsive to a bias table lookup that triggers on accelerator accesses to Host Bias pages or host accesses to Device Bias pages, and that signals the event to the accelerator's driver via an interrupt.

Note that some implementations may require a second bias state bit to enable bias transition state values. This allows systems to continue to access memory pages while those pages are in the process of a bias change (i.e. when caches are partially flushed, and incremental cache pollution due to subsequent requests must be suppressed.)

Figure 32:
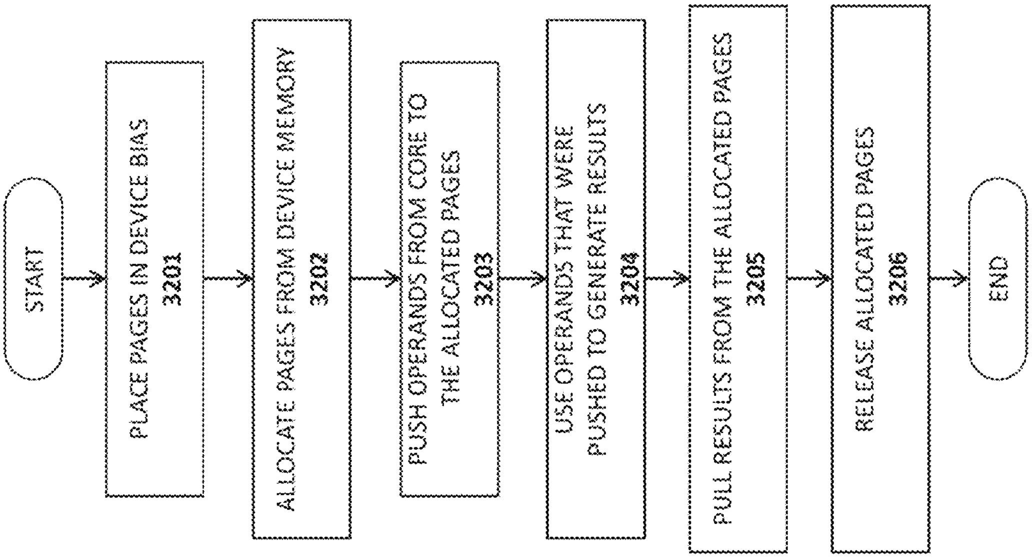
FIG. 32 illustrates an exemplary process in accordance with one implementation.

An exemplary process in accordance with one implementation is illustrated in FIG. 32. The process may be implemented on the system and processor architectures described herein, but is not limited to any particular system or processor architecture.

At 3201, a particular set of pages are placed in device bias. As mentioned, this may be accomplished by updating the entries for these pages in a Bias Table to indicate that the pages are in device bias (e.g., by setting a bit associated with each page). In one implementation, once set to device bias, the pages are guaranteed not to be cached in host cache memory. At 3202, the pages are allocated from device memory (e.g., software allocates the pages by initiating a driver/API call).

At 3203, operands are pushed to the allocated pages from a processor core. In one implantation, this is accomplished by software using an API call to flip the operand pages to Host Bias (e.g., via an OpenCL API call). No data copies or cache flushes are required and the operand data may end up at this stage in some arbitrary location in the host cache hierarchy.

At 3204, the accelerator device uses the operands to generate results. For example, it may execute commands and process data directly from its local memory (e.g., 3005 discussed above). In one implementation, software uses the OpenCL API to flip the operand pages back to Device Bias (e.g., updating the Bias Table). As a result of the API call, work descriptors are submitted to the device (e.g., via shared on dedicated work queues as described below). The work descriptor may instruct the device to flush operand pages from host cache, resulting in a cache flush (e.g., executed using CLFLUSH on the CAC protocol). In one implementation, the accelerator executes with no host related coherence overhead and dumps data to the results pages.

At 3205 results are pulled from the allocated pages. For example, in one implementation, software makes one or more API calls (e.g., via the OpenCL API) to flip the results pages to Host Bias. This action may cause some bias state to be changed but does not cause any coherence or cache flushing actions. Host processor cores can then access, cache and share the results data as needed. Finally, at 3206, the allocated pages are released (e.g., via software).

Figure 33:
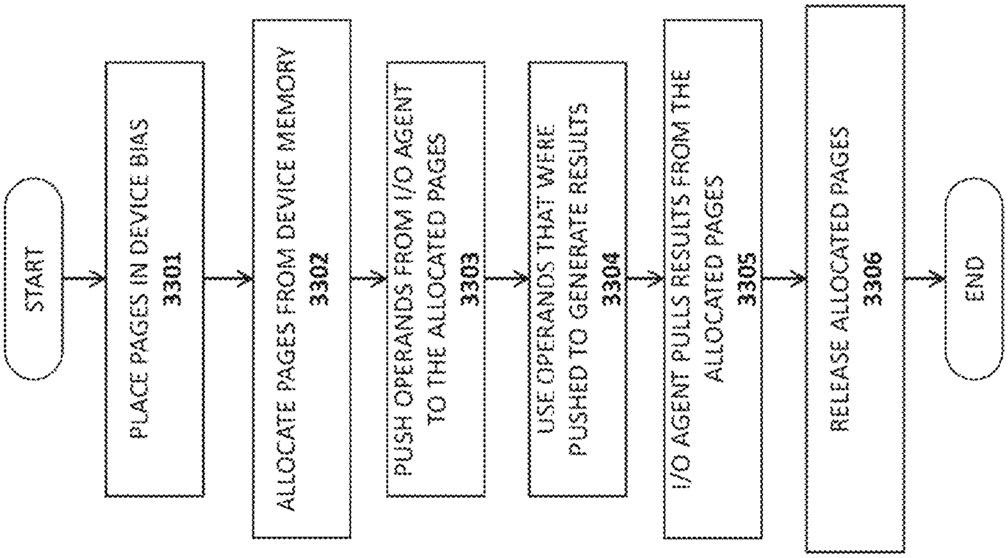
FIG. 33 illustrates a process in which operands are released from one or more I/O devices.

A similar process in which operands are released from one or more I/O devices is illustrated in FIG. 33. At 3301, a particular set of pages are placed in device bias. As mentioned, this may be accomplished by updating the entries for these pages in a Bias Table to indicate that the pages are in device bias (e.g., by setting a bit associated with each page). In one implementation, once set to device bias, the pages are guaranteed not to be cached in host cache memory. At 3302, the pages are allocated from device memory (e.g., software allocates the pages by initiating a driver/API call).

At 3303, operands are pushed to the allocated pages from an I/O agent. In one implantation, this is accomplished by software posting a DMA request to an I/O agent and the I/O agent using non-allocating stores to write data. In one implementation, data never allocates into host cache hierarchy and the target pages stay in Device Bias.

At 3304, the accelerator device uses the operands to generate results. For example, software may submit work to the accelerator device; there is no page transition needed (i.e., pages stay in Device Bias). In one implementation, the accelerator device executes with no host related coherence overhead and the accelerator dumps data to the results pages.

At 3305 the I/O agent pulls the results from the allocated pages (e.g., under direction from software). For example, software may post a DMA request to the I/O agent. No Page transition is needed as the source pages stay in Device Bias. In one implementation, the I/O bridge uses RdCurr (read current) requests to grab an uncacheable copy of the data from the results pages.

Figure 34:
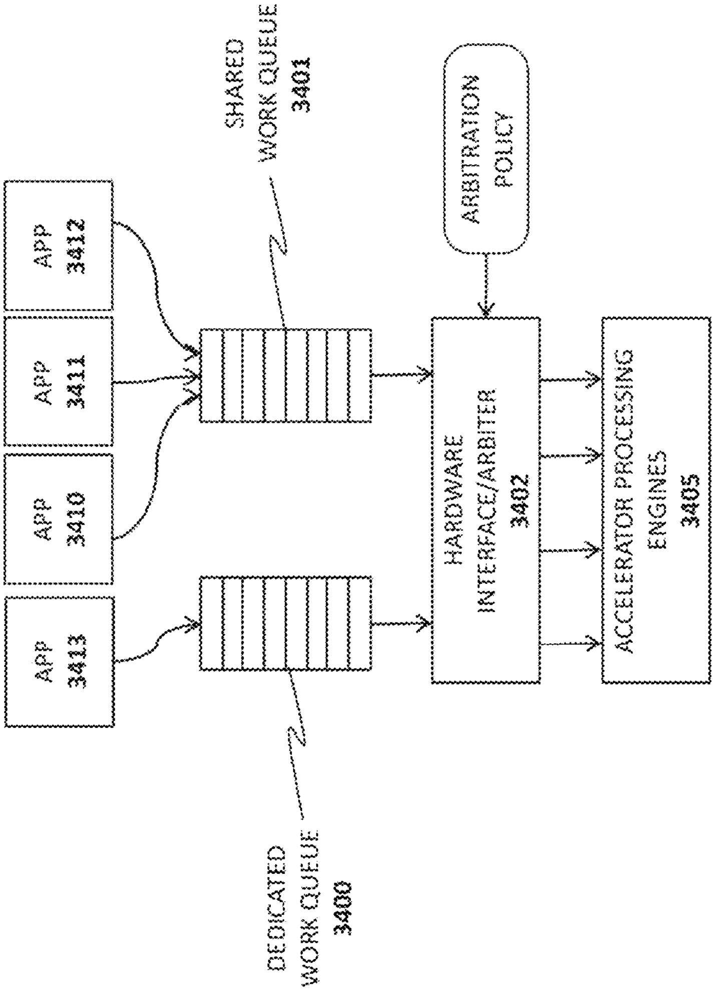
FIG. 34 illustrates an implementation of using two different types of work queues.

In some implementations, Work Queues (WQ) hold "descriptors" submitted by software, arbiters used to implement quality of service (QOS) and fairness policies, processing engines for processing the descriptors, an address translation and caching interface, and a memory read/write interface. Descriptors define the scope of work to be done. As illustrated in FIG. 34, in one implementation, there are two different types of work queues: dedicated work queues 3400 and shared work queues 3401. Dedicated work queues 3400 store descriptors for a single application 3413 while shared work queues 3401 store descriptors submitted by multiple applications 3410-3412. A hardware interface/arbiter 3402 dispatches descriptors from the work queues 3400-3401 to the accelerator processing engines 3405 in accordance with a specified arbitration policy (e.g., based on the processing requirements of each application 3410-3413 and QoS/fairness policies).

Figure 108A:
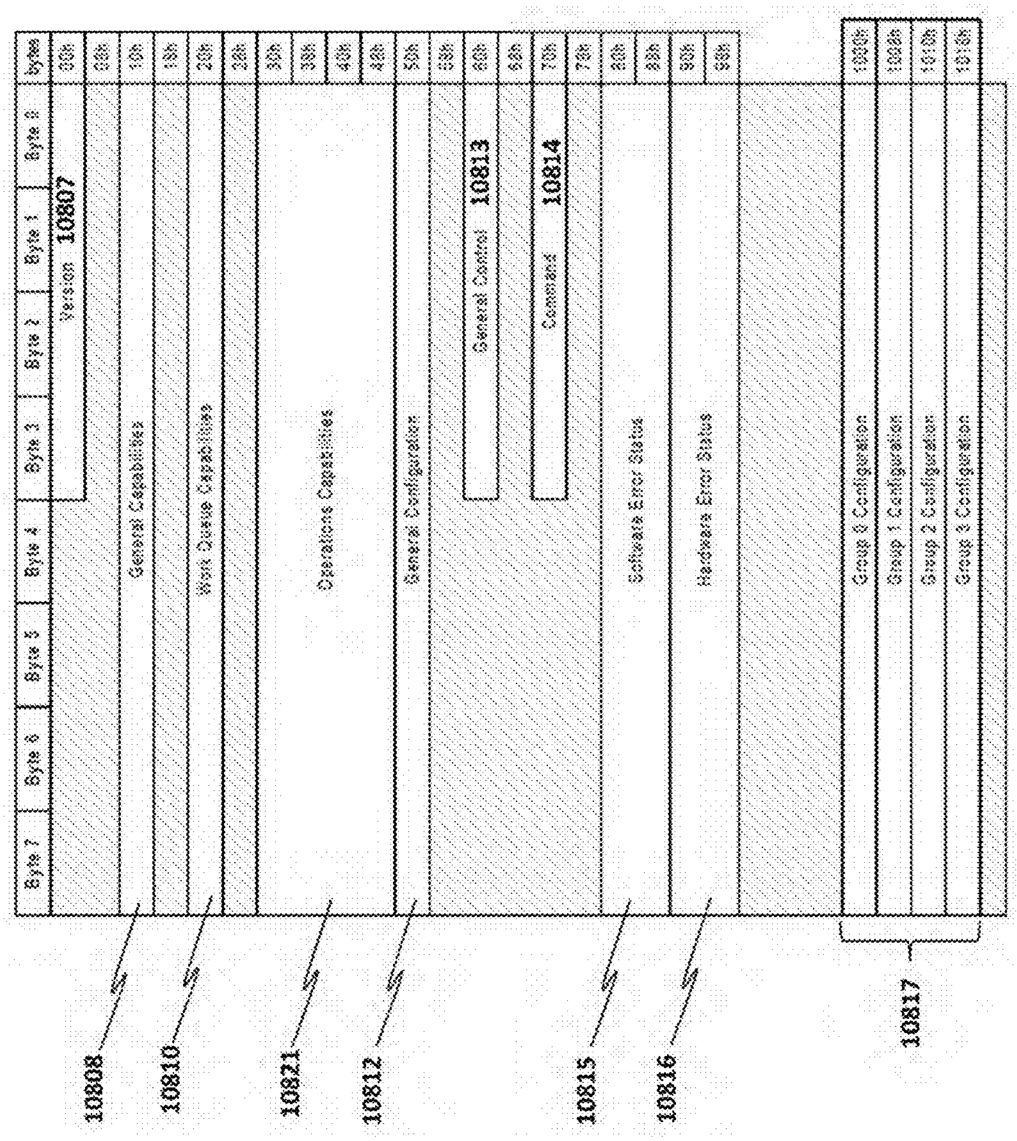
FIGS. 108A-B illustrate memory mapped I/O (MMIO) space registers used with work queue based implementations.
Figure 108B:
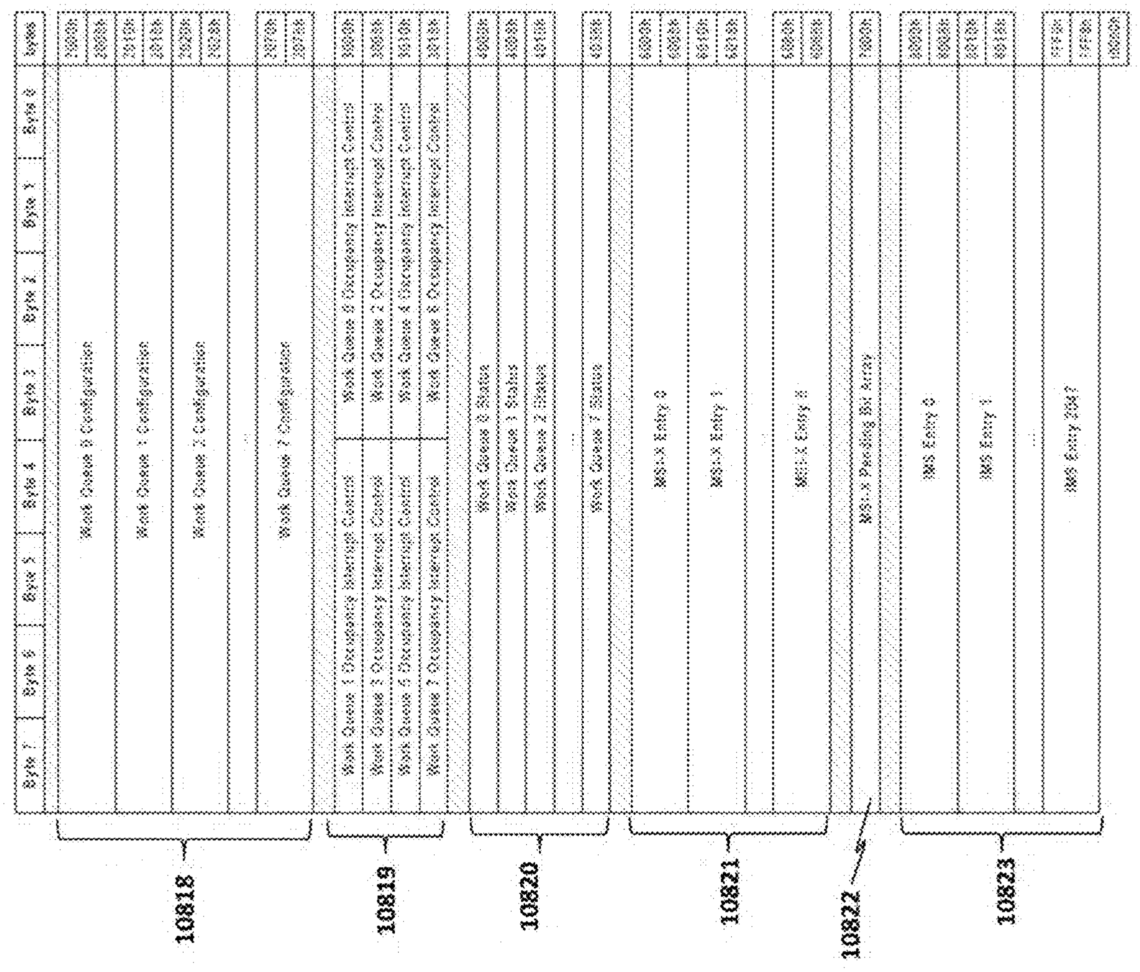

FIGS. 108A-B illustrate memory mapped I/O (MMIO) space registers used with work queue based implementations. The version register 10807 reports the version of this architecture specification that is supported by the device.

The general capabilities register (GENCAP) 10808 specifies the general capabilities of the device such as maximum transfer size, maximum batch size, etc. Table B lists various parameters and values which may be specified in the GENCAP register.

TABLE B

| GENCAP<br>Base: BAR0 Offset: 0x10 Size: 8 bytes (64 bits) | | | | |
|---|---|---|---|---|
| Bit | Attr | Size | Proposed Value | Description |
| 63:48 | RO | 16 bits | 1024 | Interrupt Message Storage Size<br>The number of entries in the Interrupt Message Storage. If the Interrupt Message Storage Support capability is 0, this field is 0. |
| 47:36 | RO | 12 bits | | Unused. |
| 35:32 | RO | 4 bits | 5 | Maximum Transfer Size<br>The maximum transfer size that can be specified in a descriptor is $2^{(N+16)}$, where N is the value in this field. |
| 31:16 | RO | 16 bits | 64 | Maximum Batch Size<br>The maximum number of descriptors that can be referenced by a Batch descriptor. |
| 15:10 | RO | 6 bits | | Unused. |
| 9 | RO | 1 bit | 1 | Durable Write Support<br>0: Durable Write flag is not supported. 1: Durable Write flag is supported. |
| 8 | RO | 1 bit | 1 | Destination Readback Support<br>0: Destination Readback flag is not supported. 1: Destination Readback flag is supported. |
| 7 | RO | 1 bit | | Unused. |
| 6 | RO | 1 bit | 1 | Interrupt Message Storage Support<br>0: Interrupt Message Storage and Guest Portals are not supported.<br>1: Interrupt Message Storage and Guest Portals are supported. |
| 5:3 | RO | 3 bits | | Unused. |
| 2 | RO | 1 bit | 1 | Destination No Snoop Support<br>0: No snoop is not supported for memory writes. The Destination No Snoop flag in descriptors is ignored.<br>1: No snoop is supported for memory writes and can be controlled by the Destination No Snoop flag in each descriptor. |
| 1 | RO | 1 bit | 1 | Destination Cache Fill Support<br>0: Cache fill for write accesses is not supported. The Destination Cache Fill bit in descriptors is ignored.<br>1: Cache fill for write accesses is supported. Software can use the Destination Cache Fill flag in descriptors to control the use of cache by each descriptor. |
| 0 | RO | 1 bit | 0 | Block on Fault Support<br>0: Block on fault is not supported. The Block On Fault Enable bit in the WQCFG registers and the Block On Fault flag in descriptors are reserved. If a page fault occurs on a source or destination memory access, the operation stops and the page fault is reported to software.<br>1: Block on fault is supported. Behavior on page faults depends on the values of the Block On Fault Enable bit in each WQCFG register and the Block on Fault flag in each descriptor.<br>See section 3.2.15 for more information on page fault handling. |

In one implementation, the work queue capabilities register (WQCAP) 10810 specifies capabilities of the work queues such as support for dedicated and/or shared modes of operation, the number of engines, the number of work queues. Table C below lists various parameters and values which may be configured.

TABLE C

WQCAP
Base: BAR0 Offset: 0x20 Size: 8 bytes (64 bits)

| Bit | Attr | Size | Value | Description |
|---|---|---|---|---|
| 63:51 | RO | 13 bits | | Unused. |
| 50 | RO | 1 bit | 1 | Work Queue Configuration Support<br>0: Engine configuration, Group configuration, and Work Queue configuration registers are read-only and reflect the fixed configuration of the device, except that the WQ PASID and WQ U/S fields of WQCFG are writeable if WQ Mode is 1. 1: Engine configuration, Group configuration, and Work Queue configuration registers are read-write and can be used by software to set the desired configuration. |
| 49 | RO | 1 bit | 1 | Dedicated Mode Support<br>0: Dedicated mode is not supported. All WQs must be configured in shared mode.<br>1: Dedicated mode is supported. |
| 48 | RO | 1 bit | 1 | Shared Mode Support<br>0: Shared mode is not supported. All WQs must be configured in dedicated mode.<br>1: Shared mode is supported. |
| 47:32 | RO | 16 bits | | Unused. |
| 31:24 | RO | 8 bits | 4 | Number of Engines |
| 23:16 | RO | 8 bits | 8 | Number of WQs |
| 15:0 | RO | 16 bits | 64 | Total WQ Size<br>This size can be divided into multiple WQs using the WQCFG registers, to support multiple Qos levels and/or multiple dedicated work queues. |

In one implementation, the operations capability register (OPCAP) 10811 is a bitmask to specify the operation types supported by the device. Each bit corresponds to the operation type with the same code as the bit position. For example, bit 0 of this register corresponds to the No-op operation (code 0). The bit is set if the operation is supported, and clear if the operation is not supported.

TABLE D

OPCAP
Base: BAR0 Offset: 0x30 Size: 32 bytes (4 × 64 bits)

| Bit | Attr | Size | Description |
|---|---|---|---|
| 255:0 | RO | 256 bits | Each bit corresponds to an operation code, and indicates whether that operation type is supported. See section 5.1.2 for the values of the operation codes. If the bit is 1, the corresponding operation type is supported; if the bit is 0, the corresponding operation type is not supported. Bits corresponding to undefined operation codes are unused and are read as 0. |

In one implementation, the General Configuration register (GENCFG) 10812 specifies virtual channel (VC) steering tags. See Table E below.

TABLE E

GENCFG
Base: BAR0 Offset: 0x50 Size: 8 bytes (64 bits)

| Bits | Attr | Size | Description |
|---|---|---|---|
| 63:16 | RW | 48 bits | Reserved. |
| 15:8 | RW | 8 bits | VC1 Steering Tag<br>This value is used with memory writes to VC1. |
| 7:0 | RW | 8 bits | VC0 Steering Tag<br>This value is used with memory writes to VC0. |

In one implementation, the General Control Register (GENCTRL) 10813 indicates whether interrupts are generated for hardware or software errors. See Table F below.

TABLE F

GENCTRL Offset: 0x58 Size: 4 bytes (32 bits)
Base: BAR0

| Bits | Attr | Size | Description |
|---|---|---|---|
| 31:2 | RW | 30 bits | Reserved. |
| 1 | RW | 1 bit | Software Error Interrupt Enable<br>0: No interrupt is generated for errors.<br>1: The interrupt at index 0 in the MSI-X table is generated when bit 0 of SWERROR changes from 0 to 1. Bit 1 of the Interrupt Cause Register is set. |

TABLE F-continued

| GENCTRL Offset: 0x58 Size: 4 bytes (32 bits) Base: BAR0 | | | |
|---|---|---|---|
| Bits | Attr | Size | Description |
| 0 | RW | 1 bit | Hardware Error Interrupt Enable<br>0: No interrupt is generated for errors.<br>1: The interrupt at index 0 in the MSI-X table is generated when bit 0 of HWERROR changes from 0 to 1. Bit 0 of the Interrupt Cause Register is set. |

In one implementation, the device enable register (ENABLE) stores error codes, indicators as to whether devices are enabled, and device reset values. See Table G below for more details.

TABLE G

| ENABLE Base: BAR0 Offset: 0x60 Size: 4 bytes (32 bits) | | | |
|---|---|---|---|
| Bits | Attr | Size | Description |
| 32:16 | RO | 16 bits | Reserved |
| 15:8 | RO | 8 bits | Error code<br>This field is used to report errors detected at the time the Enable field is set. If this field is set to a non-zero value, Enabled will be 0, and vice versa.<br>0: No error<br>1: Unspecified error in configuration when enabling the device 2: Bus Master Enable is 0.<br>3: Combination of PASID, ATS, and PRS is invalid. 4: Sum of WQCFG Size fields is out of range.<br>5: Invalid Group configuration:<br>A Group Configuration Register has one zero field and one non-zero field;<br>A WQ is in more than one group;<br>An active WQ is not in a group;<br>An inactive WQ is in a group;<br>An engine is in more than one group.<br>6: Reset field set to 1 when either Enable or Enabled is 1. |
| 7:3 | RO | 6 bits | Unused. |
| 2 | WO | 1 bit | Reset<br>Clear all MMIO registers to default values. Reset may only be set when Enabled is 0.<br>Reset and Enabled may not both be written as 1 at the same time. Reset always reads as 0. |
| 1 | RO | 1 bit | Enabled<br>0: Device is not enabled. No work is performed.<br>All ENQ operations return Retry.<br>1: Device is enabled. Descriptors may be submitted to work queues. |
| 0 | RW | 1 bit | Enable<br>Software writes 1 to this bit to enable the device. The device checks the configuration and prepares to receive descriptors to the work queues. Software must wait until the Enabled bit reads back as 1 before using the device. Software writes 0 to this bit to disable the device.<br>The device stops accepting descriptors and waits for all enqueued descriptors to complete. Software must wait until the Enabled bit reads back as 0 before changing the device configuration.<br>If software writes 1 when the device is enabled or software writes 0 when the device is disabled, there is no effect. |

In one implementation, an interrupt cause register (INTCAUSE) stores values indicating the cause of an interrupt. See Table H below.

TABLE H

| INTCAUSE Base: BAR0 Offset: 0x68 Size: 4 bytes (32 bits) | | | |
|---|---|---|---|
| Bits | Attr | Size | Description |
| 31:4 | RO | 28 bits | Reserved. |
| 3 | RW1C | 1 bit | WQ Occupancy Below Limit |
| 2 | RW1C | 1 bit | Abort/Drain Command Completion |
| 1 | RW1C | 1 bit | Software Error |
| 0 | RW1C | 1 bit | Hardware Error |

In one implementation, the command register (CMD) 10814 is used to submit Drain WQ, Drain PASID, and Drain All commands. The Abort field indicates whether the requested operation is a drain or an abort. Before writing to this register, software may ensure that any command previously submitted via this register has completed. Before writing to this register, software may configure. the Command Configuration register and also the Command Completion Record Address register if a completion record is requested.

The Drain All command drains or aborts all outstanding descriptors in all WQs and all engines. The Drain PASID command drains or aborts descriptors using the specified PASID in all WQs and all engines. The Drain WQ drains or aborts all descriptors in the specified WQ. Depending on the implementation, any drain command may wait for completion of other descriptors in addition to the descriptors that it is required to wait for.

If the Abort field is 1, software is requesting that the affected descriptors be abandoned. However, the hardware may still complete some or all of them. If a descriptor is abandoned, no completion record is written and no completion interrupt is generated for that descriptor. Some or all of the other memory accesses may occur.

Completion of a command is indicated by generating a completion interrupt (if requested), and by clearing the Status field of this register. At the time that completion is signaled, all affected descriptors are either completed or abandoned, and no further address translations, memory reads, memory writes, or interrupts will be generated due to any affected descriptors. See Table I below.

TABLE I

CMD Offset: 0x70 Size: 4 bytes (32 bits)
Base: BAR0

| Bit | Attr | Size | Description |
|---|---|---|---|
| 31 | RO | 1 bit | Status<br>0: Command is complete (or no command has been submitted). 1: Command is in progress.<br>This field is ignored when the register is written. |
| 30:29 | RV | 2 bits | Reserved. |
| 28 | RW | 1 bit | Abort<br>0: Hardware must wait for completion of matching descriptors. 1: Hardware may discard any or all matching descriptors. |
| 27:24 | RW | 4 bits | Command 0: Unused.<br>1: Drain All<br>2: Drain PASID<br>3: Drain WQ<br>4-15: Reserved. |
| 23:21 | RV | 2 bits | Reserved. |
| 20 | RW | 1 bit | Request Completion Interrupt<br>The interrupt is generated using entry 0 in the MSI-X table. |
| 19:0 | RW | 20 bits | Operand<br>If Command is Drain PASID, this field contains the PASID to drain or abort.<br>If Command is Drain WQ, this field contains the index of the WQ to drain or abort.<br>This field is unused if the command is Drain All. |

In one implementation, the software error status register (SWERROR) 10815 stores multiple different types of errors such as: an error in submitting a descriptor; an error translating a Completion Record Address in a descriptor; an error validating a descriptor, if the Completion Record Address Valid flag in the descriptor is 0; and an error while processing a descriptor, such as a page fault, if the Completion Record Address Valid flag in the descriptor is 0. See Table J below.

TABLE J

SWERROR
Base: BAR0 Offset: 0x80 Size: 16 bytes (2 × 64 bits)

| Bits | Attr | Size | Description |
|---|---|---|---|
| 127:64 | RO | 64 bits | Address<br>If the error is a page fault, this is the faulting address. Otherwise this field is unused. |
| 63 | RO | 1 bit | U/S<br>The U/S field of the descriptor that caused the error. |
| 62:60 | RO | 3 bits | Unused. |
| 59:40 | RO | 20 bits | PASID<br>The PASID field of the descriptor that caused the error. |
| 39:32 | RO | 8 bits | Operation<br>The Operation field of the descriptor that caused the error. |

TABLE J-continued

| SWERROR<br>Base: BAR0 Offset: 0x80 Size: 16 bytes (2 × 64 bits) | | | |
|---|---|---|---|
| Bits | Attr | Size | Description |
| 31:24 | RO | 8 bits | Index<br>If the descriptor was submitted in a batch, this field contains the index of the descriptor within the batch. Otherwise, this field is unused. |
| 23:16 | RO | 8 bits | WQ Index<br>Indicates which WQ the descriptor was submitted to. |
| 15:8 | RO | 8 bits | Error code |
| | | | 0x00 Unused |
| | | | 0x01 Unused |
| | | | 0x02-0x7f These values correspond to the descriptor completion status values d. These values are used if an error occurs while processing a descriptor in which the Completion Record Address Valid flag is 0. |
| | | | 0x80 Unused |
| | | | 0x81 The portal used to submit a descriptor corresponds to a WQ that is not enabled. |
| | | | 0x82 A descriptor was submitted with MOVDIR64B to a shared WQ. |
| | | | 0x83 A descriptor was submitted with ENQCMD or ENQCMDS to a dedicated WQ. |
| | | | 0x84 A descriptor was submitted with MOVDIR64B to a dedicated WQ that had no space to accept the descriptor. |
| | | | 0x85 A page fault occurred when translating a Completion Record Address. |
| | | | 0x86 A PCI configuration register was changed while the device is enabled (including BME, ATS, PASID, PRS). This error causes the device to stop. This error overwrites any error previously recorded in this register. |
| | | | 0x87 A Completion Record Address is not 32-byte aligned. |
| | | | 0x88-0xff TBD |
| | | | 0x88-0xff TBD |
| 7 | RO | 1 bit | Unused. |
| 6:5 | RO | 2 bits | Fault code.<br>If the error is a page fault, this is the fault code. Otherwise, this field is unused. |
| 4 | RO | 1 bit | Batch<br>0: The descriptor was submitted directly. 1: The descriptor was submitted in a batch. |
| 3 | RO | 1 bit | WQ Index valid<br>0: The WQ that the descriptor was submitted to is unknown. The WQ Index field is unused.<br>1: The WQ Index field indicates which WQ the descriptor was submitted to. |
| 2 | RO | 1 bit | Descriptor valid<br>0: The descriptor that caused the error is unknown. The Batch, Operation, Index, U/S, and PASID fields are unused.<br>1: The Batch, Operation, Index, U/S, and PASID fields are valid. |
| 1 | RW1C | 1 bit | Overflow<br>0: The last error recorded in this register is the most recent error.<br>1: One or more additional errors occurred after the last one recorded in this register. |
| 0 | RW1C | 1 bit | |

In one implementation, the hardware error status register (HWERROR) 10816 in a similar manner as the software error status register (see above).

Figure 36:
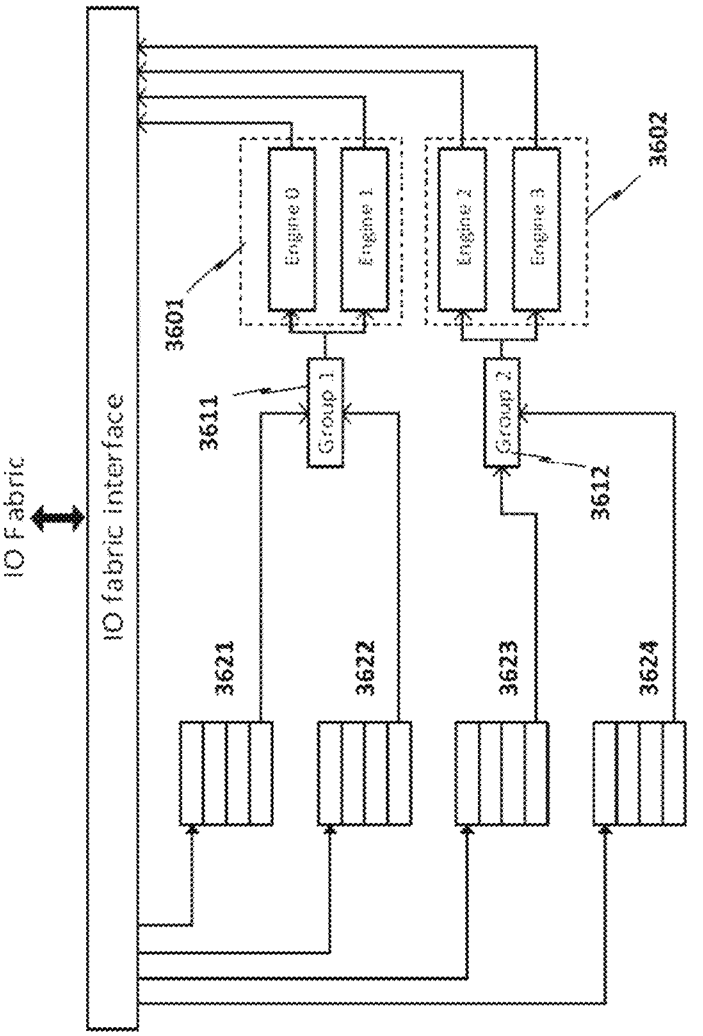
FIG. 36 illustrates two work queues.
Figure 37:
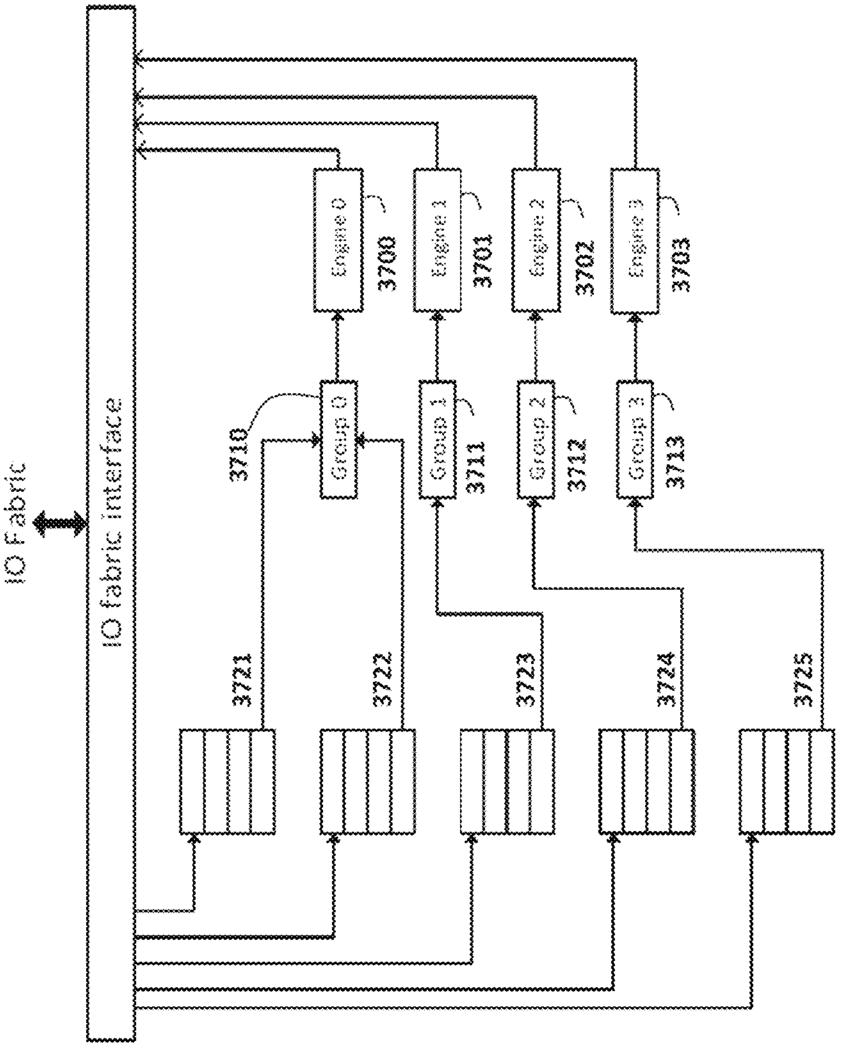
FIG. 37 illustrates another configuration using engines and groupings.

In one implementation, the group configuration registers (GRPCFG) 10817 store configuration data for each work queue/engine group (see FIGS. 36-37). In particular, the group configuration table is an array of registers in BAR0 that controls the mapping of work queues to engines. There are the same number of groups as engines, but software may configure the number of groups that it needs. Each active group contains one or more work queues and one or more engines. Any unused group must have both the WQs field and the Engines field equal to 0. Descriptors submitted to any WQ in a group may be processed by any engine in the group. Each active work queue must be in a single group. An active work queue is one for which the WQ Size field of the corresponding WQCFG register is non-zero. Any engine that is not in a group is inactive.

Each GRPCFG register 10817 may be divided into three sub-registers, and each sub-register is one or more 32-bit words (see Tables K-M). These registers may be read-only while the device is enabled. They are also read-only if the Work Queue Configuration Support field of WQCAP is 0.

The offsets of the subregisters in BAR0, for each group G, 0≤G<Number of Engines, is as follows in one implementation:

TABLE K

| Sub-register | Offset | Number of 32-bit words |
|---|---|---|
| GRPWQCFG | 0 × 1000 + G × 0 × 40 | 8 |
| GRPENGCFG | 0 × 1000 + G × 0 × 40 + 0 × 20 | 2 |
| GRPFLAGS | 0 × 1000 + G × 0 × 40 + 0 × 28 | 1 |

GRPWQCFG
Base: BAR0 Offset: 0 × 1xx0 Size: 256 bytes (8 × 32 bits)

| Bits | Attr | Size | Description |
|---|---|---|---|
| 255:0 | RW | 8 × 32 bits | WQs<br>Each bit corresponds to a WQ, and indicates that the corresponding WQ is in the group. Bits beyond the number of WQs available are reserved. Each active WQ must be in exactly one group. Inactive WQs (those for which WQ Size is 0 in WQCFG) must not be in any group. |

TABLE L

GRPENGCFG Offset: 0x1xy0 Size: 64 bits (2 × 32 bits)
Base: BAR0

| Bits | Attr | Size | Description |
|---|---|---|---|
| 63:0 | RW | 2 × 32 bits | Engines<br>Each bit corresponds to an engine, and indicates that the corresponding engine is in the group. Bits beyond the number of engines available are reserved. |

TABLE M

GRPFLAGS Offset: 0x1xy8 Size: 32 bits
Base: BAR0

| Bits | Attr | Size | Description |
|---|---|---|---|
| 31:1 | RV | 31 bits | Reserved. |
| 0 | RW | 1 bit | VC<br>Indicates the VC to be used by engines in the group.<br>If the bit is 0, VC0 is used.<br>If the bit is 1, VC1 is used.<br>VC1 should be used by engines that are used to access phase-change memory. VC0 should be used by engines that do not access phase-change memory. |

In one implementation, the work queue configuration registers (WQCFG) 10818 store data specifying the operation of each work queue. The WQ configuration table is an array of 16-byte registers in BAR0. The number of WQ configuration registers matches the Number of WQs field in WQCAP.

Each 16-byte WQCFG register is divided into four 32-bit sub-registers, which may also be read or written using aligned 64-bit read or write operations.

Each WQCFG-A sub-register is read-only while the device is enabled or if the Work Queue Configuration Support field of WQCAP is 0.

Each WQCFG-B is writeable at any time unless the Work Queue Configuration Support field of WQCAP is 0. If the WQ Threshold field contains a value greater than WQ Size at the time the WQ is enabled, the WQ is not enabled and WQ Error Code is set to 4. If the WQ Threshold field is written with a value greater than WQ Size while the WQ is enabled, the WQ is disabled and WQ Error Code is set to 4.

Each WQCFG-C sub-register is read-only while the WQ is enabled. It may be written before or at the same time as setting WQ Enable to 1. The following fields are read-only at all times if the Work Queue Configuration Support field of WQCAP is 0: WQ Mode, WQ Block on Fault Enable, and WQ Priority. The following fields of WQCFG-C are writeable when the WQ is not enabled even if the Work Queue Configuration Support field of WQCAP is 0: WQ PASID and WQ U/S.

Each WQCFG-D sub-register is writeable at any time. However, it is an error to set WQ Enable to 1 when the device is not enabled.

When WQ Enable is set to 1, both WQ Enabled and WQ Error Code fields are cleared. Subsequently, either WQ Enabled or WQ Error Code will be set to a non-zero value indicating whether the WQ was successfully enabled or not.

The sum of the WQ Size fields of all the WQCFG registers must not be greater than Total WQ Size field in GENCAP. This constraint is checked at the time the device is enabled. WQs for which the WQ Size field is 0 cannot be enabled, and all other fields of such WQCFG registers are ignored. The WQ Size field is read-only while the device is enabled. See Table N for data related to each of the sub-registers.

TABLE N

| Bits | Attr | Size | Description |
|---|---|---|---|
| WQCFG-A<br>Base: BAR0 Offset: 0x2xx0 Size: 4 bytes (32 bits) | | | |
| 31:16 | RV | 16 bits | Reserved |
| 15:0 | RW | 16 bits | WQ Size<br>The number of entries in the WQ storage allocated to this WQ. |
| WQCFG-B Offset: 0x2xx4 Size: 4 bytes (32 bits)<br>Base: BAR0 | | | |
| 31:16 | RV | 16 bits | Reserved |
| 15:0 | RW | 16 bits | WQ Threshold<br>The number of entries in this WQ that may be written via the Non-privileged and Guest Portals. This field must be less than or equal to WQ Size. |
| WQCFG-C Offset: 0x2xx8 Size: 4 bytes (32 bits)<br>Base: BAR0 | | | |
| 31 | RW | 1 bit | WQ U/S<br>The U/S flag to be used for descriptors submitted to this WQ when it is in dedicated mode. If the WQ is in shared mode, this field is ignored. |
| 30:28 | RV | 3 bits | Reserved |
| 27:8 | RW | 20 bits | WQ PASID<br>The PASID to be used for descriptors submitted to this WQ when it is in dedicated mode. If the WQ is in shared mode, this field is ignored. |

TABLE N-continued

| Bits | Attr | Size | Description |
|---|---|---|---|
| 7:4 | RW | 4 bits | WQ Priority<br>Relative priority of the work queue. Higher value is higher priority. This priority is relative to other WQs in the same group. It controls dispatching descriptors from this WQ into the engines of the group. |
| 3:2 | RV | 2 bits | Reserved |
| 1 | RW | 1 bit | WQ Block on Fault Enable<br>0: Block on fault is not allowed. The Block On Fault flag in descriptors submitted to this WQ is reserved. If a page fault occurs on a source or destination memory access, the operation stops and the page fault is reported to software.<br>1: Block on fault is allowed. Behavior on page faults depends on the values of the Block on Fault flag in each descriptor.<br>This field is reserved if the Block on Fault Support field of GENCAP is 0. |
| 0 | RW | 1 bit | WQ Mode<br>0: WQ is in shared mode.<br>1: WQ is in dedicated mode. |
| WQCFG-D Offset: 0x2xxC Size 4 bytes (32 bits) Base: BAR0 | | | |
| 31:16 | RV | 16 bits | Reserved |
| 15:8 | RO | 8 bits | WQ Error Code 0: No error<br>1: Enable set while device is not enabled. 2: Enable set while WQ Size is 0.<br>3: Reserved field not equal to 0.<br>4: WQ Threshold greater than WQ Size<br>Note: WQ Size out of range is diagnosed when the device is enabled. |
| 7:2 | RV | 6 bits | Reserved |
| 1 | RO | 1 bit | WQ Enabled<br>0: WQ is not enabled. ENQ operations to this WQ return Retry. 1: WQ is enabled. |
| 0 | RW | 1 bit | WQ Enable<br>Software writes 1 to this field to enable the work queue. The device must be enabled before writing 1 to this field. WQ Size must be non-zero. Software must wait until the Enabled field in this WQCFG register is 1 before submitting work to this WQ. Software writes 0 to this field to disable the work queue. The WQ stops accepting descriptors and waits for all descriptors previously submitted to this WQ to complete, at which time the Enabled field will read back as<br>0. Software must wait until the Enabled field is 0 before changing any other fields in this register. If software writes 1 when the WQ is enabled or software writes 0 when the WQ is not enabled, there is no effect. |

In one implementation, the work queue occupancy interrupt control registers 10819 (one per work queue (WQ)) allow software to request an interrupt when the work queue occupancy falls to a specified threshold value. When the WQ Occupancy Interrupt Enable for a WQ is 1 and the current WQ occupancy is at or less than the WQ Occupancy Limit, the following actions may be performed:

1. The WQ Occupancy Interrupt Enable field is cleared.
2. Bit 3 of the Interrupt Because Register is set to 1.
3. If bit 3 of the Interrupt Because Register was 0 prior to step 2, an interrupt is generated using MSI-X table entry 0.
4. If the register is written with enable=1 and limit≥the current WQ occupancy, the interrupt is generated immediately. As a consequence, if the register is written with enable=1 and limit≥WQ size, the interrupt is always generated immediately.

TABLE O

| WQINTR Offset: 0x3000 + 4 × WQ ID Size: 32 bits × Number of WQs Base: BAR0 | | | |
|---|---|---|---|
| Bits | Attr | Size | Description |
| 31 | RW | 1 bit | WQ Occupancy Interrupt Enable<br>Setting this field to 1 causes the device to generate an interrupt when the WQ occupancy is at or less than the WQ Occupancy Limit. The device clears this field when the interrupt is generated. |
| 30:16 | RV | 15 bits | Reserved |
| 15:0 | RO | 16 bits | WQ Occupancy Limit<br>When the WQ occupancy falls to or below the value in this field, an interrupt is generated, if the WQ Occupancy Interrupt Enable is 1. |

In one implementation, the work queue status registers (one per WQ) 10820 specify the number of entries currently in each WQ. This number may change whenever descriptors are submitted to or dispatched from the queue, so it cannot be relied on to determine whether there is space in the WQ.

In one implementation, MSI-X entries 10821 store MSI-X table data. The offset and number of entries are in the MSI-X capability. The suggested number of entries is the number of WQs plus 2.

In one implementation, the MSI-X pending bit array 10822 stores The offset and number of entries are in the MSI-X capability.

In one implementation, the interrupt message storage entries 10823 store interrupt messages in a table structure. The format of this table is similar to that of the PCIe-defined MSI-X table, but the size is not limited to 2048 entries. However, the size of this table may vary between different DSA implementations and may be less than 2048 entries in some implementations. In one implementation, the number of entries is in the Interrupt Message Storage Size field of the General Capability Register. If the Interrupt Message Storage Support capability is 0, this table is not present. In order for DSA to support a large number of virtual machines or containers, the table size supported needs to be significant.

In one implementation, the format of each entry in the IMS is as set forth in Table P below:

TABLE P

| DWORD3 | DWORD2 | DWORD1 | DWORD0 |
|---|---|---|---|
| Reserved | Message Data | Message Address 00000000FEExxxxx | |

Figure 35:
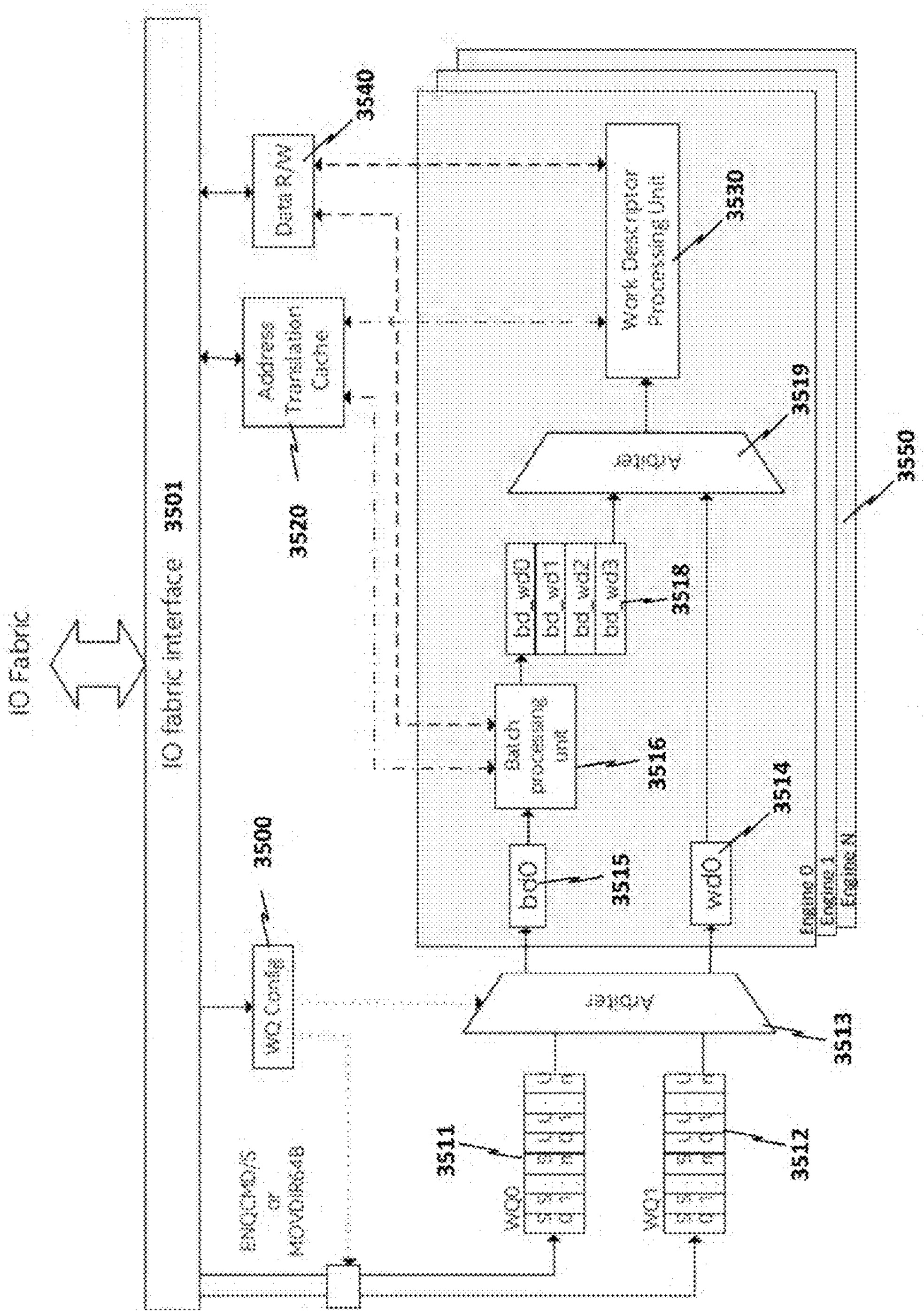
FIG. 35 illustrates an implementation of a data streaming accelerator (DSA) device comprising multiple work queues which receive descriptors submitted over an I/O fabric interface.

FIG. 35 illustrates one implementation of a data streaming accelerator (DSA) device comprising multiple work queues 3511-3512 which receive descriptors submitted over an I/O fabric interface 3501 (e.g., such as the multi-protocol link 2800 described above). DSA uses the I/O fabric interface 3501 for receiving downstream work requests from clients (such as processor cores, peer input/output (IO) agents (such as a network interface controller (NIC)), and/or software chained offload requests) and for upstream read, write, and address translation operations. The illustrated implementation includes an arbiter 3513 which arbitrates between the work queues and dispatches a work descriptor to one of a plurality of engines 3550. The operation of the arbiter 3513 and work queues 3511-1012 may be configured through a work queue configuration register 3500. For example, the arbiter 3513 may be configured to implement various QoS and/or fairness policies for dispatching descriptors from each of the work queues 3511-1012 to each of the engines 3550.

In one implementation, some of the descriptors queued in the work queues 3511-3512 are batch descriptors 3515 which contain/identify a batch of work descriptors. The arbiter 3513 forwards batch descriptors to a batch processing unit 3516 which processes batch descriptors by reading the array of descriptors 3518 from memory, using addresses translated through translation cache 3520 (a potentially other address translation services on the processor). Once the physical address has been identified data read/write circuit 3540 reads the batch of descriptors from memory.

A second arbiter 3519 arbitrates between batches of work descriptors 3518 provided by the batch processing unit 3516 and individual work descriptors 3514 retrieved from the work queues 3511-3512 and outputs the work descriptors to a work descriptor processing unit 3530. In one implementation, the work descriptor processing unit 3530 has stages to read memory (via data R/W unit 3540), perform the requested operation on the data, generate output data, and write output data (via data R/W unit 3540), completion records, and interrupt messages.

In one implementation, the work queue configuration allows software to configure each WQ (via a WQ configuration register 3500) either as a Shared Work Queue (SWQ) that receives descriptors using non-posted ENQCMD/S instructions or as a Dedicated Work Queue (DWQ) that receives descriptors using posted MOVDIR64B instructions. As mentioned above with respect to FIG. 34, a DWQ may process work descriptors and batch descriptors submitted from a single application whereas a SWQ may be shared among multiple applications. The WQ configuration register 3500 also allows software to control which WQs 3511-3512 feed into which accelerator engines 3550 and the relative priorities of the WQs 3511-3512 feeding each engine. For example, an ordered set of priorities may be specified (e.g., high, medium, low; 1, 2, 3, etc.) and descriptors may generally be dispatched from higher priority work queues ahead of or more frequently than dispatches from lower priority work queues. For example, with two work queues, identified as high priority and low priority, for every 10 descriptors to be dispatched, 8 out of the 10 descriptors may be dispatched from the high priority work queue while 2 out of the 10 descriptors are dispatched from the low priority work queue. Various other techniques may be used for achieving different priority levels between the work queues 3511-3512.

In one implementation, the data streaming accelerator (DSA) is software compatible with a PCI Express configuration mechanism, and implements a PCI header and extended space in its configuration-mapped register set. The configuration registers can be programmed through CFC/CF8 or MMCFG from the Root Complex. All the internal registers may be accessible through the JTAG or SMBus interfaces as well.

In one implementation, the DSA device uses memory-mapped registers for controlling its operation. Capability, configuration, and work submission registers (portals) are accessible through the MMIO regions defined by BAR0, BAR2, and BAR4 registers (described below). Each portal may be on a separate 4K page so that they may be independently mapped into different address spaces (clients) using processor page tables.

As mentioned, software specifies work for DSA through descriptors. Descriptors specify the type of operation for DSA to perform, addresses of data and status buffers, immediate operands, completion attributes, etc. (additional details for the descriptor format and details are set forth below). The completion attributes specify the address to which to write the completion record, and the information needed to generate an optional completion interrupt.

In one implementation, DSA avoids maintaining client-specific state on the device. All information to process a descriptor comes in the descriptor itself. This improves its shareability among user-mode applications as well as among different virtual machines (or machine containers) in a virtualized system.

A descriptor may contain an operation and associated parameters (called a Work descriptor), or it can contain the address of an array of work descriptors (called a Batch descriptor). Software prepares the descriptor in memory and submits the descriptor to a Work Queue (WQ) 3511-3512 of the device. The descriptor is submitted to the device using a MOVDIR64B, ENQCMD, or ENQCMDS instruction depending on WQ's mode and client's privilege level.

Each WQ 3511-3512 has a fixed number of slots and hence can become full under heavy load. In one implementation, the device provides the required feedback to help software implement flow control. The device dispatches descriptors from the work queues 3511-3512 and submits them to the engines for further processing. When the engine 3550 completes a descriptor or encounters certain faults or errors that result in an abort, it notifies the host software by either writing to a completion record in host memory, issuing an interrupt, or both.

In one implementation, each work queue is accessible via multiple registers, each in a separate 4 KB page in device MMIO space. One work submission register for each WQ is called "Non-privileged Portal" and is mapped into user space to be used by user-mode clients. Another work submission register is called "Privileged Portal" and is used by the kernel-mode driver. The rest are Guest Portals, and are used by kernel-mode clients in virtual machines.

As mentioned, each work queue 3511-3512 can be configured to run in one of two modes, Dedicated or Shared. DSA exposes capability bits in the Work Queue Capability register to indicate support for Dedicated and Shared modes. It also exposes a control in the Work Queue Configuration registers 3500 to configure each WQ to operate in one of the modes. The mode of a WQ can only be changed while the WQ is disabled i.e., (WQCFG.Enabled=0). Additional details of the WQ Capability Register and the WQ Configuration Registers are set forth below.

In one implementation, in shared mode, a DSA client uses the ENQCMD or ENQCMDS instructions to submit descriptors to the work queue. ENQCMD and ENQCMDS use a 64-byte non-posted write and wait for a response from the device before completing. The DSA returns a "success" (e.g., to the requesting client/application) if there is space in the work queue, or a "retry" if the work queue is full. The ENQCMD and ENQCMDS instructions may return the status of the command submission in a zero flag (0 indicates Success, and 1 indicates Retry). Using the ENQCMD and ENQCMDS instructions, multiple clients can directly and simultaneously submit descriptors to the same work queue. Since the device provides this feedback, the clients can tell whether their descriptors were accepted.

In shared mode, DSA may reserve some SWQ capacity for submissions via the Privileged Portal for kernel-mode clients. Work submission via the Non-Privileged Portal is accepted until the number of descriptors in the SWQ reaches the threshold configured for the SWQ. Work submission via the Privileged Portal is accepted until the SWQ is full. Work submission via the Guest Portals is limited by the threshold in the same way as the Non-Privileged Portal.

If the ENQCMD or ENQCMDS instruction returns "success," the descriptor has been accepted by the device and queued for processing. If the instruction returns "retry," software can either try re-submitting the descriptor to the SWQ, or if it was a user-mode client using the Non-Privileged Portal, it can request the kernel-mode driver to submit the descriptor on its behalf using the Privileged Portal. This helps avoid denial of service and provides forward progress guarantees. Alternatively, software may use other methods (e.g., using the CPU to perform the work) if the SWQ is full.

Clients/applications are identified by the device using a 20-bit ID called process address space ID (PASID). The PASID is used by the device to look up addresses in the Device TLB 1722 and to send address translation or page requests to the IOMMU 1710 (e.g., over the multi-protocol link 2800). In Shared mode, the PASID to be used with each descriptor is contained in the PASID field of the descriptor. In one implementation, ENQCMD copies the PASID of the current thread from a particular register (e.g., PASID MSR) into the descriptor while ENQCMDS allows supervisor mode software to copy the PASID into the descriptor.

In "dedicated" mode, a DSA client may use the MOVDIR64B instruction to submit descriptors to the device work queue. MOVDIR64B uses a 64-byte posted write and the instruction completes faster due to the posted nature of the write operation. For dedicated work queues, DSA may expose the total number of slots in the work queue and depends on software to provide flow control. Software is responsible for tracking the number of descriptors submitted and completed, in order to detect a work queue full condition. If software erroneously submits a descriptor to a dedicated WQ when there is no space in the work queue, the descriptor is dropped and the error may be recorded (e.g., in the Software Error Register).

Since the MOVDIR64B instruction does not fill in the PASID as the ENQCMD or ENQCMDS instructions do, the PASID field in the descriptor cannot be used in dedicated mode. The DSA may ignore the PASID field in the descriptors submitted to dedicated work queues, and uses the WQ PASID field of the WQ Configuration Register 3500 to do address translation instead. In one implementation, the WQ PASID field is set by the DSA driver when it configures the work queue in dedicated mode.

Although dedicated mode does not share of a single DWQ by multiple clients/applications, a DSA device can be configured to have multiple DWQs and each of the DWQs can be independently assigned to clients. In addition, DWQs can be configured to have the same or different QoS levels to provided different performance levels for different clients/applications.

In one implementation, a data streaming accelerator (DSA) contains two or more engines 3550 that process the descriptors submitted to work queues 3511-1012. One implementation of the DSA architecture includes 4 engines, numbered 0 through 3. Engines 0 and 1 are each able to utilize up to the full bandwidth of the device (e.g., 30 GB/s for reads and 30 GB/s for writes). Of course the combined bandwidth of all engines is also limited to the maximum bandwidth available to the device.

In one implementation, software configures WQs 3511-3512 and engines 3550 into groups using the Group Configuration Registers. Each group contains one or more WQs and one or more engines. The DSA may use any engine in a group to process a descriptor posted to any WQ in the group and each WQ and each engine may be in only one group. The number of groups may be the same as the number of engines, so each engine can be in a separate group, but not all groups need to be used if any group contains more than one engine.

Although the DSA architecture allows great flexibility in configuring work queues, groups, and engines, the hardware may be narrowly designed for use in specific configurations. Engines 0 and 1 are may be configured in one of two different ways, depending on software requirements. One recommended configuration is to place both engines 0 and 1 in the same group. Hardware uses either engine to process descriptors from any work queue in the group. In this configuration, if one engine has a stall due to a high-latency memory address translation or page fault, the other engine can continue to operate and maximize the throughput of the overall device.

FIG. 36 shows two work queues 3621-3622 and 3623-3624 in each group 3611 and 3612, respectively, but there may be any number up to the maximum number of WQs supported. The WQs in a group may be shared WQs with different priorities, or one shared WQ and the others dedicated WQs, or multiple dedicated WQs with the same or different priorities. In the illustrated example, group 3611 is serviced by engines 0 and 1 3601 and group 3612 is serviced by engines 2 and 3 3602.

As illustrated in FIG. 37, another configuration using engines 0 3700 and 1 3701 is to place them in separate groups 3710 and 3711, respectively. Similarly, group 2 3712 is assigned to engine 2 3702 and group 3 is assigned to engine 3 3703. In addition, group 0 3710 is comprised of two work queues 3721 and 3722; group 1 3711 is comprised of work queue 3723; work queue 2 3712 is comprised of work queue 3724; and group 3 3713 is comprised of work queue 3725.

Software may choose this configuration when it wants to reduce the likelihood that latency-sensitive operations become blocked behind other operations. In this configuration, software submits latency-sensitive operations to the work queue 3723 connected to engine 1 3702, and other operations to the work queues 3721-3722 connected to engine 0 3700.

Engine 2 3702 and engine 3 3703 may be used, for example, for writing to a high bandwidth non-volatile memory such as phase-change memory. The bandwidth capability of these engines may be sized to match the expected write bandwidth of this type of memory. For this usage, bits 2 and 3 of the Engine Configuration register should be set to 1, indicating that Virtual Channel 1 (VC1) should be used for traffic from these engines.

In a platform with no high bandwidth, non-volatile memory (e.g., phase-change memory) or when the DSA device is not used to write to this type of memory, engines 2 and 3 may be unused. However, it is possible for software to make use of them as additional low-latency paths, provided that operations submitted are tolerant of the limited bandwidth.

As each descriptor reaches the head of the work queue, it may be removed by the scheduler/arbiter 3513 and forwarded to one of the engines in the group. For a Batch descriptor 3515, which refers to work descriptors 3518 in memory, the engine fetches the array of work descriptors from memory (i.e., using batch processing unit 3516).

In one implementation, for each work descriptor 3514, the engine 3550 pre-fetches the translation for the completion record address, and passes the operation to the work descriptor processing unit 3530. The work descriptor processing unit 3530 uses the Device TLB 1722 and IOMMU 1710 for source and destination address translations, reads source data, performs the specified operation, and writes the destination data back to memory. When the operation is complete, the engine writes the completion record to the pre-translated completion address and generates an interrupt, if requested by the work descriptor.

In one implementation, DSA's multiple work queues can be used to provide multiple levels of quality of service (QOS). The priority of each WQ may be specified in the WQ configuration register 3500. The priorities of WQs are relative to other WQs in the same group (e.g., there is no meaning to the priority level of a WQ that is in a group by itself). Work queues in a group may have the same or different priorities. However, there is no point in configuring multiple shared WQs with the same priority in the same group, since a single SWQ would serve the same purpose. The scheduler/arbiter 3513 dispatches work descriptors from work queues 3511-3512 to the engines 3550 according to their priority.

Figure 38:
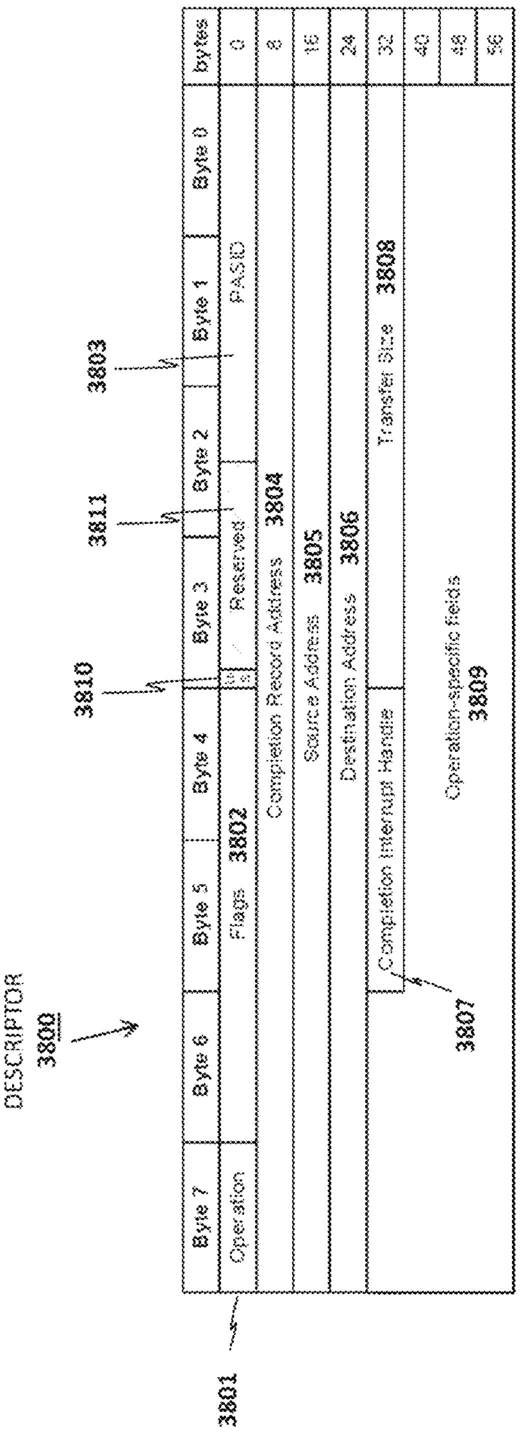
FIG. 38 illustrates an implementation of a descriptor.

FIG. 38 illustrates one implementation of a descriptor 1300 which includes an operation field 3801 to specify the operation to be performed, a plurality of flags 3802, a process address space identifier (PASID) field 3803, a completion record address field 3804, a source address field 3805, a destination address field 3806, a completion interrupt field 3807, a transfer size field 3808, and (potentially) one or more operation-specific fields 3809. In one implementation, there are three flags: Completion Record Address Valid, Request Completion Record, and Request Completion Interrupt.

Common fields include both trusted fields and untrusted fields. Trusted fields are always trusted by the DSA device since they are populated by the CPU or by privileged (ring 0 or VMM) software on the host. The untrusted fields are directly supplied by DSA clients.

In one implementation, the trusted fields include the PASID field 3803, the reserved field 3811, and the U/S (user/supervisor) field 3810 (i.e., 4 Bytes starting at an Offset of 0). When a descriptor is submitted with the ENQCMD instruction, these fields in the source descriptor may be ignored. The value contained in an MSR (e.g., PASID MSR) may be placed in these fields before the descriptor is sent to the device.

In one implementation, when a descriptor is submitted with the ENQCMDS instruction, these fields in the source descriptor are initialized by software. If the PCI Express PASID capability is not enabled, the U/S field 3810 is set to 1 and the PASID field 3803 is set to 0.

When a descriptor is submitted with the MOVDIR64B instruction, these fields in the descriptor may be ignored. The device instead uses the WQ U/S and WQ PASID fields of the WQ Config register 3500.

These fields may be ignored for any descriptor in a batch. The corresponding fields of the Batch descriptor 3515 are used for every descriptor 3518 in the batch. Table Q provides a description and bit positions for each of these trusted fields.

TABLE Q (Descriptor Trusted Fields)

| | Description |
|---|---|
| 31 | U/S (User/Supervisor)<br>0: The descriptor is a user-mode descriptor submitted directly by a user-mode client or submitted by the kernel on behalf of a user-mode client.<br>1: The descriptor is a kernel-mode descriptor submitted by kernel-mode software.<br>For descriptors submitted from user mode using the ENQCMD instruction, this field is 0. For descriptors submitted from kernel mode using the ENQCMDS instruction, software populates this field. |
| 30:20 | Reserved |
| 19:0 | PASID<br>This field contains the Process Address Space ID of the requesting process.<br>For descriptors submitted from user-mode using ENQCMD instruction, this field is populated from the PASID MSR register. For the kernel mode submissions using the ENQCMDS instruction, software populates this field. |

Table R below lists performed in one implementation in accordance with the operation field 3801 of the descriptor.

TABLE R (Operation Types)

| | Operand |
|---|---|
| 0x00 | No-op |
| 0x01 | Batch |
| 0x02 | Drain |
| 0x03 | Memory Move |
| 0x04 | Fill |
| 0x05 | Compare |
| 0x06 | Compare Immediate |
| 0x07 | Create Delta Record |
| 0x08 | Apply Delta Record |
| 0x09 | Memory Copy with Dual cast |
| 0x10 | CRC Generation |
| 0x11 | Copy with CRC generation |
| 0x12 | DIF Insert |
| 0x13 | DIF Strip |
| 0x14 | DIF Update |
| 0x20 | Cache flush |

Table S below lists the flags used in one implementation of the descriptor.

TABLE S (Flags)

| Bits | Description |
|---|---|
| 0 | Fence<br>0: This descriptor may be executed in parallel with other descriptors.<br>1: The device waits for previous descriptors in the same batch to complete before beginning work on this descriptor. If any previous descriptor completed with Status not equal to Success, |

TABLE S-continued

| (Flags) | |
|---|---|
| Bits | Description |
| | this descriptor and all subsequent descriptors in the batch are abandoned.<br>This field may only be set in descriptors that are in a batch. It is reserved in descriptors submitted directly to a Work Queue. |
| 1 | Block On Fault<br>0: Page faults cause partial completion of the descriptor.<br>1: The device waits for page faults to be resolved and then continues the operation.<br>If the Block on Fault Enable field in WQCFG is 0, this field is reserved. |
| 2 | Completion Record Address Valid<br>0: The completion record address is not valid. 1: The completion record address is valid.<br>This flag must be 1 for a Batch descriptor if the Completion Queue Enable flag is set.<br>This flag must be 0 for a descriptor in a batch if the Completion Queue Enable flag in the Batch descriptor is 1.<br>Otherwise, this flag must be 1 for any operation that yields a result, such as Compare, and it should be 1 for any operation that uses virtual addresses, because of the possibility of a page fault, which must be reported via the completion record. For best results, this flag should be 1 in all descriptors (other than those using a completion queue), because it allows the device to report errors to the software that submitted the descriptor. If this flag is 0 and an unexpected error occurs, the error is reported to the SWERROR register, and the software that submitted the request may not be notified of the error. Notwithstanding the above caveats, if the descriptor uses physical addresses or uses virtual addresses that software guarantees are present (pinned), and software has no need to receive notification of any other types of errors, this flag may be 0. |
| 3 | Request Completion Record<br>0: A completion record is only written if there is a page fault or error.<br>1: A completion record is always written at the completion of the operation.<br>This flag must be 1 for any operation that yields a result, such as Compare.<br>This flag must be 0 if Completion Record Address Valid is 0, unless the descriptor is in a batch and the Completion Queue Enable flag in the Batch descriptor is 1. |
| 4 | Request Completion Interrupt<br>0: No interrupt is generated when the operation completes. 1: An interrupt is generated when the operation completes.<br>If both a completion record and a completion interrupt are generated, the interrupt is always generated after the completion record is written.<br>This field is reserved under either of the following conditions:<br>the U/S bit is 0 (indicating a user-mode descriptor); or<br>the U/S bit is 1 (indicating a kernel-mode descriptor) and the descriptor was submitted via a Non-privileged Portal. |
| 5 | Use Interrupt Message Storage<br>0: The completion interrupt is generated using an MSI-X table entry<br>1: The Completion Interrupt Handle is an index into the Interrupt Message Storage.<br>This field is reserved under any of the following conditions:<br>the Request Completion Interrupt flag is 0;<br>the U/S bit is 0;<br>the Interrupt Message Storage Support capability is 0; or<br>the descriptor was submitted<br>via a Guest Portal. |
| 6 | Completion Queue Enable<br>0: Each descriptor in the batch contains its own completion record address, if needed.<br>1: The Completion Record Address in this Batch descriptor is to be used as the base address of a completion queue, to be used for completion records for all descriptors in the batch and for the Batch descriptor itself.<br>This field is reserved unless the Operation field is Batch.<br>This field is reserved if the Completion Queue Support field in GENCAP is 0. If the Completion Record Address Valid flag is 0, this field must be 0. |

TABLE S-continued

| (Flags) | |
|---|---|
| Bits | Description |
| 7 | Check Result<br>0: Result of operation does not affect the Status field of the completion record.<br>1: Result of operation affects the Status field of the completion record, if the operation is successful. Status is set to either Success or Success with false predicate, depending on the result of the operation. See the description of each operation for the possible results and how they affect the Status.<br>This field is used for Compare, Compare Immediate, Create Delta Record, DIF Strip, and DIF Update. It is reserved for all other operation types. |
| 8 | Destination Cache Fill<br>0: Data written to the destination address is sent to memory.<br>1: Data written to the destination address is allocated to CPU cache.<br>If the Destination Cache Fill Support field in GENCAP is 0, this field is ignored.<br>This hint does not affect access to the completion record, which is always written to cache. |
| 9 | Destination No Snoop<br>0: Destination address accesses snoop in the CPU caches.<br>1: Destination address accesses do not snoop the CPU caches.<br>If the Destination No Snoop Support field in GENCAP is 0, this field is ignored. (All memory accesses are snooped.) |
| 12:10 | Reserved. Must be 0. |
| 13 | Strict Ordering<br>0: Default behavior: writes to the destination can become globally observable out of order. The completion record write has strict ordering, so it always completes after all writes to the destination are globally observable.<br>1: Forces strict ordering of all memory writes, so they become globally observable in the exact order issued by the device. |
| 14 | Destination Readback<br>0: No readback is performed.<br>1: After all writes to the destination have been issued by the device, a read of the final destination address is performed before the operation is completed.<br>If the Destination Readback Support field in GENCAP is 0, this field is reserved. |
| 23:15 | Reserved: Must be 0. |

In one implementation, the completion record address 3804 specifies the address of the completion record. The completion record may be 32 bytes and the completion record address is aligned on a 32-byte boundary. If the Completion Record Address Valid flag is 0, this field is reserved. If the Request Completion Record flag is 1, a completion record is written to this address at the completion of the operation. If Request Completion Record is 0, a completion record is written to this address only if there is a page fault or error.

For any operation that yields a result, such as Compare, the Completion Record Address Valid and Request Completion Record flags should both be 1 and the Completion Record Address should be valid.

For any operation that uses virtual addresses, the Completion Record Address should be valid, whether or not the Request Completion Record flag is set, so that a completion record may be written in case there is a page fault or error.

For best results, this field should be valid in all descriptors, because it allows the device to report errors to the software that submitted the descriptor. If this flag is 0 and an unexpected error occurs, the error is reported to the SWERROR register, and the software that submitted the request may not be notified of the error.

The Completion Record Address field 3804 is ignored for descriptors in a batch if the Completion Queue Enable flag is set in the Batch descriptor; the Completion Queue Address in the Batch Descriptor is used instead.

In one implementation, for operations that read data from memory, the source address field 3805 specifies the address of the source data. There is no alignment requirement for the source address. For operations that write data to memory, the destination address field 3806 specifies the address of the destination buffer. There is no alignment requirement for the destination address. For some operation types, this field is used as the address of a second source buffer.

In one implementation, the transfer size field 3808 indicates the number of bytes to be read from the source address to perform the operation. The maximum value of this field may be 232-1, but the maximum allowed transfer size may be smaller, and must be determined from the Maximum Transfer Size field of the General Capability Register. Transfer Size should not be 0. For most operation types, there is no alignment requirement for the transfer size. Exceptions are noted in the operation descriptions.

In one implementation, if the Use Interrupt Message Storage flag is 1, the completion interrupt handle field 3807 specifies the Interrupt Message Storage entry to be used to generate a completion interrupt. The value of this field should be less than the value of the Interrupt Message Storage Size field in GENCAP. In one implementation, the completion interrupt handle field 3807 is reserved under any of the following conditions: the Use Interrupt Message Storage flag is 0; the Request Completion Interrupt flag is 0; the U/S bit is 0;

the Interrupt Message Storage Support field of the General Capability register is 0; or the descriptor was submitted via a Guest Portal.

Figure 39:
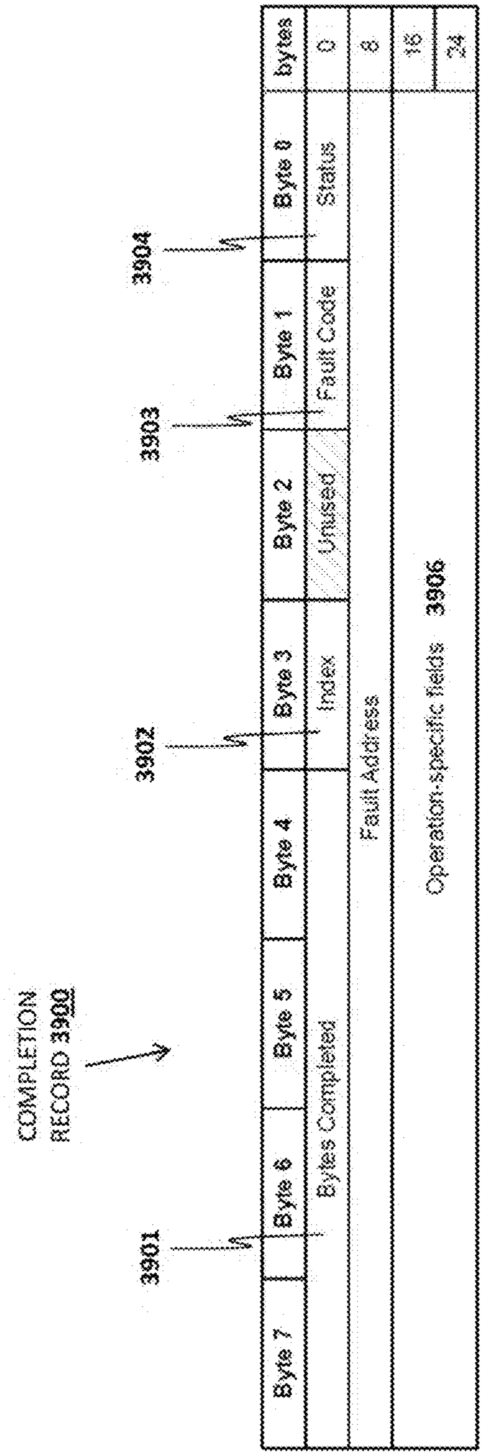
FIG. 39 illustrates an implementation of the completion record.

As illustrated in FIG. 39, one implementation of the completion record 3900 is a 32-byte structure in memory that the DSA writes when the operation is complete or encounters an error. The completion record address should be 32-byte aligned.

This section describes fields of the completion record that are common to most operation types. The description of each operation type includes a completion record diagram if the format differs from this one. Additional operation-specific fields are described further below. The completion record 3900 may always be 32 bytes even if not all fields are needed. The completion record 3900 contains enough information to continue the operation if it was partially completed due to a page fault.

The completion record may be implemented as a 32-byte aligned structure in memory (identified by the completion record address 3804 of the descriptor 3800). The completion record 3900 contains completion status field 3904 to indicate whether the operation has completed. If the operation completed successfully, the completion record may contain the result of the operation, if any, depending on the type of operation. If the operation did not complete successfully, the completion record contains fault or error information.

In one implementation, the status field 3904 reports the completion status of the descriptor. Software should initialize this field to 0 so it can detect when the completion record has been written.

TABLE T (Completion Record Status Codes)

| | |
|---|---|
| 0x00 | Not used. Indicates that the completion record has not been written by the device. |
| 0x01 | Success |
| 0x02 | Success with false predicate |
| 0x03 | Partial completion due to page fault. |
| 0x04 | Partial completion due to Maximum Destination Size or Maximum Delta Record Size exceeded. |
| 0x05 | One or more operations in the batch completed with Status not equal to Success. This value is used only in the completion record of a Batch descriptor. |
| 0x06 | Partial completion of batch due to page fault reading descriptor array. This value is used only in the completion record of a Batch descriptor. |
| 0x10 | Unsupported operation code |
| 0x11 | Unsupported flags |
| 0x12 | Non-zero reserved field |
| 0x13 | Transfer Size out of range |
| 0x14 | Descriptor Count out of range |
| 0x15 | Maximum Destination Size or Maximum Difference Record Size out of range |
| 0x16 | Overlapping source and destination buffers in Memory Copy with Dual cast, Copy with CRC Generation, DIF Insert, DIF Strip, or DIF Update descriptor |
| 0x17 | Bits 11:0 of the two destination buffers differ in Memory Copy with Dual cast |
| 0x18 | Misaligned Descriptor List Address |

Table T above provides various status codes and associated descriptions for one implementation.

Table U below illustrates fault codes 3903 available in one implementation including a first bit to indicate whether the faulting address was a read or a write and a second bit to indicate whether the faulting access was a user mode or supervisor mode access.

TABLE U (Completion Record Fault Codes)

| Bits | Description |
|---|---|
| 0 | R/W (Not used unless Status indicates a page fault)<br>0: the faulting access was a read.<br>1: the faulting access was a write. |
| 1 | U/S (Not used unless Status indicates a page fault)<br>0: the faulting access was a user mode access.<br>1: the faulting access was a supervisor mode access. |

In one implementation, if this completion record 3900 is for a descriptor that was submitted as part of a batch, the index field 3902 contains the index in the batch of the descriptor that generated this completion record. For a Batch descriptor, this field may be 0xff. For any other descriptor that is not part of a batch, this field may be reserved.

In one implementation, if the operation was partially completed due to a page fault, the bytes completed field 3901 contains the number of source bytes processed before the fault occurred. All of the source bytes represented by this count were fully processed and the result written to the destination address, as needed according to the operation type. For some operation types, this field may also be used when the operation stopped before completion for some reason other than a fault. If the operation fully completed, this field may be set to 0.

For operation types where the output size is not readily determinable from this value, the completion record also contains the number of bytes written to the destination address.

If the operation was partially completed due to a page fault, this field contains the address that caused the fault. As a general rule, all descriptors should have a valid Completion Record Address 3804 and the Completion Record Address Valid flag should be 1. Some exceptions to this rule are described below.

In one implementation, the first byte of the completion record is the status byte. Status values written by the device are all non-zero. Software should initialize the status field of the completion record to 0 before submitting the descriptor in order to be able to tell when the device has written to the completion record. Initializing the completion record also ensures that it is mapped, so the device will not encounter a page fault when it accesses it.

The Request Completion Record flag indicates to the device that it should write the completion record even if the operation completed successfully. If this flag is not set, the device writes the completion record only if there is an error.

Descriptor completion can be detected by software using any of the following methods:

1. Poll the completion record, waiting for the status field to become non-zero.
2. Use the UMONITOR/UMWAIT instructions (as described herein) on the completion record address, to block until it is written or until timeout. Software should then check whether the status field is non-zero to determine whether the operation has completed.
3. For kernel-mode descriptors, request an interrupt when the operation is completed.
4. If the descriptor is in a batch, set the Fence flag in a subsequent descriptor in the same batch. Completion of the descriptor with the Fence or any subsequent descriptor in the same batch indicates completion of all descriptors that precede the Fence.
5. If the descriptor is in a batch, completion of the Batch descriptor that initiated the batch indicates completion of all descriptors in the batch.
6. Issue a Drain descriptor or a Drain command and wait for it to complete.

If the completion status indicates a partial completion due to a page fault, the completion record indicates how much processing was completed (if any) before the fault was encountered, and the virtual address where the fault was encountered. Software may choose to fix the fault (by touching the faulting address from the processor) and resubmit the rest of the work in a new descriptor or complete the rest of the work in software. Faults on descriptor list and completion record addresses are handled differently and are described in more detail below.

One implementation of the DSA supports only message signaled interrupts. DSA provides two types of interrupt message storage: (a) an MSI-X table, enumerated through the MSI-X capability, which stores interrupt messages used by the host driver; and (b) a device-specific Interrupt Message Storage (IMS) table, which stores interrupt messages used by guest drivers.

In one implementation, interrupts can be generated for three types of events: (1) completion of a kernel-mode descriptor; (2) completion of a Drain or Abort command; and (3) an error posted in the Software or Hardware Error Register. For each type of event there is a separate interrupt enable. Interrupts due to errors and completion of Abort/Drain commands are generated using entry 0 in the MSI-X table. The Interrupt Because Register may be read by software to determine the reason for the interrupt.

For completion of a kernel mode descriptor (e.g., a descriptor in which the U/S field is 1), the interrupt message used is dependent on how the descriptor was submitted and the Use Interrupt Message Storage flag in the descriptor.

The completion interrupt message for a kernel-mode descriptor submitted via a Privileged Portal is generally an entry in the MSI-X table, determined by the portal address. However, if the Interrupt Message Storage Support field in GENCAP is 1, a descriptor submitted via a Privileged Portal may override this behavior by setting the Use Interrupt Message Storage flag in the descriptor. In this case, the Completion Interrupt Handle field in the descriptor is used as an index into the Interrupt Message Storage.

The completion interrupt message for a kernel-mode descriptor submitted via a Guest Portal is an entry in the Interrupt Message Storage, determined by the portal address.

Interrupts generated by DSA are processed through the Interrupt Remapping and Posting hardware as configured by the kernel or VMM software.

TABLE V

| Event | Submission register | Interrupt Message Support capability | Use Interrupt Storage flag | Interrupt message used |
|---|---|---|---|---|
| Error posted in SWERROR or HWERROR register | | | | MSI-X table entry 0 |
| Event | Submission register | Interrupt Message Storage Support capability | Use Interrupt Message Storage flag | Interrupt message used |
| Completion of Abort and Drain commands | Command Register | | | MSI-X table entry 0 |
| WQ Occupancy below limit | | | | MSI-X table entry 0 |
| Completion of kernel-mode descriptor | Privileged Portal | 0 | | MSI-X table entry based on portal address |
| | | 1 | 0 | MSI-X table entry based on portal address |
| | | | 1 | Interrupt Message Storage entry specified by Completion Interrupt Handle field in descriptor |

TABLE V-continued

| Event | Submission register | Interrupt Message Support capability | Use Interrupt Storage flag | Interrupt message used |
|---|---|---|---|---|
| | Guest Portal | 1 | | Interrupt Message Storage entry based on Portal address |

As mentioned, the DSA supports submitting multiple descriptors at once. A batch descriptor contains the address of an array of work descriptors in host memory and the number of elements in the array. The array of work descriptors is called the "batch." Use of Batch descriptors allows DSA clients to submit multiple work descriptors using a single ENQCMD, ENQCMDS, or MOVDIR64B instruction and can potentially improve overall throughput. DSA enforces a limit on the number of work descriptors in a batch. The limit is indicated in the Maximum Batch Size field in the General Capability Register.

Batch descriptors are submitted to work queues in the same way as other work descriptors. When a Batch descriptor is processed by the device, the device reads the array of work descriptors from memory and then processes each of the work descriptors. The work descriptors are not necessarily processed in order.

The PASID 3803 and the U/S flag of the Batch descriptor are used for all descriptors in the batch. The PASID and U/S fields 3810 in the descriptors in the batch are ignored. Each work descriptor in the batch can specify a completion record address 3804, just as with directly submitted work descriptors. Alternatively, the batch descriptor can specify a "completion queue" address where the completion records of all the work descriptors from the batch are written by the device. In this case, the Completion Record Address fields 3804 in the descriptors in the batch are ignored. The completion queue should be one entry larger than the descriptor count, so there is space for a completion record for every descriptor in the batch plus one for the Batch descriptor. Completion records are generated in the order in which the descriptors complete, which may not be the same as the order in which they appear in the descriptor array. Each completion record includes the index of the descriptor in the batch that generated that completion record. An index of 0xff is used for the Batch descriptor itself. An index of 0 is used for directly submitted descriptors other than Batch descriptors. Some descriptors in the batch may not generate completion records, if they do not request a completion record and they complete successfully. In this case, the number of completion records written to the completion queue may be less than the number of descriptors in the batch. The completion record for the Batch descriptor (if requested) is written to the completion queue after the completion records for all the descriptors in the batch.

If the batch descriptor does not specify a completion queue, the completion record for the batch descriptor (if requested) is written to its own completion record address after all the descriptors in the batch are completed. The completion record for the Batch descriptor contains an indication of whether any of the descriptors in the batch completed with Status not equal to Success. This allows software to only look at the completion record for the Batch descriptor, in the usual case where all the descriptors in the batch completed successfully.

A completion interrupt may also be requested by one or more work descriptors in the batch, as needed. The completion record for the Batch descriptor (if requested) is written after the completion records and completion interrupts for all the descriptors in the batch. The completion interrupt for the Batch descriptor (if requested) is generated after the completion record for the Batch descriptor, just as with any other descriptor.

A Batch descriptor may not be included in a batch. Nested or chained descriptor arrays are not supported.

By default, DSA doesn't guarantee any ordering while executing work descriptors. Descriptors can be dispatched and completed in any order the device sees fit to maximize throughput. Hence, if ordering is required, software must order explicitly; for example, software can submit a descriptor, wait for the completion record or interrupt from the descriptor to ensure completion, and then submit the next descriptor.

Software can also specify ordering for descriptors in a batch specified by a Batch descriptor. Each work descriptor has a Fence flag. When set, Fence guarantees that processing of that descriptor will not start until previous descriptors in the same batch are completed. This allows a descriptor with Fence to consume data produced by a previous descriptor in same batch.

A descriptor is completed after all writes generated by the operation are globally observable; after destination read back, if requested; after the write to the completion record is globally observable, if needed; and after generation of the completion interrupt, if requested.

If any descriptor in a batch completes with Status not equal to Success, for example if it is partially completed due to a page fault, a subsequent descriptor with the Fence flag equal to 1 and any following descriptors in the batch are abandoned. The completion record for the Batch descriptor that was used to submit the batch indicates how many descriptors were completed. Any descriptors that were partially completed and generated a completion record are counted as completed. Only the abandoned descriptors are considered not completed.

Fence also ensures ordering for completion records and interrupts. For example, a No-op descriptor with Fence and Request Completion Interrupt set will cause the interrupt to be generated after all preceding descriptors in the batch have completed (and their completion records have been written, if needed). A completion record write is always ordered behind data writes produced by same work descriptor and the completion interrupt (if requested) is always ordered behind the completion record write for the same work descriptor.

Drain is a descriptor which allows a client to wait for all descriptors belonging to its own PASID to complete. It can be used as a Fence operation for the entire PASID. The Drain operation completes when all prior descriptors with that PASID have completed. Drain descriptor can be used by software request a single completion record or interrupt for the completion of all its descriptors. Drain is a normal descriptor that is submitted to the normal work queue. A Drain descriptor may not be included in a batch. (A Fence flag may be used in a batch to wait for prior descriptors in the batch to complete.)

Software must ensure that no descriptors with the specified PASID are submitted to the device after the Drain descriptor is submitted and before it completes. If additional descriptors are submitted, it is unspecified whether the Drain operation also waits for the additional descriptors to complete. This could cause the Drain operation to take a long time. Even if the device doesn't wait for the additional descriptors to complete, some of the additional descriptors may complete before the Drain operation completes. In this way, Drain is different from Fence, because Fence ensures that no subsequent operations start until all prior operations are complete.

In one implementation, abort/drain commands are submitted by privileged software (OS kernel or VMM) by writing to the Abort/Drain register. On receiving one of these commands, the DSA waits for completion of certain descriptors (described below). When the command completes, software can be sure there are no more descriptors in the specified category pending in the device.

There are three types of Drain commands in one implementation: Drain All, Drain PASID, and Drain WQ. Each command has an Abort flag that tells the device that it may discard any outstanding descriptors rather than processing them to completion.

The Drain All command waits for completion of all descriptors that were submitted prior to the Drain All command. Descriptors submitted after the Drain All command may be in progress at the time the Drain All completes. The device may start work on new descriptors while the Drain All command is waiting for prior descriptors to complete.

The Drain PASID command waits for all descriptors associated with the specified PASID. When the Drain PASID command completes, there are no more descriptors for the PASID in the device. Software may ensure that no descriptors with the specified PASID are submitted to the device after the Drain PASID command is submitted and before it completes; otherwise the behavior is undefined.

The Drain WQ command waits for all descriptors submitted to the specified work queue. Software may ensure that no descriptors are submitted to the WQ after the Drain WQ command is submitted and before it completes.

When an application or VM that is using DSA is suspended, it may have outstanding descriptors submitted to the DSA. This work must be completed so the client is in a coherent state that can be resumed later. The Drain PASID and Drain All commands are used by the OS or VMM to wait for any outstanding descriptors. The Drain PASID command is used for an application or VM that was using a single PASID. The Drain All command is used for a VM using multiple PASIDs.

When an application that is using DSA exits or is terminated by the operating system (OS), the OS needs to ensure that there are no outstanding descriptors before it can free up or re-use address space, allocated memory, and the PASID. To clear out any outstanding descriptors, the OS uses the Drain PASID command with the PASID of the client being terminated and the Abort flag is set to 1. On receiving this command, DSA discards all descriptors belonging to the specified PASID without further processing.

One implementation of the DSA provides a mechanism to specify quality of service for dispatching work from multiple WQs. DSA allows software to divide the total WQ space into multiple WQs. Each WQ can be assigned a different priority for dispatching work. In one implementation, the DSA scheduler/arbiter 3513 dispatches work from the WQs so that higher priority WQs are serviced more than lower priority WQs. However, the DSA ensures that the higher priority WQs do not starve lower priority WQs. As mentioned, various prioritization schemes may be employed based on implementation requirements.

In one implementation, the WQ Configuration Register table is used to configure the WQs. Software can configure the number of active WQs to match the number of Qos levels desired. Software configures each WQ by programming the WQ size and some additional parameters in the WQ Configuration Register table. This effectively divides the entire WQ space into the desired number of WQs. Unused WQs have a size of 0. Errors can be broadly divided into two categories; 1) Affiliated errors, which happen on processing descriptors of specific PASIDs, and 2) Unaffiliated errors, which are global in nature and not PASID specific. DSA attempts to avoid having errors from one PASID take down or affect other PASIDs as much as possible. PASID-specific errors are reported in the completion record of the respective descriptors except when the error is on the completion record itself (for example, a page fault on the completion record address).

An error in descriptor submission or on the completion record of a descriptor may be reported to the host driver through the Software Error Register (SWERROR). A hardware error may be reported through the Hardware Error Register (HWERROR).

One implementation of the DSA performs the following checks at the time the Enable bit in the Device Enable register is set to 1:

Bus Master Enable is 1.

The combination of PASID, ATS, and PRS capabilities is valid. (See Table 6-3 in section 6.1.3.)

The sum of the WQ Size fields of all the WQCFG registers is not greater than Total WQ Size.

For each GRPCFG register, the WQs and Engines fields are either both 0 or both non-zero.

Each WQ for which the Size field in the WQCFG register is non-zero is in one group.

Each WQ for which the Size field in the WQCFG register is zero is not in any group.

Each engine is in no more than one group.

If any of these checks fail, the device is not enabled and the error code is recorded in the Error Code field of the Device Enable register. These checks may be performed in any order. Thus an indication of one type of error does not imply that there are not also other errors. The same configuration errors may result in different error codes at different times or with different versions of the device. If none of the checks fail, the device is enabled and the Enabled field is set to 1.

The device performs the following checks at the time the WQ Enable bit in a WQCFG register is set to 1:

The device is enabled (i.e., the Enabled field in the Device Enable register is 1).

The WQ Size field is non-zero.

The WQ Threshold is not greater than the WQ Size field.

The WQ Mode field selects a supported mode. That is, if the Shared Mode Support field in WQCAP is 0, WQ Mode is 1, or if the Dedicated Mode Support field is WQCAP is 0, WQ Mode is 0. If both the Shared Mode Support and Dedicated Mode Support fields are 1, either value of WQ Mode is allowed.

If the Block on Fault Support bit in GENCAP is 0, the WQ Block on Fault Enable field is 0.

If any of these checks fail, the WQ is not enabled and the error code is recorded in the WQ Error Code field of the WQ Config register 3500. These checks may be performed in any order. Thus an indication of one type of error does not imply that there are not also other errors. The same configuration errors may result in different error codes at different times or with different versions of the device. If none of the checks fail, the device is enabled and the WQ Enabled field is set to 1.

In one implementation, the DSA performs the following checks when a descriptor is received:

The WQ identified by the register address used to submit the descriptor is an active WQ (the Size field in the WQCFG register is non-zero). If this check fails, the error is recorded in the Software Error Register (SWERROR).

If the descriptor was submitted to a shared WQ.

It was submitted with ENQCMD or ENQCMDS. If this check fails, the error is recorded in SWERROR.

If the descriptor was submitted via a Non-privileged or Guest Portal, the current queue occupancy is not greater than the WQ Threshold. If this check fails, a Retry response is returned.

If the descriptor was submitted via a Privileged Portal, the current queue occupancy is less than WQ Size. If this check fails, a Retry response is returned.

If the descriptor was submitted to a dedicated WQ.

It was submitted with MOVDIR64B.

The queue occupancy is less than WQ Size.

If either of these checks fails, the error is recorded in SWERROR.

In one implementation, the device performs the following checks on each descriptor when it is processed:

The value in the operation code field corresponds to a supported operation. This includes checking that the operation is valid in the context in which it was submitted. For example, a Batch descriptor inside a batch would be treated as an invalid operation code.

No reserved flags are set. This includes flags for which the corresponding capability bit in the GENCAP register is 0.

No unsupported flags are set. This includes flags that are reserved for use with certain operations. For example, the Fence bit is reserved in descriptors that are enqueued directly rather than as part of a batch. It also includes flags which are disabled in the configuration, such as the Block On Fault flag, which is reserved when the Block On Fault Enable field in the WQCFG register is 0.

Required flags are set. For example, the Request Completion Record flag must be 1 in a descriptor for the Compare operation.

Reserved fields are 0. This includes any fields that have no defined meaning for the specified operation. Some implementations may not check all reserved fields, but software should take care to clear all unused fields for maximum compatibility. In a Batch descriptor, the Descriptor Count field is not greater than the Maximum Batch Size field in the GENCAP register.

The Transfer Size, Source Size, Maximum Delta Record Size, Delta Record Size, and Maximum Destination Size (as applicable for the descriptor type) are not greater than the Maximum Transfer Size field in the GENCAP register.

In a Memory Copy with Dual cast descriptor, bits 11:0 of the two destination addresses are the same.

If Use Interrupt Message Storage flag is set, Completion Interrupt Handle is less than Interrupt Message Storage Size.

In one implementation, If the Completion Record Address 3804 cannot be translated, the descriptor 3800 is discarded and an error is recorded in the Software Error Register. Otherwise, if any of these checks fail, the completion record is written with the Status field indicating the type of check that failed and Bytes Completed set to 0. A completion interrupt is generated, if requested.

These checks may be performed in any order. Thus an indication of one type of error in the completion record does not imply that there are not also other errors. The same invalid descriptor may report different error codes at different times or with different versions of the device.

Reserved fields 3811 in descriptors may fall into three categories: fields that are always reserved; fields that are reserved under some conditions (e.g., based on a capability, configuration field, how the descriptor was submitted, or values of other fields in the descriptor itself); and fields that are reserved based on the operation type. The following tables list the conditions under which fields are reserved.

TABLE W (Conditional Reserved Field Checking)

| Reserved Field (Value) | Conditions under which field (or value) is reserved |
|---|---|
| Request Completion Interrupt | U/S = 0; or<br>Descriptor was submitted to Non-privileged Portal. |
| Completion Interrupt Handle | Request Completion Interrupt = 0;<br>GENCAP Interrupt Support Capability = 2; or<br>Descriptor was submitted to Guest Portal. |
| Use Interrupt Message Storage | Request Completion Interrupt = 0;<br>U/S bit is 0<br>GENCAP Interrupt Message Storage Support capability = 0; or<br>Descriptor was submitted to Guest Portal. |
| Fence | Descriptor submitted directly to WQ (not in a batch). |
| Block On Fault | WQCFG Block On Fault Enable = 0. |
| Destination Readback | GENCAP Destination Readback Support = 0. |
| Durable Write | GENCAP Durable Write Support = 0. |

TABLE W-continued (Conditional Reserved Field Checking)

| Reserved Field (Value) | Conditions under which field (or value) is reserved |
|---|---|
| Completion Record Address Valid | For descriptors in a batch, when Completion Queue Enable = 1. |
| Completion Record Address | Completion Record Address Valld = 0. |
| Request Completion Record | Completion Record Address Valld = 0. |
| Reserved Field (Value) | Conditions under which field (or value) is reserved |
| Completion Queue Enable | GENCAP Completion Queue Support = 0;<br>Operation is not Batch; or<br>Completion Record Address Valid = 0. |

TABLE X (Operation-Specific Reserved Field Checking)

| Operation | Allowed flags | Reserved flags[1] | Reserved fields |
|---|---|---|---|
| All | Completion Record<br>Address Valid<br>Request Completion Record<br>Request Completion Intr | Bit 7<br>Bits 23:16 | Bits 30:20 |
| NO-op<br>Drain | Fence | Block-on-Fault<br>Check Result<br>Destination Cache Fill<br>Destination No Snoop<br>Strict Ordering<br>Destination Readback<br>Durable Write | Bytes 16-35<br>Bytes 38-63 |
| Memory Move | Fence<br>Block-on-Fault<br>Destination Cache Fill<br>Destination No Snoop<br>Strict Ordering<br>Destination Readback<br>Durable Write | Check Result | Bytes 38-63 |
| Fill | Fence<br>Block-on-Fault<br>Destination Cache Fill<br>Destination No Snoop<br>Strict Ordering<br>Destination Readback.<br>Durable Write | Check Result | Bytes 38-63 |
| Compare<br>Compare Immediate | Fence<br>Block-on-Fault<br>Check Result | Destination Cache Fill<br>Destination No Snoop<br>Strict Ordering<br>Destination Readback<br>Durable Write | Bytes 38-63 |
| Create Delta Record | All [3] | | Bytes 38-39<br>Bytes 52-63 |
| Apply Delta Record | Fence<br>Block-on-Fault<br>Destination Cache Fill<br>Destination No Snoop<br>Strict Ordering<br>Destination Readback<br>Durable Write | Check Result | Bytes 38-39<br>Bytes 44-63 |
| Dualcast | Fence<br>Block-on-Fault<br>Destination Cache Fil!<br>Destination No Snoop<br>Strict Ordering<br>Destination Readback<br>Durable Write | Check Result | Bytes 38-39<br>Bytes 48-63 |
| CRC Generation | Fence<br>Block-on-Fault | Check Result<br>Destination Cache Fill<br>Destination No Snoop<br>Strict Ordering<br>Destination Readback<br>Durable Write | Bytes 24-31<br>Bytes 38-39<br>Bytes 44-63 |
| Copy with CRC<br>Generation | Fence<br>Block-on-Fault<br>Destination Cache Fill<br>Destination No Shoop<br>Strict Ordering<br>Destination Readback<br>Durable Write | Check Result | Bytes 38-39<br>Bytes 44-63 |

TABLE X-continued

| (Operation-Specific Reserved Field Checking) | | | |
|---|---|---|---|
| Operation | Allowed flags | Reserved flags[1] | Reserved fields |
| DIF Insert | Fence<br>Block-on-Fault<br>Destination Cache Fill<br>Destination No Snoop<br>Strict Ordering<br>Destination Readback<br>Durable Write | Check Result | Bytes 38-39<br>Byte 40<br>Bytes 43-55 |
| DIF Strip | All | | Bytes 38-39<br>Byte 41<br>Bytes 43-47<br>Bytes 56-63 |
| DIF Update | All | | Bytes 38-39<br>Bytes 43-47 |
| Cache flush | Fence<br>Block-on-Fault | Check Result<br>Destination Cache Fill<br>Destination No Snoop<br>Strict Ordering<br>Destination Readback<br>Durable Write | Bytes 16-23<br>Bytes 38-63 |
| Batch | Completion Queue Enable | Check Result<br>Fence<br>Block-on-Fault<br>Destination Cache Fill<br>Destination No Snoop<br>Strict Ordering<br>Destination Readback<br>Durable Write | Bytes 24-31<br>Bytes 38-63 |

As mentioned, DSA supports the use of either physical or virtual addresses. The use of virtual addresses that are shared with processes running on the processor cores is called shared virtual memory (SVM). To support SVM the device provides a PASID when performing address translations, and it handles page faults that occur when no translation is present for an address. However, the device itself doesn't distinguish between virtual and physical addresses; this distinction is controlled by the programming of the IOMMU 1710.

In one implementation, DSA supports the Address Translation Service (ATS) and Page Request Service (PRS) PCI Express capabilities, as indicated in FIG. 28 which shows PCIe logic 2820 communicating with PCIe logic 2808 using PCDI to take advantage of ATS. ATS describes the device behavior during address translation. When a descriptor enters a descriptor processing unit, the device 2801 may request translations for the addresses in the descriptor. If there is a hit in the Device TLB 2822, the device uses the corresponding host physical address (HPA). If there is a miss or permission fault, one implementation of the DSA 2801 sends an address translation request to IOMMU 2810 for the translation (i.e., across the multi-protocol link 2800). The IOMMU 2810 may then locate the translation by walking the respective page tables and returns an address translation response that contains the translated address and the effective permissions. The device 2801 then stores the translation in the Device TLB 2822 and uses the corresponding HPA for the operation. If IOMMU 2810 is unable to locate the translation in the page tables, it may return an address translation response that indicates no translation is available. When the IOMMU 2810 response indicates no translation or indicates effective permissions that do not include the permission required by the operation, it is considered a page fault.

The DSA device 2801 may encounter a page fault on one of: 1) a Completion Record Address 3804; 2) the Descriptor List Address in a Batch descriptor; or 3) a source buffer or destination buffer address. The DSA device 2801 can either block until the page fault is resolved or prematurely complete the descriptor and return a partial completion to the client. In one implementation, the DSA device 2801 always blocks on page faults on Completion Record Addresses 3804 and Descriptor List Addresses.

When DSA blocks on a page fault it reports the fault as a Page Request Services (PRS) request to the IOMMU 2810 for servicing by the OS page fault handler. The IOMMU 2810 may notify the OS through an interrupt. The OS validates the address and upon successful checks creates a mapping in the page table and returns a PRS response through the IOMMU 2810.

In one implementation, each descriptor 3800 has a Block On Fault flag which indicates whether the DSA 2801 should return a partial completion or block when a page fault occurs on a source or destination buffer address. When the Block On Fault flag is 1, and a fault is encountered, the descriptor encountering the fault is blocked until the PRS response is received. Other operations behind the descriptor with the fault may also be blocked.

When Block On Fault is 0 and a page fault is encountered on a source or destination buffer address, the device stops the operation and writes the partial completion status along with the faulting address and progress information into the completion record. When the client software receives a completion record indicating partial completion, it has the option to fix the fault on the processor (by touching the page, for example) and submit a new work descriptor with the remaining work.

Alternatively, software can complete the remaining work on the processor. The Block On Fault Support field in the General Capability Register (GENCAP) may indicate device support for this feature, and the Block On Fault Enable field in the Work Queue Configuration Register allows the VMM or kernel driver to control whether applications are allowed to use the feature.

Device page faults may be relatively expensive. In fact, the cost of servicing device page faults may be higher than cost of servicing processor page faults. Even if the device performs partial work completion instead of block-on-fault on faults, it still incurs overheads because it requires software intervention to service the page-fault and resubmit the work. Hence, for best performance, it is desirable for software to minimize device page faults without incurring the overheads of pinning and unpinning.

Batch descriptor lists and source data buffers are typically produced by software right before submitting them to the device. Hence, these addresses are not likely to incur faults due to temporal locality. Completion descriptors and destination data buffers, however, are more likely to incur faults if they are not touched by software before submitting to the device. Such faults can be minimized by software explicitly "write touching" these pages before submission.

During a Device TLB invalidation request, if the address being invalidated is being used in a descriptor processing unit, the device waits for the engine to be done with the address before completing the invalidation request.

Additional Descriptor Types

Some implementations may utilize one or more of the following additional descriptor types:

No-Op

Figure 40:
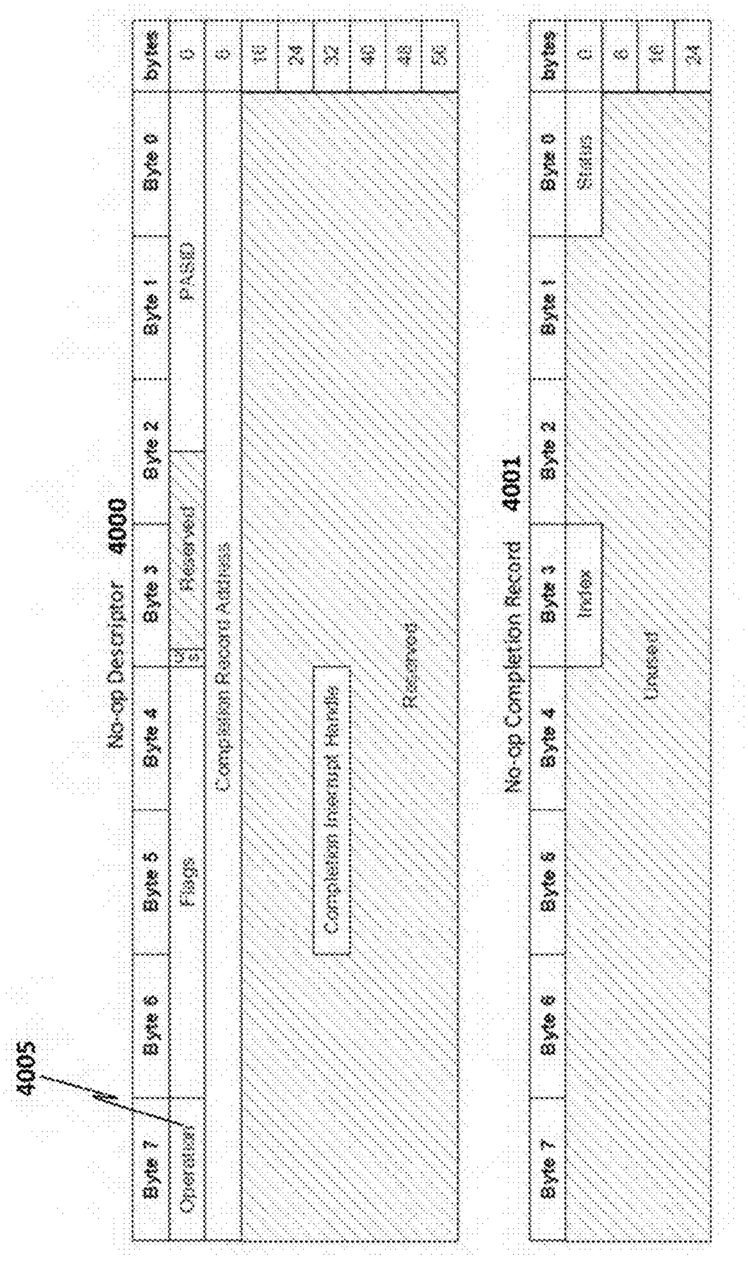
FIG. 40 illustrates an exemplary no-op descriptor and no-op completion record.

FIG. 40 illustrates an exemplary no-op descriptor 4000 and no-op completion record 4001. The No-op operation 4005 performs no DMA operation. It may request a completion record and/or completion interrupt. If it is in a batch, it may specify the Fence flag to ensure that the completion of the No-op descriptor occurs after completion of all previous descriptors in the batch.

Batch

Figure 41:
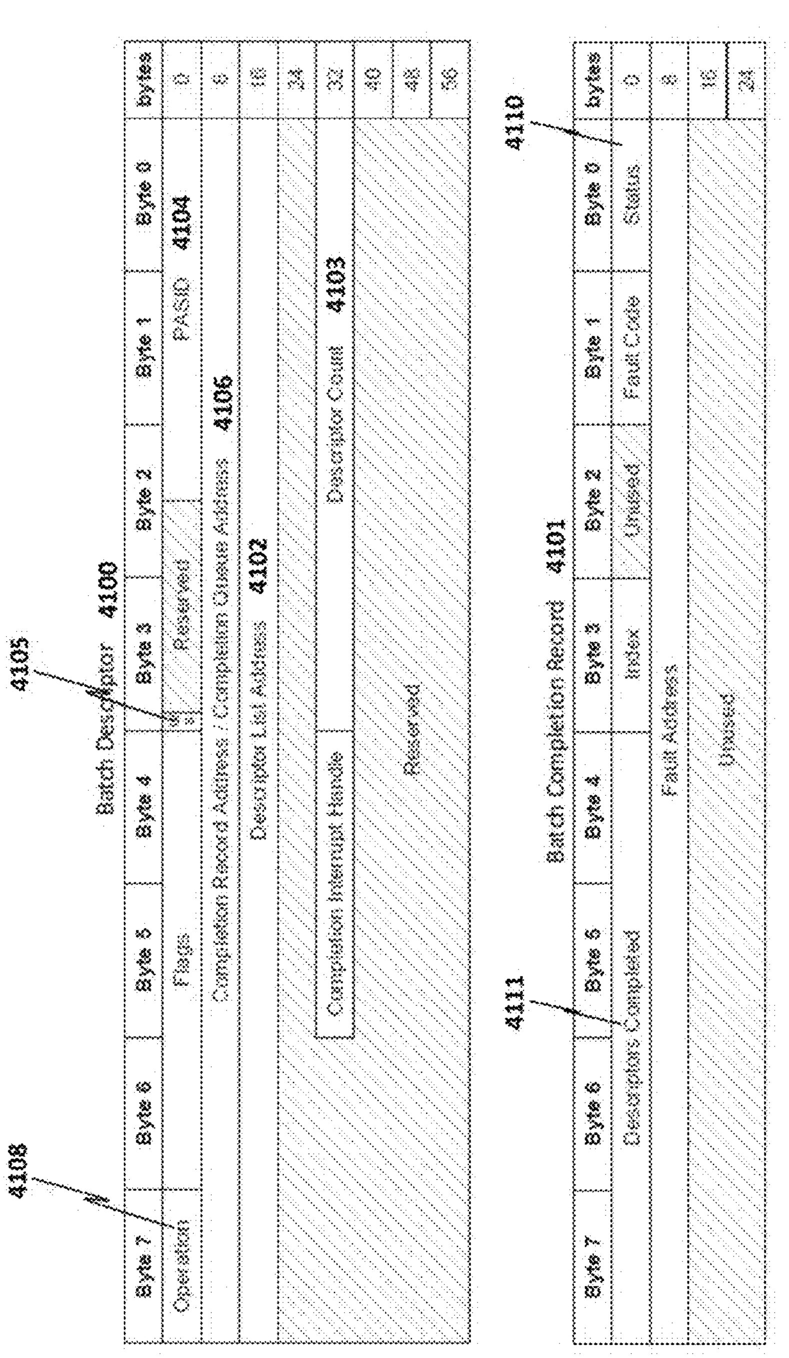
FIG. 41 illustrates an exemplary batch descriptor and no-op completion record.

FIG. 41 illustrates an exemplary batch descriptor 4100 and no-op completion record 4101. The Batch operation 4108 queues multiple descriptors at once. The Descriptor List Address 4102 is the address of a contiguous array of work descriptors to be processed. In one implementation, each descriptor in the array is 64 bytes. The Descriptor List Address 4102 is 64-byte aligned. Descriptor Count 4103 is the number of descriptors in the array. The set of descriptors in the array is called the "batch". The maximum number of descriptors allowed in a batch is given in the Maximum Batch Size field in GENCAP.

The PASID 4104 and the U/S flag 4105 in the Batch descriptor are used for all descriptors in the batch. The PASID 4104 and the U/S flag fields 4105 in the descriptors in the batch are ignored. If the Completion Queue Enable flag in the Batch descriptor 4100 is set, the Completion Record Address Valid flag must be 1 and the Completion Queue Address field 4106 contains the address of a completion queue that is used for all the descriptors in the batch. In this case, the Completion Record Address fields 4106 in the descriptors in the batch are ignored. If the Completion Queue Support field in the General Capability Register is 0, the Completion Queue Enable flag is reserved.

If the Completion Queue Enable flag in the Batch Descriptor is 0, the completion record for each descriptor in the batch is written to the Completion Record Address 4106 in each descriptor. In this case, if the Request Completion Record flag is 1 in the Batch descriptor, the Completion Queue Address field is used as a Completion Record Address 4106 solely for the Batch descriptor.

The Status field 4110 of the Batch completion record 4101 indicates Success if all of the descriptors in the batch completed successfully; otherwise it indicates that one or more descriptors completed with Status not equal to Success. The Descriptors Completed field 4111 of the completion record contains the total number of descriptors in the batch that were processed, whether they were successful or not. Descriptors Completed 4111 may be less than Descriptor Count 4103 if there is a Fence in the batch or if a page fault occurred while reading the batch.

Drain

Figure 42:
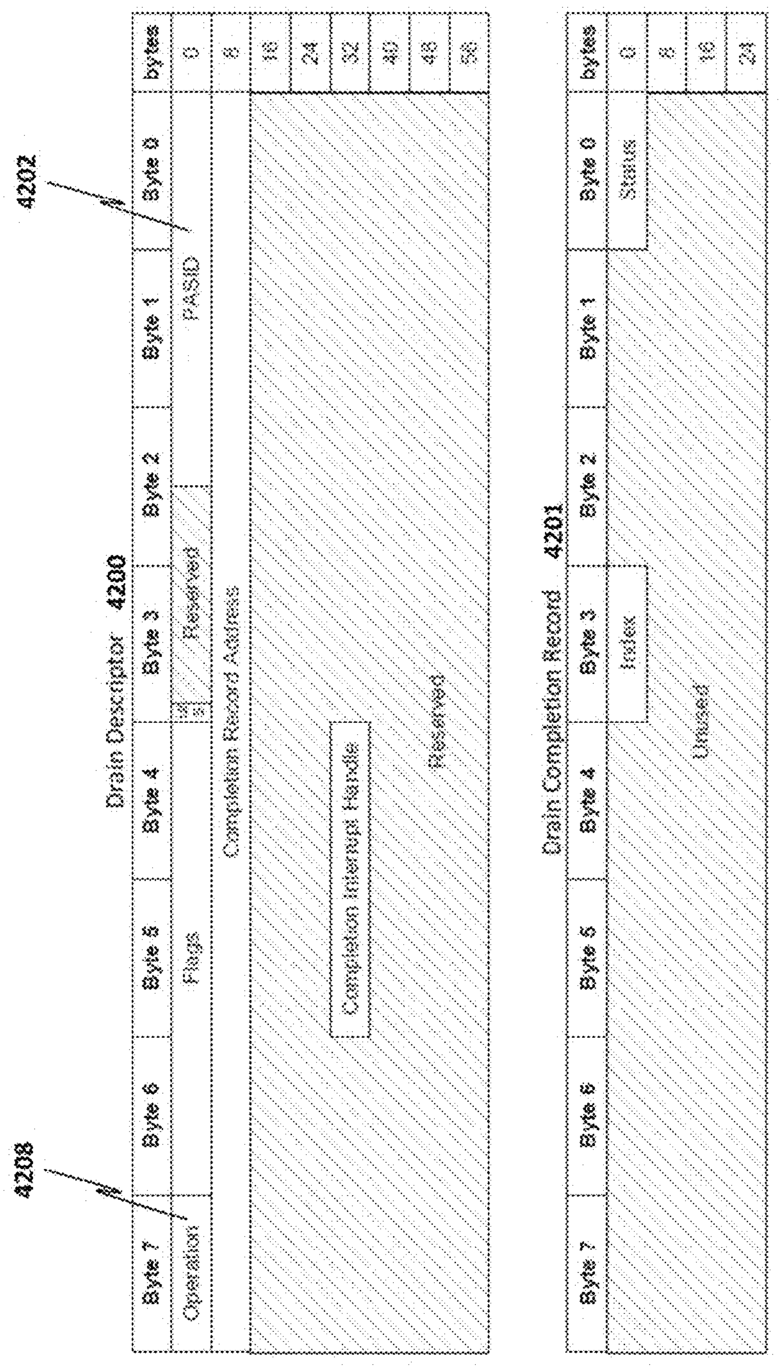
FIG. 42 illustrates an exemplary drain descriptor and drain completion record.

FIG. 42 illustrates an exemplary drain descriptor 4200 and drain completion record 4201. The Drain operation 4208 waits for completion of all outstanding descriptors in the work queue that the Drain descriptor 4200 is submitted to that are associated with the PASID 4202. This descriptor may be used during normal shut down by a process that has been using the device. In order to wait for all descriptors associated with the PASID 4202, software should submit a separate Drain operation to every work queue that the PASID 4202 was used with. Software should ensure that no descriptors with the specified PASID 4202 are submitted to the work queue after the Drain descriptor 4201 is submitted and before it completes.

A Drain descriptor 4201 may not be included in a batch; it is treated as an unsupported operation type. Drain should specify Request Completion Record or Request Completion Interrupt. Completion notification is made after the other descriptors have completed.

Memory Move

Figure 43:
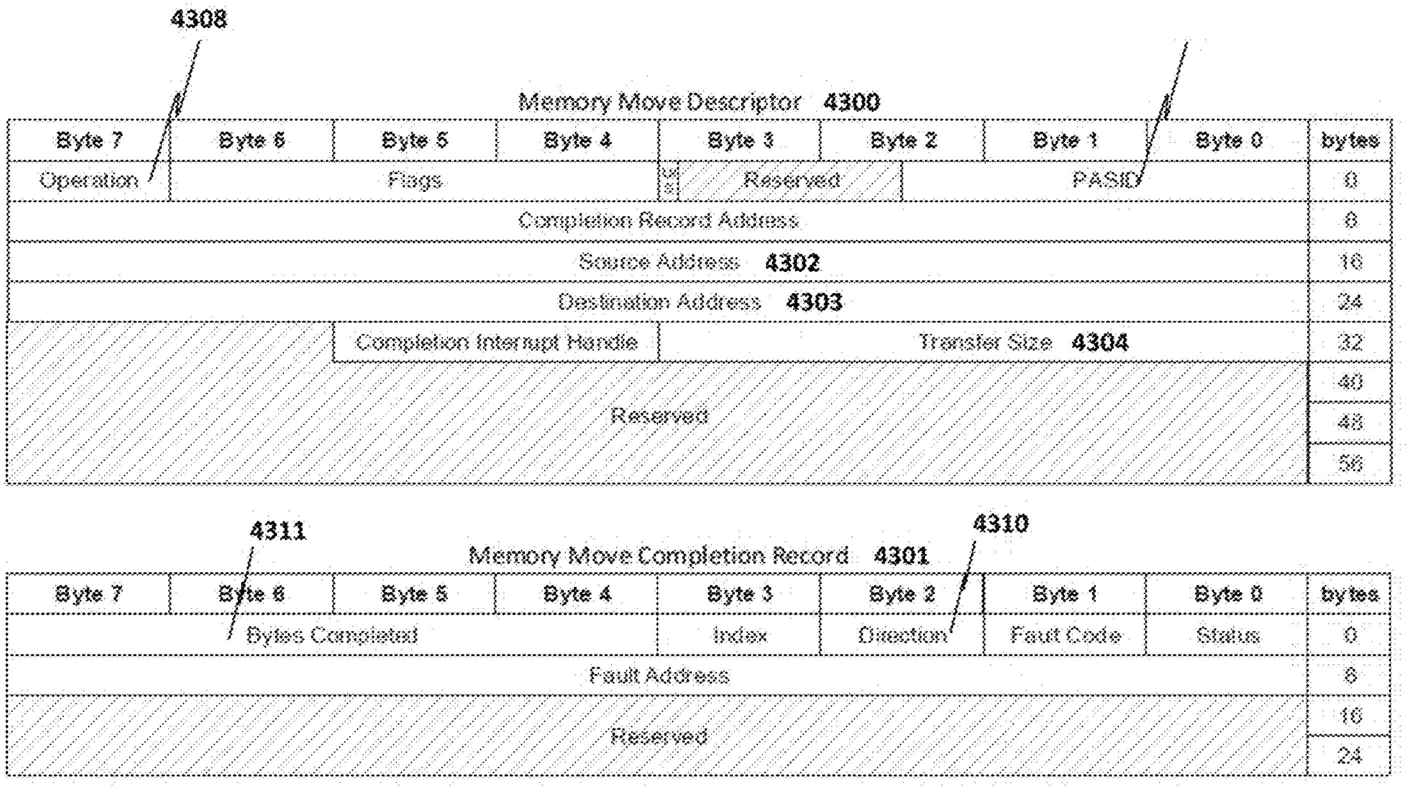
FIG. 43 illustrates an exemplary memory move descriptor and memory move completion record.

FIG. 43 illustrates an exemplary memory move descriptor 4300 and memory move completion record 4301. The Memory Move operation 4308 copies memory from the Source Address 4302 to the Destination Address 4303. The number of bytes copied is given by Transfer Size 4304. There are no alignment requirements for the memory addresses or the transfer size. If the source and destination regions overlap, the memory copy is done as if the entire source buffer is copied to temporary space and then copied to the destination buffer. This may be implemented by reversing the direction of the copy when the beginning of the destination buffer overlaps the end of the source buffer.

If the operation is partially completed due to a page fault, the Direction field 4310 of the completion record is 0 if the copy was performed starting at the beginning of the source and destination buffers, and the Direction field is 1 if the direction of the copy was reversed.

To resume the operation after a partial completion, if Direction is 0, the Source and Destination Address fields 4302-4303 in the continuation descriptor should be increased by Bytes Completed, and the Transfer Size should be decreased by Bytes Completed 4311. If Direction is 1, the Transfer Size 4304 should be decreased by Bytes Completed 4311, but the Source and Destination Address fields 4302-4303 should be the same as in the original descriptor. Note that if a subsequent partial completion occurs, the Direction field 4310 may not be the same as it was for the first partial completion.

Fill

Figure 44:
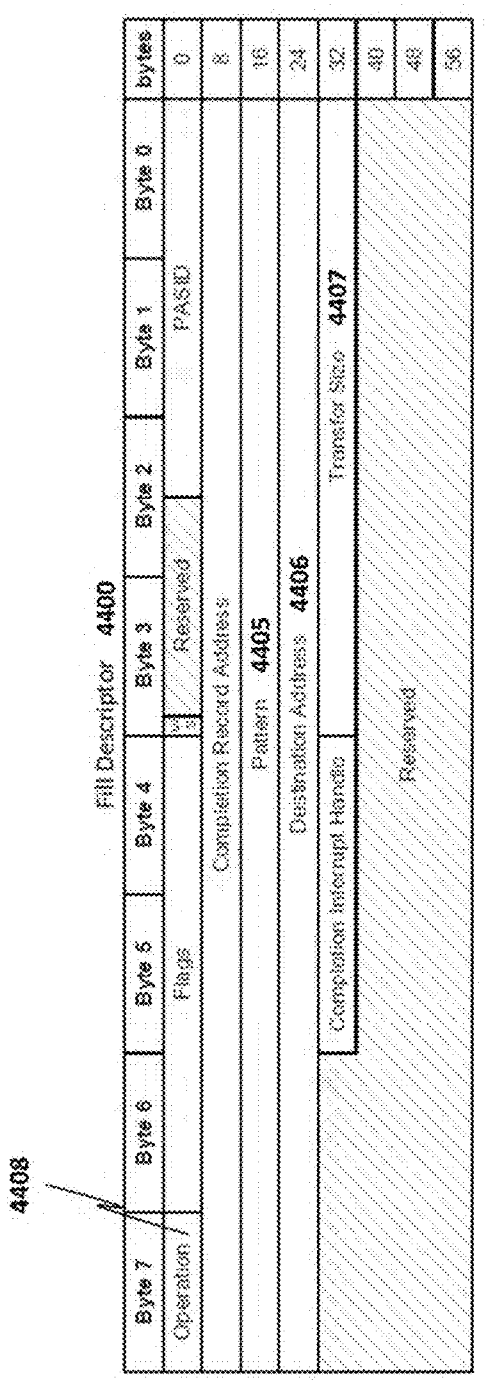
FIG. 44 illustrates an exemplary fill descriptor.

FIG. 44 illustrates an exemplary fill descriptor 4400. The Memory Fill operation 4408 fills memory at the Destination Address 4406 with the value in the pattern field 4405. The pattern size may be 8 bytes. To use a smaller pattern, software must replicate the pattern in the descriptor. The number of bytes written is given by Transfer Size 4407. The transfer size does not need to be a multiple of the pattern size. There are no alignment requirements for the destination address or the transfer size. If the operation is partially completed due to a page fault, the Bytes Completed field of the completion record contains the number of bytes written to the destination before the fault occurred.

Compare

Figure 45:
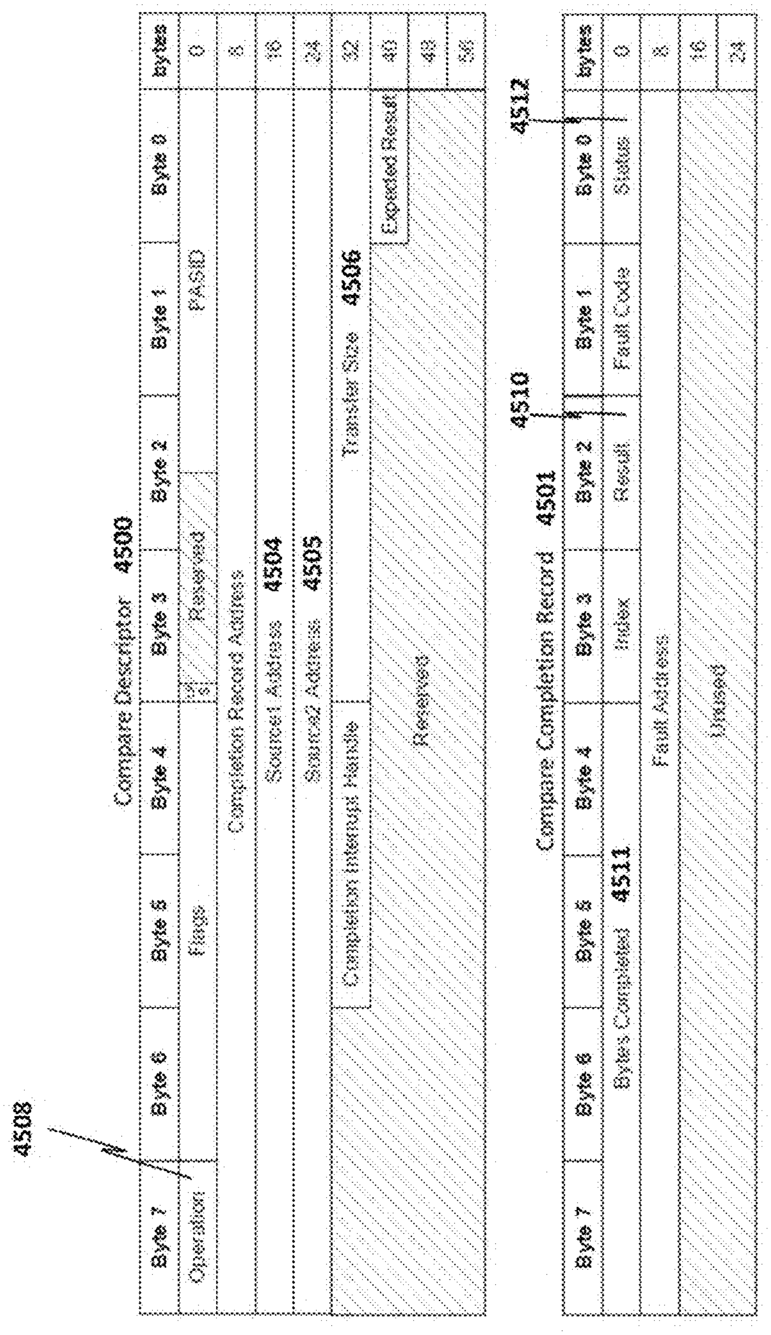
FIG. 45 illustrates an exemplary compare descriptor and compare completion record.

FIG. 45 illustrates an exemplary compare descriptor 4500 and compare completion record 4501. The Compare operation 4508 compares memory at Source1 Address 4504 with memory at Source2 Address 4505. The number of bytes compared is given by Transfer Size 4506. There are no alignment requirements for the memory addresses or the transfer size 4506. The Completion Record Address Valid and Request Completion Record flags must be 1 and the Completion Record Address must be valid. The result of the comparison is written to the Result field 4510 of the completion record 4501: a value of 0 indicates that the two memory regions match, and a value of 1 indicates that they do not match. If Result 4510 is 1, the Bytes Completed 4511 field of the completion record indicates the byte offset of the first difference. If the operation is partially completed due to a page fault, Result is 0. If a difference had been detected, the difference would be reported instead of the page fault.

If the operation is successful and the Check Result flag is 1, the Status field 4512 of the completion record is set according to Result and Expected Result, as shown in the table below. This allows a subsequent descriptor in the same batch with the Fence flag to continue or stop execution of the batch based on the result of the comparison.

TABLE Y

| Check Result flag | Expected Result bit 0 | Result | Status |
|---|---|---|---|
| 0 | X | X | Success |
| 1 | 0 | 0 | Success |
| 1 | 0 | 1 | Success with false predicate |
| 1 | 1 | 0 | Success with false predicate |
| 1 | 1 | 1 | Success |

Compare Immediate

Figure 46:
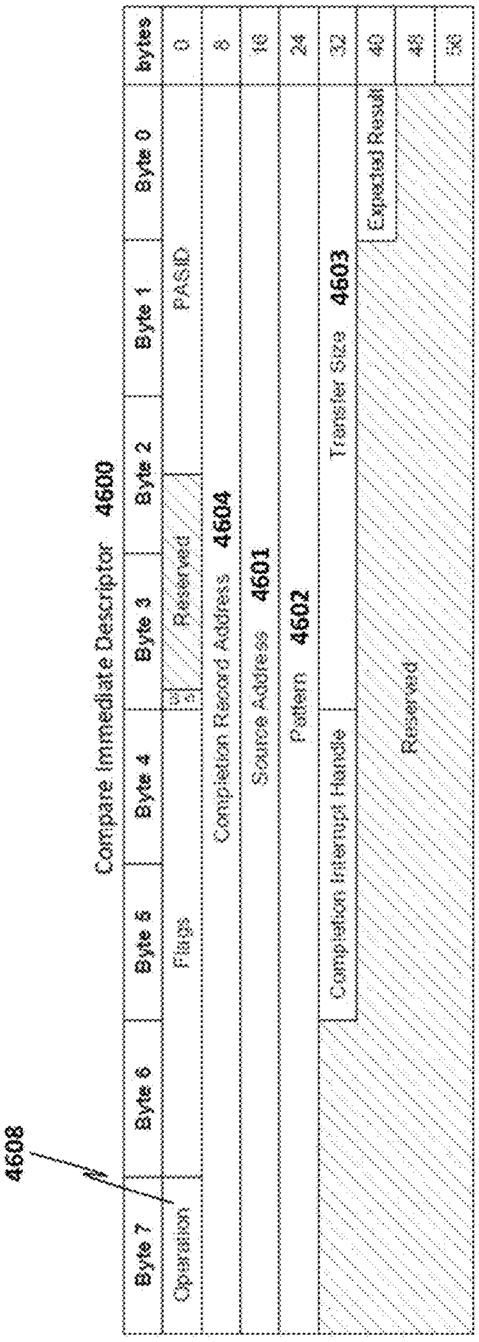
FIG. 46 illustrates an exemplary compare immediate descriptor.

FIG. 46 illustrates an exemplary compare immediate descriptor 4600. The Compare Immediate operation 4608 compares memory at Source Address 4601 with the value in the pattern field 4602. The pattern size is 8 bytes. To use a smaller pattern, software must replicate the pattern in the descriptor. The number of bytes compared is given by Transfer Size 4603. The transfer size does not need to be a multiple of the pattern size. The Completion Record Address Valid and Request Completion Record flags must be 1 and the Completion Record Address 4604 must be valid. The result of the comparison is written to the Result field of the completion record: a value of 0 indicates that the memory region matches the pattern, and a value of 1 indicates that it does not match. If Result is 1, the Bytes Completed field of the completion record indicates the location of the first difference. It may not be the exact byte location, but it is guaranteed to be no greater than the first difference. If the operation is partially completed due to a page fault, the Result is 0. If a difference had been detected, the difference would be reported instead of the page fault. In one implementation, the completion record format for Compare Immediate and the behavior of Check Result and Expected Result are identical to Compare.

Create Delta Record

Figure 47:
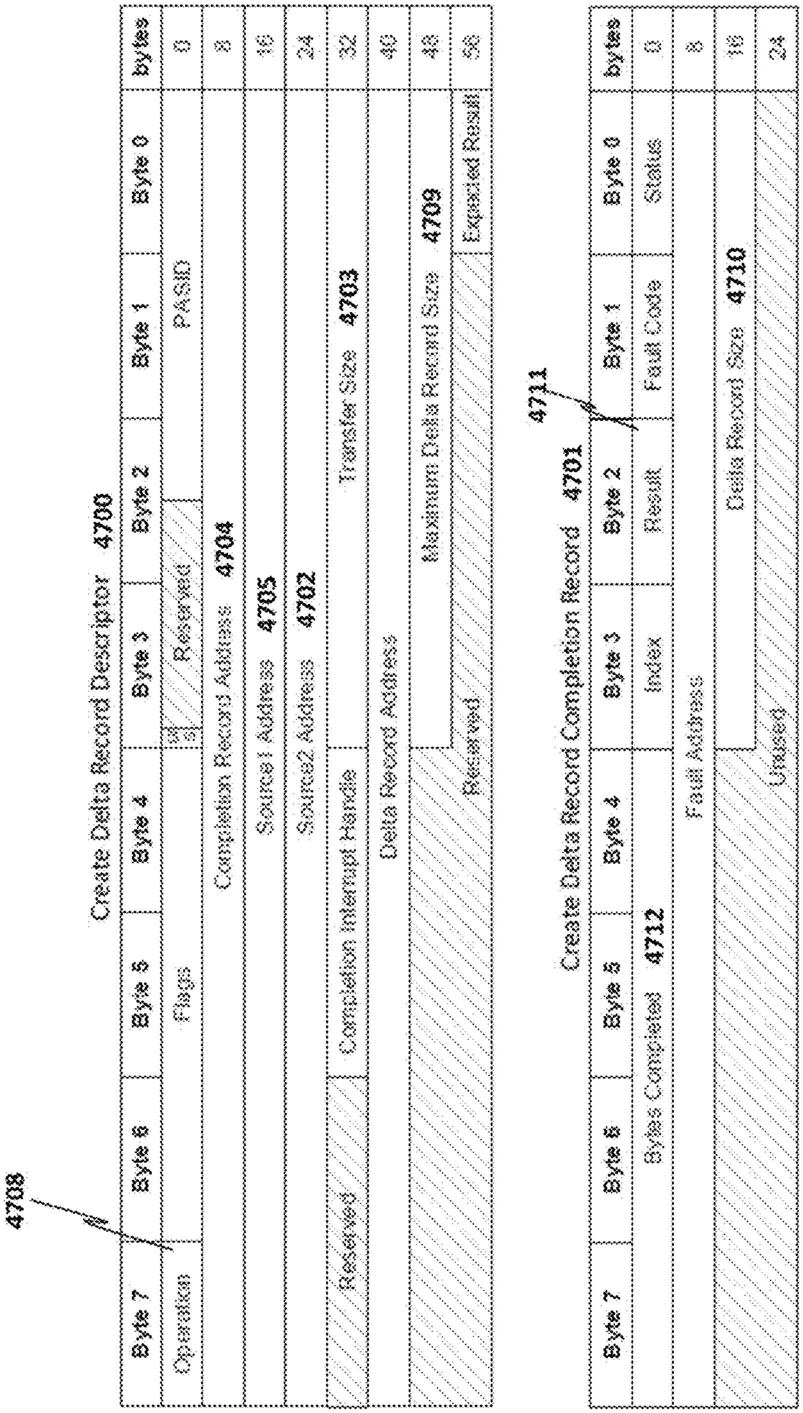
FIG. 47 illustrates an exemplary create data record descriptor and create delta record completion record.

FIG. 47 illustrates an exemplary create data record descriptor 4700 and create delta record completion record 4701. The Create Delta Record operation 4708 compares memory at Source1 Address 4705 with memory at Source2 Address 4702 and generates a delta record that contains the information needed to update source1 to match source2. The number of bytes compared is given by Transfer Size 4703. The transfer size is limited by the maximum offset that can be stored in the delta record, as described below. There are no alignment requirements for the memory addresses or the transfer size. The Completion Record Address Valid and Request Completion Record flags must be 1 and the Completion Record Address 4704 must be valid.

The maximum size of the delta record is given by Maximum Delta Record Size 4709. The maximum delta record size 4709 should be a multiple of the delta size (10 bytes) and must be no greater than the Maximum Transfer Size in GENCAP. The actual size of the delta record depends on the number of differences detected between source1 and source2; it is written to the Delta Record Size field 4710 of the completion record. If the space needed in the delta record exceeds the maximum delta record size 4709 specified in the descriptor, the operation completes with a partial delta record.

The result of the comparison is written to the Result field 4711 of the completion record 4701. If the two regions match exactly, then Result is 0, Delta Record Size is 0, and Bytes Completed is 0. If the two regions do not match, and a complete set of deltas was written to the delta record, then Result is 1, Delta Record Size contains the total size of all the differences found, and Bytes Completed is 0. If the two regions do not match, and the space needed to record all the deltas exceeded the maximum delta record size, then Result is 2, Delta Record Size 4710 contains the size of the set of deltas written to the delta record (typically equal or nearly equal to the Delta Record Size specified in the descriptor), and Bytes Completed 4712 contains the number of bytes compared before space in the delta record was exceeded.

If the operation is partially completed due to a page fault, then Result 4711 is either 0 or 1, as described in the previous paragraph, Bytes Completed 4712 contains the number of bytes compared before the page fault occurred, and Delta Record Size contains the space used in the delta record before the page fault occurred.

Figure 48:
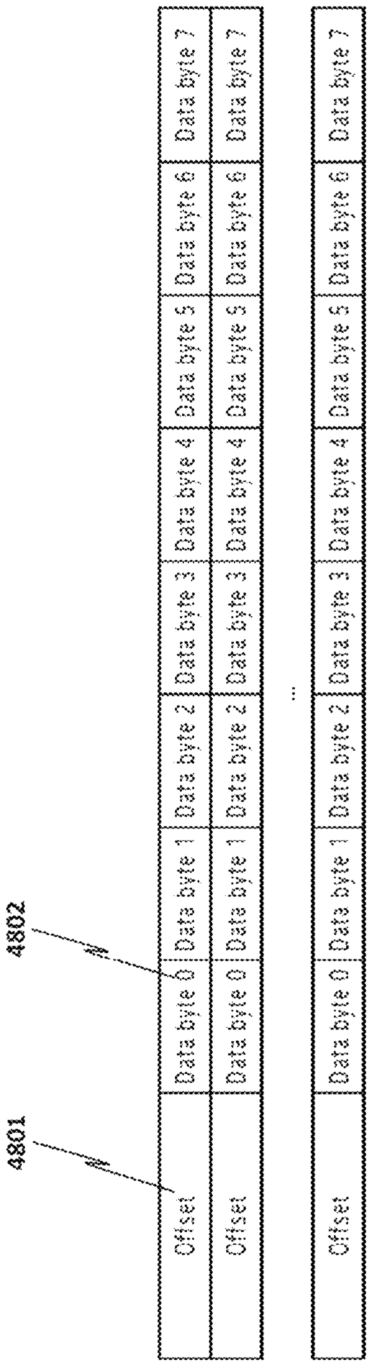
FIG. 48 illustrates a format of the delta record.

The format of the delta record is shown in FIG. 48. The delta record contains an array of deltas. Each delta contains a 2-byte offset 4801 and an 8-byte block of data 4802 from Source2 that is different from the corresponding 8 bytes in Source1. The total size of the delta record is a multiple of 10. Since the offset 4801 is a 16-bit field representing a multiple of 8 bytes, the maximum offset than can be expressed is 0x7FFF8, so the maximum Transfer Size is 0x80000 bytes (512 KB).

If the operation is successful and the Check Result flag is 1, the Status field of the completion record is set according to Result and Expected Result, as shown in the table below. This allows a subsequent descriptor in the same batch with the Fence flag to continue or stop execution of the batch based on the result of the delta record creation. Bits 7:2 of Expected Result are ignored.

TABLE Z

| Check Result flag | Expected Result bit 1:0 | Result | Status |
|---|---|---|---|
| 0 | X | X | Success |
| 1 | 0 | 0 | Success |
| | | 1 | Success with false predicate |
| | | 2 | Success with false predicate |
| | 1 | 0 | Success with false predicate |
| | | 1 | Success |
| | | 2 | Success with false predicate |

TABLE Z-continued

| Check Result flag | Expected Result bit 1:0 | Result | Status |
|---|---|---|---|
| | 2 | 0 | Success |
| | | 1 | Success |
| | | 2 | Success with false predicate |
| | 3 | 0 | Success with false predicate |
| | | 1 | Success |
| | | 2 | |

Apply Delta Record

FIG. 49 illustrates an exemplary apply delta record descriptor 4901. The Apply Delta Record operation 4902 applies a delta record to the contents of memory at Destination Address 4903. Delta Record Address 4904 is the address of a delta record that was created by a Create Delta Record operation 4902 that completed with Result equal to 1. Delta Record Size 4905 is the size of the delta record, as reported in the completion record of the Create Delta Record operation 4902. Destination Address 4903 is the address of a buffer that contains the same contents as the memory at the Source1 Address when the delta record was created. Transfer Size 4906 is the same as the Transfer Size used when the delta record was created. After the Apply Delta Record operation 4902 completes, the memory at Destination Address 4903 will match the contents that were in memory at the Source2 Address when the delta record was created. There are no alignment requirements for the memory addresses or the transfer size.

If a page fault is encountered during the Apply Delta Record operation 4902, the Bytes Completed field of the completion record contains the number of bytes of the delta record that were successfully applied to the destination. If software chooses to submit another descriptor to resume the operation, the continuation descriptor should contain the same Destination Address 4903 as the original. The Delta Record Address 4904 should be increased by Bytes Completed (so it points to the first unapplied delta), and the Delta Record Size 4905 should be reduced by Bytes Completed.

Figure 50:
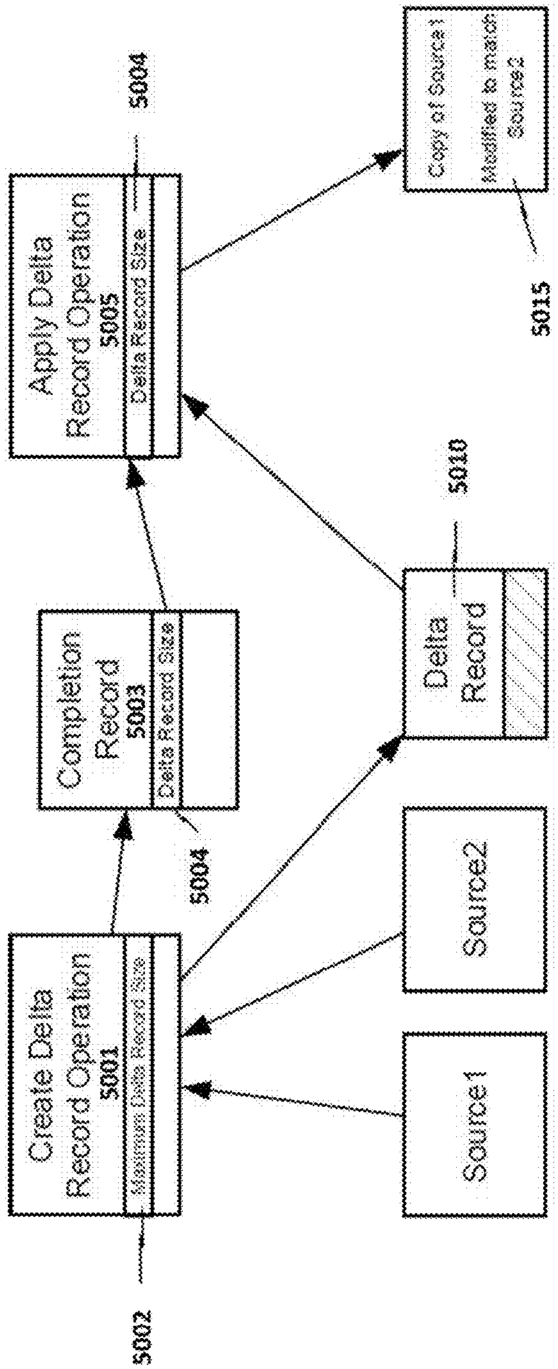
FIG. 50 shows one implementation of the usage of the Create Delta Record and Apply Delta Record operations.

FIG. 50 shows one implementation of the usage of the Create Delta Record and Apply Delta Record operations. First, the Create Delta Record operation 5001 is performed. It reads the two source buffers—Sources 1 and 2—and writes the delta record 5010, recording the actual delta record size 5004 in its completion record 5003. The Apply Delta Record operation 5005 takes the content of the delta record that was written by the Create Delta Record operation 5001, along with its size and a copy of the Source1 data, and updates the destination buffer 5015 to be a duplicate of the original Source2 buffer. The create delta record operation includes a maximum delta record size 5002.

Memory Copy with Dual Cast

FIG. 51 illustrates an exemplary memory copy with dual cast descriptor 5100 and memory copy with dual cast completion record 5102. The Memory Copy with Dual cast operation 5104 copies memory from the Source Address 5105 to both Destination1 Address 5106 and Destination2 Address 5107. The number of bytes copied is given by Transfer Size 5108. There are no alignment requirements for the source address or the transfer size. Bits 11:0 of the two destination addresses 5106-5107 should be the same.

If the source region overlaps with either of the destination regions, the memory copy is done as if the entire source buffer is copied to temporary space and then copied to the destination buffers. This may be implemented by reversing the direction of the copy when the beginning of a destination buffer overlaps the end of the source buffer. If the source region overlaps with both of the destination regions or if the two destination regions overlap, it is an error. If the operation is partially completed due to a page fault, the copy operation stops after having written the same number of bytes to both destination regions and the Direction field 5110 of the completion record is 0 if the copy was performed starting at the beginning of the source and destination buffers, and the Direction field is 1 if the direction of the copy was reversed.

To resume the operation after a partial completion, if Direction 5110 is 0, the Source 5105 and both Destination Address fields 5106-5107 in the continuation descriptor should be increased by Bytes Completed 5111, and the Transfer Size 5108 should be decreased by Bytes Completed 5111. If Direction is 1, the Transfer Size 5108 should be decreased by Bytes Completed 5111, but the Source 5105 and Destination 5106-5107 Address fields should be the same as in the original descriptor. Note that if a subsequent partial completion occurs, the Direction field 5110 may not be the same as it was for the first partial completion.

Cyclic Redundancy Check (CRC) Generation

Figure 52:
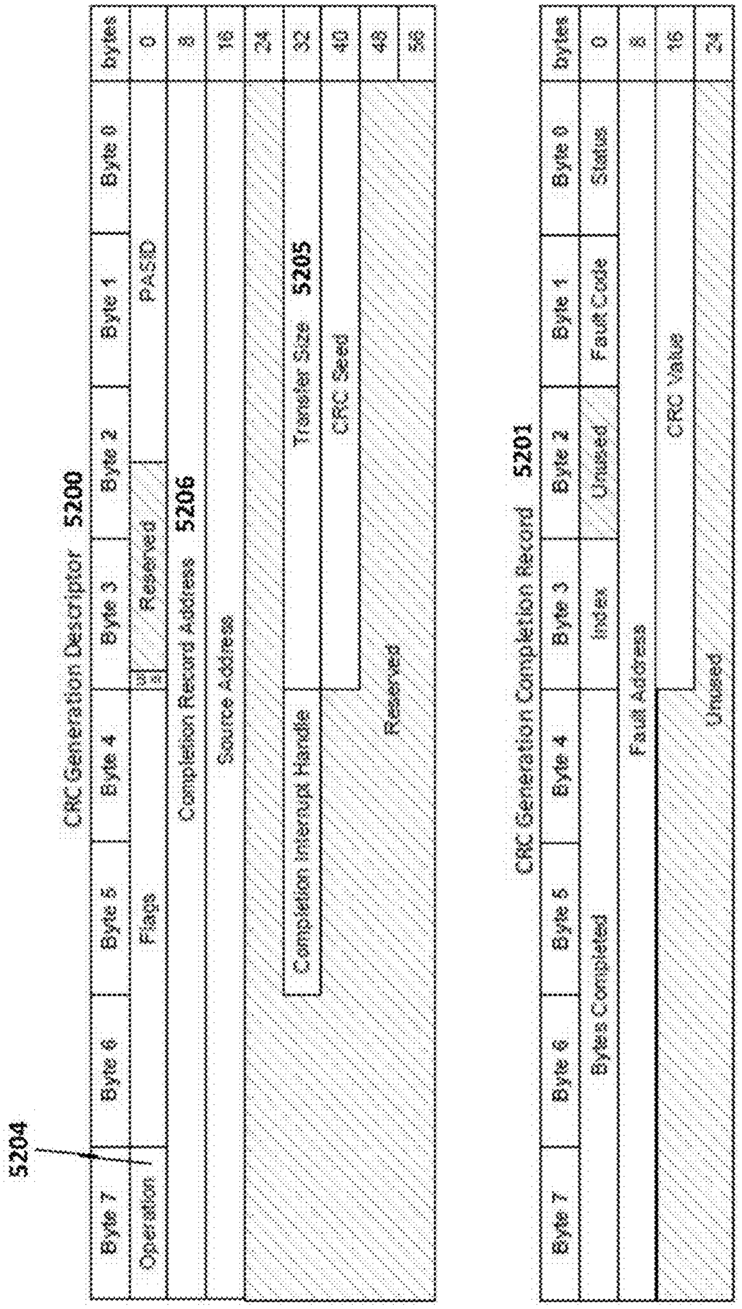
FIG. 52 illustrates an exemplary CRC generation descriptor and CRC generation completion record.

FIG. 52 illustrates an exemplary CRC generation descriptor 5200 and CRC generation completion record 5201. The CRC Generation operation 5204 computes the CRC on memory at the Source Address. The number of bytes used for the CRC computation is given by Transfer Size 5205. There are no alignment requirements for the memory addresses or the transfer size 5205. The Completion Record Address Valid and Request Completion Record flags must be 1 and the Completion Record Address 5206 must be valid. The computed CRC value is written to the completion record.

If the operation is partially completed due to a page fault, the partial CRC result is written to the completion record along with the page fault information. If software corrects the fault and resumes the operation, it must copy this partial result into the CRC Seed field of the continuation descriptor. Otherwise, the CRC Seed field should be 0.

Copy with CRC Generation

FIG. 53 illustrates an exemplary copy with CRC generation descriptor 5300. The Copy with CRC Generation operation 5305 copies memory from the Source Address 5302 to the Destination Address 5303 and computes the CRC on the data copied. The number of bytes copied is given by Transfer Size 5304. There are no alignment requirements for the memory addresses or the transfer size. If the source and destination regions overlap, it is an error. The Completion Record Address Valid and Request Completion Record flags must be 1 and the Completion Record Address must be valid. The computed CRC value is written to the completion record.

If the operation is partially completed due to a page fault, the partial CRC result is written to the completion record along with the page fault information. If software corrects the fault and resumes the operation, it must copy this partial result into the CRC Seed field of the continuation descriptor. Otherwise, the CRC Seed field should be 0. In one implementation, the completion record format for Copy with CRC Generation is the same as the format for CRC Generation.

Data Integrity Field (DIF) Insert

Figure 54:
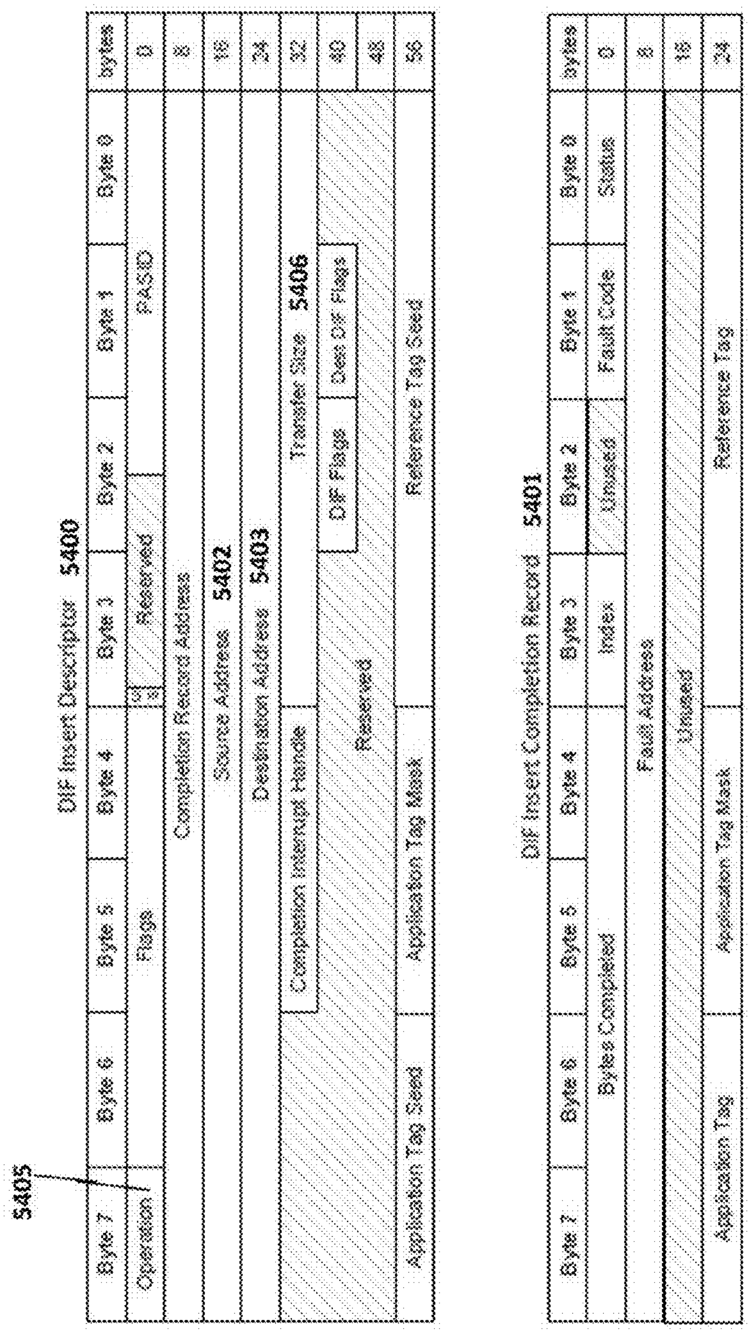
FIG. 54 illustrates an exemplary DIF insert descriptor and DIF insert completion record.

FIG. 54 illustrates an exemplary DIF insert descriptor 5400 and DIF insert completion record 5401. The DIF Insert operation 5405 copies memory from the Source Address 5402 to the Destination Address 5403, computes the Data Integrity Field (DIF) on the source data and inserts the DIF into the output data. The number of source bytes copied is given by Transfer Size 5406. DIF computation is performed on each block of source data that is, for example, 512, 520, 4096, or 4104 bytes. The transfer size should be a multiple of the source block size. The number of bytes written to the destination is the transfer size plus 8 bytes for each source block. There is no alignment requirement for the memory addresses. If the source and destination regions overlap, it is an error. If the operation is partially completed due to a page fault, updated values of Reference Tag and Application Tag are written to the completion record along with the page fault information. If software corrects the fault and resumes the operation, it may copy these fields into the continuation descriptor.

DIF Strip

Figure 55:
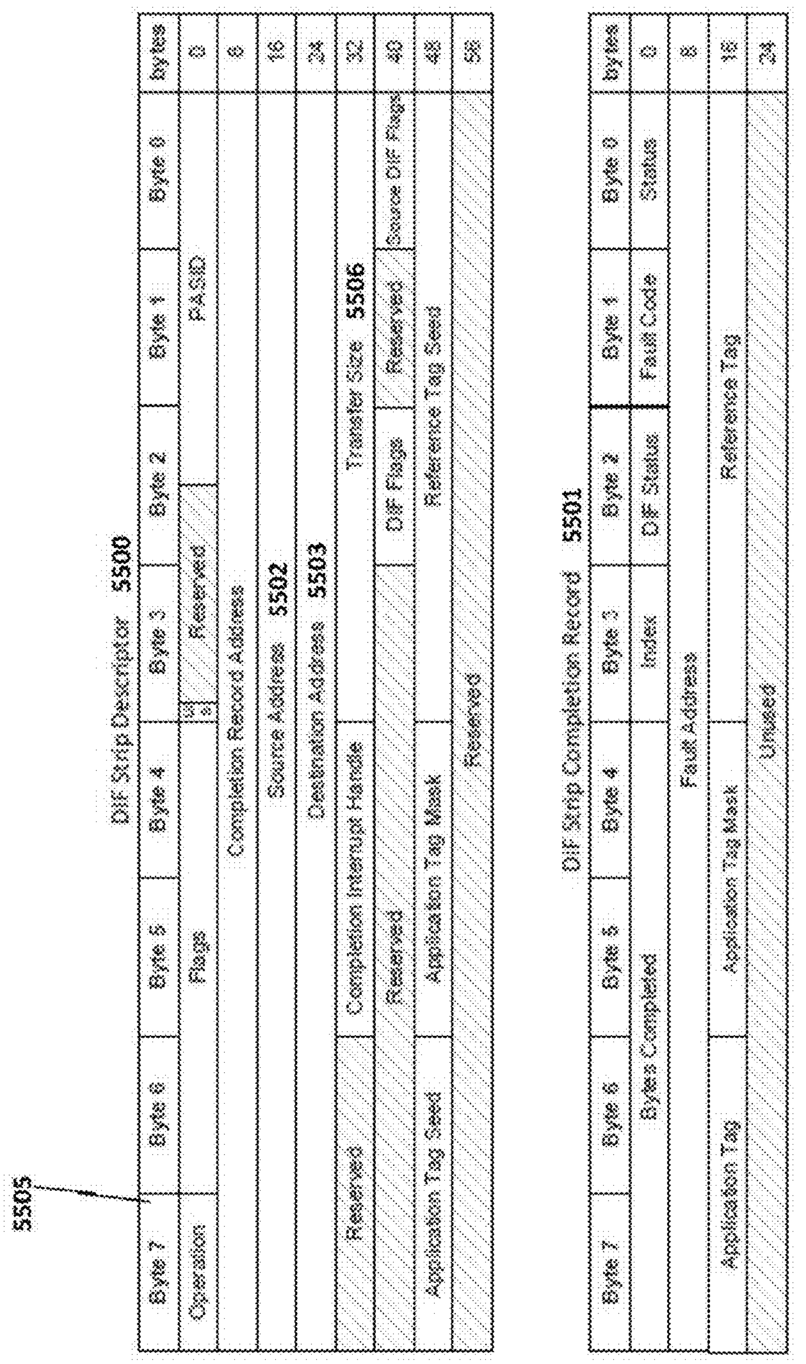
FIG. 55 illustrates an exemplary DIF strip descriptor and DIF strip completion record.

FIG. 55 illustrates an exemplary DIF strip descriptor 5500 and DIF strip completion record 5501. The DIF Strip operation 5505 copies memory from the Source Address 5502 to the Destination Address 5503, computes the Data Integrity Field (DIF) on the source data and compares the computed DIF to the DIF contained in the data. The number of source bytes read is given by Transfer Size 5506. DIF computation is performed on each block of source data that may be 512, 520, 4096, or 4104 bytes. The transfer size should be a multiple of the source block size plus 8 bytes for each source block. The number of bytes written to the destination is the transfer size minus 8 bytes for each source block. There is no alignment requirement for the memory addresses. If the source and destination regions overlap, it is an error. If the operation is partially completed due to a page fault, updated values of Reference Tag and Application Tag are written to the completion record along with the page fault information. If software corrects the fault and resumes the operation, it may copy these fields into the continuation descriptor.

DIF Update

FIG. 56 illustrates an exemplary DIF update descriptor 5600 and DIF update completion record 5601. The Memory Move with DIF Update operation 5605 copies memory from the Source Address 5602 to the Destination Address 5603, computes the Data Integrity Field (DIF) on the source data and compares the computed DIF to the DIF contained in the data. It simultaneously computes the DIF on the source data using Destination DIF fields in the descriptor and inserts the computed DIF into the output data. The number of source bytes read is given by Transfer Size 5606. DIF computation is performed on each block of source data that may be 512, 520, 4096, or 4104 bytes. The transfer size 5606 should be a multiple of the source block size plus 8 bytes for each source block. The number of bytes written to the destination is the same as the transfer size 5606. There is no alignment requirement for the memory addresses. If the source and destination regions overlap, it is an error. If the operation is partially completed due to a page fault, updated values of the source and destination Reference Tags and Application Tags are written to the completion record along with the page fault information. If software corrects the fault and resumes the operation, it may copy these fields into the continuation descriptor.

Table AA below illustrates DIF Flags used in one implementation. Table BB illustrates Source DIF Flags used in one implementation, and Table CC illustrates Destination DIF flags in one implementation.

TABLE AA (DIF Flags)

| Bits | Description |
|---|---|
| 7:2 | Reserved. |
| 1:0 | DIF Block Size<br>00b: 512<br>bytes<br>01b: 520 bytes<br>10b: 4096 bytes<br>11b: 4104 bytes |

Source DIF Flags

TABLE BB (Source DIF Flags)

| Bits | Description |
|---|---|
| 7 | Source Reference Tag Type<br>This field denotes the type of operation to perform on the source DIF Reference Tag. 0: Incrementing<br>1: Fixed |
| 6 | Reference Tag Check Disable<br>0: Enable Reference Tag field checking 1: Disable Reference Tag field checking |
| 5 | Guard Check Disable<br>0: Enable Guard field checking 1: Disable Guard field checking |
| 4 | Source Application Tag Type<br>This field denotes the type of operation to perform on the source DIF Application Tag. 0: Fixed<br>1: Incrementing<br>Note that the meaning of the Application Tag Type is reversed compared to the Reference Tag Type. The default typically used in storage systems is for the Application Tag to be fixed and the Reference Tag to be incrementing. |
| 3 | Application and Reference Tag F Detect<br>0: Disable F Detect for Application Tag and Reference Tag fields<br>1: Enable F Detect for Application Tag and Reference Tag fields. When all bits of both the Application Tag and Reference Tag fields are equal to 1, the Application Tag and Reference Tag checks are not done and the Guard field is ignored. |

TABLE BB-continued

| (Source DIF Flags) | |
|---|---|
| Bits | Description |
| 2 | Application Tag F Detect<br>0: Disable F Detect for the Application Tag field<br>1: Enable F Detect for the Application Tag field. When all bits of the Application Tag field of the source Data Integrity Field are equal to 1, the Application Tag check is not done and the Guard field and Reference Tag field are ignored. |
| 1 | All F Detect<br>0: Disable All F Detect<br>1: Enable All F Detect. When all bits of the Application Tag, Reference Tag, and Guard fields are equal to 1, no checks are performed on these fields. (The All F Detect Status is reported, if enabled.) |
| 0 | Enable All F Detect Error<br>0: Disable All F Detect Error.<br>1: Enable All F Detect Error. When all bits of the Application Tag, Reference Tag, and Guard fields are equal to 1, All F Detect Error is reported in the DIF Result field of the Completion Record.<br>If All F Detect flag is 0, this flag is ignored. |

Destination DIF Flags

TABLE CC

| (Destination DIF Flags) | |
|---|---|
| Bits | Description |
| 7 | Destination Reference Tag Type<br>This field denotes the type of operation to perform on the destination DIF Reference Tag. 0: Incrementing<br>1: Fixed |
| 6 | Reference Tag Pass-through<br>0: The Reference Tag field written to the destination is determined based on the Destination Reference Tag Seed and Destination Reference Tag Type fields of the descriptor.<br>1: The Reference Tag field from the source is copied to the destination. The Destination Reference Tag Seed and Destination Reference Tag Type fields of the descriptor are ignored.<br>This field is ignored for the DIF Insert and DIF Strip operations. |
| 5 | Guard Field Pass-through<br>0: The Guard field written to the destination is computed from the source data.<br>1: The Guard field from the source is copied to the destination.<br>This field is ignored for the DIF Insert and DIF Strip operations. |
| 4 | Destination Application Tag Type<br>This field denotes the type of operation to perform on the destination DIF Application Tag. 0: Fixed<br>1: Incrementing<br>Note that the meaning of the Application Tag Type is reversed compared to the Reference Tag Type. The default typically used in storage systems is for the Application Tag to be fixed and the Reference Tag to be incrementing. |
| 3 | Application Tag Pass-through<br>0: The Application Tag field written to the destination is determined based on the Destination Application Tag Seed, Destination Application Tag Mask, and Destination Application Tag Type fields of the descriptor.<br>1: The Application Tag field from the source is copied to the destination. The Destination Application Tag Seed, Destination Application Tag Mask, and Destination Application Tag Type fields of the descriptor are ignored.<br>This field is ignored for the DIF Insert and DIF Strip operations. |
| 2:0 | Reserved |

In one implementation, a DIF Result field reports the status of a DIF operation. This field may be defined only for DIF Strip and DIF Update operations and only if the Status field of the Completion Record is Success or Success with false predicate. Table DD below illustrates exemplary DIF result field codes.

TABLE DD

| (DIF Result field codes) | |
|---|---|
| 0x00 | Not used |
| 0x01 | No error |

TABLE DD-continued

| (DIF Result field codes) | |
|---|---|
| 0x02 | Guard mismatch. This value is reported under the following condition: Guard Check Disable is 0;<br>F Detect condition is not detected; and<br>The guard value computed from the source data does not match the Guard field in the source Data Integrity Field. |
| 0x03 | Application Tag mismatch. This value is reported under the following condition:<br>Source Application Tag Mask is not equal to 0xFFFF;<br>F Detect condition is not detected; and |

TABLE DD-continued

| (DIF Result field codes) | |
|---|---|
| | The computed Application Tag value does not match the Application Tag field in the source Data Integrity Field. |
| 0x04 | Reference Tag mismatch. This value is reported under the following condition: Reference Tag Check Disable is 0. F Detect condition is not detected; and The computed Application Tag value does not match the Application Tag field in the source Data Integrity Field. |
| 0x05 | All F Detect Error. This value is reported under the following condition: All F Detect is 1; Enable All F Detect Error is 1; All bits of the Application Tag, Reference Tag, and Guard fields of the source Data Integrity Field are equal to 1 |

F Detect condition is detected when one of the following shown in Table EE is true:

TABLE EE

| | |
|---|---|
| All F Detect = 1 | All bits of the Application Tag, Reference Tag, and Guard fields of the source Data Integrity Field are equal to 1 |
| Application Tag F Detect = 1 | All bits of the Application Tag field of the source Data Integrity Field are equal to 1 |
| Application and Reference Tag F Detect = 1 | All bits of both the Application Tag and Reference Tag fields of the source Data Integrity Field are equal to 1 |

If the operation is successful and the Check Result flag is 1, the Status field of the completion record is set according to DIF Result, as shown in Table FF below. This allows a subsequent descriptor in the same batch with the Fence flag to continue or stop execution of the batch based on the result of the operation.

TABLE FF

| Check Result flag | DIF Result | Status |
|---|---|---|
| 0 | X | Success |
| 1 | =0x01 | Success |
| 1 | ≠0x01 | Success with false predicate |

Cache Flush

Figure 57:
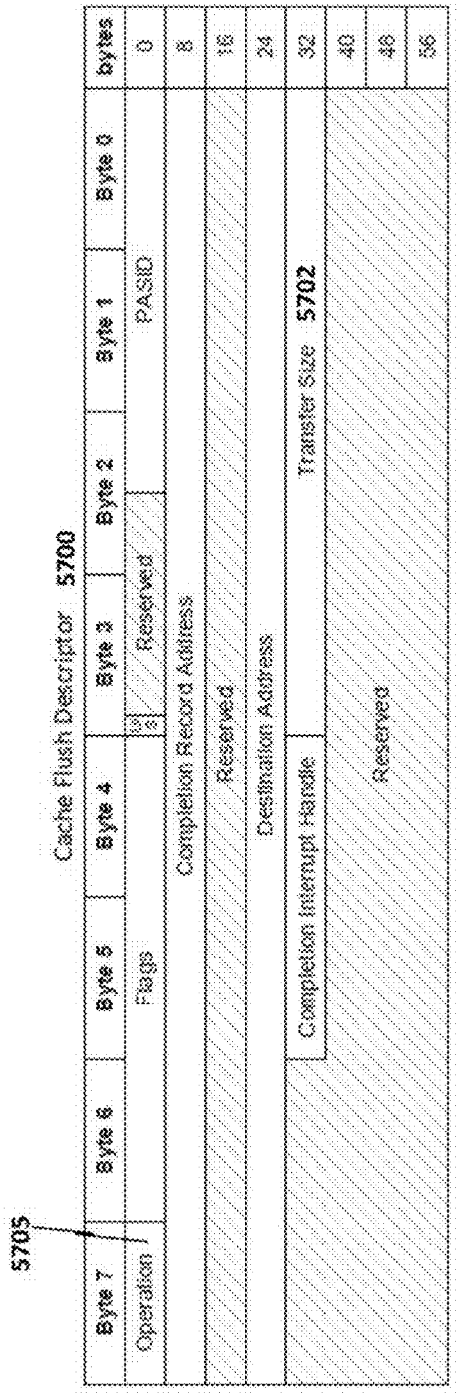
FIG. 57 illustrates an exemplary cache flush descriptor.

FIG. 57 illustrates an exemplary cache flush descriptor 5700. The Cache Flush operation 5705 flushes the processor caches at the Destination Address. The number of bytes flushed is given by Transfer Size 5702. The transfer size does not need to be a multiple of the cache line size. There are no alignment requirements for the destination address or the transfer size. Any cache line that is partially covered by the destination region is flushed.

If the Destination Cache Fill flag is 0, affected cache lines may be invalidated from every level of the cache hierarchy. If a cache line contains modified data at any level of the cache hierarchy, the data is written back to memory. This is similar to the behavior of the CLFLUSH instruction implemented in some processors.

If the Destination Cache Fill flag is 1, modified cache lines are written to main memory, but are not evicted from the caches. This is similar to the behavior of the CLWB instruction in some processors.

The term accelerators are sometimes used herein to refer to loosely coupled agents that may be used by software running on host processors to offload or perform any kind of compute or I/O task. Depending on the type of accelerator and usage model, these could be tasks that perform data movement to memory or storage, computation, communication, or any combination of these.

"Loosely coupled" refers to how these accelerators are exposed and accessed by host software. Specifically, these are not exposed as processor ISA extensions, and instead are exposed as PCI-Express enumerable endpoint devices on the platform. The loose coupling allows these agents to accept work requests from host software and operate asynchronously to the host processor.

"Accelerators" can be programmable agents (such as a GPU/GPGPU), fixed-function agents (such as compression or cryptography engines), or re-configurable agents such as a field programmable gate array (FPGA). Some of these may be used for computation offload, while others (such as RDMA or host fabric interfaces) may be used for packet processing, communication, storage, or message-passing operations.

Accelerator devices may be physically integrated at different levels including on-die (i.e., the same die as the processor), on-package, on chipset, on motherboard; or can be discrete PCIe attached devices. For integrated accelerators, even though enumerated as PCI-Express endpoint devices, some of these accelerators may be attached coherently (to on-die coherent fabric or to external coherent interfaces), while others may be attached to internal non-coherent interfaces, or external PCI-Express interface.

At a conceptual level, an "accelerator," and a high-performance I/O device controller are similar. What distinguishes them are capabilities such as unified/shared virtual memory, the ability to operate on pageable memory, user-mode work submission, task scheduling/pre-emption, and support for low-latency synchronization. As such, accelerators may be viewed as a new and improved category of high performance I/O devices.

Offload Processing Models

Accelerator offload processing models can be broadly classified into three usage categories:

1. Streaming: In streaming offload model, small units of work are streamed at a high rate to the accelerator. A typical example of this usage is a network dataplane performing various types of packet processing at high rates.
2. Low Latency: For some offload usages, the latency of the offload operation (both dispatching of the task to the accelerator and the accelerator acting on it) is critical. An example of this usage is low-latency message-passing constructs including remote get, put and atomic operations across a host fabric.
3. Scalable: Scalable offload refers to usages where a compute accelerator's services are directly (e.g., from the highest ring in the hierarchical protection domain such as ring-3) accessible to a large (unbounded) number of client applications (within and across virtual machines), without constraints imposed by the accelerator device such as number of work-queues or number of doorbells supported on the device. Several of the accelerator devices and processor interconnects described herein fall within this category. Such scalability applies to compute offload devices that support time-sharing/scheduling of work such as GPU, GPGPU, FPGA or compression accelerators, or message-passing usages such as for enterprise databases with large scalability requirements for lock-less operation.

Work Dispatch Across Offload Models

Each of the above offload processing models imposes its own work-dispatch challenges as described below.

1. Work Dispatch for Streaming Offload Usages

For streaming usages, a typical work-dispatch model is to use memory-resident work-queues. Specifically, the device is configured the location and size of the work-queue in memory. Hardware implements a doorbell (tail pointer) register that is updated by software when adding new work-elements to the work-queue. Hardware reports the current head pointer for software to enforce the producer-consumer flow-control on the work-queue elements. For the streaming usages, the typical model is for software to check if there is space in the work-queue by consulting the head pointer (often maintained in host memory by hardware to avoid overheads of UC MMIO reads by software) and the tail pointer cached in software, and add new work elements to the memory-resident work-queue and update the tail pointer using a doorbell register write to the device.

The doorbell write is typically a 4-byte or 8-byte uncacheable (UC) write to MMIO. On some processors, UC write is a serialized operation that ensures older stores are globally observed before issuing the UC write (needed for producer-consumer usages), but also blocks all younger stores in the processor pipeline from getting issued until the UC write is posted by the platform. The typical latency for a UC write operation on a Xeon server processor is in the order of 80-100 nsecs, during which time all younger store operations are blocked by the core, limiting streaming offload performance.

While one approach to address the serialization of younger stores following a UC doorbell write is to use a write combining (WC) store operation for doorbell write (due to WC weak ordering), using WC stores for doorbell writes imposes some challenges: The doorbell write size (typically DWORD or QWORD) is less than cache-line size. These partial writes incur additional latency due to the processor holding them in its write-combining buffers (WCB) for potential write-combing opportunity, incurring latency for the doorbell write to be issued from the processor. Software can force them to be issued through explicit store fence, incurring the same serialization for younger stores as with UC doorbell.

Another issue with WC-mapped MMIO is the exposure of miss-predicted and speculative reads (with MOVNTDQA) to WC-mapped MMIO (with registers that may have read side-effects). Addressing this is cumbersome for devices as it would require the devices to host the WC-mapped doorbell registers in separate pages than rest of the UC-mapped MMIO registers. This also imposes challenges in virtualized usages, where the VMM software can no-longer ignore guest-memory type and force UC mapping for any device MMIO exposed to the guest using EPT page-tables.

The MOVDIRI instruction described herein addresses above limitations with using UC or WC stores for doorbell writes with these streaming offload usages.

2. Work Dispatch for Low Latency Offload Usages

Some types of accelerator devices are highly optimized for completing the requested operation at minimal latency. Unlike streaming accelerators (which are optimized for throughput), these accelerators commonly implement device-hosted work-queues (exposed through device MMIO) to avoid the DMA read latencies for fetching work-elements (and in some cases even data buffers) from memory-hosted work-queues. Instead, host software submits work by directly writing work descriptors (and in some cases also data) to device-hosted work-queues exposed through device MMIO. Examples of such devices include host fabric controllers, remote DMA (RDMA) devices, and new storage controllers such as Non-Volatile Memory (NVM)-Express. The device-hosted work-queue usage incurs few challenges with an existing ISA.

To avoid serialization overheads of UC writes, the MMIO addresses of the device-hosted work-queues are typically mapped as WC. This exposes the same challenges as with WC-mapped doorbells for streaming accelerators.

In addition, using WC stores to device-hosted work-queues requires devices to guard against the write-atomicity behavior of some processors. For example, some processors only guarantee write operation atomicity up to 8-byte sized writes within a cacheline boundary (and for LOCK operations) and does not define any guaranteed write completion atomicity. Write operation atomicity is the granularity at which a processor store operation is observed by other agents, and is a property of the processor instruction set architecture and the coherency protocols. Write completion atomicity is the granularity at which a non-cacheable store operation is observed by the receiver (memory-controller in case of memory, or device in case of MMIO). Write completion atomicity is stronger than write operation atomicity, and is a function of not only processor instruction set architecture, but also of the platform. Without write completion atomicity, a processor instruction performing non-cacheable store operation of N-bytes can be received as multiple (torn) write transactions by the device-hosted work-queue. Currently the device hardware needs to guard against such torn-writes by tracking each word of the work-descriptor or data written to the device-hosted work-queue.

The MOVDIR64B instruction described herein addresses the above limitations by supporting 64-byte writes with guaranteed 64-byte write completion atomicity. MOVDIR64B is also useful for other usages such as writes to persistent memory (NVM attached to memory controller) and data replication across systems through Non-Transparent Bridges (NTB).

3. Work Dispatch for Scalable Offload Usages

The traditional approach for submitting work to I/O devices from applications involves making system calls to the kernel I/O stack that routes the request through kernel device drivers to the I/O controller device. While this approach is scalable (any number of applications can share services of the device), it incurs the latency and overheads of a serialized kernel I/O stack which is often a performance bottleneck for high-performance devices and accelerators.

To support low overhead work dispatch, some high-performance devices support direct ring-3 access to allow direct work dispatch to the device and to check for work completions. In this model, some resources of the device (doorbell, work-queue, completion-queue, etc.) are allocated and mapped to the application virtual address space. Once mapped, ring-3 software (e.g., a user-mode driver or library) can directly dispatch work to the accelerator. For devices supporting the Shared Virtual Memory (SVM) capability, the doorbell and work-queues are set up by the kernel-mode driver to identify the Process Address Space Identifier (PASID) of the application process to which the doorbell and work-queue is mapped. When processing a work item dispatched through a particular work-queue, the device uses the respective PASID configured for that work-queue for virtual to physical address translations through the I/O Memory Management Unit (IOMMU).

One of the challenges with direct ring-3 work submission is the issue of scalability. The number of application clients that can submit work directly to an accelerator device depends on the number of queues/doorbells (or device-hosted work-queues) supported by the accelerator device. This is because a doorbell or device-hosted work-queue is statically allocated/mapped to an application client, and there is a fixed number of these resources supported by the accelerator device design. Some accelerator devices attempt to 'work around' this scalability challenge by over-committing the doorbell resources they have (by dynamically detaching and re-attaching doorbells on demand for an application) but are often cumbersome and difficult to scale. With devices that support I/O virtualization (such as Single Root I/O Virtualization (SR-IOV)), the limited doorbell/work-queue resources are further constrained as these need to be partitioned across different Virtual Functions (VFs) assigned to different virtual machines.

The scaling issue is most critical for high-performance message passing accelerators (with some of the RDMA devices supporting 64K to 1M queue-pairs) used by enterprise applications such as databases for lock-free operation, and for compute accelerators that support sharing of the accelerator resources across tasks submitted from a large number of clients.

The ENQCMD/S instructions described herein address the above scaling limitations to enable an unbounded number of clients to subscribe and share work-queue resources on an accelerator.

One implementation includes new types of store operations by processor cores including direct stores and enqueue stores.

In one implementation, direct stores are generated by the MOVDIRI and MOVDIR64B instructions described herein.

Cacheability: Similar to UC and WC stores, direct stores are non-cacheable. If a direct store is issued to an address that is cached, the line is written-back (if modified) and invalidated from the cache, before the direct store.

Memory Ordering: Similar to WC stores, direct stores are weakly ordered.

Specifically, they are not ordered against older WB/WC/NT stores, CLFLUSHOPT and CLWB to different addresses. Younger WB/WC/NT stores, CLFLUSHOPT, or CLWB to different addresses can pass older direct stores. Direct stores to the same address are always ordered with older stores (including direct stores) to the same address. Direct stores are fenced by any operation that enforces store fencing (E.G., SFENCE, MFENCE, UC/WP/WT stores, LOCK, IN/OUT instructions, etc.).

Write Combining: Direct stores have different write-combining behavior than normal WC stores. Specifically, direct stores are eligible for immediate eviction from the write-combing buffer, and thus are not combined with younger stores (including direct stores) to the same address. Older WC/NT stores held in the write combining buffers may be combined with younger direct stores to the same address, and usages that needs to avoid such combining must explicitly store fence WC/NT stores before executing direct stores to the same address.

Atomicity: Direct stores support write completion atomicity for the write size of the instruction issuing the direct store. In case of MOVDIRI, when the destination is 4-byte aligned (or 8-byte aligned the write completion atomicity is 4-bytes (or 8-bytes). For MOVDIR64B, the destination is enforced to be 64-byte aligned and the write-completion atomicity is 64-bytes. Write completion atomicity guarantees that direct stores are not torn into multiple write transactions as processed by the memory controller or root-complex. Root-complex implementations on processors supporting direct stores guarantee that direct stores are forwarded on external PCI-Express fabric (and internal I/O fabrics within the SoC that follows PCI-Express ordering) as single non-torn posted write transaction. A read operation from any agent (processor or non-processor agent) to a memory location will either see all or none of the data written by an instruction issuing a direct store operation.

Ignore destination memory type: Direct stores ignore the destination address memory type (including UC/WP types) and always follow weak ordering. This enables software to map device MMIO as UC, and access specific registers (such as doorbell or device-hosted work-queue registers) using direct-store instructions (MOVDIRI or MOVDIR64B), while continuing to access other registers that may have strict serializing requirement using normal MOV operations that follow UC ordering per the mapped UC memory-type. This also enables direct store instructions to operate from within guest software, while virtual machine monitor (VMM) software (that does not have device-specific knowledge) maps guest exposed MMIO as UC in processor Extended Page Tables (EPT), ignoring guest memory type.

SoCs supporting direct stores need to ensure write completion atomicity for direct stores as follows:

Direct Stores to main memory: For direct stores to main memory, the coherent fabric and system agent should ensure that all data bytes in a direct store are issued to the home agent or other global observability (GO) point for requests to memory as a single (non-torn) write transaction. For platforms supporting persistent memory, home agents, memory controllers, memory-side-caches, in-line memory encryption engines, memory buses (such as DDR-T) attaching persistent memory, and the persistent memory controllers themselves must support the same or higher granularity of write completion atomicity for direct stores. Thus, software can perform a direct store of 64-bytes using MOVDIR64B to memory (volatile or persistent), and be guaranteed that all 64-bytes of write will be processed atomically by all agents. As with normal writes to persistent memory, if software needs to explicitly commit to persistence, software follows the direct store with fence/commit/fence sequence.

Direct Stores to Memory Mapped I/O: For direct stores to memory-mapped I/O (MMIO), the coherent fabric and system agent must ensure that all data bytes in a direct store is issued to the root-complex (Global Observability point for requests to MMIO) as a single (non-torn) write transaction. Root-complex implementations must ensure that each direct store is processed and forwarded as a single (non-torn) posted write transaction on internal I/O fabrics attaching PCI-Express Root Complex Integrated Endpoints (RCIEPs) and Root Ports (RPs). PCI-Express root ports and switch ports must forward each direct store as a single posted write transaction. Write completion atomicity is not defined or guaranteed for direct stores targeting devices on or behind secondary bridges (such as legacy PCI, PCI-X bridges) or secondary buses (such as USB, LPC, etc.).

Note that some SoC implementations already guarantee write completion atomicity for WC write requests. Specifically, partial-line WC writes (WCiL) and full-line WC writes (WCiLF) are already processed with write completion atomicity by the system agent, memory controllers, root-complex, and I/O fabrics. For such implementations, there is no need for the processor to distinguish direct writes from WC writes, and the behavior difference between direct stores and WC stores are internal to the processor core. Thus no changes are proposed to internal or external fabric specifications for direct writes.

Handling of a direct write received by a PCI-Express endpoint or RCIEP is device implementation specific. Depending on the programming interface of the device, the device and its driver may require some of its registers (e.g., doorbell registers or device-hosted work-queue registers) to be always written using direct store instructions (such as MOVDIR64B) and process them atomically within the device. Writes to other registers on the device may be processed by the device without any atomicity consideration or expectation. For RCIEPs, if a register with write atomicity requirement is implemented for access through sideband or private wire interfaces, such implementations must ensure the write atomicity property through implementation-specific means.

Enqueue stores in one implementation are generated by the ENQCMD and ENQCMDS instructions described herein. The intended target of an enqueue store is a Shared Work Queue (SWQ) on an accelerator device. In one implementation, enqueue-stores have the following properties.

Non-posted: Enqueue stores generate a 64-byte non-posted write transaction to the target address, and receive a completion response indicating Success or Retry status. The Success/Retry status returned in the completion response may be returned to software by the ENQCMD/S instruction (e.g., in the zero flag).

Cacheability: In one implementation, enqueue-stores are not cacheable. Platforms supporting enqueue stores enforce that enqueue non-posted writes are routed only to address (MMIO) ranges that are explicitly enabled to accept these stores.

Memory Ordering: Enqueue-stores may update architectural state (e.g., zero flag) with the non-posted write completion status. Thus at most one Enqueue-store can be outstanding from a given logical processor. In that sense, an Enqueue-store from a logical processor cannot pass another Enqueue-store issued from the same logical processor. Enqueue-stores are not ordered against older WB/WC/NT stores, CLFLUSHOPT or CLWB to different addresses. Software that needs to enforce such ordering may use explicit store fencing after such stores and before the Enqueue-store. Enqueue-stores are always ordered with older stores to the same address.

Alignment: The ENQCMD/S instructions enforce that the Enqueue-store destination address is 64-byte aligned.

Atomicity: Enqueue-stores generated by ENQCMD/S instructions support 64-byte write completion atomicity. Write completion atomicity guarantees that Enqueue-stores are not torn into multiple transactions as processed by the root-complex. Root-complex implementations on processors supporting Enqueue-stores guarantee that each Enqueue store is forwarded as a single (non-torn) 64-byte non-posted write transaction to the endpoint device.

Ignore destination memory type: Similar to Direct stores, Enqueue stores ignore the destination address memory type (including UC/WP types) and always follow ordering as described above. This enables software to continue to map device MMIO as UC, and access the Shared-Work-Queue (SWQ) registers using ENQCMD/S instructions, while continuing to access other registers using normal MOV instructions or through Direct-store (MOVDIRI or MOVDIR64B) instructions. This also enables Enqueue-store instructions to operate from within guest software, while VMM software (that does not have device-specific knowledge) maps guest-exposed MMIO as UC in the processor Extended Page Tables (EPT), ignoring guest memory type.

Platform Considerations for Enqueue Stores

For some implementations, a specific set of platform integrated devices support the Shared Work Queue (SWQ) capability. These devices may be attached to the Root-Complex through internal I/O fabrics. These devices may be exposed to host software as either PCI Express Root Complex Integrated End Points (RCIEPs) or as PCI Express endpoints devices behind Virtual Root Ports (VRPs).

Platforms supporting integrated devices with SWQs should limit routing of Enqueue non-posted write requests on internal I/O fabrics only to such devices. This is to ensure that the new transaction type (Enqueue non-posted write) is not treated as a malformed transaction layer packet (TLP) by an Enqueue-unaware endpoint device.

Enqueue stores to all other addresses (including main memory address ranges and all other memory-mapped address ranges) are terminated by the platform and a normal (not error) response is returned to the issuing processor with Retry completion status. No platform errors are generated on such Enqueue-store terminations as unprivileged software (ring-3 software, or ring-0 software in VMX non-root mode) can generate the Enqueues non-posted write transactions by executing the ENQCMD/S instructions.

Root-complex implementations should ensure that Enqueue-stores are processed and forwarded as single (non-torn) non-posted write transactions on internal I/O fabrics to the integrated devices supporting SWQs.

Platform Performance Considerations

This section describes some of the performance considerations in the processing of Enqueue-stores by system agent and system agents.

Relaxed ordering for system agent tracker (TOR) entry allocation for Enqueue-stores:

To maintain memory consistency, system agent implementations typically enforce strict ordering for requests to a cacheline address (when allocating TOR entries) for coherent memory and MMIO. While this is required to support the total ordering for coherent memory accesses, this strict ordering for Enqueue-stores imposes a performance problem. This is because Enqueue-stores target Shared Work Queues (SWQ) on devices and hence it will be common to have Enqueue-store requests issued from multiple logical processors with the same destination SWQ address. Also, unlike normal stores that are posted to the system agent, Enqueue-stores are non-posted and incur latency similar to reads. To avoid the condition of allowing only one Enqueue-store outstanding to a shared work queue, system agent implementations are required to relax the strict ordering for Enqueue-store requests to the same address, and instead allow TOR allocations for multiple in-flight Enqueue-stores to the same address. Since a logical processor can only issue at most one Enqueue-store at a time, the system agent/platform can treat each Enqueue-store independently without ordering concerns.

Supporting multiple outstanding Enqueue non-posted writes in I/O bridge agents:

I/O bridge implementations typically limit the number of non-posted (read) requests supported in the downstream path to a small number (often to a single request). This is because reads from processor to MMIO (which are mostly UC reads) are not performance critical for most usages, and supporting a large queue depth for reads require buffers for the data returned, adding to the hardware cost. Since Enqueue-stores are expected to be used normally for work-dispatch to accelerator devices, applying this limited queueing for Enqueue non-posted writes can be detrimental for performance. I/O bridge implementations are recommended to support increased queue-depth (some practical ratio of the number of logical processors, since a logical processor can have only one outstanding Enqueue-store request at a time) for improved Enqueue non-posted write bandwidth. Unlike read requests, Enqueue-stores do not incur the hardware cost of data buffers, as Enqueue non-posted write completions return only a completion status (Success v/s Retry) and no data.

Virtual Channel Support for Enqueue Non-Posted Writes

Unlike typical memory read and write requests on I/O buses that have producer-consumer ordering requirements (such as specified by PCI-Express transaction ordering), Enqueue non-posted writes do not have any ordering requirements on the I/O bus. This enables use of a non-VC0 virtual channel for issuing Enqueue non-posted writes and returning respective completions. The benefit of using a non-VC0 channel is that Enqueue non-posted write completions can have better latency (fewer cycles to hold up the core) by avoiding being ordered behind upstream posted writes on VC0 from device to host. Implementations are recommended to carefully consider the integrated device usages and minimize Enqueue non-posted completion latency.

Intermediate Termination of Enqueue Non-Posted Write

To handle specific flow control on high-latency situations (such as power management to wake-up an internal link, or on a lock flow), an intermediate agent (system agent, I/O bridge etc.) is allowed to drop a legitimate Enqueue-store request and return a completion with Retry response to the issuing core. Software issuing the Enqueue-store has no direct visibility if the retry response was from an intermediate agent or the target, and would normally retry (potentially with some back-off) in software.

Implementations that perform such intermediate termination must take extreme care to make sure such behavior cannot expose any denial of service attacks across software clients sharing a SWQ.

Shared Work Queue Support on Endpoint Devices

FIG. 34 illustrates the concept of a Shared Work Queue (SWQ), which allows multiple non-cooperating software agents (applications 3410-3412) to submit work through a shared work queue 3401, utilizing the ENQCMD/S instructions described herein.

The following considerations are applicable to endpoint devices implementing Shared Work Queues (SWQ).

SWQs and its enumeration: A device physical function (PF) may support one or more SWQs. Each SWQ is accessible for Enqueue non-posted writes through a 64-byte aligned and sized register (referred here on as SWQ_REG) in the device MMIO address range. Each such SWQ_REG on a device is recommended to be located on a unique system page size (4 KB) region. The device driver for the device is responsible for reporting/enumerating the SWQ capability, the number of SWQs supported and the corresponding SWQ_REG addresses to software through appropriate software interfaces. The driver may also optionally report the depth of the SWQ supported for software tuning or informational purposes (although this is not required for functional correctness). For devices supporting multiple physical functions, it is recommended to support independent SWQs for each physical function.

SWQ support on Single Root I/O Virtualization (SR-IOV) devices: Devices supporting SR-IOV may support independent SWQs for each Virtual Function (VF), exposed through SWQ_REGs in respective VF base address registers (BARs). This design point allows for maximum performance isolation for work submission across VFs, and may be appropriate for a small to moderate number of VFs. For devices supporting large number of VFs (where independent SWQ per VF is not practical), a single SWQ may be shared across multiple VFs. Even in this case, each VF has its own private SWQ_REGs in its VF BARs, except they are backed by a common SWQ across the VFs sharing the SWQ. For such device designs, which VFs share a SWQ may be decided statically by the hardware design, or the mapping between a given VF's SWQ_REG to SWQ instance may be dynamically setup/torn-down through the Physical Function and its driver. Device designs sharing SWQ across VFs need to pay special attention to QoS and protection against denial of service attacks as described later in this section. When sharing SWQs across VFs, care must be taken in the device design to identify which VF received an Enqueue request accepted to SWQ. When dispatching the work requests from the SWQ, the device should make sure upstream requests are properly tagged with the Requester-ID (Bus/Device/Function #) of the respective VF (in addition to the PASID that was conveyed in the Enqueue request payload).

Enqueue non-posted write address: Endpoint devices supporting SWQs are required to accept Enqueue non-posted writes to any addresses routed through their PF or VF memory BARs. For any Enqueue non-posted write request received by an endpoint device to an address that is not an SWQ_REG address, the device may be required to not treat this as an error (e.g., Malformed TLP, etc.) and instead return completion with a completion status of Retry (MRS). This may be done to ensure unprivileged (ring-3 or ring-0 VMX guest) software use of ENQCMD/S instructions to erroneously or maliciously issue Enqueue-stores to a non SWQ_REG addresses on a SWQ-capable device cannot result in non-fatal or fatal error reporting with platform-specific error handling consequences.

Non-Enqueue Request handling to SWQ REGs: Endpoint devices supporting SWQs may silently drop non-Enqueue requests (normal memory writes and reads) to the SWQ_REG addresses without treating them as fatal or non-fatal errors. Read requests to the SWQ_REG addresses may return a successful completion response (as opposed to UR or CA) with a value of all 1s for the requested data bytes. Normal memory (posted) write requests to SWQ_REG addresses are simply dropped without action by the endpoint device. This may be done to ensure unprivileged software cannot generate normal read and write requests to the SWQ_REG address to erroneously or maliciously cause non-fatal or fatal error reporting with platform-specific error handling consequences.

SWQ queue depth and storage: SWQ queue depth and storage is device implementation specific. Device designs should ensure sufficient queue depth is supported for the SWQ to achieve maximum utilization of the device. Storage for the SWQ may be implemented on the device. Integrated devices on the SoC may utilize stolen main memory (non-OS visible private memory reserved for device use) as a spill buffer for the SWQ, allowing for larger SWQ queue-depths than possible with on-device storage. For such designs, the use of a spill buffer is transparent to software, with device hardware deciding when to spill (versus drop the Enqueue request and send a Retry completion status), fetch from the spill buffer for command execution, and maintain any command-specific ordering requirements. For all purposes, such spill buffer usage is equivalent to a discrete device using local device-attached DRAM for SWQ storage. Device designs with a spill buffer in stolen memory must take extreme care to make sure that such stolen memory is protected from any accesses other than spill buffer read and writes by the device for which it is allocated for.

Non-blocking SWQ behavior: For performance reasons, device implementations should respond quickly to Enqueue non-posted write requests with Success or Retry completion status, and not block Enqueue completions for SWQ capacity to be freed-up to accept the request. The decision to accept or reject an Enqueue request to the SWQ could be based on capacity, QoS/occupancy or any other policies. Some example QoS considerations are described next.

SWQ QoS considerations: For an Enqueue non-posted write targeting a SWQ_REG address, the endpoint device may apply admission control to decide to accept the request to the respective SWQ (and send a successful completion status) or drop it (and send a Retry completion status). The admission control may be device and usage specific, and the specific policies supported/enforced by hardware may be exposed to software through the Physical Function (PF) driver interfaces. Because the SWQ is a shared resource with multiple producer clients, device implementations must ensure adequate protection against denial-of-service attacks across producers. QoS for SWQ refers only to acceptance of work requests (through enqueue requests) to the SWQ, and is orthogonal to any QoS applied by the device hardware on how QoS is applied to share the execution resources of the device when processing work requests submitted by different producers. Some example approaches are described below for configuring endpoint devices to enforce admission policies for accepting Enqueue requests to SWQ. These are documented for illustration purposes only and the exact implementation choices will be device specific.

In one implementation, the MOVDIRI instruction moves the doubleword integer in the source operand (second operand) to the destination operand (first operand) using a direct-store operation. The source operand may be a general-purpose register. The destination operand may be a 32-bit memory location. In 64-bit mode, the instruction's default operation size is 32 bits. MOVDIRI defines the destination to be doubleword or quadword aligned.

A direct-store may be implemented by using write combining (WC) memory type protocol for writing data. Using this protocol, the processor does not write the data into the cache hierarchy, nor does it fetch the corresponding cache line from memory into the cache hierarchy. If the destination address is cached, the line is written-back (if modified) and invalidated from the cache, before the direct-store. Unlike stores with non-temporal hint that allow uncached (UC) and write-protected (WP) memory-type for the destination to override the non-temporal hint, direct-stores always follow WC memory type protocol irrespective of the destination address memory type (including UC and WP types).

Unlike WC stores and stores with a non-temporal hint, direct-stores are eligible for immediate eviction from the write-combining buffer, and thus not combined with younger stores (including direct-stores) to the same address. Older WC and non-temporal stores held in the write-combing buffer may be combined with younger direct stores to the same address.

Because the WC protocol used by direct-stores follows a weakly-ordered memory consistency model, a fencing operation should follow the MOVDIRI instruction to enforce ordering when needed.

Direct-stores issued by MOVDIRI to a destination aligned to 4-byte boundary and guarantee 4-byte write-completion atomicity. This means that the data arrives at the destination in a single non-torn 4-byte (or 8-byte) write transaction. If the destination is not aligned for the write size, the direct-stores issued by MOVDIRI are split and arrive at the destination in two parts. Each part of such split direct-store will not merge with younger stores but can arrive at the destination in any order.

Figure 59:
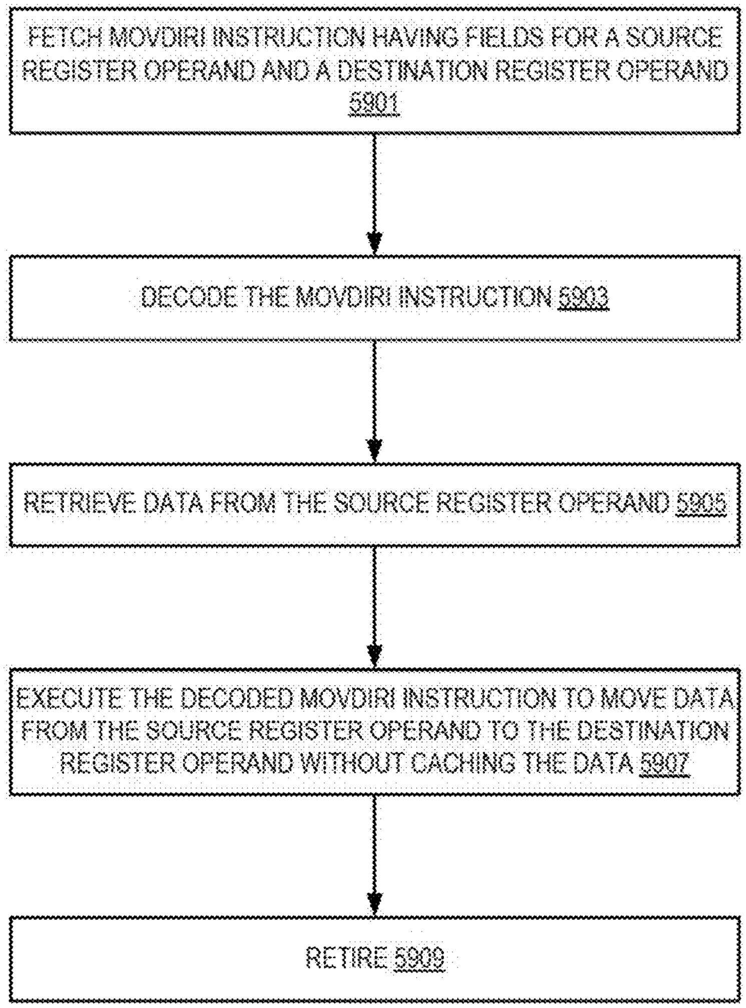
FIG. 59 illustrates an embodiment of method performed by a processor to process a MOVDIRI instruction.

FIG. 59 illustrates an embodiment of method performed by a processor to process a MOVDIRI instruction. For example, the hardware detailed herein is used.

At 5901, an instruction is fetched. For example, a MOVDIRI is fetched. The MOVDIRI instruction includes an opcode (and in some embodiment a prefix), a destination field representing a destination operand, and a source field representing source register operand.

The fetched instruction is decoded at 5903. For example, the MOVDIRI instruction is decoded by decode circuitry such as that detailed herein.

Data values associated with the source operand of the decoded instruction are retrieved at 5905. Additionally, in some embodiments, the instruction is scheduled.

At 5907, the decoded instruction is executed by execution circuitry (hardware), such as that detailed herein, to, move doubleword sized data from the source register operand to the destination register operand without caching the data.

In some embodiments, the instruction is committed or retired at 5909.

Moves 64-bytes as a direct-store with 64-byte write atomicity from source memory address to destination memory address. The source operand is a normal memory operand. The destination operand is a memory location specified in a general-purpose register. The register content is interpreted as an offset into the ES segment without any segment override. In 64-bit mode, the register operand width is 64-bits (or 32-bits). Outside of 64-bit mode, the register width is 32-bits or 16-bits. MOVDIR64B requires the destination address to be 64-byte aligned. No alignment restriction is enforced for the source operand. MOVDIR64B reads 64-bytes from the source memory address and performs a 64-byte direct-store operation to the destination address. The load operation follows normal read ordering based on the source address memory-type. The direct-store is implemented by using the write combining (WC) memory type protocol for writing data. Using this protocol, the processor may not write the data into the cache hierarchy, and may not fetch the corresponding cache line from memory into the cache hierarchy. If the destination address is cached, the line is written-back (if modified) and invalidated from the cache, before the direct-store.

Unlike stores with a non-temporal hint which allow UC/WP memory-types for destination to override the non-temporal hint, direct-stores may follow the WC memory type protocol irrespective of destination address memory type (including UC/WP types).

Unlike WC stores and stores with non-temporal hints, direct-stores are eligible for immediate eviction from the write-combining buffer, and thus are not combined with younger stores (including direct-stores) to the same address. Older WC and non-temporal stores held in the write-combing buffer may be combined with younger direct stores to the same address.

Because the WC protocol used by direct-stores follows a weakly-ordered memory consistency model, fencing operations should follow the MOVDIR64B instruction to enforce ordering when needed.

There is no atomicity guarantee provided for the 64-byte load operation from source address, and processor implementations may use multiple load operations to read the 64-bytes. The 64-byte direct-store issued by MOVDIR64B guarantees 64-byte write-completion atomicity. This means that the data arrives at the destination in a single non-torn 64-byte write transaction.

Figure 60:
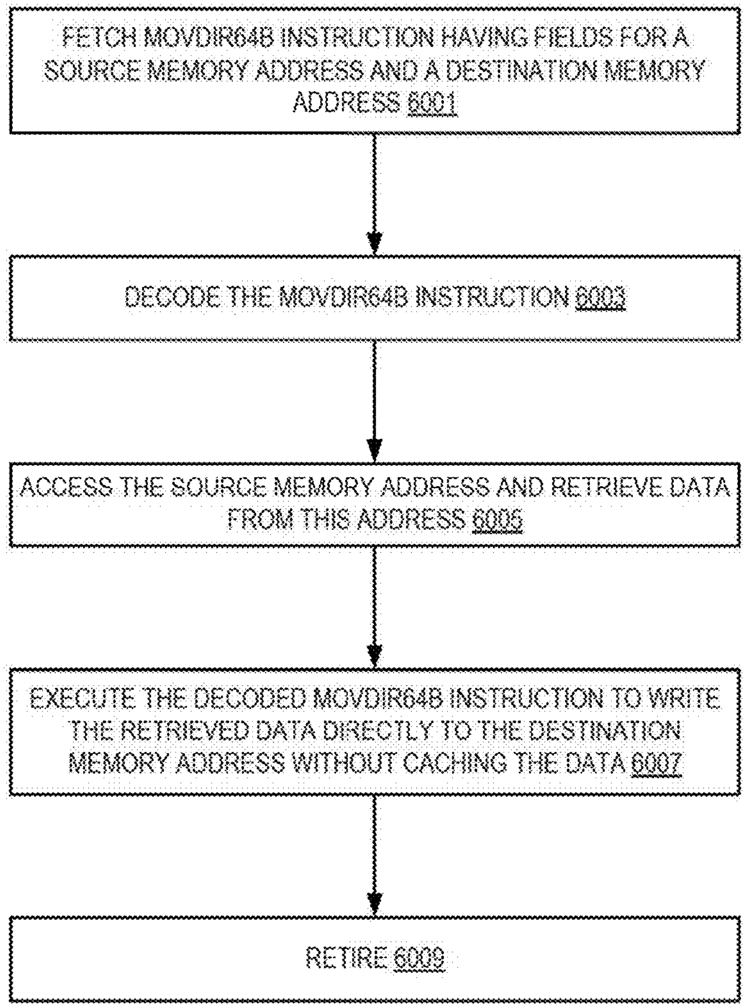
FIG. 60 illustrates an embodiment of method performed by a processor to process a MOVDIRI64B instruction.

FIG. 60 illustrates an embodiment of method performed by a processor to process a MOVDIRI64B instruction. For example, the hardware detailed herein is used.

At 6001, an instruction is fetched. For example, a MOVDIRI64B is fetched. The MOVDIRI64B instruction includes an opcode (and in some embodiment a prefix), a destination field representing a destination operand, and a source field representing source register operand.

The fetched instruction is decoded at 6003. For example, the MOVDIRI64B instruction is decoded by decode circuitry such as that detailed herein.

Data values associated with the source operand of the decoded instruction are retrieved at 6005. Additionally, in some embodiments, the instruction is scheduled.

At 6007, the decoded instruction is executed by execution circuitry (hardware), such as that detailed herein, to move 64-byte data from the source register operand to the destination register operand without caching the data.

In some embodiments, the instruction is committed or retired at 6009.

In one implementation, the ENQCMD command enqueues a 64-byte command using a non-posted write with 64-byte write atomicity from source memory address (second operand) to a device Shared Work Queue (SWQ) memory address in the destination operand. The source operand is a normal memory operand. The destination operand is a memory address specified in a general-purpose register. The register content is interpreted as an offset into the ES segment without any segment override. In 64-bit mode, the register operand width is 64-bits or 32-bits. Outside of 64-bit mode, the register width is 32-bits or 16-bits. ENQCMD requires the destination address to be 64-byte aligned. No alignment restriction is enforced for the source operand.

In one implementation, ENQCMD reads the 64-byte command from the source memory address, formats 64-byte enqueue store data, and performs a 64-byte enqueue-store operation of the store data to destination address. The load operation follows normal read ordering based on source address memory-type. A general protection error may be raised if the low 4-bytes of the 64-byte command data read from source memory address have a non-zero value, or, if a PASID Valid field bit is 0. Otherwise, the 64-byte enqueue store data is formatted as follows:

Enqueue Store Data [511:32]=Command Data [511:32]

Enqueue Store Data=0

Enqueue Store Data [30:20]=0

Enqueue Store Data [19:0]=PASID MSR [19:0]

Figure 58:
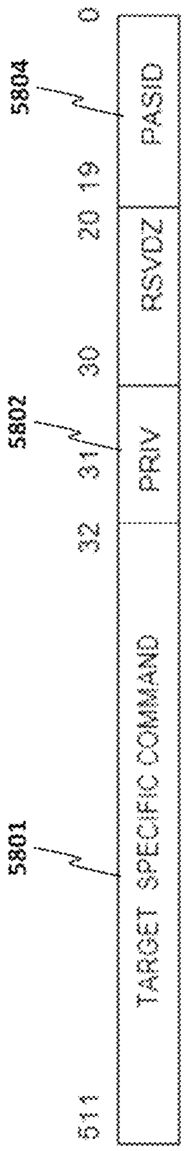
FIG. 58 illustrates a 64-byte enqueue store data generated by ENQCMD.

In one implementation, the 64-byte enqueue store data generated by ENQCMD has the format illustrated in FIG. 58. The upper 60-bytes in the command descriptor specifies the target device specific command 5801. The PRIV field 5802 (bit 31) may be forced to 0 to convey user privilege for enqueue-stores generated by the ENQCMD instruction. The PASID field (bits 19:0) 5804 conveys the Process Address Space Identity (as programmed in PASID MSR) assigned by system software for the software thread executing ENQCMD1.

The enqueue-store operation uses a non-posted write protocol for writing 64-bytes of data. The non-posted write protocol may not write the data into the cache hierarchy, and may not fetch the corresponding cache line into the cache hierarchy. Enqueue-stores always follow the non-posted write protocol irrespective of the destination address memory type (including UC/WP types).

The non-posted write protocol may return a completion response to indicate Success or Retry status for the non-posted write. The ENQCMD instruction may return this completion status in a zero flag (0 indicates Success, and 1 indicates Retry). Success status indicates that the non-posted write data (64-bytes) is accepted by the target shared work-queue (but not necessarily acted on). Retry status indicates the non-posted write was not accepted by the destination address due to capacity or other temporal reasons (or due to the destination address not being a valid Shared Work Queue address).

In one implementation, at most one enqueue-store can be outstanding from a given logical processor. In that sense, an enqueue-store cannot pass another enqueue-store. Enqueue-stores are not ordered against older WB stores, WC and non-temporal stores, CLFLUSHOPT or CLWB to different addresses. Software that needs to enforce such ordering must use explicit store fencing after such stores and before the enqueue-store. ENQCMD only affects Shared Work Queue (SWQ) addresses, which are unaffected by other stores.

There is no atomicity guarantee provided for the 64-byte load operation from source address, and processor implementations may use multiple load operations to read the 64 bytes. The 64-byte enqueue-store issued by ENQCMD guarantee 64-byte write-completion atomicity. The data may arrive at the destination as a single non-torn 64-byte non-posted write transaction.

In some embodiments a PASID architectural MSR is used by the ENQCMD instruction.

| Bit Offset | Description |
|---|---|
| 62:32 | Reserved.<br>RDMSR returns 0 for this field. WRMSR that attempts to set this will #GP. |
| 31 | PASID Valid. (RW)<br>If set, bits 19:0 of this MSR contains a valid PASID value.<br>If clear, the MSR is not programmed with PASID value. |
| 30:20 | Reserved.<br>RDMSR returns 0 for this field. WRMSR that attempts to set this will #GP. |
| 19:0 | PASID Value. (RW)<br>Specifies the Process Address Space Identifier (PASID) value for the currently running thread context. |

Figure 61:
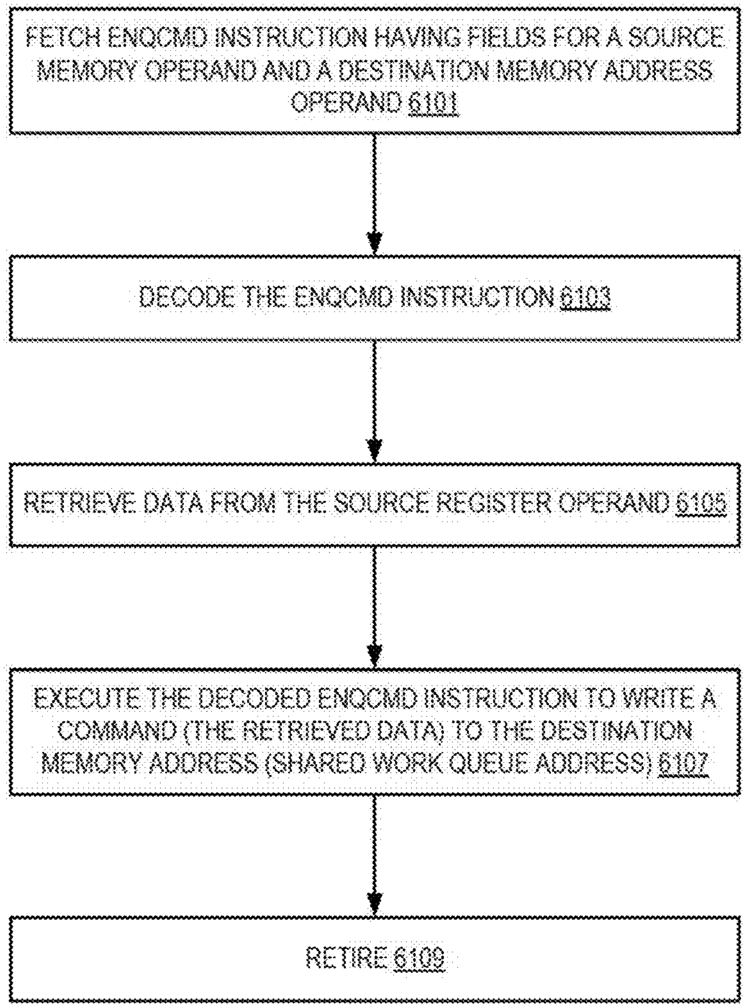
FIG. 61 illustrates an embodiment of method performed by a processor to process a ENCQMD instruction.

FIG. 61 illustrates an embodiment of method performed by a processor to process a ENCQMD instruction. For example, the hardware detailed herein is used.

At 6101, an instruction is fetched. For example, a ENCQMD is fetched. The ENCQMD instruction includes an opcode (and in some embodiment a prefix), a destination field representing a destination memory address operand, and a source field representing source memory operand.

The fetched instruction is decoded at 6103. For example, the ENCQMD instruction is decoded by decode circuitry such as that detailed herein.

Data values associated with the source operand of the decoded instruction are retrieved at 6105. Additionally, in some embodiments, the instruction is scheduled.

At 6107, the decoded instruction is executed by execution circuitry (hardware), such as that detailed herein, to, write a command (the retrieved data) to the destination memory address. In some embodiments, the destination memory address is a shared work queue address.

In some embodiments, the instruction is committed or retired at 6109.

In one implementation, the ENQCMDS instruction enqueues the 64-byte command using a non-posted write with 64-byte write atomicity from source memory address (second operand) to a device Shared Work Queue (SWQ) memory address in the destination operand. The source operand is a normal memory operand. The destination operand is a memory address specified in a general-purpose register. The register content may be interpreted as an offset into the ES segment without any segment override. In 64-bit mode, the register operand width is 64-bits or 32-bits. Outside of 64-bit mode, the register width is 32-bits or 16-bits. ENQCMD requires the destination address to be 64-byte aligned. No alignment restriction is enforced for the source operand.

Unlike ENQCMD (which can be executed from any privilege level), ENQCMDS is a privileged instruction. When the processor is running in protected mode, the CPL must be 0 to execute this instruction. ENQCMDS reads the 64-byte command from the source memory address, and performs a 64-byte enqueue-store operation using this data to destination address. The load operation follows normal read ordering based on source address memory-type. The 64-byte enqueue store data is formatted as follows:

$$\text{Enquenue Store Data }[511{:}32] = \text{Command Data }[511{:}32]$$

$$\text{Enquenue Store Data }[31] = \text{Command Data }[31]$$

$$\text{Enquenue Store Data }[30{:}20] = 0$$

$$\text{Enquenue Store Data }[19{:}0] = \text{Command Data }[19{:}0]$$

Figure 62:
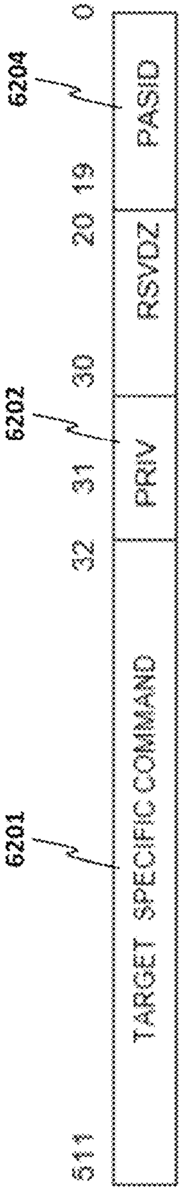
FIG. 62 illustrates a format for a ENQCMDS instruction.

The 64-byte enqueue store data generated by ENQCMDS may have the same format as ENQCMD. In one implementation, ENQCMDS has the format illustrated in FIG. 62.

The upper 60-bytes in the command descriptor specifies the target device specific command 6201. The PRIV field (bit 31) 6202 is specified by bit 31 in command data at source operand address to convey either user (0) or supervisor (1) privilege for enqueue-stores generated by ENQCMDS instruction. The PASID field (bits 19:0) 6204 conveys the Process Address Space Identity as specified in bits 19:0 in the command data at source operand address1.

In one implementation, the enqueue-store operation uses a non-posted write protocol for writing 64-bytes of data. The non-posted write protocol does not write the data into the cache hierarchy, nor does it fetch the corresponding cache line into the cache hierarchy. Enqueue-stores always follow the non-posted write protocol irrespective of the destination address memory type (including UC/WP types).

The non-posted write protocol returns a completion response to indicate Success or Retry status for the non-posted write. The ENQCMD instruction returns this completion status in a zero flag (0 indicates Success, and 1 indicates Retry). Success status indicates that the non-posted write data (64-bytes) is accepted by the target shared work-queue (but not necessarily acted on). Retry status indicates the non-posted write was not accepted by the destination address due to capacity or other temporal reasons (or due to the destination address not a valid Shared Work Queue address).

At most one enqueue-store (ENQCMD or ENQCMDS) can be outstanding from a given logical processor. In that sense, an enqueue-store cannot pass another enqueue-store. Enqueue-stores may not be ordered against older WB stores, WC and non-temporal stores, CLFLUSHOPT or CLWB to different addresses. Software that needs to enforce such ordering may use explicit store fencing after such stores and before the enqueue-store.

ENQCMDS only affects Share Work Queue (SWQ) addresses, which are unaffected by other stores.

There is no atomicity guarantee provided for the 64-byte load operation from the source address, and processor implementations may use multiple load operations to read the 64-bytes. The 64-byte enqueue-store issued by ENQCMDS guarantees 64-byte write-completion atomicity (i.e., arriving at the destination as single non-torn 64-byte non-posted write transaction).

Figure 63:
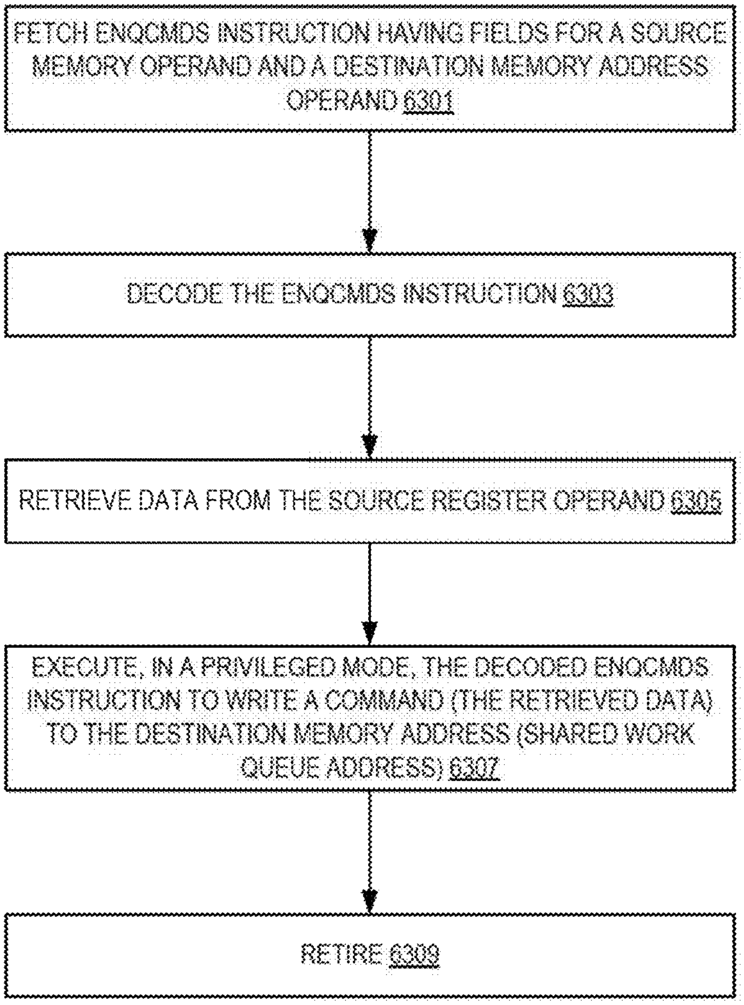
FIG. 63 illustrates an embodiment of method performed by a processor to process a ENCOMDs instruction.

FIG. 63 illustrates an embodiment of method performed by a processor to process a ENCQMDs instruction. For example, the hardware detailed herein is used.

At 6301, an instruction is fetched. For example, a ENCOMDs is fetched. The ENCOMDs instruction includes an opcode (and in some embodiment a prefix), a destination field representing a destination memory address operand, and a source field representing source memory operand.

The fetched instruction is decoded at 6303. For example, the ENCOMDs instruction is decoded by decode circuitry such as that detailed herein.

Data values associated with the source operand of the decoded instruction are retrieved at 6305. Additionally, in some embodiments, the instruction is scheduled.

At 6307, the decoded instruction is executed, in a privileged mode, by execution circuitry (hardware), such as that detailed herein, to, write a command (the retrieved data) to the destination memory address. In some embodiments, the destination memory address is a shared work queue address.

In some embodiments, the instruction is committed or retired at 6309.

One implementation utilizes two instructions to ensure efficient synchronization between an accelerator and host processor: UMONITOR and UMWAIT. Briefly, the UMONITOR instruction arms address monitoring hardware using an address specified in a source register and the UMWAIT instruction instructs the processor to enter an implementation-dependent optimized state while monitoring a range of addresses.

The UMONITOR instruction arms address monitoring hardware using an address specified in the r32/r64 source register (the address range that the monitoring hardware checks for store operations can be determined by using a CPUID monitor leaf function. A store to an address within the specified address range triggers the monitoring hardware. The state of monitor hardware is used by UMWAIT.

The following operand encodings are used for one implementation of the UMONITOR instruction:

| Encoding/Instruction | Op/En | CPUID |
|---|---|---|
| F3 OF AE/6 UMONITOR r32/r64 | A | WAITPKG |

| Op/En | Tuple | Operand 1 | Operand 2 | Operand 3 | Operand 4 |
|---|---|---|---|---|---|
| A | N/A | R/M(r) | N/A | N/A | N/A |

The content of r32/r64 source register is an effective address (in 64-bit mode, r64 is used). By default, the DS segment is used to create a linear address that is monitored. Segment overrides can be used. The address range must use memory of the write-back type. Only write-back memory is guaranteed to correctly trigger the monitoring hardware.

The UMONITOR instruction is ordered as a load operation with respect to other memory transactions. The instruction is subject to the permission checking and faults associated with a byte load. Like a load, UMONITOR sets the A-bit but not the D-bit in page tables.

UMONITOR and UMWAIT may be executed at any privilege level. The instruction's operation is the same in non-64-bit modes and in 64-bit mode.

UMONITOR does not interoperate with the legacy MWAIT instruction. If UMONITOR was executed prior to executing MWAIT and following the most recent execution of the legacy MONITOR instruction, MWAIT may not enter an optimized state. Execution will resume at the instruction following the MWAIT.

The UMONITOR instruction causes a transactional abort when used inside transactional region.

UMONITOR sets up an address range for the monitor hardware using the content of source register as an effective address and puts the monitor hardware in armed state. A store to the specified address range will trigger the monitor hardware.

Figure 64:
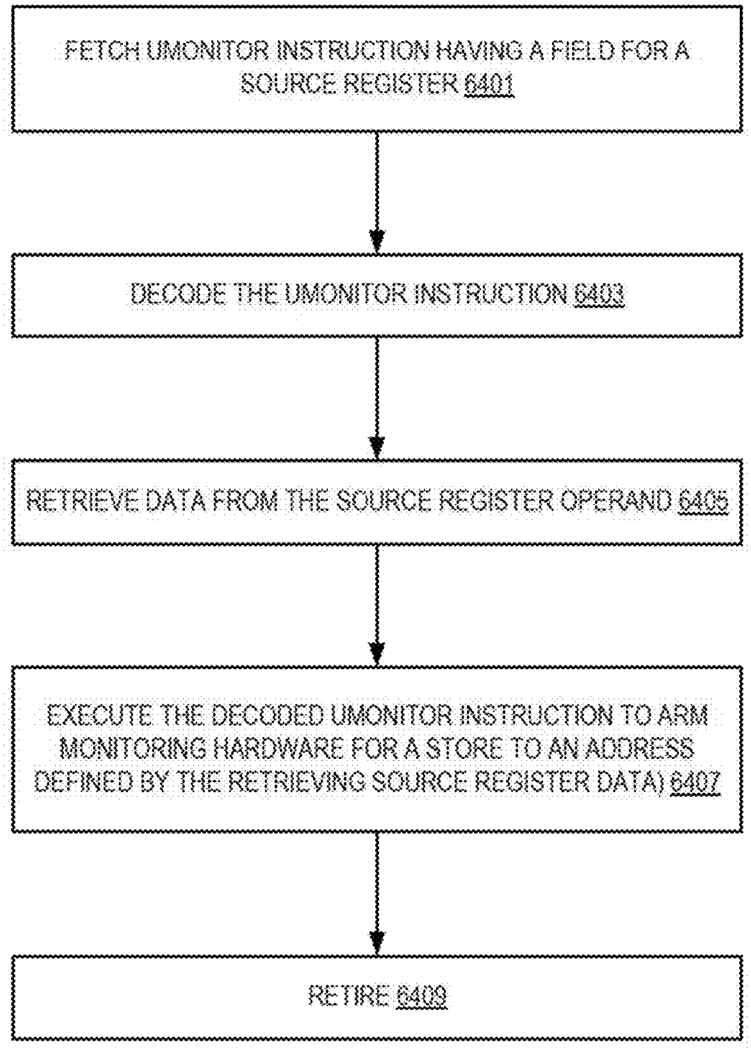
FIG. 64 illustrates an embodiment of method performed by a processor to process a UMONITOR instruction.

FIG. 64 illustrates an embodiment of method performed by a processor to process a UMONITOR instruction. For example, the hardware detailed herein is used.

At 6401, an instruction is fetched. For example, a UMONITOR is fetched. The UMONITOR instruction includes an opcode (and in some embodiment a prefix) and an explicit source register operand.

The fetched instruction is decoded at 6403. For example, the UMONITOR instruction is decoded by decode circuitry such as that detailed herein.

Data values associated with the source operand of the decoded instruction are retrieved at 6405. Additionally, in some embodiments, the instruction is scheduled.

At 6407, the decoded instruction is executed by execution circuitry (hardware), such as that detailed herein, to, arm monitoring hardware for a store to an address defined by the retrieved source register data.

In some embodiments, the instruction is committed or retired at 6409.

UMWAIT instructs the processor to enter an implementation-dependent optimized state while monitoring a range of addresses. The optimized state may be either a light-weight power/performance optimized state or an improved power/performance optimized state. The selection between the two states is governed by the explicit input register bit[0] source operand.

TABLE

| Encoding/Instruction | Op/En | CPUID |
|---|---|---|
| F2 OF AE/6<br>UMWAIT r32/r64, <edx>, <eax> | A | WAITPKG |

| Op/En | Tuple | Operand 1 | Operand 2 | Operand 3 | Operand 4 |
|---|---|---|---|---|---|
| A | N/A | R/M(r) | N/A | N/A | N/A |

UMWAIT may be executed at any privilege level. This instruction's operation is the same in non-64-bit modes and in 64-bit mode.

The input register may contain information such as the preferred optimized state the processor should enter as described in the following table. Bits other than bit 0 are reserved and will result in #GP if nonzero.

TABLE MM

| bit value | State Name | Wakeup Time | Power Savings | Other Benefits |
|---|---|---|---|---|
| bit[0] = 0 | C0.2 | Slower | Larger | Improves performance of the other SMT thread(s) on the samecore. |
| bit[0] = 1 | C0.1 | Faster | Smaller | |
| bits[31:1] | | | | Reserved (MBZ) non-64b modes |
| bits[63:1] | | | | Reserved (MBZ) 64b mode |

The instruction wakes up when the time-stamp counter reaches or exceeds the implicit 64-bit input value (if the monitoring hardware did not trigger beforehand).

Prior to executing the UMWAIT instruction, an operating system may specify the maximum delay it allows the processor to suspend its operation in which may include either of two power/performance optimized states. It can do so by writing TSC-quanta value to the following 32 bit MSR:

UMWAIT_CONTROL [31:2]—Determines the maximum time in TSC-quanta that the processor can reside in either of C0.1 or C0.2. Zero value indicates OS posed no limit on the processor. The maximum time value is a 32b value where the upper 30 b come from this field and the lower two bits are assumed to be zero.

UMWAIT_CONTROL [1]—Reserved.

UMWAIT_CONTROL [0]—C0.2 is not allowed by the OS. A value of 1 means all C0.2 requests revert to C0.1

In one implementation, if the processor that executed a UMWAIT instruction wakes due to the expiration of the operating system time-limit, the instructions sets a carry flag; otherwise, that flag is cleared.

The UMWAIT instruction causes a transactional abort when used inside transactional region.

In one implementation, the UMWAIT instruction operates with the UMONITOR instruction. The two instructions allow the definition of an address at which to wait (UMONITOR) and an implementation-dependent optimized operation to commence at the wait address (UMWAIT). The execution of UMWAIT is a hint to the processor that it can enter an implementation-dependent-optimized state while waiting for an event or a store operation to the address range armed by UMONITOR.

The following may cause the processor to exit the implementation-dependent optimized state: a store to the address range armed by the UMONITOR instruction, a non-maskable interrupt (NMI) or system management interrupt (SMI), a debug exception, a machine check exception, the BINIT #signal, the INIT #signal, and the RESET #signal. Other implementation-dependent events may also cause the processor to exit the implementation-dependent optimized state.

In addition, an external interrupt may cause the processor to exit the implementation-dependent optimized state regardless of whether maskable-interrupts are inhibited.

Following exit from the implementation-dependent-optimized state, control passes to the instruction following the UMWAIT instruction. A pending interrupt that is not masked (including an NMI or an SMI) may be delivered before execution of that instruction.

Unlike the HLT instruction, the UMWAIT instruction does not support a restart at the UMWAIT instruction following the handling of an SMI. If the preceding UMONITOR instruction did not successfully arm an address range or if UMONITOR was not executed prior to executing UMWAIT and following the most recent execution of the legacy MONITOR instruction (UMWAIT does not interoperate with MONITOR), then the processor will not enter an optimized state. Execution will resume at the instruction following the UMWAIT.

Note that UMWAIT is used to enter C0-sub states that are numerically lower than C1, thus a store to the address range armed by the UMONITOR instruction will cause the processor to exit UMWAIT if either the store was originated by other processor agents or the store was originated by a non-processor agent.

Figure 65:
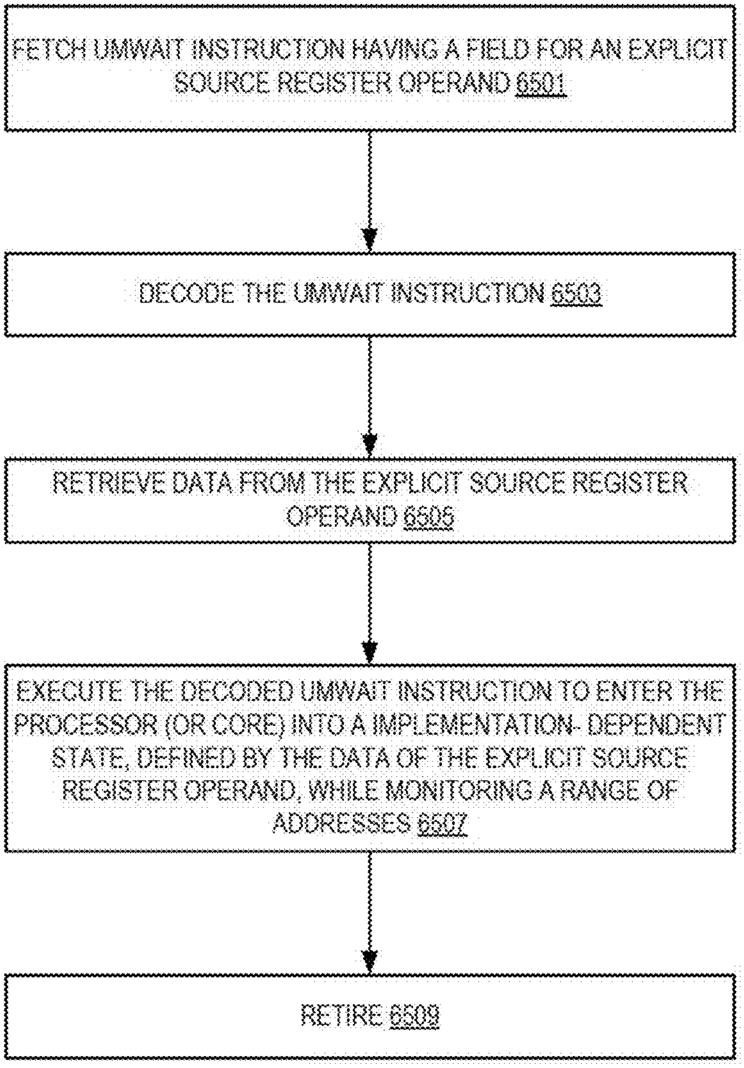
FIG. 65 illustrates an embodiment of method performed by a processor to process a UMWAIT instruction.

FIG. 65 illustrates an embodiment of method performed by a processor to process a UMWAIT instruction. For example, the hardware detailed herein is used.

At 6501, an instruction is fetched. For example, a UMWAIT is fetched. The UMWAIT instruction includes an opcode (and in some embodiment a prefix) and an explicit source register operand.

The fetched instruction is decoded at 6503. For example, the UMWAIT instruction is decoded by decode circuitry such as that detailed herein.

Data values associated with the source operand of the decoded instruction are retrieved at 6505. Additionally, in some embodiments, the instruction is scheduled.

At 6507, the decoded instruction is executed by execution circuitry (hardware), such as that detailed herein, to, enter the processor (or core) into an implementation dependent state, defined by data of the explicit source register operand, while monitoring a range of addresses.

In some embodiments, the instruction is committed or retired at 6509.

TPAUSE instructs the processor to enter an implementation-dependent optimized state. There are two such optimized states to choose from: light-weight power/performance optimized state, and improved power/performance optimized state. The selection between the two is governed by the explicit input register bit[0] source operand.

TABLE OO

| Encoding/Instruction | Op/En | CPUID |
|---|---|---|
| 66 OF AE/6<br>TPAUSE r32/r64, <edx>, <eax> | A | WAITPKG |

| Op/En | Tuple | Operand 1 | Operand 2 | Operand 3 | Operand 4 |
|---|---|---|---|---|---|
| A | N/A | R/M(r) | N/A | N/A | N/A |

TPAUSE may be executed at any privilege level. This instruction's operation is the same in non-64-bit modes and in 64-bit mode.

Unlike PAUSE, the TPAUSE instruction will not cause an abort when used inside transactional region. The input register contains information such as the preferred optimized state the processor should enter as described in the following table. Bits other than bit 0 are reserved and will result in #GP if nonzero.

TABLE PP

| | | | | |
|---|---|---|---|---|
| bit[0] = 0 | C0.2 | Slower | Larger | Improves performance of |
| bits[31:1] | | | | Reserved (MBZ) |
| bits[63:1] | | | | Reserved (MBZ) |

The instruction wakes up when the time-stamp counter reaches or exceeds the implicit 64-bit input value (if the monitoring hardware did not trigger beforehand). Prior to executing the TPAUSE instruction, an operating system may specify the maximum delay it allows the processor to suspend its operation in either of the two power/performance optimized states. It can do so by writing TSC-quanta value to the following 32-bit MSR:

UMWAIT_CONTROL [31:2]—Determines the maximum time in TSC-quanta that the processor can reside in either of C0.1 or C0.2. Zero value indicates OS posed no limit on the processor. The maximum time value is a 32b value where the upper 30 b come from this field and the lower two bits are assumed to be zero.

UMWAIT_CONTROL [1]—Reserved.

UMWAIT_CONTROL [0]—C0.2 is not allowed by the OS. Value of '1 means all C0.2 requests revert to C0.1

The wake-up reason due to the expiration of the OS time-limit may be indicated by setting a carry flag.

If the processor that executed a TPAUSE instruction wakes due to the expiration of the operating system time-limit, the instruction sets a carry flag; otherwise, that flag is cleared.

For monitoring multiple address-ranges, the TPAUSE instruction can be placed within a transactional region that is comprised of a set of addresses to monitor and a subsequent TPAUSE instruction. The transactional region allows the definition of a set of addresses at which to wait and an implementation-dependent optimized operation to commence at the execution of the TPAUSE instruction. In one implementation, the execution of TPAUSE directs the processor to enter an implementation-dependent optimized state while waiting for an event or a store operation to the addresses in range defined by the read-set.

The use of TPAUSE within a transactional memory region may be limited to C0.1 (the light-weight power/performance optimized state). Even if software sets bit[0]=0 to indicate its preference for C0.2 (improved power/performance optimized state), the processor may enter C0.1.

The following may cause the processor to exit the implementation-dependent optimized state: a store to the read-set range within the transactional region, an NMI or SMI, a debug exception, a machine check exception, the BINIT #signal, the INIT #signal, and the RESET #signal. All these events will also abort the transaction.

Other implementation-dependent events may cause the processor to exit the implementation-dependent optimized state, and may result in non-aborted transactional region, proceeding to the instruction following TPAUSE. In addition, an external interrupt causes the processor to exit the implementation-dependent optimized state regardless of whether maskable-interrupts are inhibited in some embodiments. It should be noted that in case maskable-interrupts are inhibited execution will proceed to the instruction following TPAUSE, while in the case of an interrupts enabled flag being set, the transactional region will be aborted.

Figure 66:
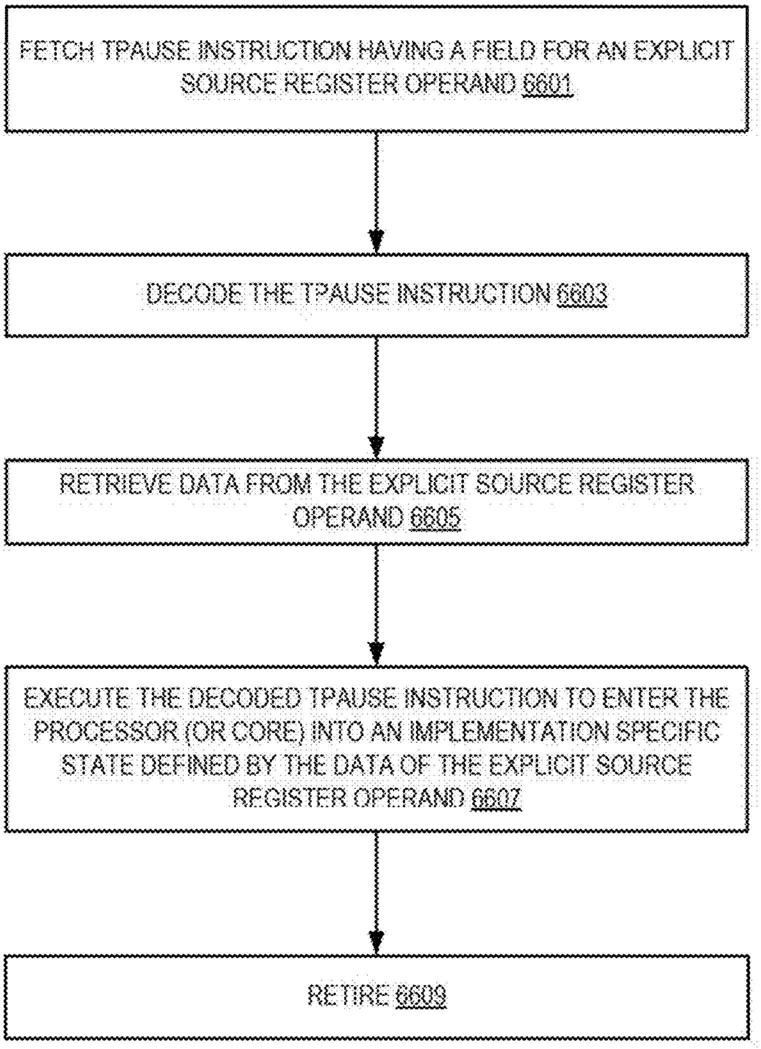
FIG. 66 illustrates an embodiment of a method performed by a processor to process a TPAUSE instruction.

FIG. 66 illustrates an embodiment of a method performed by a processor to process a TPAUSE instruction. For example, the hardware detailed herein is used.

At 6601, an instruction is fetched. For example, a TPAUSE is fetched. The TPAUSE instruction includes an opcode (and in some embodiment a prefix) and an explicit source register operand.

The fetched instruction is decoded at 6603. For example, the TPAUSE instruction is decoded by decode circuitry such as that detailed herein.

Data values associated with the source operand of the decoded instruction are retrieved at 6605. Additionally, in some embodiments, the instruction is scheduled.

At 6607, the decoded instruction is executed by execution circuitry (hardware), such as that detailed herein, to, enter the processor (or core) in an implementation specific state defined by the data of the explicit source register operand.

In some embodiments, the instruction is committed or retired at 6609.

Figure 67:
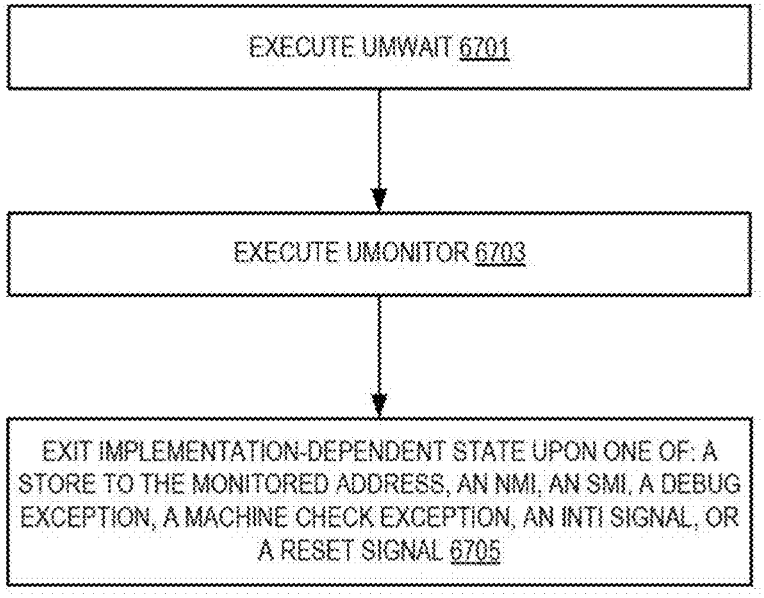
FIG. 67 illustrates an example of execution using UMWAIT and UMONITOR. Instructions.

FIG. 67 illustrates an example of execution using UMWAIT and UMONITOR. instructions.

At 6701, a UMWAIT instruction is executed to set a range of addresses to monitor.

At 6703, a UMONITOR instruction is executed to enter the core executing the instruction into an implementation dependent state, defined by data of the explicit source register operand of the instruction, for the range of addresses being monitored.

The implementation dependent state is exited upon one of: a stored to the monitored addresses, a NMI, a SMI, a debug exception, a machine check exception, an init signal, or a reset signal at 6705.

Figure 68:
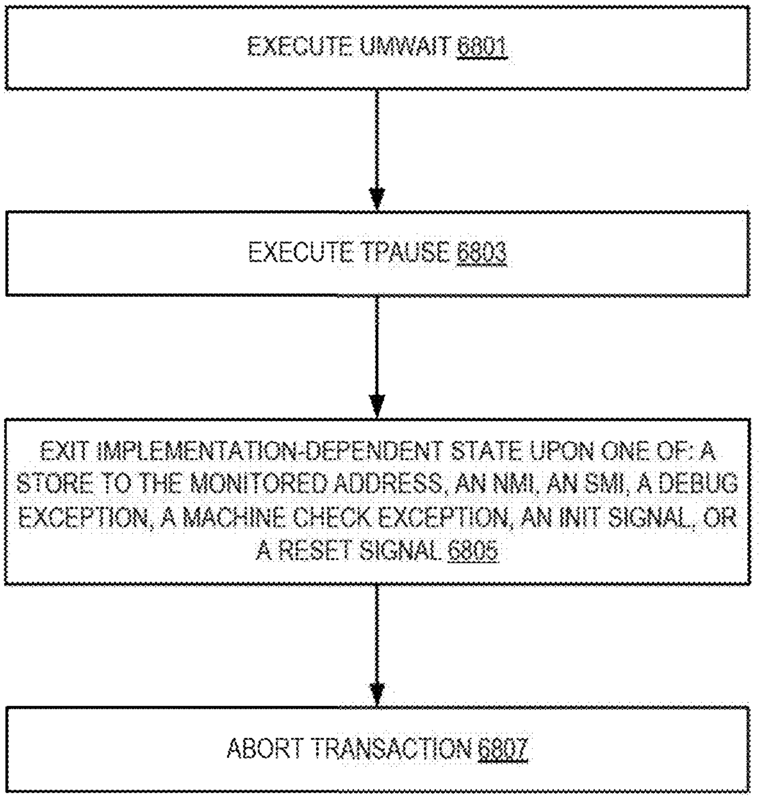
FIG. 68 illustrates an example of execution using TPAUSE and UMONITOR. Instructions.

FIG. 68 illustrates an example of execution using TPAUSE and UMONITOR. instructions.

At 6801, a TPAUSE instruction is executed to set a range of addresses to monitor.

At 6803, a UMONITOR instruction is executed to enter the core executing the instruction into an implementation dependent state, defined by data of the explicit source register operand of the instruction, for the range of addresses being monitored.

The implementation dependent state is exited upon one of: a stored to the monitored addresses, a NMI, a SMI, a debug exception, a machine check exception, an init signal, or a reset signal at 6805.

The transaction associated with the thread is aborted upon the implementation dependent state being exited at 6807.

In some implementations, an accelerator is coupled to processor cores or other processing elements to accelerate certain types of operations such as graphics operations, machine-learning operations, pattern analysis operations, and (as described in detail below) sparse matrix multiplication operations, to name a few. The accelerator may be communicatively coupled to the processor/cores over a bus or other interconnect (e.g., a point-to-point interconnect) or may be integrated on the same chip as the processor and communicatively coupled to the cores over an internal processor bus/interconnect. Regardless of the manner in which the accelerator is connected, the processor cores may allocate certain processing tasks to the accelerator (e.g., in the form of sequences of instructions or uops) which includes dedicated circuitry/logic for efficiently processing these tasks.

Figure 69:
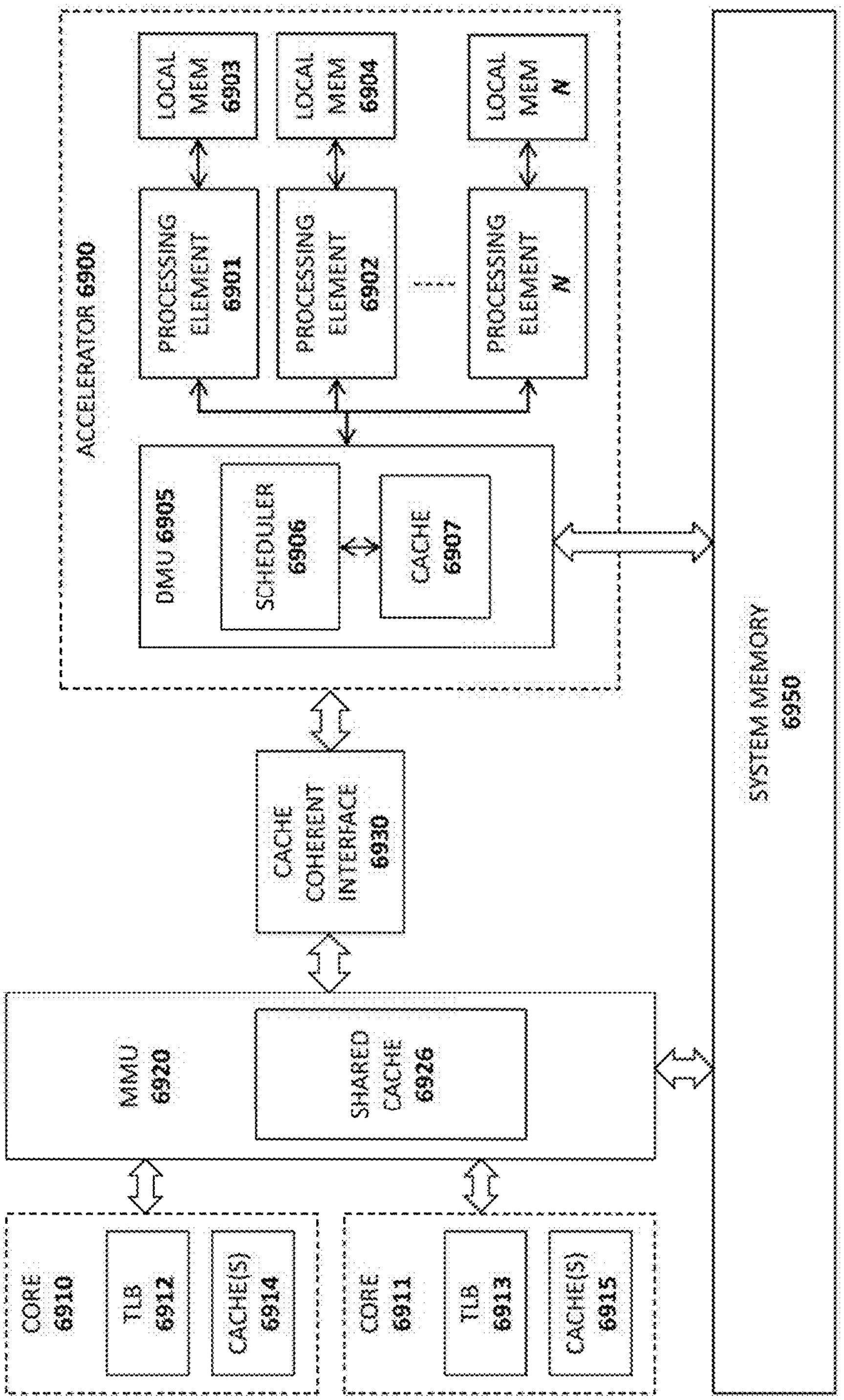
FIG. 69 illustrates an exemplary implementation in which an accelerator is communicatively coupled to a plurality of cores through a cache coherent interface.

FIG. 69 illustrates an exemplary implementation in which an accelerator 6900 is communicatively coupled to a plurality of cores 6910-6911 through a cache coherent interface 6930. Each of the cores 6910-6911 includes a translation lookaside buffer 6912-6913 for storing virtual to physical address translations and one or more caches 6914-6915 (e.g., L1 cache, L2 cache, etc.) for caching data and instructions. A memory management unit 6920 manages access by the cores 6910-6911 to system memory 6950 which may be a dynamic random access memory DRAM. A shared cache 6926 such as an L3 cache may be shared among the processor cores 6910-6911 and with the accelerator 6900 via the cache coherent interface 6930. In one implementation, the cores 6910-1011, MMU 6920 and cache coherent interface 6930 are integrated on a single processor chip.

The illustrated accelerator 6900 includes a data management unit 6905 with a cache 6907 and scheduler 6906 for scheduling operations to a plurality of processing elements 6901-6902, N. In the illustrated implementation, each processing element has its own local memory 6903-6904, N. As described in detail below, each local memory 6903-6904, N may be implemented as a stacked DRAM.

In one implementation, the cache coherent interface 6930 provides cache-coherent connectivity between the cores 6910-6911 and the accelerator 6900, in effect treating the accelerator as a peer of the cores 6910-6911. For example, the cache coherent interface 6930 may implement a cache coherency protocol to ensure that data accessed/modified by the accelerator 6900 and stored in the accelerator cache 6907 and/or local memories 6903-6904, N is coherent with the data stored in the core caches 6910-6911, the shared cache 6926 and the system memory 6950. For example, the cache coherent interface 6930 may participate in the snooping mechanisms used by the cores 6910-6911 and MMU 6920 to detect the state of cache lines within the shared cache 6926 and local caches 6914-6915 and may act as a proxy, providing snoop updates in response to accesses and attempted modifications to cache lines by the processing elements 6901-6902, N. In addition, when a cache line is modified by the processing elements 6901-6902, N, the cache coherent interface 6930 may update the status of the cache lines if they are stored within the shared cache 6926 or local caches 6914-6915.

In one implementation, the data management unit 1005 includes memory management circuitry providing the accelerator 6900 access to system memory 6950 and the shared cache 6926. In addition, the data management unit 6905 may provide updates to the cache coherent interface 6930 and receiving updates from the cache coherent interface 6930 as needed (e.g., to determine state changes to cache lines). In the illustrated implementation, the data management unit 6905 includes a scheduler 6906 for scheduling instructions/operations to be executed by the processing elements 6901-6902. To perform its scheduling operations, the scheduler 6906 may evaluate dependences between instructions/operations to ensure that instructions/operations are executed in a coherent order (e.g., to ensure that a first instruction executes before a second instruction which is dependent on results from the first instruction). Instructions/operations which are not inter-dependent may be executed in parallel on the processing elements 6901-6902.

Figure 70:
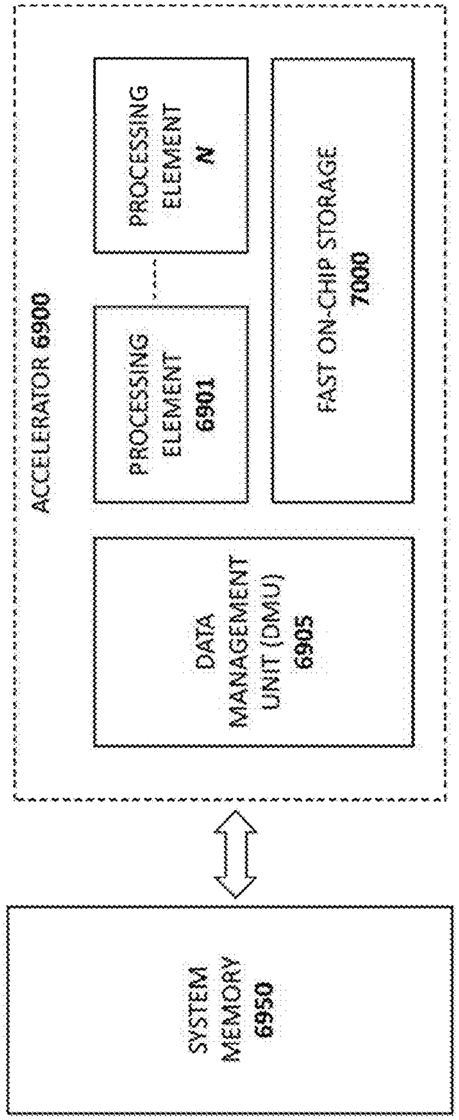
FIG. 70 illustrates another view of accelerator, and other components previously described including a data management unit, a plurality of processing elements, and fast on-chip storage.

FIG. 70 illustrates another view of accelerator 6900 and other components previously described including a data management unit 6905, a plurality of processing elements 6901-N, and fast on-chip storage 7000 (e.g., implemented using stacked local DRAM in one implementation). In one implementation, the accelerator 6900 is a hardware accelerator architecture and the processing elements 6901-N include circuitry for performing matrix*vector and vector*vector operations, including operations for sparse/dense matrices. In particular, the processing elements 6901-N may include hardware support for column and row-oriented matrix processing and may include microarchitectural support for a "scale and update" operation such as that used in machine learning (ML) algorithms.

The described implementations perform matrix/vector operations which are optimized by keeping frequently used, randomly accessed, potentially sparse (e.g., gather/scatter) vector data in the fast on-chip storage 7000 and maintaining large, infrequently used matrix data in off-chip memory (e.g., system memory 6950), accessed in a streaming fashion whenever possible, and exposing intra/inter matrix block parallelism to scale up.

Implementations of the processing elements 6901-N process different combinations of sparse matrixes, dense matrices, sparse vectors, and dense vectors. As used herein, a "sparse" matrix or vector is a matrix or vector in which most of the elements are zero. By contrast, a "dense" matrix or vector is a matrix or vector in which most of the elements are non-zero. The "sparsity" of a matrix/vector may be defined based on the number of zero-valued elements divided by the total number of elements (e.g., m×n for an m×n matrix). In one implementation, a matrix/vector is considered "sparse" if its sparsity if above a specified threshold.

An exemplary set of operations performed by the processing elements 6901-N is illustrated in the table in FIG. 71. In particular, the operation types include a first multiply 7100 using a sparse matrix, a second multiply 7101 using a dense matrix, a scale and update operation 7102 and a dot product operation 7103. Columns are provided for a first input operand 7110 and a second input operand 7111 (each of which may include sparse or dense matrix/vector); an output format 7112 (e.g., dense vector or scalar); a matrix data format (e.g., compressed sparse row, compressed sparse column, row-oriented, etc.) 7113; and an operation identifier 7114.

Figure 72A:
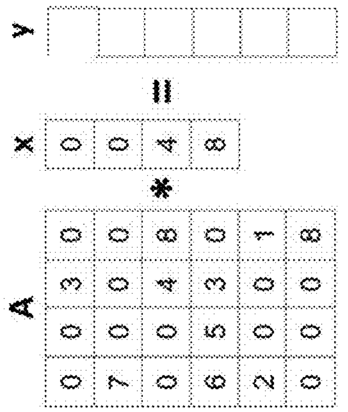
FIG. 72A depicts an example of a multiplication between a sparse matrix A against a vector x to produce a vector y.
Figure 72B:
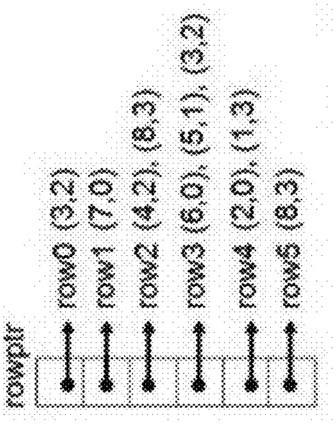
FIG. 72B illustrates the CSR representation of matrix A in which each value is stored as a (value, row index) pair.
Figure 72C:
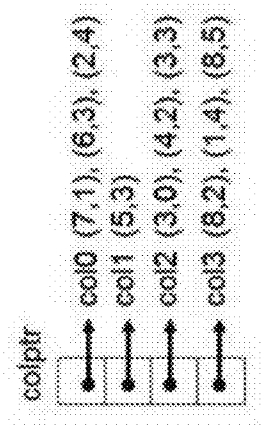
FIG. 72C illustrates a CSC representation of matrix A which uses a (value, column index) pair.

The runtime-dominating compute patterns found in some current workloads include variations of matrix multiplication against a vector in row-oriented and column-oriented fashion. They work on well-known matrix formats: compressed sparse row (CSR) and compressed sparse column (CSC). FIG. 72A depicts an example of a multiplication between a sparse matrix A against a vector x to produce a vector y. FIG. 72B illustrates the CSR representation of matrix A in which each value is stored as a (value, row index) pair. For example, the (3,2) for row0 indicates that a value of 3 is stored in element position 2 for row 0. FIG. 72C illustrates a CSC representation of matrix A which uses a (value, column index) pair.

FIGS. 73A, 73B, and 73C illustrate pseudo code of each compute pattern, which is described below in detail. In particular, FIG. 73A illustrates a row-oriented sparse matrix dense vector multiply (spMdV_csr); FIG. 73B illustrates a column-oriented sparse matrix sparse vector multiply (spMspC_csc); and FIG. 73C illustrates a scale and update operation (scale_update).

A. Row-Oriented Sparse Matrix Dense Vector Multiplication (spMdV_Csr)

This is a well-known compute pattern that is important in many application domains such as high-performance computing. Here, for each row of matrix A, a dot product of that row against vector x is performed, and the result is stored in the y vector element pointed to by the row index. This computation is used in a machine-learning (ML) algorithm that performs analysis across a set of samples (i.e., rows of the matrix). It may be used in techniques such as "mini-batch." There are also cases where ML algorithms perform only a dot product of a sparse vector against a dense vector (i.e., an iteration of the spMdV_csr loop), such as in the stochastic variants of learning algorithms.

A known factor that can affect performance on this computation is the need to randomly access sparse x vector elements in the dot product computation. For a conventional server system, when the x vector is large, this would result in irregular accesses (gather) to memory or last level cache.

To address this, one implementation of a processing element divides matrix A into column blocks and the x vector into multiple subsets (each corresponding to an A matrix column block). The block size can be chosen so that the x vector subset can fit on chip. Hence, random accesses to it can be localized on-chip.

B. Column-Oriented Sparse Matrix Sparse Vector Multiplication (spMspV_csc)

This pattern that multiplies a sparse matrix against a sparse vector is not as well-known as spMdV_csr. However, it is important in some ML algorithms. It is used when an algorithm works on a set of features, which are represented as matrix columns in the dataset (hence, the need for column-oriented matrix accesses).

In this compute pattern, each column of the matrix A is read and multiplied against the corresponding non-zero element of vector x. The result is used to update partial dot products that are kept at the y vector. After all the columns associated with non-zero x vector elements have been processed, the y vector will contain the final dot products.

While accesses to matrix A is regular (i.e., stream in columns of A), the accesses to the y vector to update the partial dot products is irregular. The y element to access depends on the row index of the A vector element being processed. To address this, the matrix A can be divided into row blocks. Consequently, the vector y can be divided into subsets corresponding to these blocks. This way, when processing a matrix row block, it only needs to irregularly access (gather/scatter) its y vector subset. By choosing the block size properly, the y vector subset can be kept on-chip.

C. Scale and Update (scale_update)

This pattern is typically used by ML algorithms to apply scaling factors to each sample in the matrix and reduced them into a set of weights, each corresponding to a feature (i.e., a column in A). Here, the x vector contains the scaling factors. For each row of matrix A (in CSR format), the scaling factors for that row are read from the x vector, and then applied to each element of A in that row. The result is used to update the element of y vector. After all rows have been processed, the y vector contains the reduced weights.

Similar to prior compute patterns, the irregular accesses to the y vector could affect performance when y is large. Dividing matrix A into column blocks and y vector into multiple subsets corresponding to these blocks can help localize the irregular accesses within each y subset.

One implementation includes a hardware accelerator that can efficiently perform the compute patterns discussed above. The accelerator is a hardware IP block that can be integrated with general purpose processors. In one implementation, the accelerator 6900 independently accesses memory 6950 through an interconnect shared with the processors to perform the compute patterns. It supports any arbitrarily large matrix datasets that reside in off-chip memory.

Figure 74:
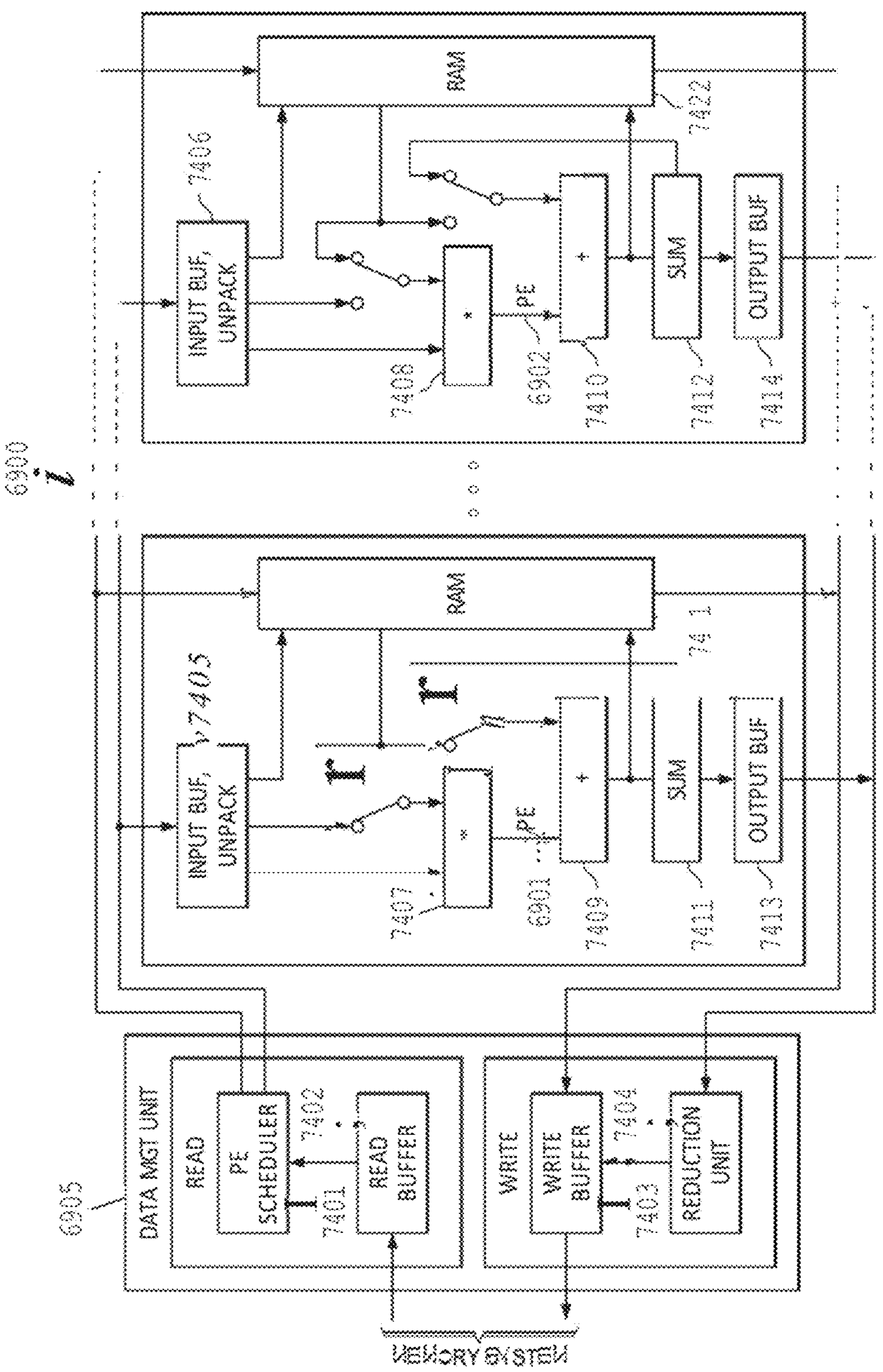
FIG. 74 illustrates the processing flow for one implementation of the data management unit and the processing elements.

FIG. 74 illustrates the processing flow for one implementation of the data management unit 6905 and the processing elements 6901-6902. In this implementation, the data management unit 6905 includes a processing element scheduler 7401, a read buffer 7402, a write buffer 7403 and a reduction unit 7404. Each PE 6901-6902 includes an input buffer 7405-7406, a multiplier 7407-7408, an adder 7409-7410, a local RAM 7421-7422, a sum register 7411-7412, and an output buffer 7413-7414.

The accelerator supports the matrix blocking schemes discussed above (i.e., row and column blocking) to support any arbitrarily large matrix data. The accelerator is designed to process a block of matrix data. Each block is further divided into sub-blocks which are processed in parallel by the Pes 6901-6902.

In operation, the data management unit 6905 reads the matrix rows or columns from the memory subsystem into its read buffer 7402, which is then dynamically distributed by the PE scheduler 7401 across PEs 6901-6902 for processing. It also writes results to memory from its write buffer 7403.

Each PE 6901-6902 is responsible for processing a matrix sub-block. A PE contains an on-chip RAM 7421-7422 to store the vector that needs to be accessed randomly (i.e., a subset of x or y vector, as described above). It also contains a floating point multiply-accumulate (FMA) unit including multiplier 7407-7408 and adder 7409-7410 and unpack logic within input buffers 7405-7406 to extract matrix elements from input data, and a sum register 7411-7412 to keep the accumulated FMA results.

One implementation of the accelerator achieves extreme efficiencies because (1) it places irregularly accessed (gather/scatter) data in on-chip PE RAMs 7421-7422, (2) it utilizes a hardware PE scheduler 7401 to ensure PEs are well utilized, and (3) unlike with general purpose processors, the accelerator consists of only the hardware resources that are essential for sparse matrix operations. Overall, the accelerator efficiently converts the available memory bandwidth provided to it into performance.

Scaling of performance can be done by employing more PEs in an accelerator block to process multiple matrix subblocks in parallel, and/or employing more accelerator blocks (each has a set of PEs) to process multiple matrix blocks in parallel. A combination of these options is considered below. The number of PEs and/or accelerator blocks should be tuned to match the memory bandwidth.

One implementation of the accelerator 6900 can be programmed through a software library. Such library prepares the matrix data in memory, sets control registers in the accelerator 6900 with information about the computation (e.g., computation type, memory pointer to matrix data), and starts the accelerator. Then, the accelerator independently accesses matrix data in memory, performs the computation, and writes the results back to memory for the software to consume.

Figure 75A:
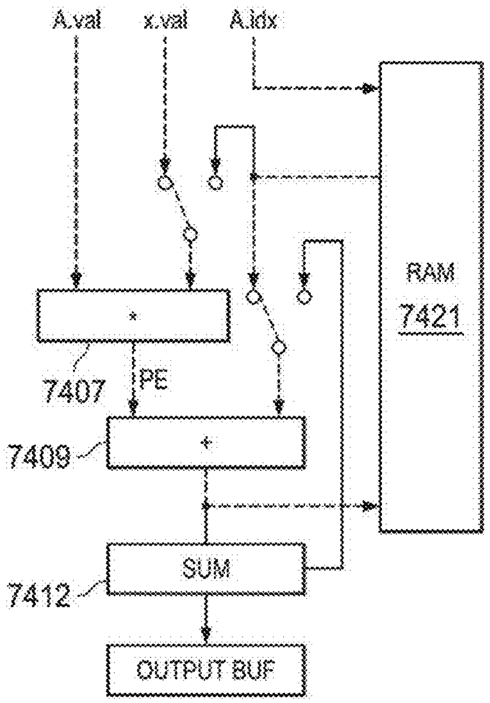
FIG. 75*a* highlights paths (using dotted lines) for spMspV_csc and scale_update operations.
Figure 75B:
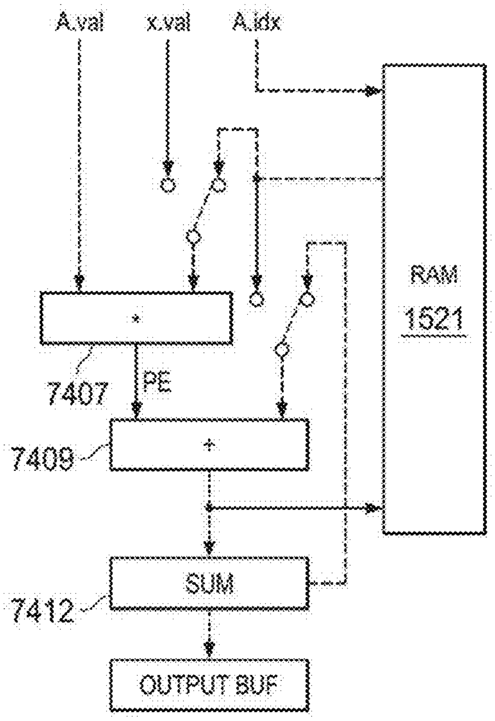
FIG. 75*b* illustrates paths for a spMdV_csr operation.

The accelerator handles the different compute patterns by setting its PEs to the proper datapath configuration, as depicted in FIGS. 75A-B. In particular, FIG. 75*a* highlights paths (using dotted lines) for spMspV_csc and scale_update operations and FIG. 75*b* illustrates paths for a spMdV_csr operation. The accelerator operation to perform each compute pattern is detailed below.

For spMspV_csc, the initial y vector subset is loaded in to PE's RAM 7421 by the DMU 6905. It then reads x vector elements from memory. For each x element, the DMU 6905 streams the elements of the corresponding matrix column from memory and supplies them to the PE 6901. Each matrix element contains a value (A.val) and an index (A.idx) which points to the y element to read from PE's RAM 7421. The DMU 6905 also provides the x vector element (x.val) that is multiplied against A.val by the multiply-accumulate (FMA) unit. The result is used to update the y element in the PE's RAM pointed to by A.idx. Note that even though not used by our workloads, the accelerator also supports column-wise multiplication against a dense x vector (spMdV_csc) by processing all matrix columns instead of only a subset (since x is dense).

The scale_update operation is similar to the spMspV_csc, except that the DMU 6905 reads the rows of an A matrix represented in a CSR format instead of a CSC format. For the spMdV_csr, the x vector subset is loaded in to the PE's RAM 7421. DMU 6905 streams in matrix row elements (i.e., {A.val,A.idx} pairs) from memory. A.idx is used to read the appropriate x vector element from RAM 7421, which is multiplied against A.val by the FMA. Results are accumulated into the sum register 7412. The sum register is written to the output buffer each time a PE sees a marker indicating an end of a row, which is supplied by the DMU 6905. In this way, each PE produces a sum for the row sub-block it is responsible for. To produce the final sum for the row, the sub-block sums produced by all the PEs are added together by the Reduction Unit 7404 in the DMU (see FIG. 74). The final sums are written to the output buffer 7413-7414, which the DMU 6905 then writes to memory.

Graph Data Processing

In one implementation, the accelerator architectures described herein are configured to process graph data. Graph analytics relies on graph algorithms to extract knowledge about the relationship among data represented as graphs. The proliferation of graph data (from sources such as social media) has led to strong demand for and wide use of graph analytics. As such, being able to do graph analytics as efficient as possible is of critical importance.

To address this need, one implementation automatically maps a user-defined graph algorithm to a hardware accelerator architecture "template" that is customized to the given input graph algorithm. The accelerator may comprise the architectures described above and may be implemented as a FPGA/ASIC, which can execute with extreme efficiency. In summary, one implementation includes:

(1) a hardware accelerator architecture template that is based on a generalized sparse matrix vector multiply (GSPMV) accelerator. It supports arbitrary graph algorithm because it has been shown that graph algorithm can be formulated as matrix operations.

(2) an automatic approach to map and tune a widely-used "vertex centric" graph programming abstraction to the architecture template.

There are existing sparse matrix multiply hardware accelerators, but they do not support customizability to allow mapping of graph algorithms.

One implementation of the design framework operates as follows.

(1) A user specifies a graph algorithm as "vertex programs" following vertex-centric graph programming abstraction. This abstraction is chosen as an example here due to its popularity. A vertex program does not expose hardware details, so users without hardware expertise (e.g., data scientists) can create it.

(2) Along with the graph algorithm in (1), one implementation of the framework accepts the following inputs:

a. The parameters of the target hardware accelerator to be generated (e.g., max amount of on-chip RAMs). These parameters may be provided by a user, or obtained from an existing library of known parameters when targeting an existing system (e.g., a particular FPGA board).

b. Design optimization objectives (e.g., max performance, min area)

c. The properties of the target graph data (e.g., type of graph) or the graph data itself. This is optional, and is used to aid in automatic tuning.

(3) Given above inputs, one implementation of the framework performs auto-tuning to determine the set of customizations to apply to the hardware template to optimize for the input graph algorithm, map these parameters onto the architecture template to produce an accelerator instance in synthesizable RTL, and conduct functional and performance validation of the generated RTL against the functional and performance software models derived from the input graph algorithm specification.

In one implementation, the accelerator architecture described above is extended to support execution of vertex programs by (1) making it a customizable hardware template and (2) supporting the functionalities needed by vertex program. Based on this template, a design framework is described to map a user-supplied vertex program to the hardware template to produce a synthesizable RTL (e.g., Verilog) implementation instance optimized for the vertex program. The framework also performs automatic validation and tuning to ensure the produced RTL is correct and optimized. There are multiple use cases for this framework. For example, the produced synthesizable RTL can be deployed in an FPGA platform (e.g., Xeon-FPGA) to efficiently execute the given vertex program. Or, it can be refined further to produce an ASIC implementation.

Graphs can be represented as adjacency matrices, and graph processing can be formulated as sparse matrix operations. FIGS. 76*a-b* show an example of representing a graph as an adjacency matrix. Each non-zero in the matrix represents an edge among two nodes in the graph. For example, a 1 in row 0 column 2 represents an edge from node A to C.

One of the most popular models for describing computations on graph data is the vertex programming model. One implementation supports the vertex programming model variant from Graphmat software framework, which formulates vertex programs as generalized sparse matrix vector multiply (GSPMV). As shown in FIG. 76*c*, a vertex program consists of the types of data associated with edges/vertices in the graph (edata/vdata), messages sent across vertices in the graph (mdata), and temporary data (tdata) (illustrated in the top portion of program code); and stateless user-defined compute functions using pre-defined APIs that read and update the graph data (as illustrated in the bottom portion of program code).

FIG. 76*d* illustrates exemplary program code for executing a vertex program. Edge data is represented as an adjacency matrix A (as in FIG. 76*b*), vertex data as vector y, and messages as sparse vector x. FIG. 76*e* shows the GSPMV formulation, where the multiply( ) and add( ) operations in SPMV is generalized by user-defined PROCESS_MSG( ) and REDUCE( )

One observation here is that the GSPMV variant needed to execute vertex program performs a column-oriented multiplication of sparse matrix A (i.e., adjacency matrix) against a sparse vector x (i.e., messages) to produce an output vector y (i.e., vertex data). This operation is referred to as col_spMspV (previously described with respect to the above accelerator).

Figure 77:
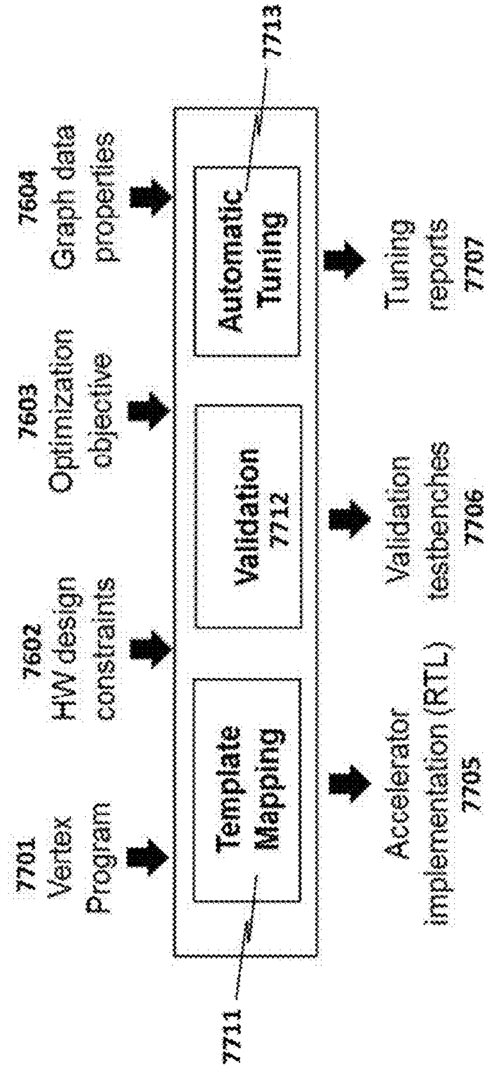
FIG. 77 illustrates a framework.

Design Framework. One implementation of the framework is shown in FIG. 77 which includes a template mapping component 7711, a validation component 7712 and an automatic tuning component 7713. Its inputs are a user-specified vertex program 7701, design optimization goals 7703 (e.g., max performance, min area), and target hardware design constraints 7702 (e.g., maximum amount of on-chip RAMs, memory interface width). As an optional input to aid automatic-tuning, the framework also accepts graph data properties 7704 (e.g., type=natural graph) or a sample graph data.

Given these inputs, the template mapping component 7711 of the framework maps the input vertex program to a hardware accelerator architecture template, and produces an RTL implementation 7705 of the accelerator instance optimized for executing the vertex program 7701. The automatic tuning component 7713 performs automatic tuning 7713 to optimize the generated RTL for the given design objectives, while meeting the hardware design constraints. Furthermore, the validation component 7712 automatically validates the generated RTL against functional and performance models derived from the inputs. Validation test benches 7706 and tuning reports 7707 are produced along with the RTL.

Generalized Sparse Matrix Vector Multiply (GSPMV) Hardware Architecture Template One implementation of an architecture template for GSPMV is shown in FIG. 77, which is based on the accelerator architecture described above (see, e.g., FIG. 74 and associated text). Many of the components illustrated in FIG. 77 are customizable. In one implementation, the architecture to support execution of vertex programs has been extended as follows.

Figure 78:
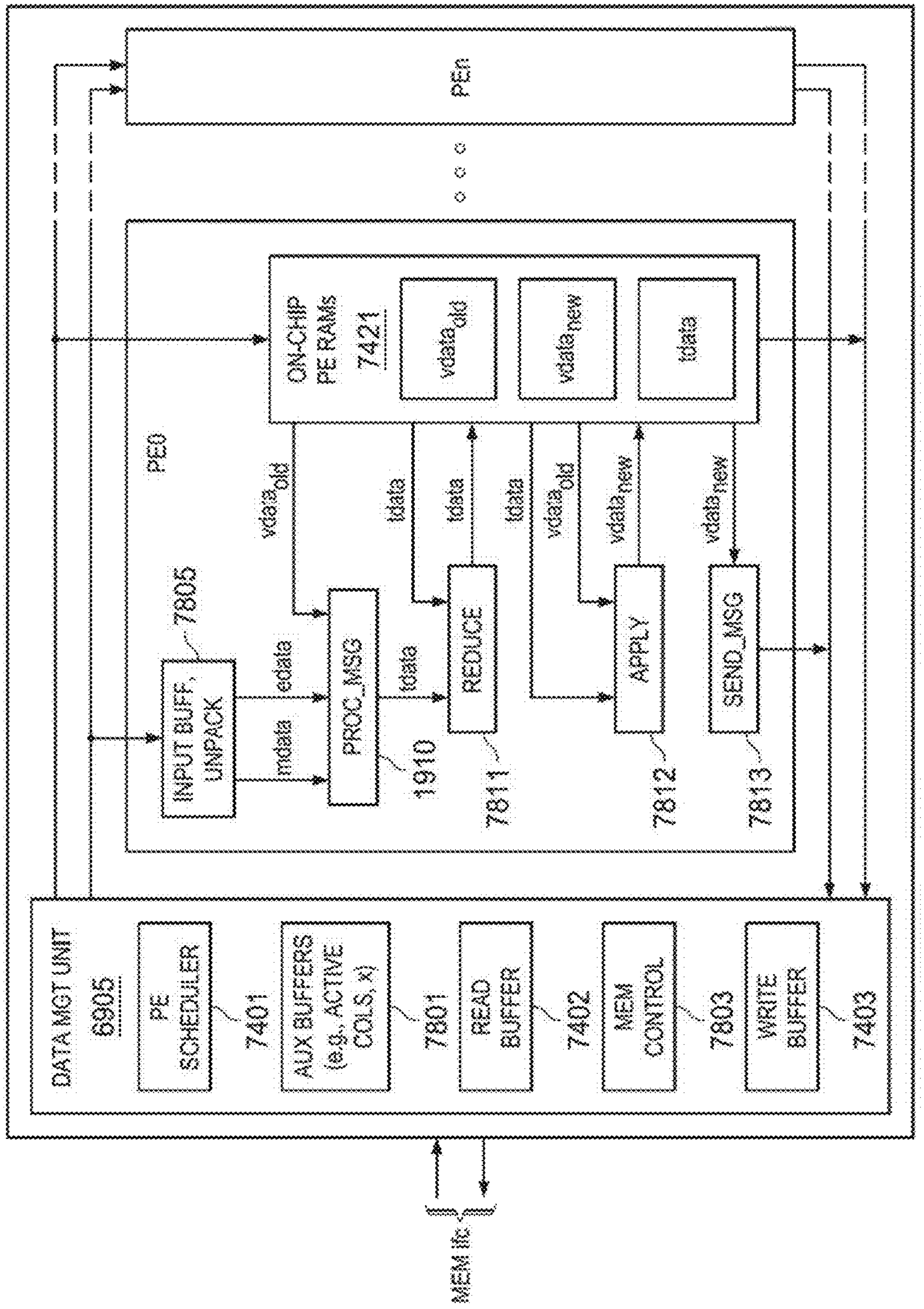
FIG. 78 illustrates customizable logic blocks are provided inside each PE.

As illustrated in FIG. 78, customizable logic blocks are provided inside each PE to support PROCESS_MSG( ) 1910, REDUCE( ) 7811, APPLY 7812, and SEND_MSG( ) 7813 needed by the vertex program. In addition, one implementation provides customizable on-chip storage structures and pack/unpack logic 7805 to support user-defined graph data (i.e., vdata, edata, mdata, tdata). The data management unit 6905 illustrated includes a PE scheduler 7401 (for scheduling PEs as described above), aux buffers 7801 for storing active column, x data), a read buffer 7402, a memory controller 7803 for controlling access to system memory, and a write buffer 7403. In addition, in the implementation shown in FIG. 78 old and new vdata and tdata is stored within the local PE memory 7421. Various control state machines may be modified to support executing vertex programs, abiding to the functionalities specified by the algorithms in FIGS. 76*d* and 76*e*.

Figure 79:
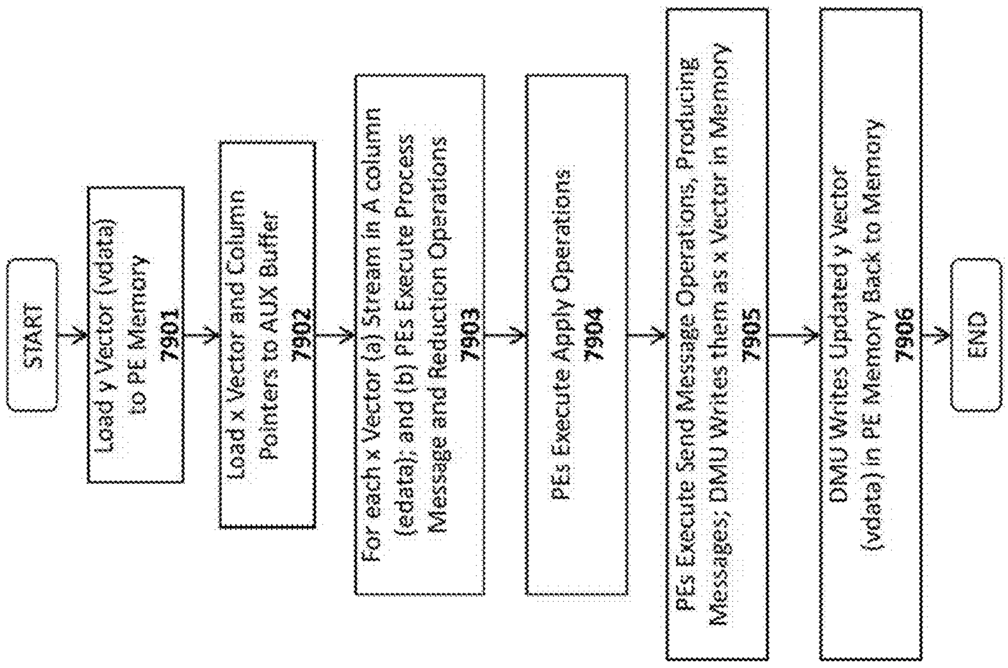
FIG. 79 illustrates an operation of each accelerator tile.

The operation of each accelerator tile is summarized in FIG. 79. At 7901, the y vector (vdata) is loaded to the PE RAM 7421. At 7902, the x vector and column pointers are loaded to the aux buffer 7801. At 7903, for each x vector element, the A column is streamed in (edata) and the PEs execute PROC_MSG( ) 7810 and REDUCE( ) 7811. At 7904, the PEs execute APPLY( ) 7812. At 7905, the PEs execute SEND_MSG( ) 7813, producing messages, and the data management unit 6905 writes them as x vectors in memory. At 7906, the data management unit 6905 writes the updated y vectors (vdata) stored in the PE RAMs 7421 back to memory. The above techniques conform to the vertex program execution algorithm shown in FIGS. 76*d* and 76*e*. To scale up performance, the architecture allows increasing the number of PEs in a tile and/or the number of tiles in the design. This way, the architecture can take advantage of multiple levels of parallelisms in the graph (i.e., across subgraphs (across blocks of adjacency matrix) or within each subgraph). The Table in FIG. 80*a* summarizes the customizable parameters of one implementation of the template. It is also possible to assign asymmetric parameters across tiles for optimization (e.g., one tile with more PEs than another tile).

Automatic Mapping, Validation, and Tuning

Tuning. Based on the inputs, one implementation of the framework performs automatic tuning to determine the best design parameters to use to customize the hardware architecture template in order to optimize it for the input vertex program and (optionally) graph data. There are many tuning considerations, which are summarized in the table in FIG. 80*b*. As illustrated, these include locality of data, graph data sizes, graph compute functions, graph data structure, graph data access attributes, graph data types, and graph data patterns.

Template Mapping. In this phase, the framework takes the template parameters determined by the tuning phase, and produces an accelerator instance by "filling" in the customizable portions of the template. The user-defined compute functions (e.g., FIG. 76*c*) may be mapped from the input specification to the appropriate PE compute blocks using existing High-Level Synthesis (HLS) tools. The storage structures (e.g., RAMs, buffers, cache) and memory interfaces are instantiated using their corresponding design parameters. The pack/unpack logic may automatically be generated from the data type specifications (e.g., FIG. 76*a*). Parts of the control finite state machines (FSMs) are also generated based on the provided design parameters (e.g., PE scheduling schemes).

Validation. In one implementation, the accelerator architecture instance (synthesizable RTL) produced by the template mapping is then automatically validated. To do this, one implementation of the framework derives a functional model of the vertex program to be used as the "golden" reference. Test benches are generated to compare the execution of this golden reference against simulations of the RTL implementation of the architecture instance. The framework also performs performance validation by comparing RTL simulations against analytical performance model and cycle-accurate software simulator. It reports runtime breakdown and pinpoints the bottlenecks of the design that affect performance.

Computations on sparse datasets—vectors or matrices most of whose values are zero—are critical to an increasing number of commercially-important applications, but typically achieve only a few percent of peak performance when run on today's CPUs. In the scientific computing arena, sparse-matrix computations have been key kernels of linear solvers for decades. More recently, the explosive growth of machine learning and graph analytics has moved sparse computations into the mainstream. Sparse-matrix computations are central to many machine-learning applications and form the core of many graph algorithms.

Sparse-matrix computations tend to be memory bandwidth-limited rather than compute-limited, making it difficult for CPU changes to improve their performance. They execute few operations per matrix data element and often iterate over an entire matrix before re-using any data, making caches ineffective. In addition, many sparse-matrix algorithms contain significant numbers of data-dependent gathers and scatters, such as the result[row]+=matrix[row][i].value*vector [matrix[row][i].index] operation found in sparse matrix-vector multiplication, which are hard to predict and reduce the effectiveness of prefetchers.

To deliver better sparse-matrix performance than conventional microprocessors, a system must provide significantly higher memory bandwidth than current CPUs and a very energy-efficient computing architecture. Increasing memory bandwidth makes it possible to improve performance, but the high energy/bit cost of DRAM accesses limits the amount of power available to process that bandwidth. Without an energy-efficient compute architecture, a system might find itself in the position of being unable to process the data from a high-bandwidth memory system without exceeding its power budget.

One implementation comprises an accelerator for sparse-matrix computations which uses stacked DRAM to provide the bandwidth that sparse-matrix algorithms require combined with a custom compute architecture to process that bandwidth in an energy-efficient manner.

Sparse-Matrix Overview

Many applications create data sets where the vast majority of the values are zero. Finite-element methods model objects as a mesh of points where the state of each point is a function of the state of the points near it in the mesh. Mathematically, this becomes a system of equations that is represented as a matrix where each row describes the state of one point and the values in the row are zero for all of the points that do not directly affect the state of the point the row describes. Graphs can be represented as an adjacency matrix, where each element {i,j} in the matrix gives the weight of the edge between vertices i and j in the graph. Since most vertexes connect to only a small fraction of the other vertices in the graph, the vast majority of the elements in the adjacency matrix are zeroes. In machine learning, models are typically trained using datasets that consist of many samples, each of which contains a set of features (observations of the state of a system or object) and the desired output of the model for that set of features. It is very common for most of the samples to only contain a small subset of the possible features, for example when the features represent different words that might be present in a document, again creating a dataset where most of the values are zero.

Datasets where most of the values are zero are described as "sparse," and it is very common for sparse datasets to be extremely sparse, having non-zero values in less than 1% of their elements. These datasets are often represented as matrices, using data structures that only specify the values of the non-zero elements in the matrix. While this increases the amount of space required to represent each non-zero element, since it is necessary to specify both the element's location and its value, the overall space (memory) savings can be substantial if the matrix is sparse enough. For example, one of the most straightforward representations of a sparse matrix is the coordinate list (COO) representation, in which each non-zero is specified by a {row index, column index, value} tuple. While this triples the amount of storage required for each non-zero value, if only 1% of the elements in a matrix have non-zero values, the COO representation will take up only 3% of the space that a dense representation (one that represents the value of each element in the matrix) would take.

Figure 81:
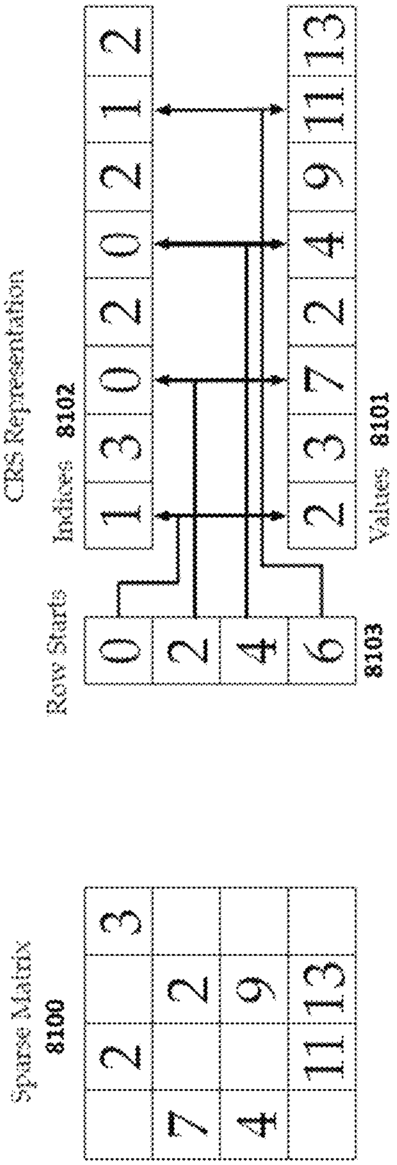
FIG. 81 illustrates one of the most common sparse-matrix formats.

FIG. 81 illustrates one of the most common sparse-matrix formats, the compressed row storage (CRS, sometimes abbreviated CSR) format. In CRS format, the matrix 8100 is described by three arrays: a values array 8101, which contains the values of the non-zero elements, an indices array 8102, which specifies the position of each non-zero element within its row of the matrix, and a row starts array 8103, which specifies where each row of the matrix starts in the lists of indices and values. Thus, the first non-zero element of the second row of the example matrix can be found at position 2 in the indices and values arrays, and is described by the tuple {0, 7}, indicating that the element occurs at position 0 within the row and has value 7. Other commonly-used sparse-matrix formats include compressed sparse column (CSC), which is the column-major dual to CRS, and ELLPACK, which represents each row of the matrix as a fixed-width list of non-zero values and their indices, padding with explicit zeroes when a row has fewer non-zero elements than the longest row in the matrix.

Computations on sparse matrices have the same structure as their dense-matrix counterparts, but the nature of sparse data tends to make them much more bandwidth-intensive than their dense-matrix counterparts. For example, both the sparse and dense variants of matrix-matrix multiplication find C=A. B by computing Ci,j=Ai,·B,j for all i, j. In a dense matrix-matrix computation, this leads to substantial data re-use, because each element of A participates in N multiply-add operations (assuming N×N matrices), as does each element of B. As long as the matrix-matrix multiplication is blocked for cache locality, this re-use causes the computation to have a low bytes/op ratio and to be compute-limited. However, in the sparse variant, each element of A only participates in as many multiply-add operations as there are non-zero values in the corresponding row of B, while each element of B only participates in as many multiply-adds as there are non-zero elements in the corresponding column of A. As the sparseness of the matrices increases, so does the bytes/op ratio, making the performance of many sparse matrix-matrix computations limited by memory bandwidth in spite of the fact that dense matrix-matrix multiplication is one of the canonical compute-bound computations.

Four operations make up the bulk of the sparse-matrix computations seen in today's applications: sparse matrix-dense vector multiplication (SpMV), sparse matrix-sparse vector multiplication, sparse matrix-sparse matrix multiplication, and relaxation/smoother operations, such as the Gauss-Seidel smoother used in implementations of the High-Performance Conjugate Gradient benchmark. These operations share two characteristics that make a sparse-matrix accelerator practical. First, they are dominated by vector dot-products, which makes it possible to implement simple hardware that can implement all four important computations. For example, a matrix-vector multiplication is performed by taking the dot-product of each row in the matrix with the vector, while a matrix-matrix multiplication takes the dot-product of each row of one matrix with each column of the other. Second, applications generally perform multiple computations on the same matrix, such as the thousands of multi-plications of the same matrix by different vectors that a support vector machine algorithm performs with training a model. This repeated use of the same matrix makes it practical to transfer matrices to/from an accelerator during program execution and/or to re-format the matrix in a way that simplifies the hardware's task, since the cost of data transfers/transformations can be amortized across many operations on each matrix.

Figure 82:
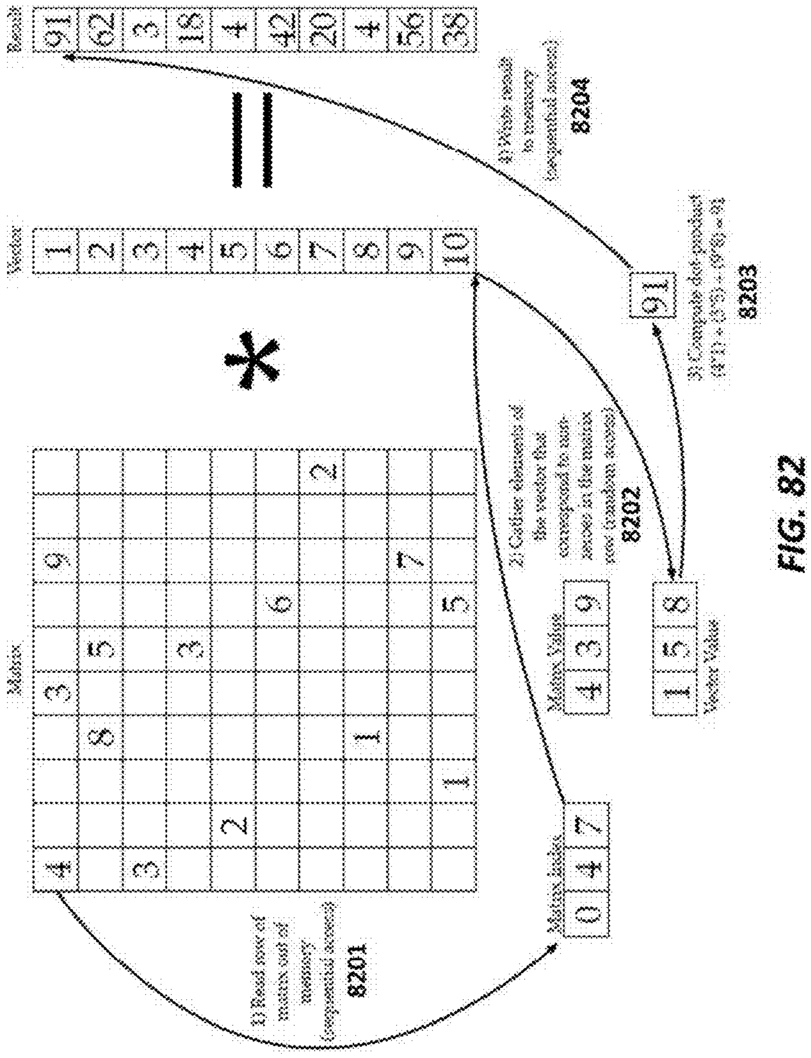
FIG. 82 shows steps involved in an implementation of sparse matrix-dense vector multiplication using the CRS data format.

Sparse-matrix computations typically achieve only a few percent of the peak performance of the system they run on. To demonstrate why this occurs, FIG. 82 shows the steps 8201-8204 involved in an implementation of sparse matrix-dense vector multiplication using the CRS data format. First, at 8201, the data structure that represents a row of the matrix is read out of memory, which usually involves a set of sequential reads that are easy to predict and prefetch. Second, at 8202, the indices of the non-zero elements in the matrix row are used to gather the corresponding elements of the vector, which requires a number of data-dependent, hard-to-predict memory accesses (a gather operation). Moreover, these memory accesses often touch only one or two words in each referenced cache line, resulting in significant wasted bandwidth when the vector does not fit in the cache.

Third, at 8203, the processor computes the dot-product of the non-zero elements of the matrix row and the corresponding elements of the vector. Finally, at 8204, the result of the dot-product is written into the result vector, which is also accessed sequentially, and the program proceeds to the next row of the matrix. Note that this is a conceptual/algorithmic view of the computation, and the exact sequence of operations the program executes will depend on the processor's ISA and vector width.

This example illustrates a number of important characteristics of sparse-matrix computations. Assuming 32-bit data types and that neither the matrix nor the vector fit in the cache, computing the first element of the output row requires reading 36 bytes from DRAM, but only five compute instructions (three multiplies and two adds), for a bytes/op ratio of 7.2:1.

Memory bandwidth is not the only challenge to high-performance sparse-matrix computations, however. As FIG. 82 shows, the accesses to the vector in SpMV are data-dependent and hard to predict, exposing the latency of vector accesses to the application. If the vector does not fit in the cache, SpMV performance becomes sensitive to DRAM latency as well as bandwidth unless the processor provides enough parallelism to saturate the DRAM bandwidth even when many threads are stalled waiting for data.

Thus, an architecture for sparse-matrix computations must provide several things to be effective. It must deliver high memory bandwidth to meet the bytes/op needs of sparse computations. It must also support high-bandwidth gathers out of large vectors that may not fit in the cache. Finally, while performing enough arithmetic operations/second to keep up with DRAM bandwidth is not a challenge in and of itself, the architecture must perform those operations and all of the memory accesses they require in an energy-efficient manner in order to remain within system power budgets.

Figure 83:
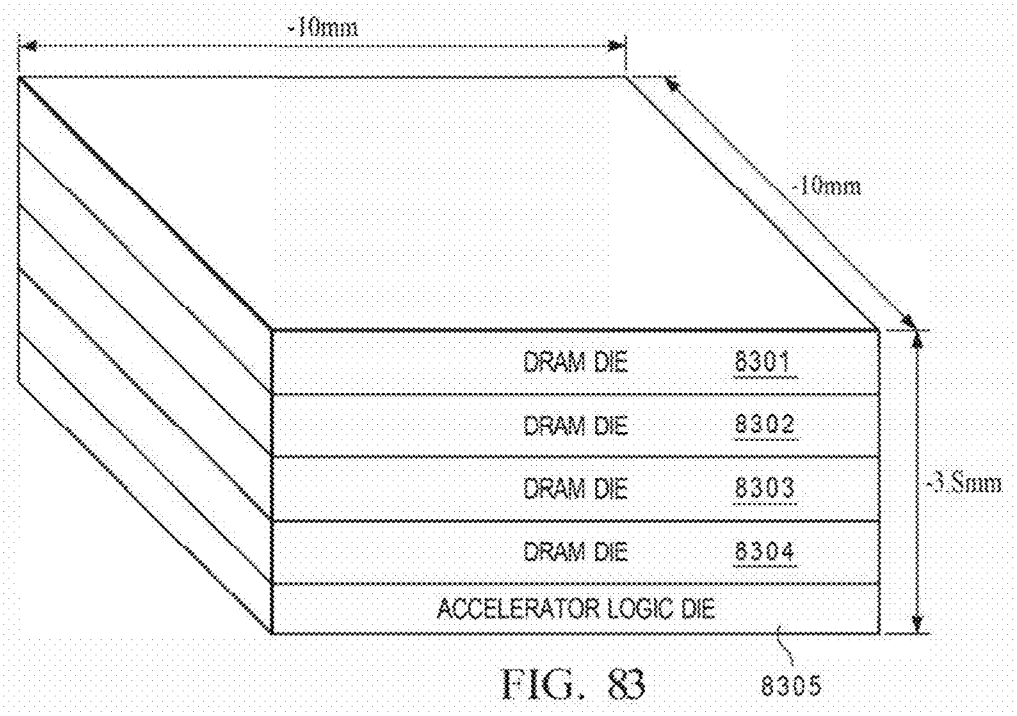
FIG. 83 illustrates an implementation of the accelerator includes an accelerator logic die and one of more stacks of DRAM.

One implementation comprises an accelerator designed to provide the three features necessary for high sparse-matrix performance: high memory bandwidth, high-bandwidth gathers out of large vectors, and energy-efficient computation. As illustrated in FIG. 83, one implementation of the accelerator includes an accelerator logic die 8305 and one of more stacks 8301-8304 of DRAM die. Stacked DRAM, which is described in more detail below, provides high memory bandwidth at low energy/bit. For example, stacked DRAMs are expected to deliver 256-512 GB/see at 2.5 pJ/bit, while LPDDR4 DIMMs are only expected to deliver 68 GB/see and will have an energy cost of 12 pJ/bit.

The accelerator logic chip 8305 at the bottom of the accelerator stack is customized to the needs of sparse-matrix computations, and is able to consume the bandwidth offered by a DRAM stack 8301-8304 while only expending 2-4 Watts of power, with energy consumption proportional to the bandwidth of the stack. To be conservative, a stack bandwidth of 273 GB/see is assumed (the expected bandwidth of WIO3 stacks) for the remainder of this application. Designs based on higher-bandwidth stacks would incorporate more parallelism in order to consume the memory bandwidth.

Figure 84A:
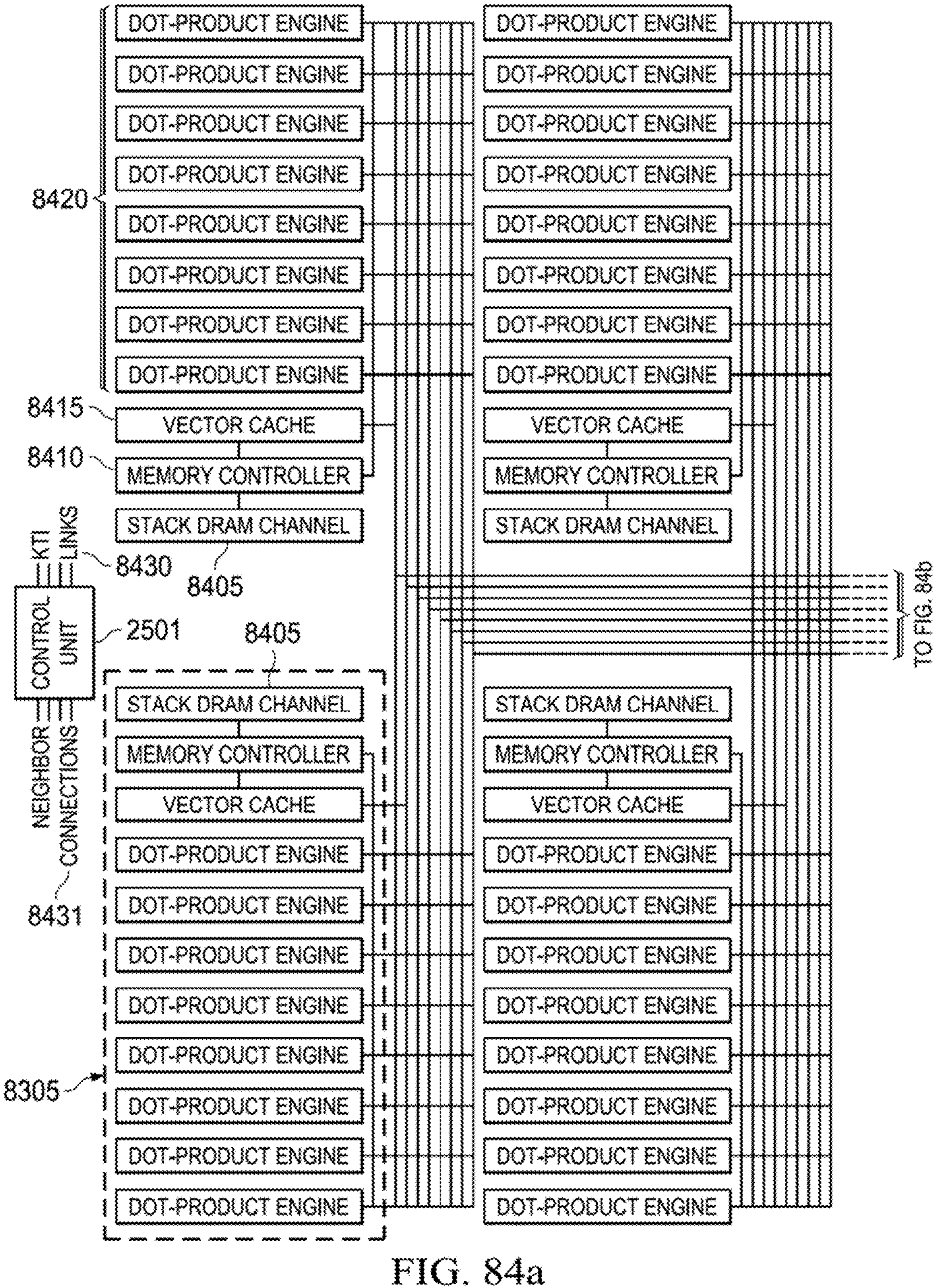
FIGS. 84A-B illustrates one implementation of the accelerator logic chip, oriented from a top perspective through the stack of DRAM die.
Figure 84B:
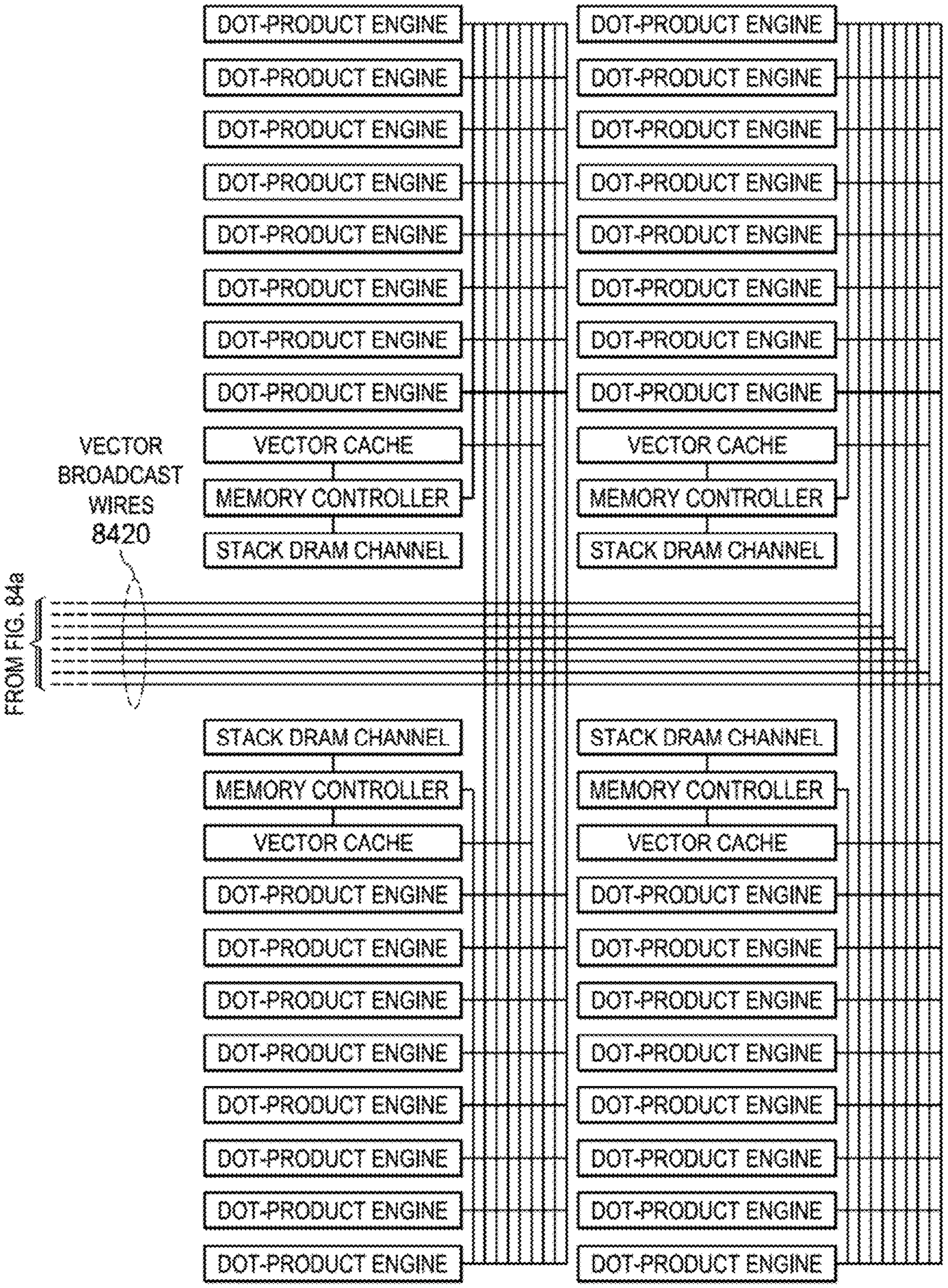

FIG. 84 illustrates one implementation of the accelerator logic chip 8305, oriented from a top perspective through the stack of DRAM die 8301-8304. The stack DRAM channel blocks 8405 towards the center of the diagram represent the through-silicon vias that connect the logic chip 8305 to the DRAMs 8301-8304, while the memory controller blocks 7410 contain the logic that generates the control signals for the DRAM channels. While eight DRAM channels 8405 are shown in the figure, the actual number of channels implemented on an accelerator chip will vary depending on the stacked DRAMs used. Most of the stack DRAM technologies being developed provide either four or eight channels.

Figure 85:
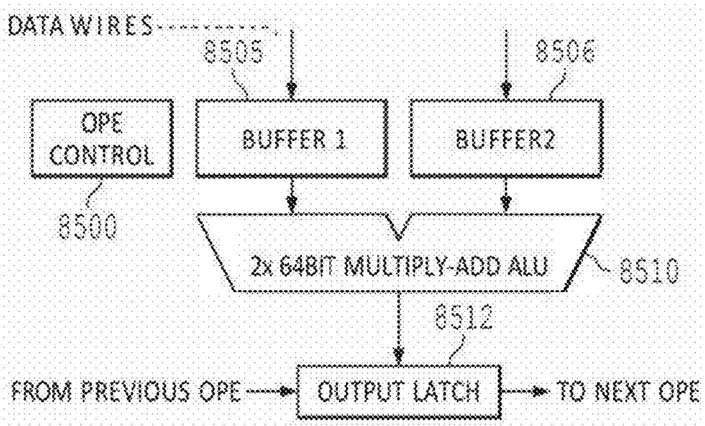
FIG. 85 provides a high-level overview of a DPE.

The dot-product engines (DPEs) 8420 are the computing elements of the architecture. In the particular implementation shown in FIGS. 84A-B, each set of eight DPEs is associated with a vector cache 8415. FIG. 85 provides a high-level overview of a DPE which contains two buffers 8505-8506, two 64-bit multiply-add ALUs 8510, and control logic 8500. During computations, the chip control unit 8500 streams chunks of the data being processed into the buffer memories 8505-8506. Once each buffer is full, the DPE's control logic sequences through the buffers, computing the dot-products of the vectors they contain and writing the results out to the DPE's result latch 8512, which is connected in a daisy-chain with the result latches of the other DPE's to write the result of a computation back to the stack DRAM 8301-8304.

In one implementation, the accelerator logic chip operates at approximately 1 GHz and 0.65V to minimize power consumption (although the particular operating frequency and voltage may be modified for different applications). Analysis based on 14 nm design studies shows that 32-64 KB buffers meet this frequency spec at that voltage, although strong ECC may be required to prevent soft errors. The multiply-add unit may be operated at half of the base clock rate in order to meet timing with a 0.65V supply voltage and shallow pipeline. Having two ALUs provides a throughput of one double-precision multiply-add/cycle per DPE.

At 273 GB/second and a clock rate of 1.066 MHZ, the DRAM stack 8301-8304 delivers 256 bytes of data per logic chip clock cycle. Assuming that array indices and values are at least 32-bit quantities, this translates to 32 sparse-matrix elements per cycle (4 bytes of index+4 bytes of value=8 bytes/element), requiring that the chip perform 32 multiply-adds per cycle to keep up. (This is for matrix-vector multiplication and assumes a high hit rate in the vector cache so that 100% of the stack DRAM bandwidth is used to fetch the matrix.) The 64 DPEs shown in FIG. 84 provide 2-4× the required compute throughput, allowing the chip to process data at the peak stack DRAM bandwidth even if the ALUs 8510 are not used 100% of the time.

In one implementation, the vector caches 8415 cache elements of the vector in a matrix-vector multiplication. This significantly increases the efficiency of the matrix-blocking scheme described below. In one implementation, each vector cache block contains 32-64 KB of cache, for a total capacity of 256-512 KB in an eight-channel architecture.

The chip control unit 8401 manages the flow of a computation and handles communication with the other stacks in an accelerator and with other sockets in the system. To reduce complexity and power consumption, the dot-product engines never request data from memory. Instead, the chip control unit 8401 manages the memory system, initiating transfers that push the appropriate blocks of data to each of the DPEs.

In one implementation, the stacks in a multi-stack accelerator communicate with each other via a network of KTI links 8430 that is implemented using the neighbor connections 8431 shown in the figure. The chip also provides three additional KTI links that are used to communicate with the other socket(s) in a multi-socket system. In a multi-stack accelerator, only one of the stacks' off-package KTI links 8430 will be active. KTI transactions that target memory on the other stacks will be routed to the appropriate stack over the on-package KTI network.

Techniques and hardware to implement sparse matrix-dense vector and sparse matrix-sparse vector multiplication on one implementation of the accelerator are described herein. This can also be extended to support matrix-matrix multiplication, relaxation operations, and other functions to create an accelerator that supports sparse-matrix operations.

While sparse-sparse and sparse-dense matrix-vector multiplications execute the same basic algorithm (taking the dot product of each row in the matrix and the vector), there are significant differences in how this algorithm is implemented when the vector is sparse as compared to when it is dense, which are summarized in Table below.

TABLE

| | Sparse-Sparse SpMV | Sparse-Dense SpMV |
|---|---|---|
| Size of Vector | Typically Small | Often large (5-10% of matrix size) |
| Location of Vector Elements | Unpredictable | Determined by Index |
| Number of operations per matrix element | Unpredictable | Fixed |

In a sparse matrix-dense vector multiplication, the size of the vector is fixed and equal to the number of columns in the matrix. Since many of the matrices found in scientific computations average approximately 10 non-zero elements per row, it is not uncommon for the vector in a sparse matrix-dense vector multiplication to take up 5-10% as much space as the matrix itself. Sparse vectors, on the other hand, are often fairly short, containing similar numbers of non-zero values to the rows of the matrix, which makes them much easier to cache in on-chip memory.

In a sparse matrix-dense vector multiplication the location of each element in the vector is determined by its index, making it feasible to gather the vector elements that correspond to the non-zero values in a region of the matrix and to pre-compute the set of vector elements that need to be gathered for any dense vector that the matrix will be multiplied by. The location of each element in a sparse vector, however is unpredictable and depends on the distribution of non-zero elements in the vector. This makes it necessary to examine the non-zero elements of the sparse vector and of the matrix to determine which non-zeroes in the matrix correspond to non-zero values in the vector.

It is helpful to compare the indices of the non-zero elements in the matrix and the vector because the number of instructions/operations required to compute a sparse matrix-sparse vector dot-product is unpredictable and depends on the structure of the matrix and vector. For example, consider taking the dot-product of a matrix row with a single non-zero element and a vector with many non-zero elements. If the row's non-zero has a lower index than any of the non-zeroes in the vector, the dot-product only requires one index comparison. If the row's non-zero has a higher index than any of the non-zeroes in the vector, computing the dot-product requires comparing the index of the row's non-zero with every index in the vector. This assumes a linear search through the vector, which is common practice. Other searches, such as binary search, would be faster in the worst case, but would add significant overhead in the common case where the non-zeroes in the row and the vector overlap. In contrast, the number of operations required to perform a sparse matrix-dense vector multiplication is fixed and determined by the number of non-zero values in the matrix, making it easy to predict the amount of time required for the computation.

Figure 86:
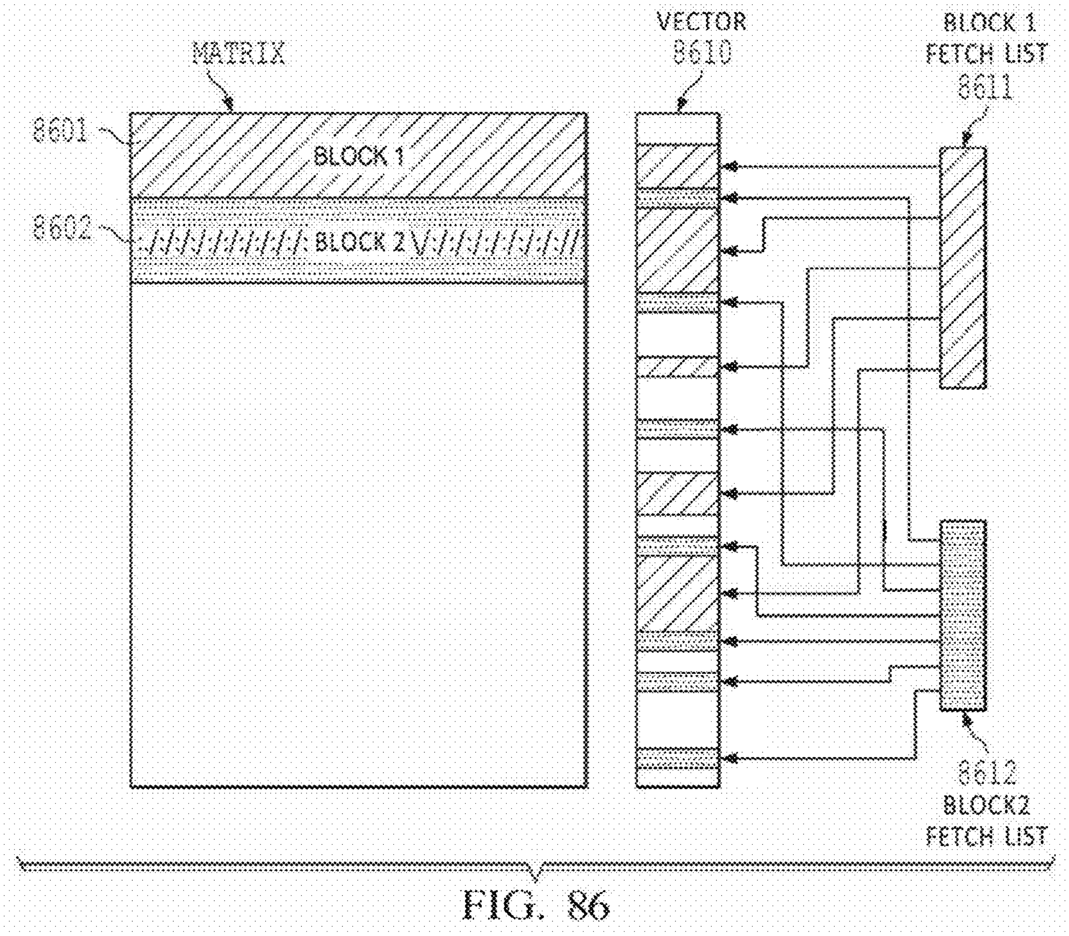
FIG. 86 illustrates an implementation of a blocking scheme.

Because of these differences, one implementation of the accelerator uses the same high-level algorithm to implement sparse matrix-dense vector and sparse matrix-sparse vector multiplication, with differences in how the vector is distributed across the dot-product engines and how the dot-product is computed. Because the accelerator is intended for large sparse-matrix computations, it cannot be assumed that either the matrix or the vector will fit in on-chip memory. Instead, one implementation uses the blocking scheme outlined in FIG. 86.

In particular, in this implementation, the accelerator will divide matrices into fixed-size blocks of data 8601-8602, sized to fit in the on-chip memory, and will multiply the rows in the block by the vector to generate a chunk of the output vector before proceeding to the next block. This approach poses two challenges. First, the number of non-zeroes in each row of a sparse matrix varies widely between datasets, from as low as one to as high as 46,000 in the datasets studied. This makes it impractical to assign one or even a fixed number of rows to each dot-product engine. Therefore, one implementation assigns fixed-size chunks of matrix data to each dot product engine and handles the case where a chunk contains multiple matrix rows and the case where a single row is split across multiple chunks.

The second challenge is that fetching the entire vector from stack DRAM for each block of the matrix has the potential to waste significant amounts of bandwidth (i.e., fetching vector elements for which there is no corresponding non-zero in the block). This is particularly an issue for sparse matrix-dense vector multiplication, where the vector can be a significant fraction of the size of the sparse matrix. To address this, one implementation constructs a fetch list 8611-8612 for each block 8601-8602 in the matrix, which lists the set of vector 8610 elements that correspond to non-zero values in the block, and only fetch those elements when processing the block. While the fetch lists must also be fetched from stack DRAM, it has been determined that the fetch list for most blocks will be a small fraction of the size of the block. Techniques such as run-length encodings may also be used to reduce the size of the fetch list.

Thus, a matrix-vector multiplication on Accelerator will involve the following sequence of operations:

1. Fetch a block of matrix data from the DRAM stack and distribute it across the dot-product engines;
2. Generate fetch list based on non-zero elements in the matrix data;
3. Fetch each vector element in the fetch list from stack DRAM and distribute it to the dot-product engines
4. Compute the dot-product of the rows in the block with the vector and write the results out to stack DRAM; and
5. In parallel with the computation, fetch the next block of matrix data and repeat until the entire matrix has been processed.

When an accelerator contains multiple stacks, "partitions" of the matrix may be statically assigned to the different stacks and then the blocking algorithm may be executed in parallel on each partition. This blocking and broadcast scheme has the advantage that all of the memory references originate from a central control unit, which greatly simplifies the design of the on-chip network, since the network does not have to route unpredictable requests and replies between the dot product engines and the memory controllers. It also saves energy by only issuing one memory request for each vector element that a given block needs, as opposed to having individual dot product engines issue memory requests for the vector elements that they require to perform their portion of the computation. Finally, fetching vector elements out of an organized list of indices makes it easy to schedule the memory requests that those fetches require in a way that maximizes page hits in the stacked DRAM and thus bandwidth usage.

One challenge in implementing sparse matrix-dense vector multiplication on the accelerator implementations described herein is matching the vector elements being streamed from memory to the indices of the matrix elements in each dot-product engine's buffers. In one implementation, 256 bytes (32-64 elements) of the vector arrive at the dot-product engine per cycle, and each vector element could correspond to any of the non-zeroes in the dot-product engine's matrix buffer since fixed-size blocks of matrix data were fetched into each dot-product engine's matrix buffer.

Performing that many comparisons each cycle would be prohibitively expensive in area and power. Instead, one implementation takes advantage of the fact that many sparse-matrix applications repeatedly multiply the same matrix by either the same or different vectors and pre-compute the elements of the fetch list that each dot-product engine will need to process its chunk of the matrix, using the format shown in FIG. 87. In the baseline CRS format, a matrix is described by an array of indices 8702 that define the position of each non-zero value within its row, an array containing the values of each non-zero 8703, and an array 8701 that indicates where each row starts in the index and values arrays. To that, one implementation adds an array of block descriptors 8705 that identify which bursts of vector data each dot-product engine needs to capture in order to perform its fraction of the overall computation.

Figure 87:
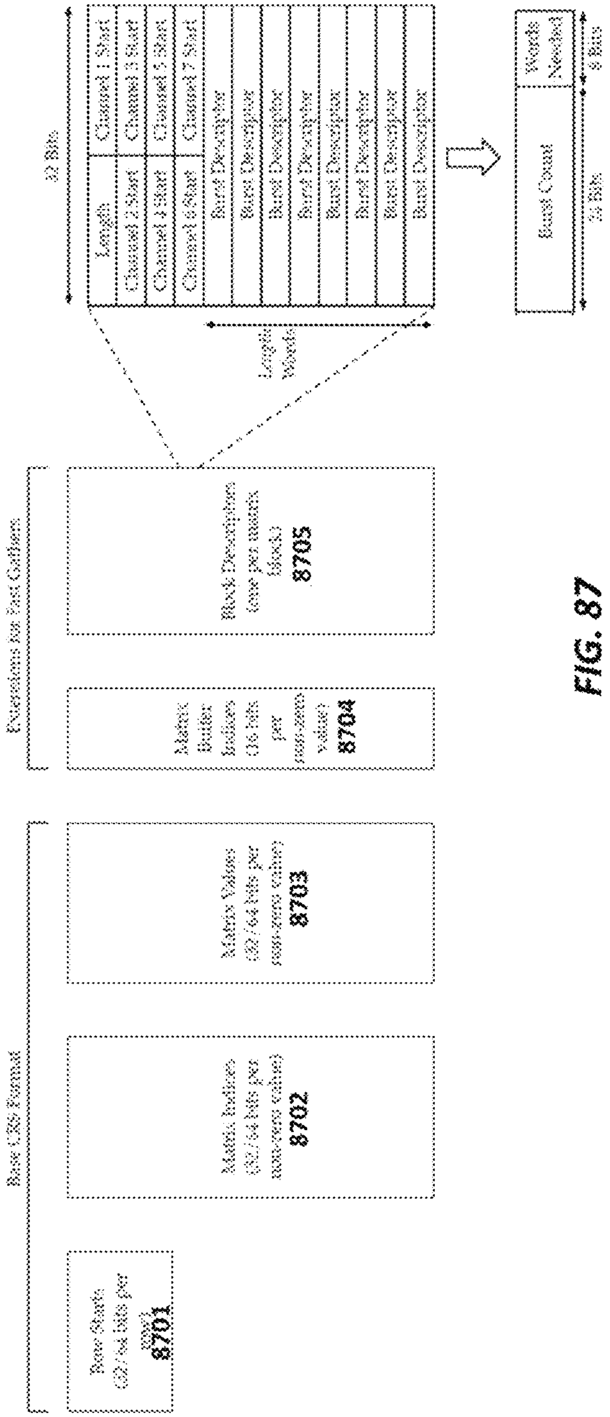
FIG. 87 shows a block descriptor.

As shown in FIG. 87, each block descriptor consists of eight 16-bit values and a list of burst descriptors. The first 16-bit value tells the hardware how many burst descriptors are in the block descriptor, while the remaining seven identify the start points within the burst descriptor list for all of the stack DRAM data channels except the first. The number of these values will change depending on the number of data channels the stacked DRAM provides. Each burst descriptor contains a 24-bit burst count that tells the hardware which burst of data it needs to pay attention to and a "Words Needed" bit-vector that identifies the words within the burst that contain values the dot-processing engine needs.

The other data structure included in one implementation is an array of matrix buffer indices (MBIs) 8704, one MBI per non-zero in the matrix. Each MBI gives the position at which the dense vector element that corresponds to the non-zero will be stored in the relevant dot-product engine's vector value buffer (see, e.g., FIG. 89). When performing a sparse matrix-dense vector multiplication, the matrix buffer indices, rather than the original matrix indices, are loaded into the dot-product engine's matrix index buffer 8704, and serve as the address used to look up the corresponding vector value when computing the dot product.

Figure 88:
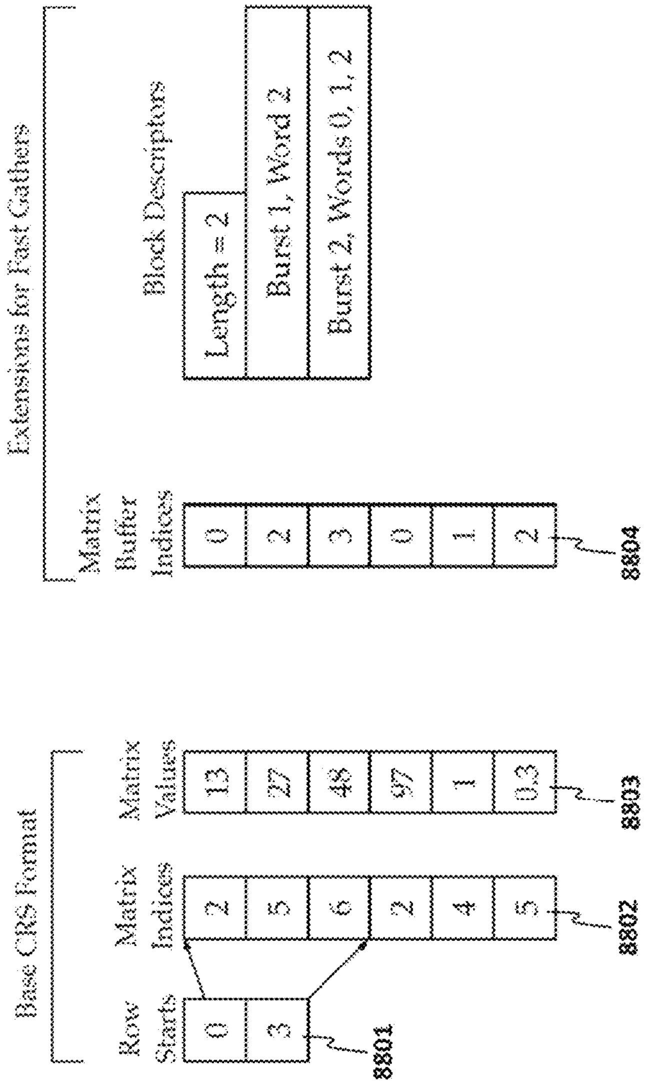
FIG. 88 illustrates a two-row matrix that fits within the buffers of a single dot-product engine.

FIG. 88 illustrates how this works for a two-row matrix that fits within the buffers of a single dot-product engine, on a system with only one stacked DRAM data channel and four-word data bursts. The original CRS representation including row start values 8801, matrix indices 8802 and matrix values 8803 are shown on the left of the figure. Since the two rows have non-zero elements in columns {2, 5, 6} and {2, 4, 5}, elements 2, 4, 5, and 6 of the vector are required to compute the dot-products. The block descriptors reflect this, indicating that word 2 of the first four-word burst (element 2 of the vector) and words 0, 1, and 2 of the second four-word burst (elements 4-6 of the vector) are required. Since element 2 of the vector is the first word of the vector that the dot-product engine needs, it will go in location 0 in the vector value buffer. Element 4 of the vector will go in location 1, and so on.

The matrix buffer index array data 8804 holds the location within the vector value buffer where the hardware will find the value that corresponds to the non-zero in the matrix. Since the first entry in the matrix indices array has value "2", the first entry in the matrix buffer indices array gets the value "0", corresponding to the location where element 2 of the vector will be stored in the vector value buffer. Similarly, wherever a "4" appears in the matrix indices array, a "1" will appear in the matrix buffer indices, each "5" in the matrix indices array will have a corresponding "2" in the matrix buffer indices, and each "6" in the matrix indices array will correspond to a "3" in the matrix buffer indices.

One implementation of the invention performs the pre-computations required to support fast gathers out of dense vectors when a matrix is loaded onto the accelerator, taking advantage of the fact that the total bandwidth of a multi-stack accelerator is much greater than the bandwidth of the KTI links used to transfer data from the CPU to the accelerator. This pre-computed information increases the amount of memory required to hold a matrix by up to 75%, depending on how often multiple copies of the same matrix index occur within the chunk of the matrix mapped onto a dot-product engine. However, because the 16-bit matrix buffer indices array is fetched instead of the matrix indices array when a matrix-vector multiplication is performed, the amount of data fetched out of the stack DRAMs will often be less than in the original CRS representation, particularly for matrices that use 64-bit indices.

Figure 89:
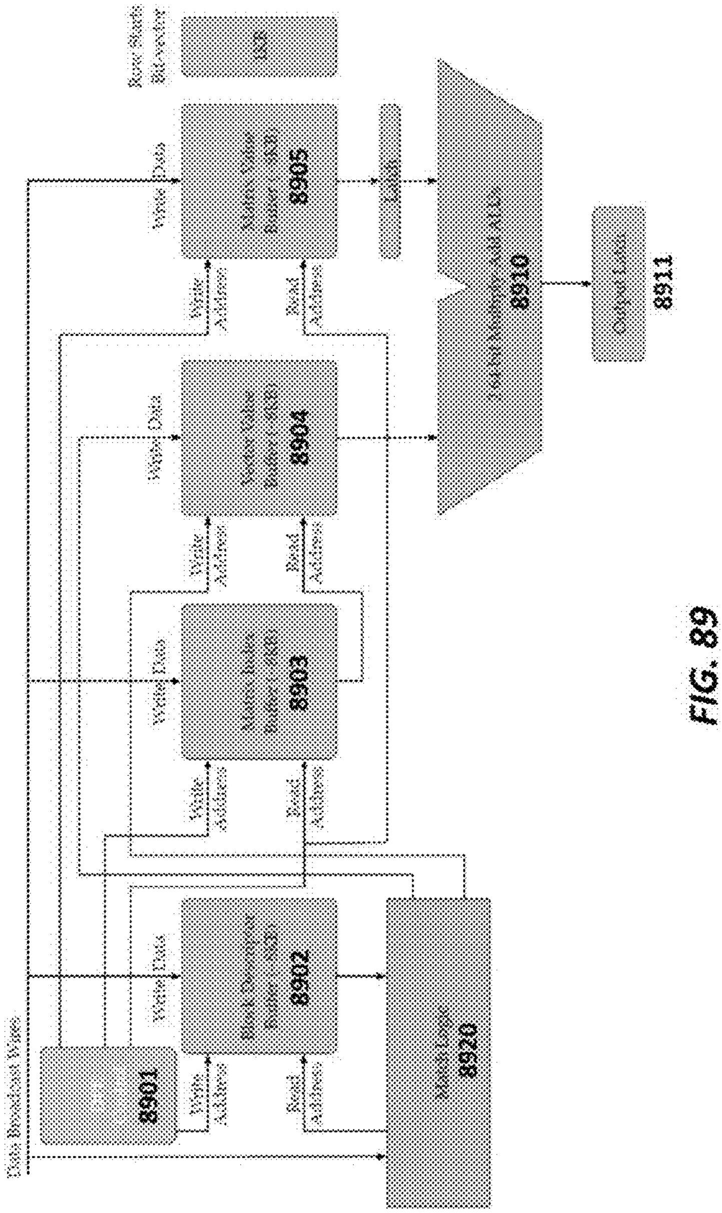
FIG. 89 illustrates one implementation of the hardware in a dot-product engine that uses this format.

FIG. 89 illustrates one implementation of the hardware in a dot-product engine that uses this format. To perform a matrix-vector multiplication, the chunks of the matrix that make up a block are copied into the matrix index buffer 8903 and matrix value buffer 8905 (copying the matrix buffer indices instead of the original matrix indices), and the relevant block descriptor is copied into the block descriptor buffer 8902. Then, the fetch list is used to load the required elements from the dense vector and broadcast them to the dot-product engines. Each dot-product engine counts the number of bursts of vector data that go by on each data channel. When the count on a given data channel matches the value specified in a burst descriptor, the match logic 8920 captures the specified words and stores them in its vector value buffer 8904.

Figure 90:
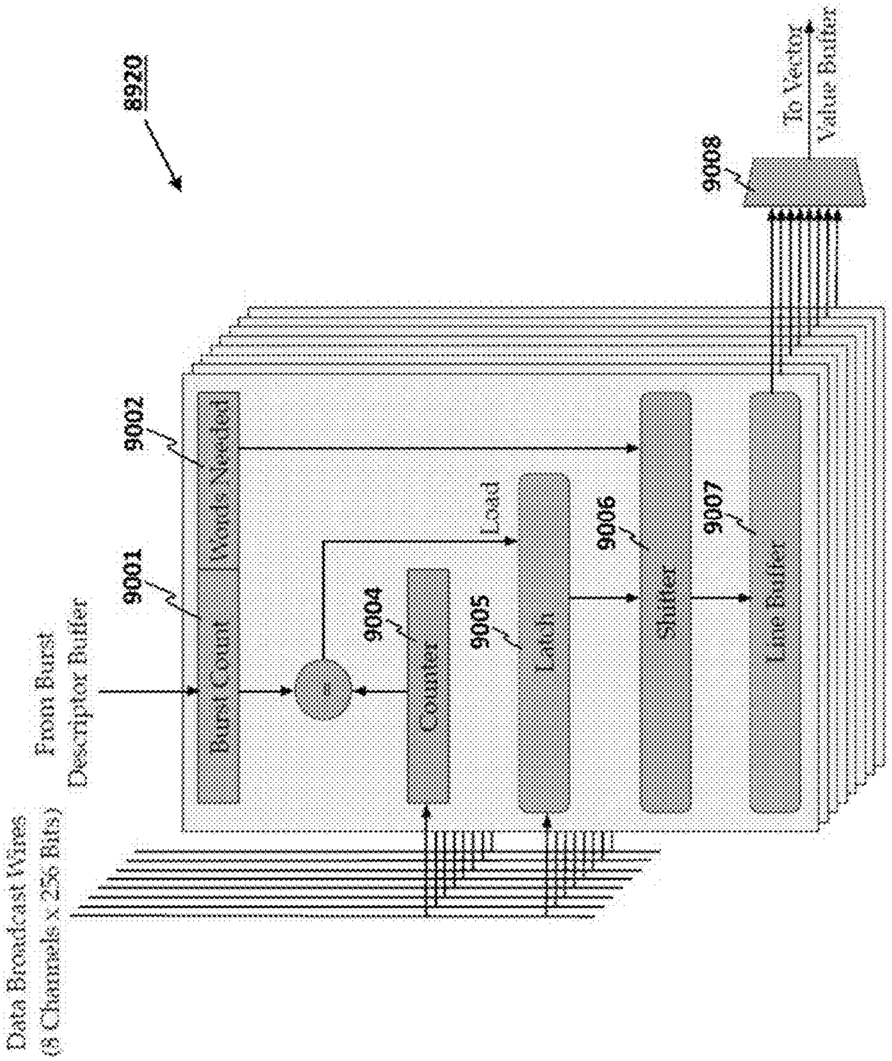
FIG. 90 illustrates contents of the match logic unit that does capturing.

FIG. 90 shows the contents of the match logic 8920 unit that does this capturing. A latch 9005 captures the value on the data channel's wires when the counter matches the value in the burst descriptor. A shifter 9006 extracts the required words 9002 out of the burst 9001 and routes them to the right location in a line buffer 9007 whose size matches the rows in the vector value buffer. A load signal is generated when the burst count 9001 is equal to an internal counter 9004. When the line buffer fills up, it is stored in the vector value buffer 9004 (through mux 9008). Assembling the words from multiple bursts into lines in this way reduces the number of writes/cycle that the vector value buffer needs to support, reducing its size.

Once all of the required elements of the vector have been captured in the vector value buffer, the dot-product engine computes the required dot-product(s) using the ALUs 8910. The control logic 8901 steps through the matrix index buffer 8903 and matrix value buffer 8904 in sequence, one element per cycle. The output of the matrix index buffer 8903 is used as the read address for the vector value buffer 8904 on the next cycle, while the output of the matrix value buffer 8904 is latched so that it reaches the ALUs 8910 at the same time as the corresponding value from the vector value buffer 8904. For example, using the matrix from FIG. 88, on the first cycle of the dot-product computation, the hardware would read the matrix buffer index "0" out of the matrix index buffer 8903 along with the value "13" from the matrix value buffer 8905. On the second cycle, the value "0" from the matrix index buffer 8903 acts as the address for the vector value buffer 8904, fetching the value of vector element "2", which is then multiplied by "13" on cycle 3.

The values in the row starts bit-vector 8901 tell the hardware when a row of the matrix ends and a new one begins. When the hardware reaches the end of the row, it places the accumulated dot-product for the row in its output latch 8911 and begins accumulating the dot-product for the next row. The dot-product latches of each dot-product engine are connected in a daisy chain that assembles the output vector for writeback.

In sparse matrix-sparse vector multiplication, the vector tends to take up much less memory than in sparse matrix-dense vector multiplication, but, because it is sparse, it is not possible to directly fetch the vector element that corresponds to a given index. Instead, the vector must be searched, making it impractical to route only the elements that each dot-product engine needs to the dot-product engine and making the amount of time required to compute the dot-products of the matrix data assigned to each dot-product engine unpredictable. Because of this, the fetch list for a sparse matrix-sparse vector multiplication merely specifies the index of the lowest and highest non-zero elements in the matrix block and all of the non-zero elements of the vector between those points must be broadcast to the dot-product engines.

Figure 91:
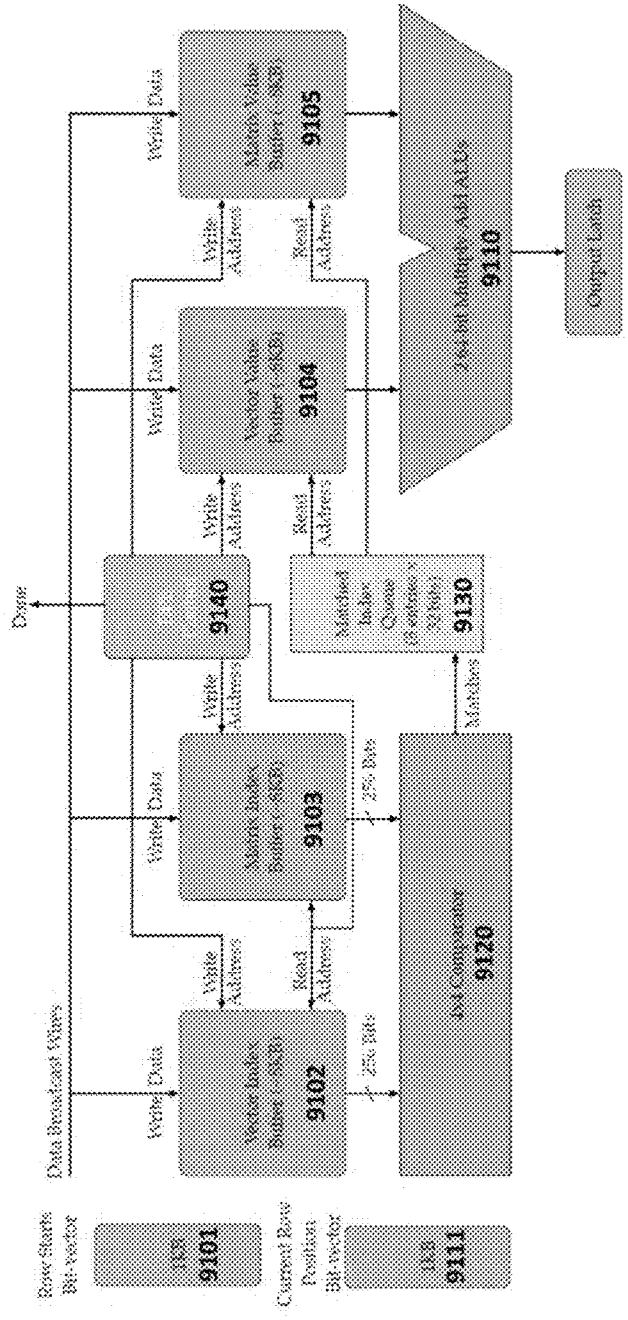
FIG. 91 illustrates details of a dot-product engine design to support sparse matrix-sparse vector multiplication according to an implementation.

FIG. 91 shows the details of a dot-product engine design to support sparse matrix-sparse vector multiplication. To process a block of matrix data, the indices (not the matrix buffer indices used in a sparse-dense multiplication) and values of the dot-product engine's chunk of the matrix are written into the matrix index and value buffers, as are the indices and values of the region of the vector required to process the block. The dot-product engine control logic 9140 then sequences through the index buffers 9102-9103, which output blocks of four indices to the 4×4 comparator 9120. The 4×4 comparator 9120 compares each of the indices from the vector 9102 to each of the indices from the matrix 9103, and outputs the buffer addresses of any matches into the matched index queue 9130. The outputs of the matched index queue 9130 drive the read address inputs of the matrix value buffer 9105 and vector value buffer 9104, which output the values corresponding to the matches into the multiply-add ALU 9110. This hardware allows the dot-product engine to consume at least four and as many as eight indices per cycle as long as the matched index queue 9130 has empty space, reducing the amount of time required to process a block of data when index matches are rare.

As with the sparse matrix-dense vector dot-product engine, a bit-vector of row starts 9101 identifies entries in the matrix buffers 9102-9103 that start a new row of the matrix. When such an entry is encountered, the control logic 9140 resets to the beginning of the vector index buffer 9102 and starts examining vector indices from their lowest value, comparing them to the outputs of the matrix index buffer 9103. Similarly, if the end of the vector is reached, the control logic 9140 advances to the beginning of the next row in the matrix index buffer 9103 and resets to the beginning of the vector index buffer 9102. A "done" output informs the chip control unit when the dot-product engine has finished processing a block of data or a region of the vector and is ready to proceed to the next one. To simplify one implementation of the accelerator, the control logic 9140 will not proceed to the next block/region until all of the dot-product engines have finished processing.

In many cases, the vector buffers will be large enough to hold all of the sparse vector that is required to process the block. In one implementation, buffer space for 1,024 or 2,048 vector elements is provided, depending on whether 32- or 64-bit values are used.

When the required elements of the vector do not fit in the vector buffers, a multipass approach may be used. The control logic 9140 will broadcast a full buffer of the vector into each dot-product engine, which will begin iterating through the rows in its matrix buffers. When the dot-product engine reaches the end of the vector buffer before reaching the end of the row, it will set a bit in the current row position bit-vector 9111 to indicate where it should resume processing the row when the next region of the vector arrives, will save the partial dot-product it has accumulated in the location of the matrix values buffer 9105 corresponding to the start of the row unless the start of the row has a higher index value than any of the vector indices that have been processed so far, and will advance to the next row. After all of the rows in the matrix buffer have been processed, the dot-product engine will assert its done signal to request the next region of the vector, and will repeat the process until the entire vector has been read.

Figure 92:
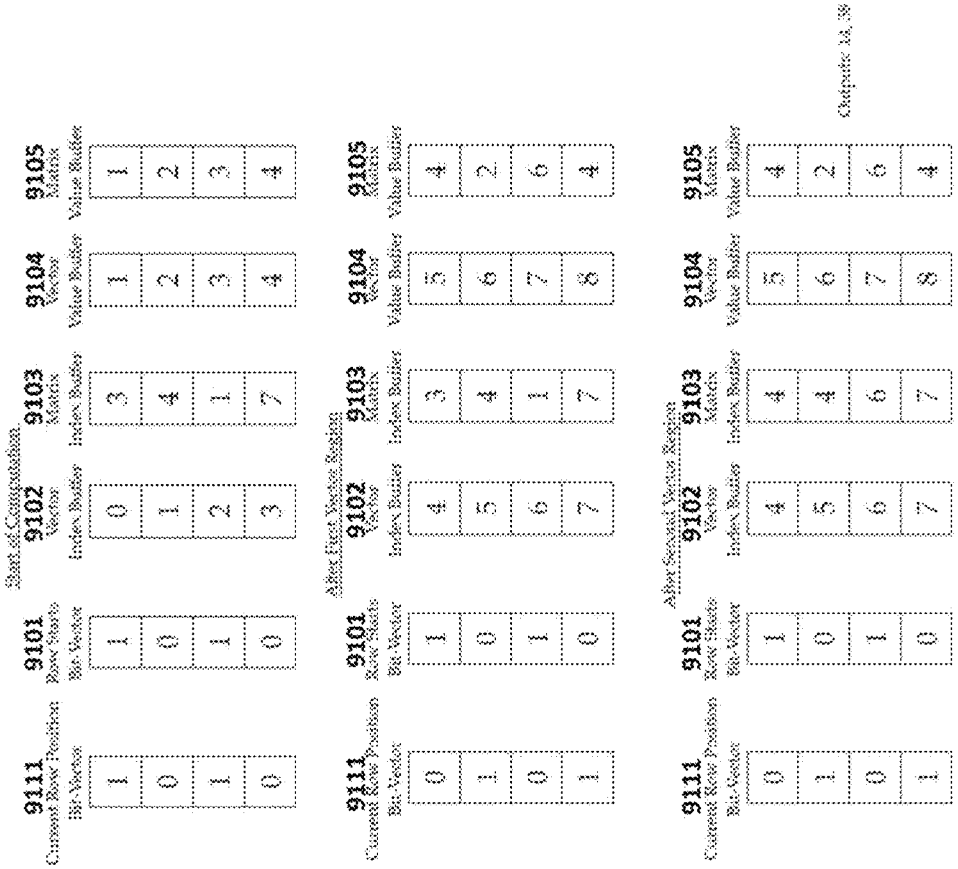
FIG. 92 illustrates an example using specific values.

FIG. 92 illustrates an example using specific values. At the start of the computation, a four-element chunk of the matrix has been written into the matrix buffers 9103, 9105, and a four-element region of the vector has been written into the vector buffers 9102, 9104. The row starts 9101 and current row position bit-vectors 9106 both have the value "1010," indicating that the dot-product engine's chunk of the matrix contains two rows, one of which starts at the first element in the matrix buffer, and one of which starts at the third.

When the first region is processed, the first row in the chunk sees an index match at index 3, computes the product of the corresponding elements of the matrix and vector buffers (4×1=4) and writes that value into the location of the matrix value buffer 9105 that corresponds to the start of the row. The second row sees one index match at index 1, computes the product of the corresponding elements of the vector and matrix, and writes the result (6) into the matrix value buffer 9105 at the position corresponding to its start. The state of the current row position bit-vector changes to "0101," indicating that the first element of each row has been processed and the computation should resume with the second elements. The dot-product engine then asserts its done line to signal that it is ready for another region of the vector.

When the dot-product engine processes the second region of the vector, it sees that row 1 has an index match at index 4, computes the product of the corresponding values of the matrix and vector (5×2=10), adds that value to the partial dot-product that was saved after the first vector region was processed, and outputs the result (14). The second row finds a match at index 7, and outputs the result 38, as shown in the figure. Saving the partial dot-products and state of the computation in this way avoids redundant work processing elements of the matrix that cannot possibly match indices in later regions of the vector (because the vector is sorted with indices in ascending order), without requiring significant amounts of extra storage for partial products.

Figure 93:
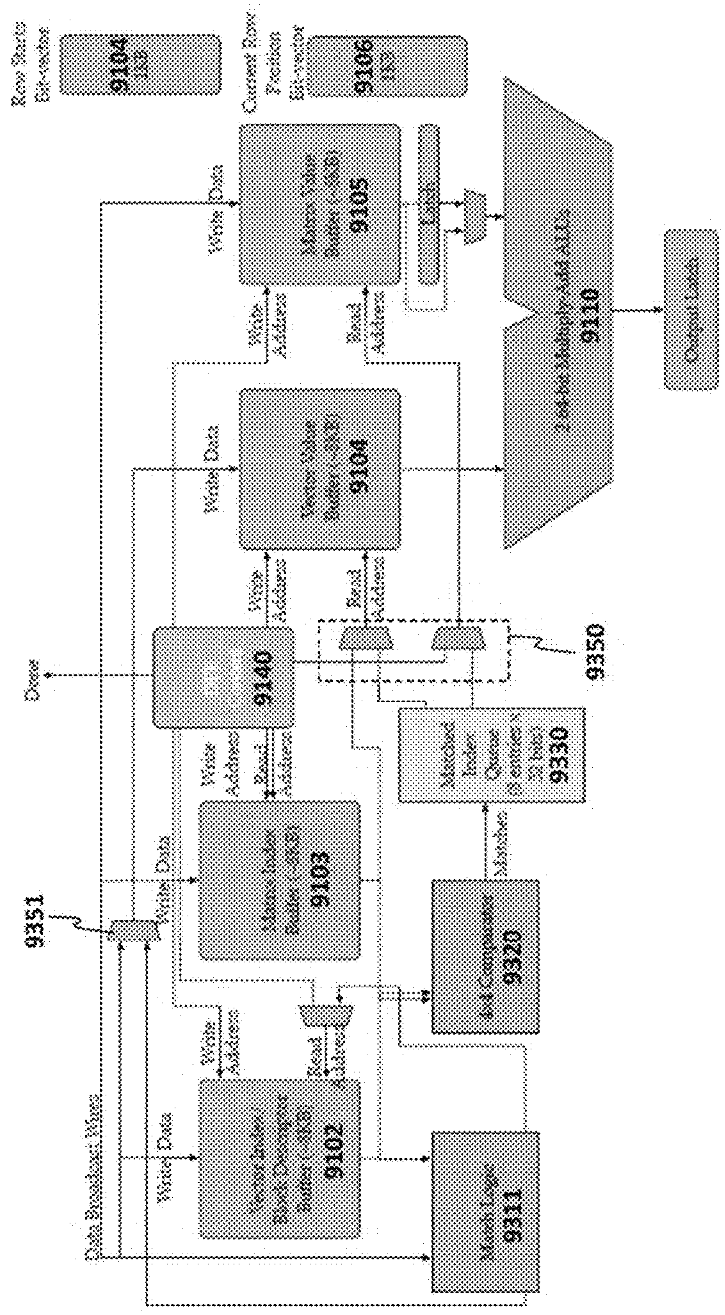
FIG. 93 illustrates how sparse-dense and sparse-sparse dot-product engines are combined to yield a dot-product engine that can handle both types of computations.

FIG. 93 shows how the sparse-dense and sparse-sparse dot-product engines described above are combined to yield a dot-product engine that can handle both types of computations. Given the similarity between the two designs, the only required changes are to instantiate both the sparse-dense dot-product engine's match logic 9311 and the sparse-sparse dot-product engine's comparator 9320 and matched index queue 9330, along with a set of multiplexors 9350 that determine which modules drive the read address and write data inputs of the buffers 9104-9105 and a multiplexor 9351 that selects whether the output of the matrix value buffer or the latched output of the matrix value buffer is sent to the multiply-add ALUs 9110. In one implementation, these multiplexors are controlled by a configuration bit in the control unit 9140 that is set at the beginning of a matrix-vector multiplication and remain in the same configuration throughout the operation.

A single accelerator stack will deliver performance comparable to a server CPU on sparse-matrix operations, making it an attractive accelerator for smartphones, tablets, and other mobile devices. For example, there are a number of proposals for machine-learning applications that train models on one or more servers and then deploy those models on mobile devices to process incoming data streams. Since models tend to be much smaller than the datasets used to train them, the limited capacity of a single accelerator stack is less of a limitation in these applications, while the performance and power efficiency of accelerator will allow mobile devices to process much more complex models than would be feasible on their primary CPUs. Accelerators for non-mobile systems will combine multiple stacks to deliver extremely high bandwidth and performance.

Figure 94B:
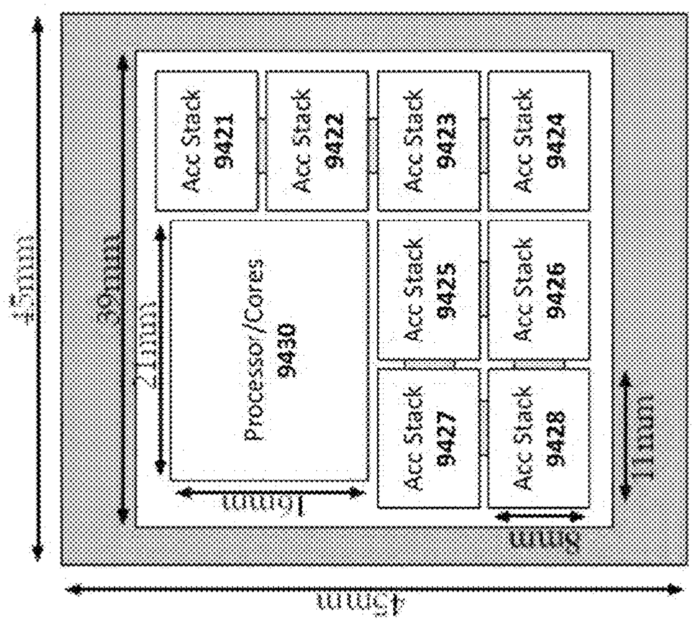
FIG. 94*b* illustrates a multi-chip package (MCP) implementation with a processor/set of cores and 8 stacks.
Figure 94A:
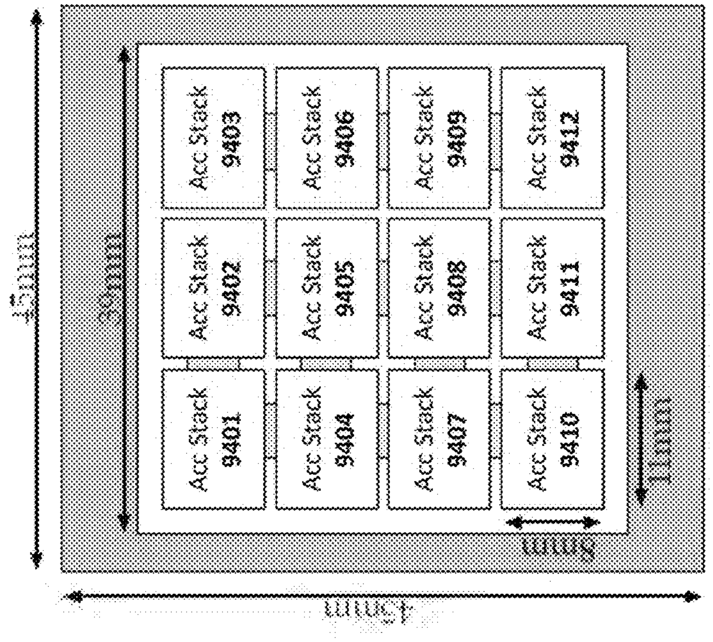
FIG. 94*a* illustrates a socket replacement implementation with 12 accelerator stacks.

Two implementations of a multi-stack implementation are illustrated in FIGS. 94*a* and 94*b*. Both of these implementations integrate several accelerator stacks onto a package that is pin-compatible with contemporary server CPUs. FIG. 94*a* illustrates a socket replacement implementation with 12 accelerator stacks 9401-9412 and FIG. 94*b* illustrates a multi-chip package (MCP) implementation with a processor/set of cores 9430 (e.g., a low core count Xeon) and 8 stacks 9421-9424. The 12 Accelerator stacks in FIG. 94*a* are placed in an array that fits under the 39 mm×39 mm heat spreader used in current packages, while the implementation in FIG. 94*b* incorporates the eight stacks and a processor/set of cores within the same footprint. In one implementation, the physical dimensions used for the stacks are the dimensions for 8 GB WIO3 stacks. Other DRAM technologies may have different dimensions, which may change the number of stacks that fit on a package.

Both of these implementations provide low-latency memory-based communication between the CPU and the accelerators via KTI links. The socket replacement design for Xeon implementations replaces one or more of the CPUs in a multi-socket system, and provides a capacity of 96 GB and 3.2 TB/s of stack DRAM bandwidth. Expected power consumption is 90 W, well within the power budget of a Xeon socket. The MCP approach provides 64 GB of capacity and 2.2 TB/s of bandwidth while consuming 60 W of power in the accelerator. This leaves 90 W for the CPU, assuming a 150 W per socket power budget, sufficient to support a medium-range Xeon CPU. If a detailed package design allowed more space for logic in the package, additional stacks or a more powerful CPU could be used, although this would require mechanisms such as the core parking techniques being investigated for the Xeon+FPGA hybrid part to keep total power consumption within the socket's power budget.

Both of these designs may be implemented without requiring silicon interposers or other sophisticated integration techniques. The organic substrates used in current packages allow approximately 300 signals per cm of die perimeter, sufficient to support the inter-stack KTI network and the off-package KTI links. Stacked DRAM designs can typically support logic chips that consume ~10 W of power before cooling becomes a problem, which is well over the estimates of 2 W of logic die power for a stack that provides 256 GB/see of bandwidth. Finally, multi-chip packages require 1-2 mm of space between chips for wiring, which is consistent with current designs.

Implementations may also be implemented on PCIe cards and/or using DDR4-T-based accelerators. Assuming a 300

W power limit for a PCIe card allows the card to support 40 accelerator stacks for a total capacity of 320 GB and bandwidth of 11 TB/sec. However, the long latency and limited bandwidth of the PCIe channel limit a PCIe-based accelerator to large problems that only require infrequent interaction with the CPU.

Figure 95:
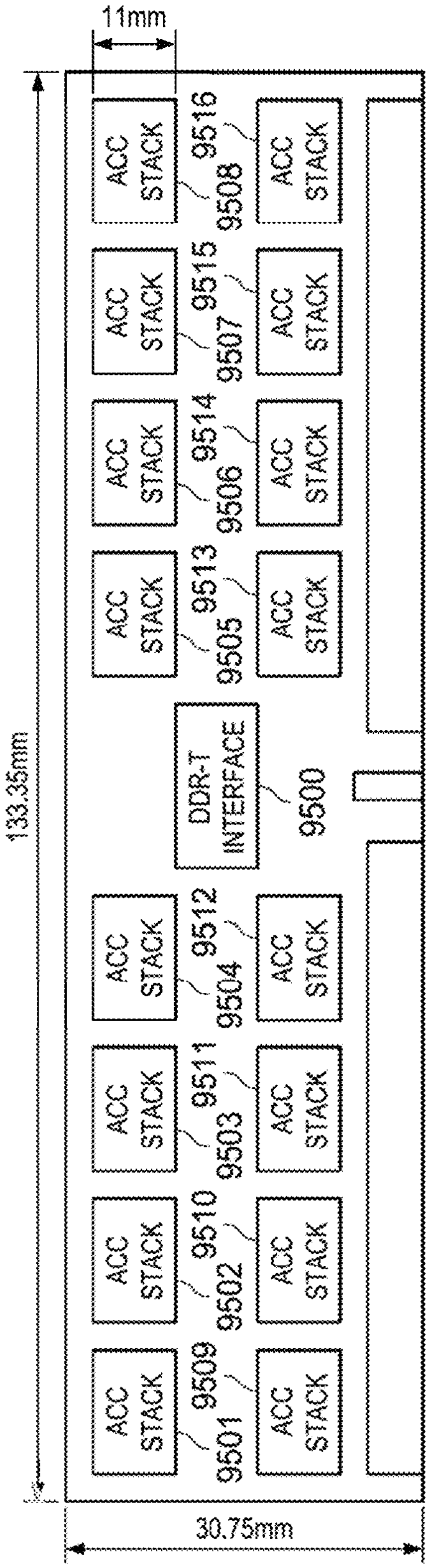
FIG. 95 illustrates accelerator stacks.

Alternately, accelerator stacks could be used to implement a DDR-T DIMM-based accelerators 9501-9516, as shown in FIG. 95. DDR-T is a memory interface designed to be compatible with DDR4 sockets and motherboards. Using the same pinout and connector format as DDR4, DDR-T provides a transaction-based interface 9500 that allows the use of memory devices with different timing characteristics. In this implementation, the accelerator stacks 9501-9516 act as simple memories when not being used to perform computations.

A DDR-T DIMM provides enough space for 16 Accelerator stacks, or 32 if both sides of the card are used, giving a memory capacity of 126-256 GB and a total bandwidth of 4-8 TB/sec. However, such a system would consume 120-240 Watts of power, much more than the ~10 W consumed by a DDR4-DIMM. This would require active cooling, which would be hard to fit into the limited space allocated for each DIMM on a motherboard. Still, a DDR-T-based accelerator might be attractive for applications where the user is not willing to give up any CPU performance for acceleration and is willing to pay the cost of a custom motherboard design that includes enough space between accelerator DIMMs for fans or other cooling systems.

In one implementation, the stacks in a multi-stack accelerator will be separate, distinct KTI nodes, and will be managed as separate devices by the system software. The system firmware will determine the routing table within a multi-stack accelerator statically at boot time based on the number of accelerator stacks present, which should uniquely determine the topology.

In one implementation, the low-level interface to accelerator will be implemented using an Accelerator Abstraction Layer (AAL) software, due to its suitability for socket-based accelerators. Accelerators may implement a Caching Agent as described by a Core Cache Interface specification (CCI), treating the stacked DRAM as private (non-coherent) memory for the accelerator that is not accessible by the host system (i.e., Caching Agent+Private Cache Memory configuration, such as CA+PCM). The CCI specification mandates a separate Config/Status Register (CSR) address space for each accelerator that is used by the driver to control the accelerator. According to the specification, each accelerator will communicate its status to the host via a Device Status Memory (DSM), a pinned memory region mapped to the host memory that is used to indicate the status of the accelerator. Thus, in a 12-stack system, there will be 12 distinct DSM regions managed by a single unified driver agent. These mechanisms may be used to create a command buffer for each stack. A command buffer is a pinned memory region mapped to system memory, implemented as a circular queue managed by the AAL driver. The driver writes commands into each stack's command buffer and each stack consumes items from its dedicated command buffer. Command production and consumption will thus be decoupled in this implementation.

As an example, consider a system composed of a single accelerator stack connected to a host CPU. The user writes code to perform the following computation: $wn+1=wn-\alpha Awn$, where A is a matrix and the wx are vectors. The software framework and AAL driver decompose this code into the following sequence of commands:

- TRANSMIT—load a sequence of partitions (wn+1, wn, $\alpha$, A) into the private cache memory
- MULTIPLY—multiply a sequence of partitions ($tmp=wn*\alpha*A$)
- SUBTRACT—subtract a sequence of partitions ($wn+1=wn-tmp$)
- RECEIVE—store a sequence of partitions to host memory containing the result (wn+1)

These commands operate on "partitions", coarse-grained (approximately 16 MB-512 MB) units of data located in either host or private cache memory. Partitions are intended to map easily onto the blocks of data that the MapReduce or Spark distributed computing systems use in order to facilitate acceleration of distributed computations using the accelerator(s). The AAL driver is responsible for creating a static one-to-one mapping of partitions to host memory regions or accelerator stacks. The accelerator stacks each individually map their assigned partitions to their private cache memory (PCM) address space. Partitions are described by a partition index, which is a unique identifier, plus (for partitions located in host memory) the corresponding memory region (s) and data format. The partitions located in the PCM are managed by the central control unit, which determines the PCM address region for the partition.

In one implementation, to initialize the PCM of the accelerator, the host directs the accelerator to load data from the host memory. A TRANSMIT operation causes the Accelerator to read host memory and store the data read into the accelerator's PCM. The data to be transmitted is described by a sequence of {partition index, host memory region, data format} tuples. To avoid the overhead of data marshaling by the host driver, the accelerator may implement System Protocol 2 (SPL2) shared virtual memory (SVM).

The data format in each tuple describes the layout of the partition in memory. Examples of formats the accelerator will support include Compressed Sparse Row (CSR) and multidimensional dense array. For the example above, A may be in the CSR format whereas wn may be in the array format. The command specification includes the necessary information and host memory addresses to direct the accelerator to load all the partitions referenced by the TRANSMIT operation into PCM.

Each operation may reference a small number of operands in the form of sequences of partitions. For example, the MULTIPLY operation causes the accelerator to read stacked DRAM and perform matrix-vector multiplication. It therefore has four operands in this example: the destination vector tmp, the multiplier A, the multiplicand wn, and the scalar a. The destination vector tmp is accumulated into a sequence of partitions specified by the driver as part of the command containing the operation. The command will direct the accelerator to initialize the sequence of partitions if required.

A RECEIVE operation causes the accelerator to read PCM and write host memory. This operation may be implemented as an optional field on all other operations, potentially fusing a command to perform an operation such as MULTIPLY with the directive to store the result to host memory. The destination operand of the RECEIVE operation is accumulated on-chip and then streamed into a partition in host memory, which must be pinned by the driver prior to dispatch of the command (unless the accelerator implements SPL2 SVM).

Command Dispatch Flow

In one implementation, after inserting commands into the command buffer for a stack, the driver will generate a CSR write to notify the stack of new commands to be consumed.

The CSR write by the driver is consumed by the central control unit of the accelerator stack, which causes the control unit to generate a series of reads to the command buffer to read the commands dispatched by the driver to the stack. When an accelerator stack completes a command, it writes a status bit to its DSM. The AAL driver either polls or monitors these status bits to determine completion of the command. The output for a TRANSMIT or MULTIPLY operation to the DSM is a status bit indicating completion. For a RECEIVE operation, the output to the DSM is a status bit and a sequence of partitions written into host memory. The driver is responsible for identifying the region of memory to be written by the accelerator. The control unit on the stack is responsible for generating a sequence of read operations to the stacked DRAM and corresponding writes to the destination partitions in host memory.

Software Enabling

In one implementation, users interact with the accelerator (s) by calling a library of routines to move data onto the accelerator, perform sparse-matrix computations, etc. The API for this library may be as similar as possible to existing sparse-matrix libraries in order to reduce the amount of effort required to modify existing applications to take advantage of the accelerator(s). Another advantage of a library-based interface is that it hides the details of the accelerator and its data formats, allowing programs to take advantage of different implementations by dynamically linking the correct version of the library at run time. Libraries may also be implemented to call accelerators from distributed computing environments like Spark.

The area and power consumption of an accelerator stack may be estimated by dividing the design into modules (memories, ALUs, etc.) and gathering data from 14 nm designs of similar structures. To scale to a 10 nm process, a 50% reduction in area may be assumed along with a 25% reduction in Cdyn, and a 20% reduction in leakage power. The area estimates include all on-chip memories and ALUs. It is assumed that wires run above the logic/memories. The power estimates include active energy for ALUs and memories, leakage power for memories, and wire power on our major networks. A base clock rate of 1 GHz was assumed and a supply voltage of 0.65V in both the 14 nm and 10 nm processes. As mentioned above, the ALUs may run at half of the base clock rate, and this was taken into account in the power projections. The KTI links and inter-stack networks are expected to be idle or nearly idle when the accelerator is performing computations, so were not included in the power estimates. One implementation tracks activity on these networks and includes them in power estimates.

Figure 96:
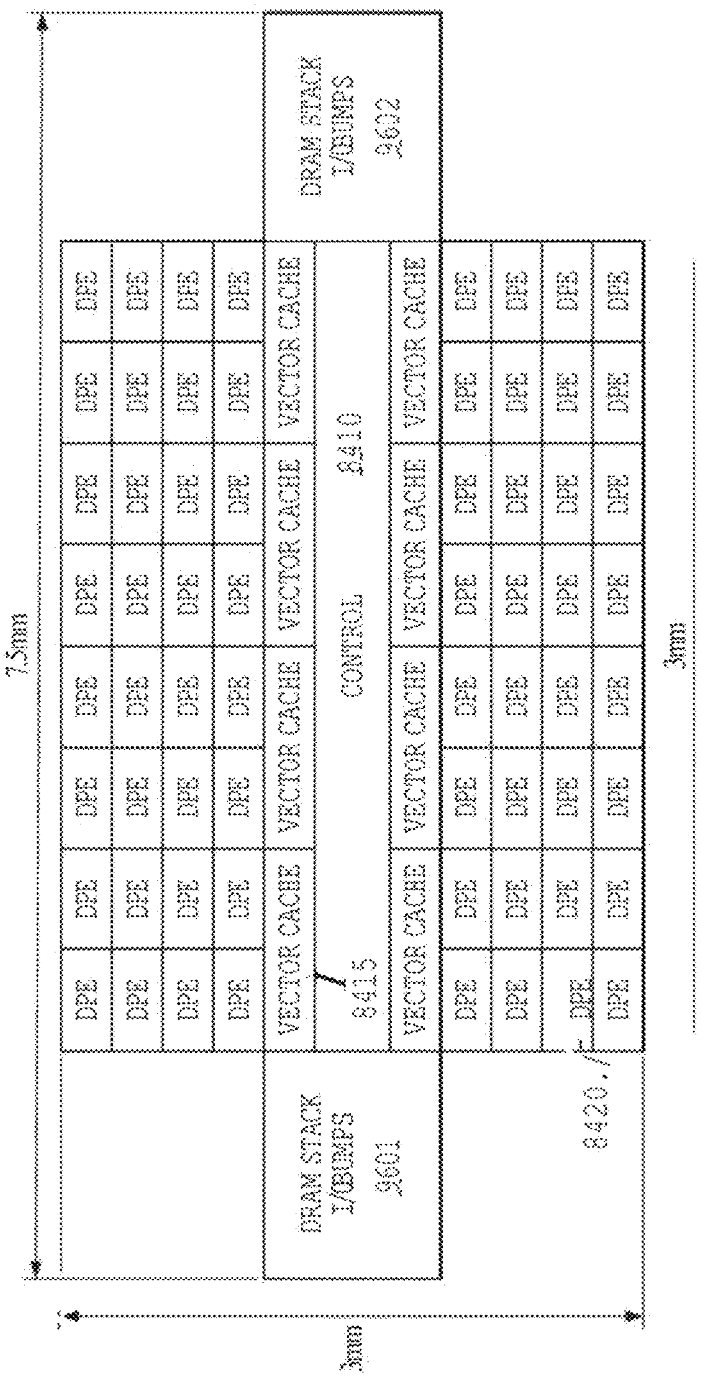
FIG. 96 shows a potential layout for an accelerator intended to sit under a WIO3 DRAM stack including 64 dot-product engines, 8 vector caches and an integrated memory controller.

The estimates predict that an accelerator as described herein will occupy 17 mm2 of chip area in a 14 nm process and 8.5 mm2 in a 10 nm process, with the vast majority of the chip area being occupied by memories. FIG. 96 shows a potential layout for an accelerator intended to sit under a WIO3 DRAM stack including 64 dot-product engines 8420, 8 vector caches 8415 and an integrated memory controller 8410. The size and placement of the DRAM stack I/O bumps 9601, 9602 shown are specified by the WIO3 standard, and the accelerator logic fits in the space between them. However, for ease of assembly, the logic die under a DRAM stack should be at least as large as the DRAM die. Therefore, an actual accelerator chip would be approximately 8 mm-10 mm, although most of the area would be unused. In one implementation, this unused area may be used for accelerators for different types of bandwidth limited applications.

Stacked DRAM is a memory technology that, as its name suggests, stacks multiple DRAM die vertically in order to deliver higher bandwidth, tighter physical integration with compute die, and lower energy/bit than traditional DRAM modules such as DDR4 DIMMs. The table in FIG. 97 compares seven DRAM technologies: non-stacked DDR4 and LPDDR4, the Pico modules, the JEDEC-standard High-Bandwidth ($HBM_2$) and Wide I/O ($WIO_3$) stacks, a stacked DRAM, and the dis-integrated RAM (DiRAM).

Figure 98A:
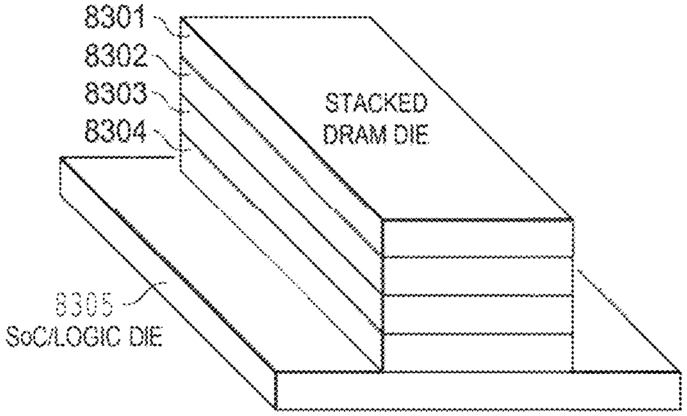
FIGS. 98*a-b* illustrate stacked DRAMs.
Figure 98B:
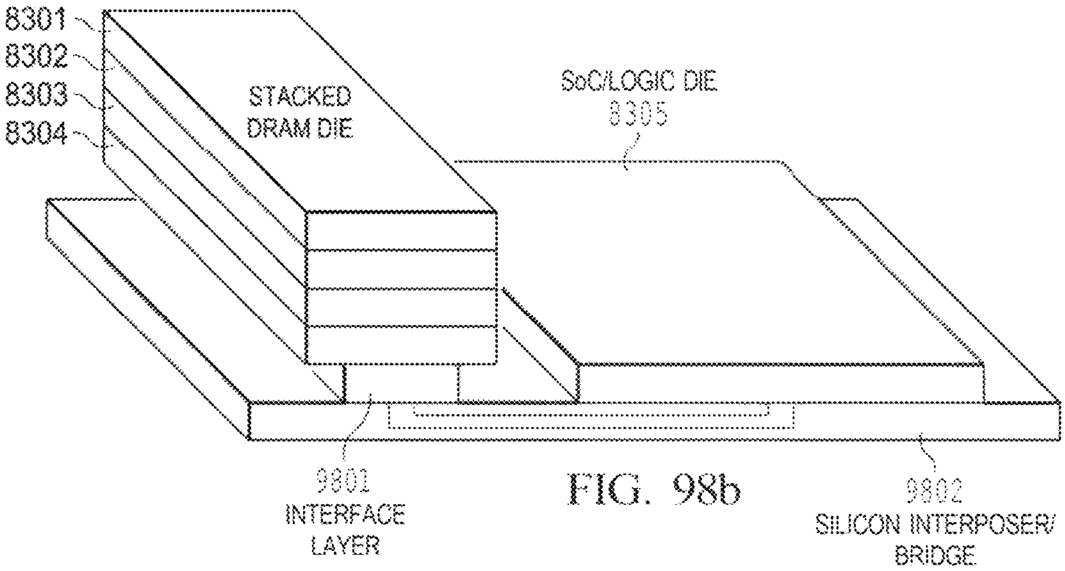

Stacked DRAMs come in two varieties: on-die and beside-die. On-die stacks 8301-8304, as illustrated in FIG. 98*a*, connect directly to a logic die or SoC 8305 using through-silicon vias. In contrast, beside-die stacks 8301-8304, shown in FIG. 98*b*, are placed beside the logic/SoC die 8305 on a silicon interposer or bridge 9802, with the connections between the DRAM and the logic die running through the interposer 9802 and an interface layer 9801. On-die DRAM stacks have the advantage that they allow smaller packages than beside-die stacks but have the disadvantage that it is difficult to attach more than one stack to a logic die, limiting the amount of memory they can provide per die. In contrast, the use of a silicon interposer 9802 allows a logic die to communicate with multiple beside-die stacks, albeit at some cost in area.

Two important characteristics of a DRAM are the bandwidth per stack and the energy per bit, as they define the bandwidth that will fit on a package and the power required to consume that bandwidth. These characteristics make WIO3, ITRI, and DiRAM the most promising technologies for an accelerator as described herein, as Pico modules do not provide enough bandwidth and the energy/bit of $HBM_2$ would significantly increase power consumption.

Of those three technologies, the DiRAM has the highest bandwidth and capacity as well as the lowest latency, making it extremely attractive. $WIO_3$ is yet another promising option, assuming it becomes a JEDEC standard, and provides good bandwidth and capacity. The ITRI memory has the lowest energy/bit of the three, allowing more bandwidth to fit in a given power budget. It also has a low latency, and its SRAM-like interface would reduce the complexity of the accelerator's memory controller. However, the ITRI RAM has the lowest capacity of the three, as its design trades off capacity for performance.

The accelerator described herein is designed to tackle data analytics and machine learning algorithms built upon a core sparse-matrix vector multiply (SpMV) primitive. While SpMV often dominates the runtime of these algorithms, other operations are required to implement them as well.

As an example, consider the breadth-first search (BFS) listing shown in FIG. 99. In this example, the bulk of the work is performed by the SpMV on line 4; however, there is also a vector-vector subtract (line 8), inner-product operation (line 9), and a data-parallel map operation (line 6). Vector subtraction and an inner-product are relatively straightforward operations that are commonly supported in vector ISAs and need little explanation.

In contrast, the data-parallel map operation is far more interesting because it introduces programmability into a conceptually element-wise operation. The BFS example demonstrates the programmability provided by the map functionality of one implementation. In particular, the Lambda function in BFS (see line 6 in FIG. 99) is used to keep track of when a vertex was first visited. This is done in one implementation by passing into the Lambda function two arrays and one scalar. The first array passed into the Lambda function is the output of the SpMV operation and reflects which vertices are currently reachable. The second array has an entry for each vertex whose value is the iteration number on which the vertex was first seen, or 0 if the vertex has not yet been reached. The scalar passed into the Lambda function is simply the loop iteration counter. In one implementation, the Lambda function is compiled into a sequence of scalar operations that is performed on each element of the input vector to generate the output vector.

An intermediate representation (IR) of the sequence of operations for BFS is illustrated in FIG. 99. The BFS Lambda IR demonstrates several interesting characteristics. The generated Lambda code is guaranteed to only have a single basic block. One implementation prevents iterative constructions in a Lambda function and performs if-conversion to avoid control flow. This constraint significantly reduces the complexity of the computation structure used to execute a Lambda as it does not need to support general control flow.

All memory operations are performed at the beginning of the basic block (lines 2 through 4 of FIG. 99). When transformed to assembly the memory operations are hoisted into the preamble of the codelet (lines 2 through 5).

An evaluation of statistics was performed for benchmarks implemented with the accelerator that make use of Lambda functions. The number of instructions were recorded, the total number of registers, and total number of loads to quantify the "complexity" of various Lambda functions of interest. In addition, the critical path length reflects the longest chain of dependent instructions in each Lambda function. When the number of instructions is significantly longer than the critical path, instruction-level parallelism techniques are an applicable solution to increase performance. Some loads are invariant for a given invocation of a map or reduce call (all executions of the Lambda function will load the same value). This situation is referred to as a "Lambda invariant load" and analysis is performed to detect it.

Based on the analyzed results, a relatively small instruction store is needed and a register file to support execution of Lambda functions. Techniques to increase concurrency (interleaving execution of multiple Lambda functions) increases the size and complexity of the register file; however, a baseline design could have as few as 16 entries. Moreover, a 2R1 W register file should be sufficient for all operations if a single-bit predicate register file is also provided for use with comparison and conditional move operations.

As described below, Lambda-invariant loads will be executed in the gather engines, so that they are only performed once per invocation of the Lambda functions. The values returned by these loads will be passed to the processing element so that they can be read into the Lambda datapath's local register file as necessary.

In one implementation, execution of a Lambda function is split between the gather engines and the processor elements (PEs) (e.g., dot-product engines as described above) to exploit the different capabilities of each unit. Lambda functions have three types of arguments: constants, scalar and vector. Constants are arguments whose value can be determined at compile time. Scalar arguments correspond to the Lambda-invariant loads described above, and are arguments whose value varies between invocations of the Lambda function, but remain constant across all of the elements that a given Lambda function operates on. Vector arguments are arrays of data that the Lambda function processes, applying the instructions in the function to each element in the vector arguments.

In one implementation, a Lambda function is specified by a descriptor data structure that contains the code that implements the function, any constants that the function references, and pointers to its input and output variables. To execute a Lambda function, the top-level controller sends a command to one or more gather engines that specifies the descriptor of the Lambda function and the starting and ending indices of the portions of the function's vector arguments that the gather engine and its associated PE are to process.

When a gather engine receives a command to execute a Lambda function, it fetches the function's descriptor from memory and passes the descriptor to its associated PE until it reaches the last section of the descriptor, which contains the addresses of the function's scalar arguments. It then fetches each of the function's scalar arguments from memory, replaces the address of each argument in the descriptor with its value, and passes the modified descriptor to the PE.

When a PE receives the beginning of the function descriptor from its gather engine, it copies the addresses of the function's vector inputs into control registers, and the PE's fetch hardware begins loading pages of the vector inputs into the PE's local buffers. It then decodes each of the instructions that implement the Lambda function and stores the results in a small decoded instruction buffer. The PE then waits for the values of the function's scalar arguments to arrive from its gather engine, and for the first page of each of the function's vector arguments to arrive from memory. Once the function's arguments have arrived, the PE begins applying the Lambda function to each element in its range of the input vectors, relying on the PE's fetch and writeback hardware to fetch pages of input data and write back pages of output values as required. When the PE reaches the end of its assigned range of data, it signals the top-level controller that it is done and ready to begin another operation.

Figure 100:
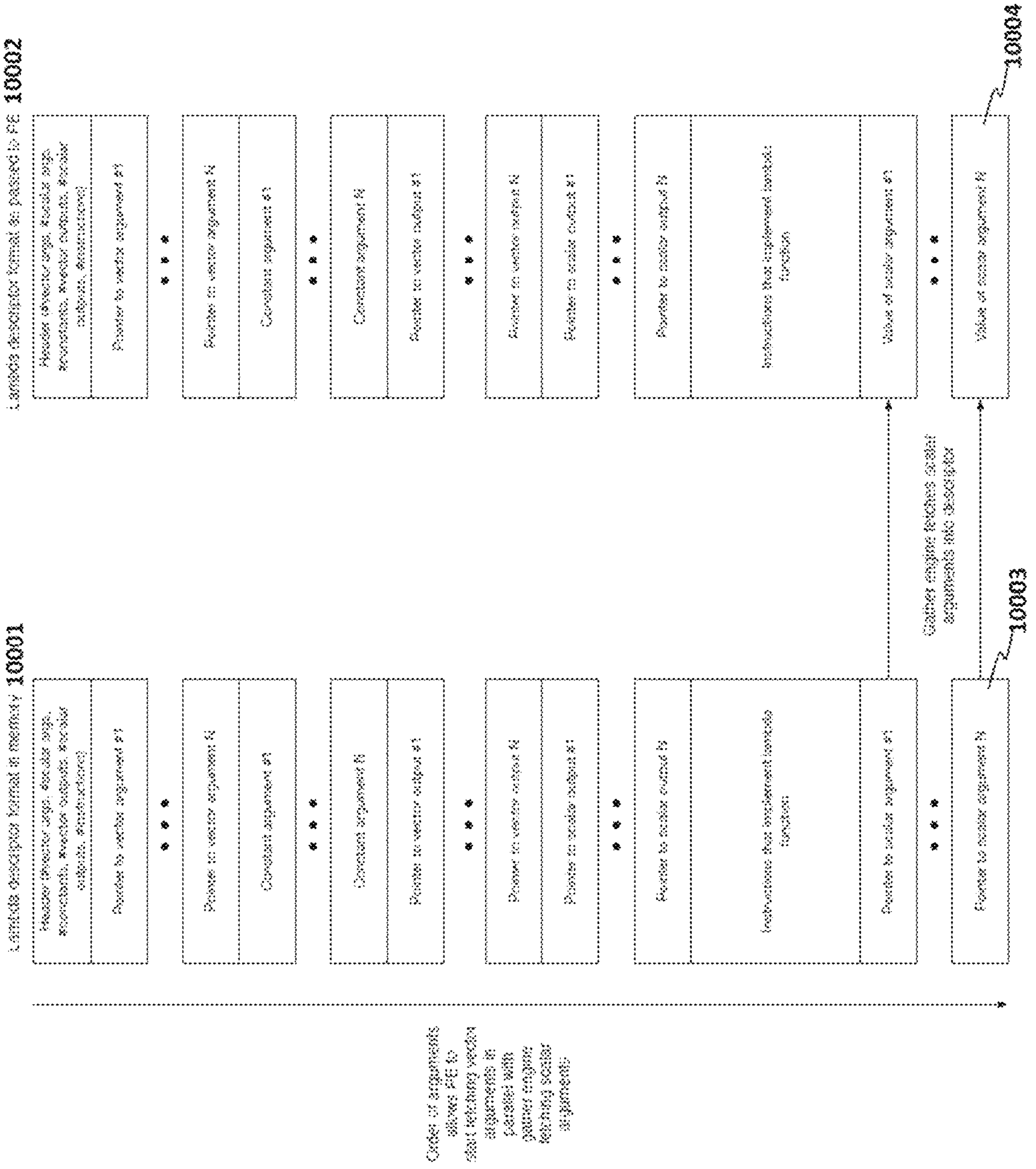
FIG. 100 shows the format of the descriptors used to specify Lambda functions in accordance with one implementation.

FIG. 100 shows the format of the descriptors used to specify Lambda functions in accordance with one implementation. In particular, FIG. 100 shows the Lambda descriptor format in memory 10001 and the Lambda format descriptor passed to a PE 10002. All fields in the descriptor except the instructions are 64-bit values. Instructions are 32-bit values, packed two to a 64-bit word. The descriptor is organized such that the scalar arguments appear last, allowing the gather engine to pass everything but the scalar arguments to the PE before it fetches the scalar arguments from memory. This makes it possible for the PE to decode the function's instructions and to begin fetching its vector arguments while waiting for the gather engine to fetch the scalar arguments. The Lambda function's descriptor and the scalar arguments are fetched through the vector caches to eliminate redundant DRAM accesses when a Lambda function is distributed across multiple gather engine/PE pairs. As illustrated, the Lambda descriptor format in memory 10001 may include a pointer to a scalar argument 10003 while the gather engine fetches the value of the scalar argument 10004 in the Lambda descriptor format as passed to the PE 10002.

Figure 101:
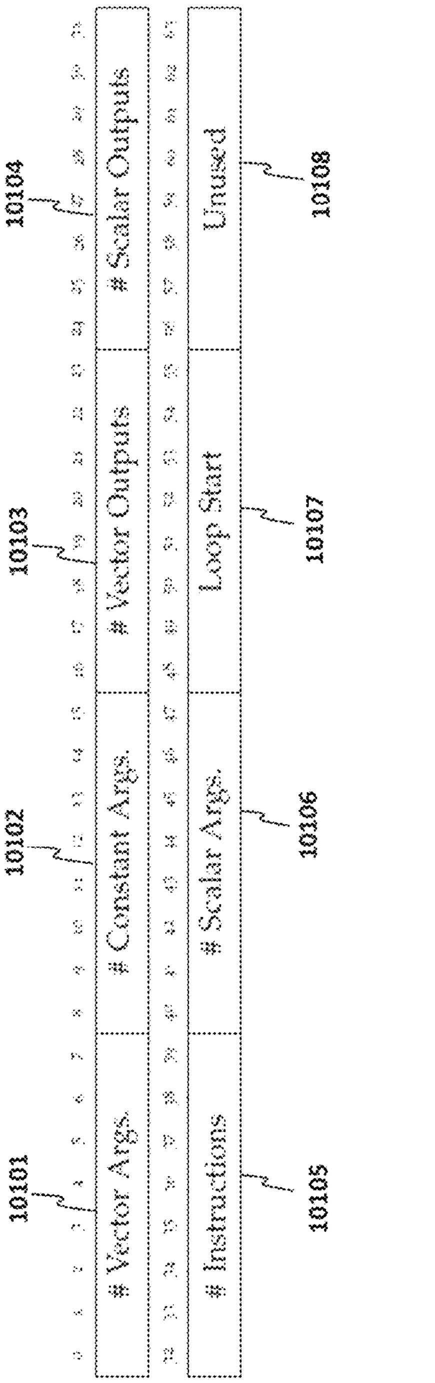
FIG. 101 illustrates the low six bytes of the header word in an embodiment.

In one implementation, the first word of each descriptor is a header that specifies the meaning of each word in the descriptor. As shown in FIG. 101, the low six bytes of the header word specify the number of vector arguments to the Lambda function 10101, the number of constant arguments 10102, the number of vector and scalar outputs 10103-10104, the number of instructions in the function 10105, and the number of scalar arguments in the function 10106 (ordered to match where each type of data appears in the descriptor). The seventh byte of the header word specifies the position of the loop start instruction 10107 within the function's code (i.e., the instruction where the hardware should begin each iteration after the first). The high-order byte in the word is unused 10108. The remaining words contain the functions instructions, constants, and input and output addresses, in the order shown in the figure.

No changes to the gather engine datapath are required to support Lambda functions, as all necessary operations can be supported by modifying the control logic. When the gather engine fetches a Lambda descriptor from memory, it will copy lines of the descriptor into both the vector element line buffers and the column descriptor buffer. Descriptor lines that do not contain the addresses of scalar arguments will be passed to the PE unmodified, while those that do will remain in the line buffers until the values of the scalar arguments have been fetched from memory and inserted into the line buffers in place of their addresses. The existing gather and pending reply buffer hardware can support this operation without changes.

Changes to the Processing Element to Support Lambda Functions

Figure 102:
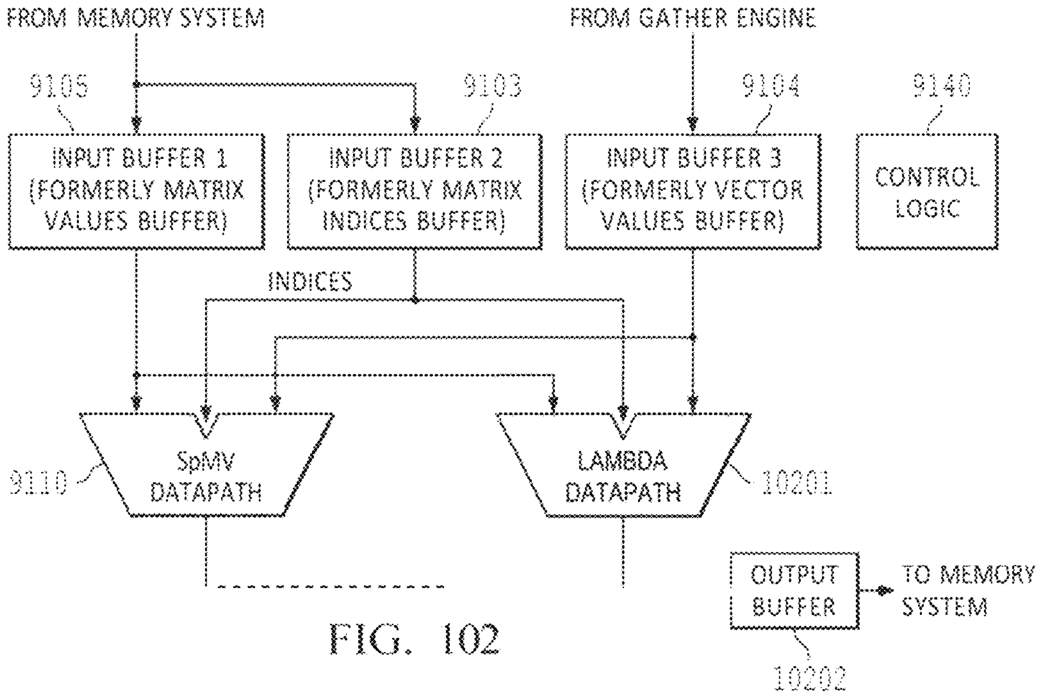
FIG. 102 illustrates which matrix values buffer, the matrix indices buffer, and the vector values buffer.

In one implementation, to support Lambda functions, a separate datapath is added to the PE, as illustrated in FIG. 102, which shows the matrix values buffer 9105, the matrix indices buffer 9103 and the vector values buffer 9104 described above. While the PE's buffers remain the same, their names have been changed to Input Buffer 1, Input Buffer 2, and Input Buffer 3 to reflect their more-general uses in the present implementation. The SpMV datapath 9110 also remains unchanged from the base architecture. While it would be possible to implement SpMV as a Lambda function, building dedicated hardware 10201 reduces power and improve performance on SpMV. Results from the SpMV datapath 9110 and Lambda datapath 10201 are sent to output buffer 10202 and ultimately to system memory.

Figure 103:
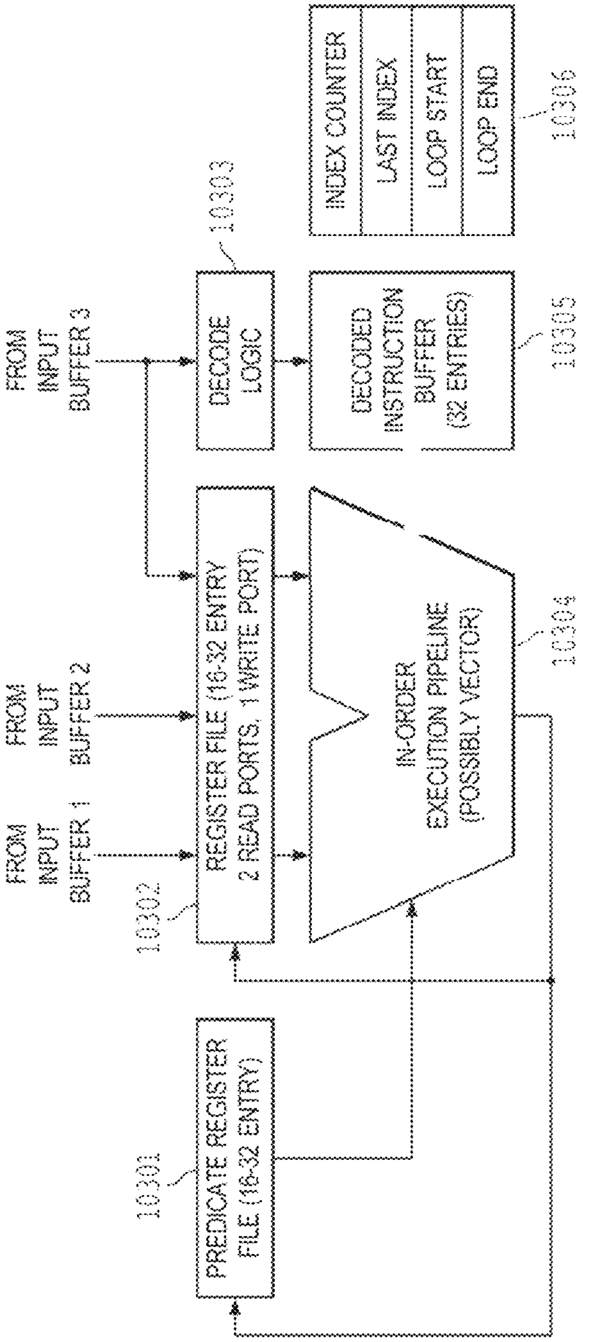
FIG. 103 illustrates the details of one implementation of the Lambda datapath.

FIG. 103 illustrates the details of one implementation of the Lambda datapath, which includes a predicate register file 10301, a register file 10302, decode logic 10303, a decoded instruction buffer 10305, and which centers around an in-order execution pipeline 10304 that implements a load-store ISA. If a single-issue execution pipeline fails to provide sufficient performance, one may take advantage of the data parallelism inherent in Lambda operations and vectorize the execution pipeline to process multiple vector elements in parallel, which should be a more energy-efficient way to improve parallelism than exploiting the ILP in individual Lambda functions. The execution pipeline reads its inputs from and writes results back to a 16-32 entry register file 10302, with 64 bits per register. The hardware does not distinguish between integer and floating-point registers, and any register may hold data of any type. The predicate register file 10301 holds the output of compare operations, which are used to predicate instruction execution. In one implementation, the Lambda datapath 10304 does not support branch instructions, so any conditional execution must be done through predicated instructions.

At the start of each Lambda function, the gather engine places the function's instructions in input buffer 3 9104 (the vector values buffer). The decode logic 10303 then decodes each instruction in sequence, placing the results in a 32-entry decoded instruction buffer 10305. This saves the energy cost of repeatedly decoding each instruction on every iteration of the loop1.

The Lambda datapath contains four special control registers 10306. The index counter register holds the index of the vector elements that the Lambda datapath is currently processing, and is automatically incremented at the end of each iteration of the Lambda. The last index register holds the index of the last vector element that the PE is expected to process. The loop start register holds the location in the decoded instruction buffer of the first instruction in the repeated portion of the Lambda function, while the loop end register holds the location of the last instruction in the Lambda function.

Execution of a Lambda function starts with the first instruction in the decoded instruction buffer and proceeds until the pipeline reaches the instruction pointed to by the loop end register. At that point, the pipeline compares the value of the index counter register to the value of the last index register and does an implicit branch back to the instruction pointed to by the loop start register if the index counter is less than the last index. Since the index counter register is only incremented at the end of each iteration, this check can be done in advance in order to avoid bubbles in the pipeline.

This scheme makes it easy to include "preamble" instructions that only need to be executed on the first iteration of a Lambda function. For example, a Lambda function with two scalar and one constant input might begin with three load instructions to fetch the values of those inputs into the register file and set the loop start register to point at the fourth instruction in the decoded instruction buffer so that the inputs are only read once rather than on each iteration of the function.

In one implementation, the Lambda datapath executes a load-store ISA similar to many RISC processors. Lambda datapath load and store instructions reference locations in the PE's SRAM buffers. All transfers of data between the SRAM buffers and DRAM are managed by the PE's fetch and writeback hardware. The Lambda datapath supports two types of load instructions: scalar and element. Scalar loads fetch the contents of the specified location in one of the SRAM buffers and place it in a register. It is expected that most of the scalar load instructions in a Lambda function will occur in the function's preamble, although register pressure may occasionally require scalar loads to be placed into loop bodies.

Element loads fetch elements of the Lambda function's input vectors. The PE will keep a compute pointer for each buffer that points to the current element of the first input vector that is mapped into that buffer. Element loads specify a target buffer and an offset from the compute pointer. When an element instruction is executed, the hardware adds the specified offset to the value of the compute pointer modulo the size of the appropriate buffer, and loads the data from that location into a register. Element store instructions are similar, but write data into the appropriate address in the PEs output buffer 10202.

This approach allows multiple input and output vectors to be supported with the PE's existing fetch hardware. Input vectors alternate between input buffers 1 9105 and 2 9103 in the order specified by the Lambda function's descriptor, and the fetch hardware reads entire pages of each vector into the buffers at a time.

As an example, consider a function that has three input vectors, A, B, and C. Input vector A will be mapped onto input buffer 1 9105 of the PE at an offset of 0. Input B will be mapped onto input buffer 2 9103, again at an offset of 0. Input C will be mapped onto input buffer 1 9105, at an offset of 256 (assuming Tezzaron-style 256-byte pages). The PE's fetch hardware will interleave pages of inputs A and C into input buffer 1 9105, while input buffer 2 9103 will be filled with pages of input B. Each iteration of the Lambda function will fetch the appropriate element of input A by executing an element load from buffer 1 9105 with an offset of 0, will fetch the appropriate element of input B with an element load from buffer 2 9103 with an offset of 0, and will fetch its element of input C with an element load from buffer 1 9105 with an offset of 256. At the end of each iteration, the hardware will increment the compute pointer to advance to the next element of each input vector. When the compute pointer reaches the end of a page, the hardware will increment it by (page size*(# of vector inputs mapped onto the page−1)) byte to advance it to the first element of the next page of the buffer's first input vector. A similar scheme will be used to handle Lambda functions that generate multiple output vectors.

Figure 104:
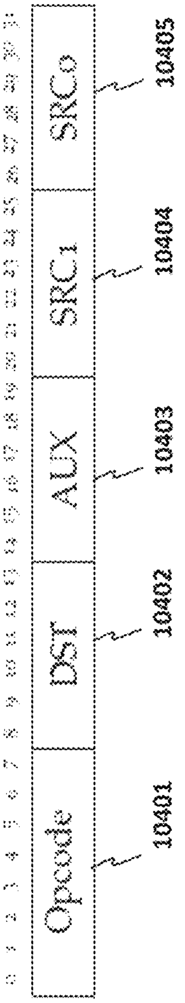
FIG. 104 illustrates an implementation of instruction encoding.

As illustrated in FIG. 104, in one implementation, 8 bits are dedicated to the opcode 10401. The remaining 24 bits are split among a single destination 10402 and 3 input operands 10403-10405 which results in 6-bit register specifiers. As control flow instructions are not used in one implementation and constants are sourced from an auxiliary register file, bit allocation acrobatics are not required to fit a large immediate in an instruction word. In one implementation, all instructions fit into the instruction encoding presented in FIG. 104. Encodings for one particular set of instructions are illustrated in FIG. 105.

In one implementation, the comparison instructions use a comparison predicate. The encodings of exemplary comparison predicates are listed in the table in FIG. 106.

As detailed above, in some instances it is advantages to use an accelerator for a given task. However, there may be instances where that is not feasible and/or advantageous. For example, an accelerator not be available, the movement of data to the accelerator resulting in too large of a penalty, the speed of the accelerator is less than a processor core, etc. As such, in some implementations additional instructions may provide for performance and/or energy efficiency for some tasks.

Figure 109:
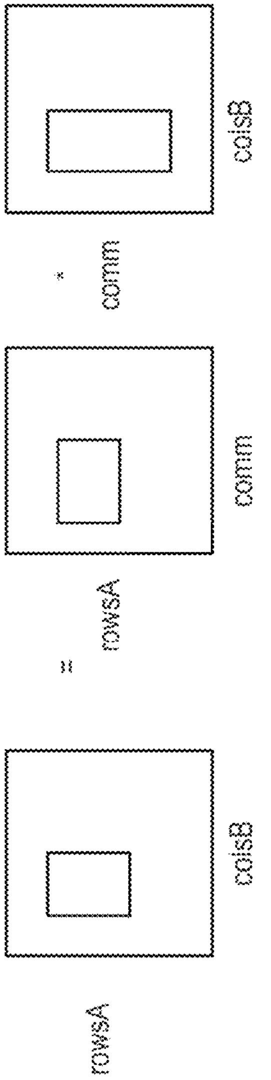
FIG. 109 illustrates an example of matrix multiplication.

An example of matrix multiplication is illustrated in FIG. 109. Matrix multiplication is C[rowsA,colsB]+=A[rowsA, comm]*B[comm,colsB]. As used herein with respect to a MADD (multiply add instruction), a matrix*vector multiplication instruction is defined by setting colsB=1. This instruction takes a matrix input A, a vector input B, and produces a vector output C. In the context of 512-bit vectors, rowsA=8 for double-precision and 16 for single-precision.

Most CPUs perform dense matrix multiplication via SIMD instructions that operate on one-dimensional vectors. Detailed herein is an instruction (and underlying hardware) that extends the SIMD approach to include two-dimensional matrices (tiles) of sizes 8*4, 8*8, and larger. Through the use of this instruction, a small matrix can be multiplied with a vector and the result added to the destination vector. All operations are performed in one instruction, amortizing the energy costs of fetching the instruction and data over a large number of multiply-adds. In addition, some implementations utilize a binary tree to perform summation (reduction) and/or include a register file embedded into a multiplier array to hold an input matrix as a collection of registers.

With respect to matrix multiplication, an execution of embodiments of the MADD instruction computes:

$$\text{for } (i = 0; i < N; i{+}{+})\ //\ N = \text{8 packed data element size (e.g., vector length) of } rowsA \text{ (e.g., 8)}$$
$$\text{for } (k = 0; k < M; k{+}{+})\ //\ comm = M$$
$$C[i] \mathrel{+}= A[i, k] * B[k];$$

Typically, the "A" operand is stored in eight packed data registers. The "B" operand may be stored in one packed data register or read from memory. The "C" operand is stored in one packed data register.

Throughout the remaining discussion of this instruction, an "octoMADD" version is discussed. This version multiples 8 packed data element sources (e.g., 8 packed data registers) by a packed data element source (e.g., a single register). Expanding the inner loop provides execution as follows for a sequential implementation (for an octoMADD instruction):

$$\text{for } (i = 0; i < 8; i{+}{+})\, C[i] \mathrel{+}= A[i, 0]*B[0] + A[i, 1]*B[1] + A[i, 2]*B[2] + A[i, 3]*B[3] + A[i, 4]*B[4] + A[i, 5]*B[5] + A[i, 6]*B[6] + A[i, 7]*B[7];$$

As shown, each multiplication of a packed data element from corresponding packed data element positions of the "A" and "B" operands are followed by an addition. Sequential additions decomposed into multiple, simpler operations with minimal temporary storage.

In some implementations, a binary tree approach is used. A binary tree minimizes latency by summing two sub-trees in parallel and then adding together the results. This is applied recursively to the entire binary tree. The final result is added to the "C" destination operand.

Expanding the inner loop provides execution as follows for a binary implementation (for an octoMADD instruction):

$$\text{for } (i = 0; i < 8; i{+}{+})$$
$$C[i] \mathrel{+}= ((A[i, 0]*B[0] + A[i, 1]*B[1]) + (A[i, 2]*B[2] + A[i, 3]*B[3])) + ((A[i, 4]*B[4] + A[i, 5]*B[5]) + (A[i, 6]*B[6] + A[i, 7]*B[7]));$$

Figure 110:
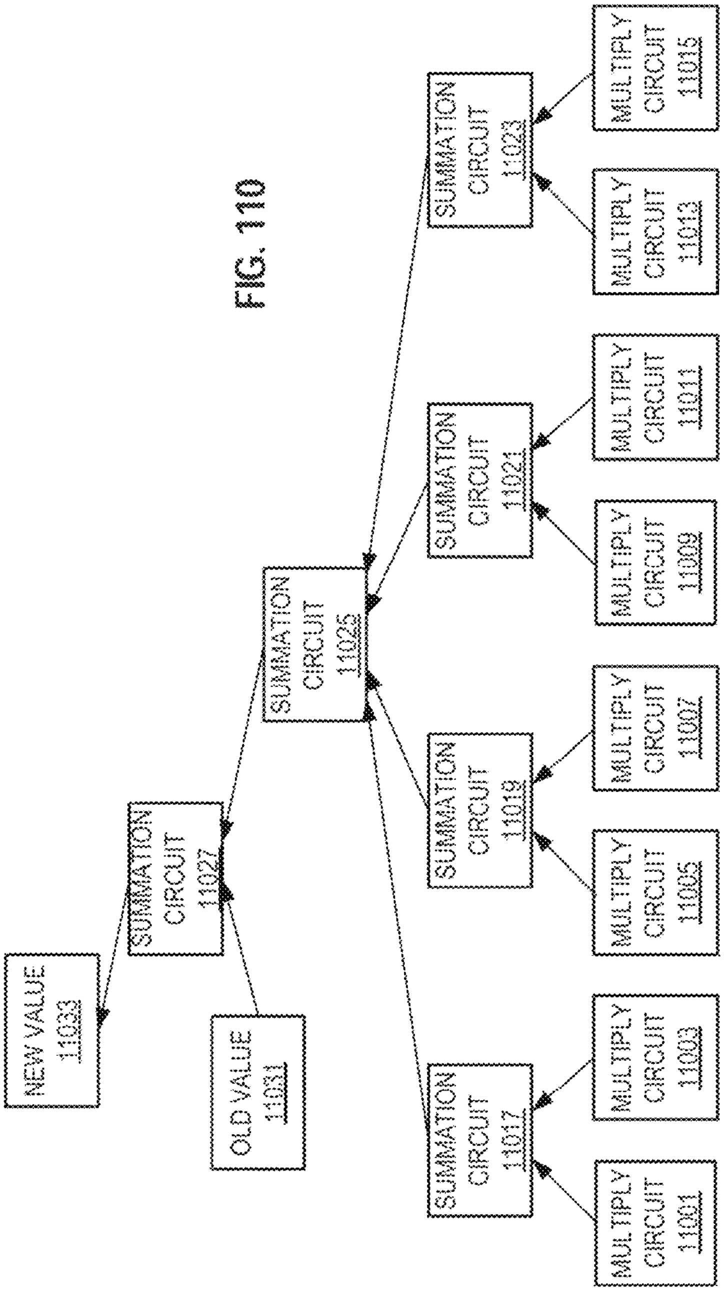
FIG. 110 illustrates an octoMADD instruction operation with the binary tree reduction network.

FIG. 110 illustrates an octoMADD instruction operation with the binary tree reduction network. The FIG. shows one vector lane of the operation. With 512-bit vectors, double-precision octoMADD has eight lanes, while single-precision octoMADD has 16 lanes.

As illustrated, a plurality of multiplication circuits 11001-11015 which perform the multiplications of A[i,0]*B[0], A[i,1]*B[1], A[i,2]*B[2], A[i,3]*B[3], A[i,4]*B[4], A[i,5]*B[5], A[1,6]*B[6], and A[i,7]*B[7] respectively. In this example, i is A register. Typically, the multiplications are performed in parallel.

Coupled to the multiplication circuits 11001-11015 are summation circuits 11017-11023 which add results of the multiplication circuits 11001-11015. For example, the summation circuits perform A[i,0]*B[0]+A[i,1]*B[1], A[i,2]*B[2]+A[i,3]*B[3], A[i,4]*B[4]+A[i,5]*B[5], and A[i,6]*B[6]+A[i,7]*B[7]. Typically, the summations are performed in parallel.

The results of the initial summations are summed using summation circuit 11025 and added together. The result of this addition is added by summation circuit 11027 to the original (old) value 11031 from the destination to generate a new value 11033 to be stored in the destination.

In most implementations, an instruction cannot specify eight independent source registers, plus a register or memory operand for the other source and a register destination. Thus, in some instances, the octoMADD instruction specifies a limited range of eight registers for the matrix operand. For example, the octoMADD matrix operand may be registers 0-7. In some embodiments, a first register is specified and consecutive registers to the first register are the additional (e.g., 7) registers.

Figure 111:
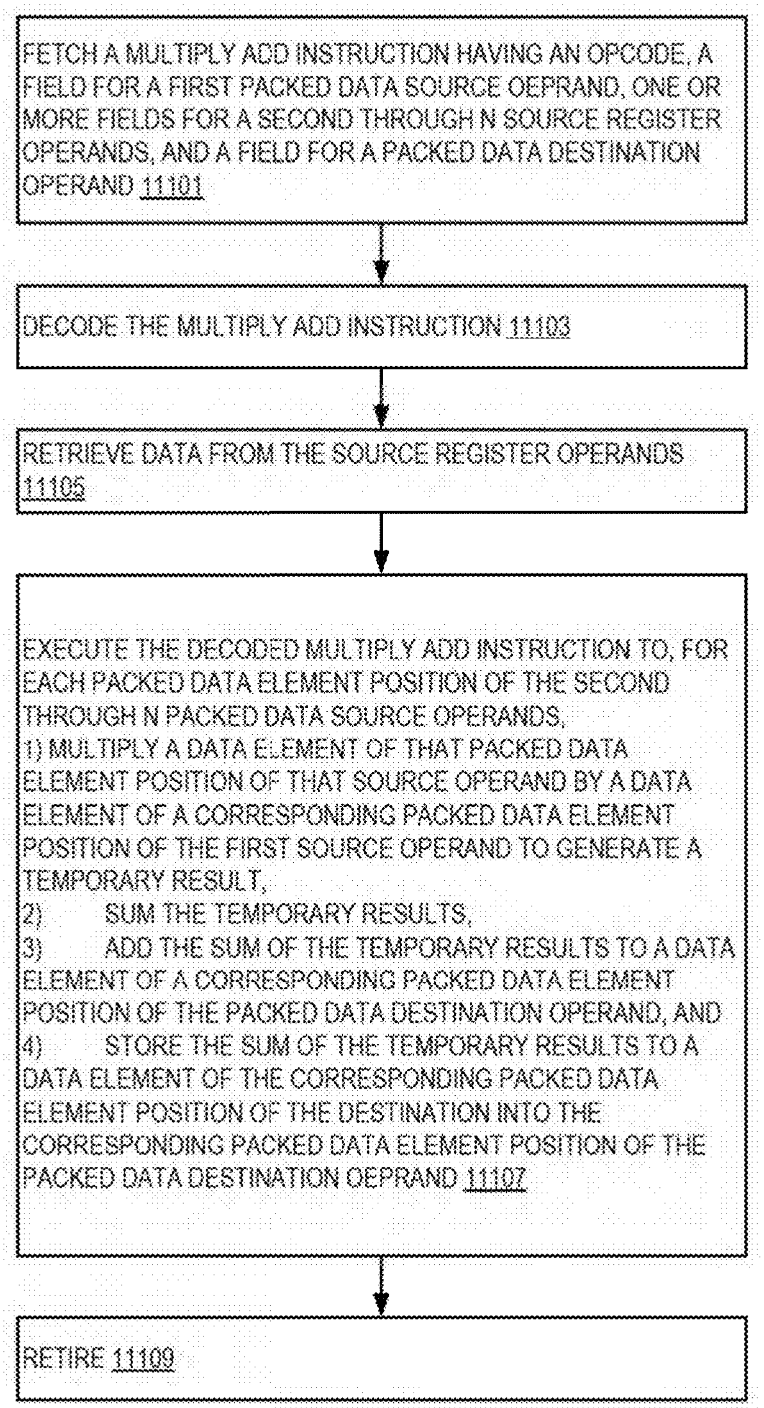

FIG. 111 illustrates an embodiment of method performed by a processor to process a multiply add instruction.

At 11101, an instruction is fetched. For example, a multiply add instruction is fetched. The multiply add instruction includes an opcode, field for a first packed data operand (either a memory or register), one or more fields for a second through N packed data source operands, and a packed data destination operand. In some embodiments, the multiply add instruction includes a writemask operand. In some embodiments, the instruction is fetched from an instruction cache.

The fetched instruction is decoded at 11103. For example, the fetched multiply add instruction is decoded by decode circuitry such as that detailed herein.

Data values associated with the source operands of the decoded instruction are retrieved at 11105. To avoid the need to read these values repeatedly from the main register file when executing a sequence of multiply add instructions, a copy of these registers is built into the multiplier-adder array itself (as detailed below). The copy is maintained as a cache of the main register file.

At 11107, the decoded instruction is executed by execution circuitry (hardware) such as that detailed herein, to, for each packed data element position of the second through N packed data source operands, 1) multiply a data element of that packed data element position of that source operand by a data element of a corresponding packed data element position of the first source operand to generate a temporary result, 2) sum the temporary results, 3) add the sum of the temporary results to a data element of a corresponding packed data element position of the packed data destination operand, and 4) store the sum of the temporary results to a data element of the corresponding packed data element position of the destination into the corresponding packed data element position of the packed data destination operand. N is typically indicated by the opcode or a prefix. For example, for octoMADD, N is 9 (such that there are 8 registers for A). The multiplications may be performed in parallel.

In some embodiments, the instruction is committed or retired at 11109.

Figure 112:
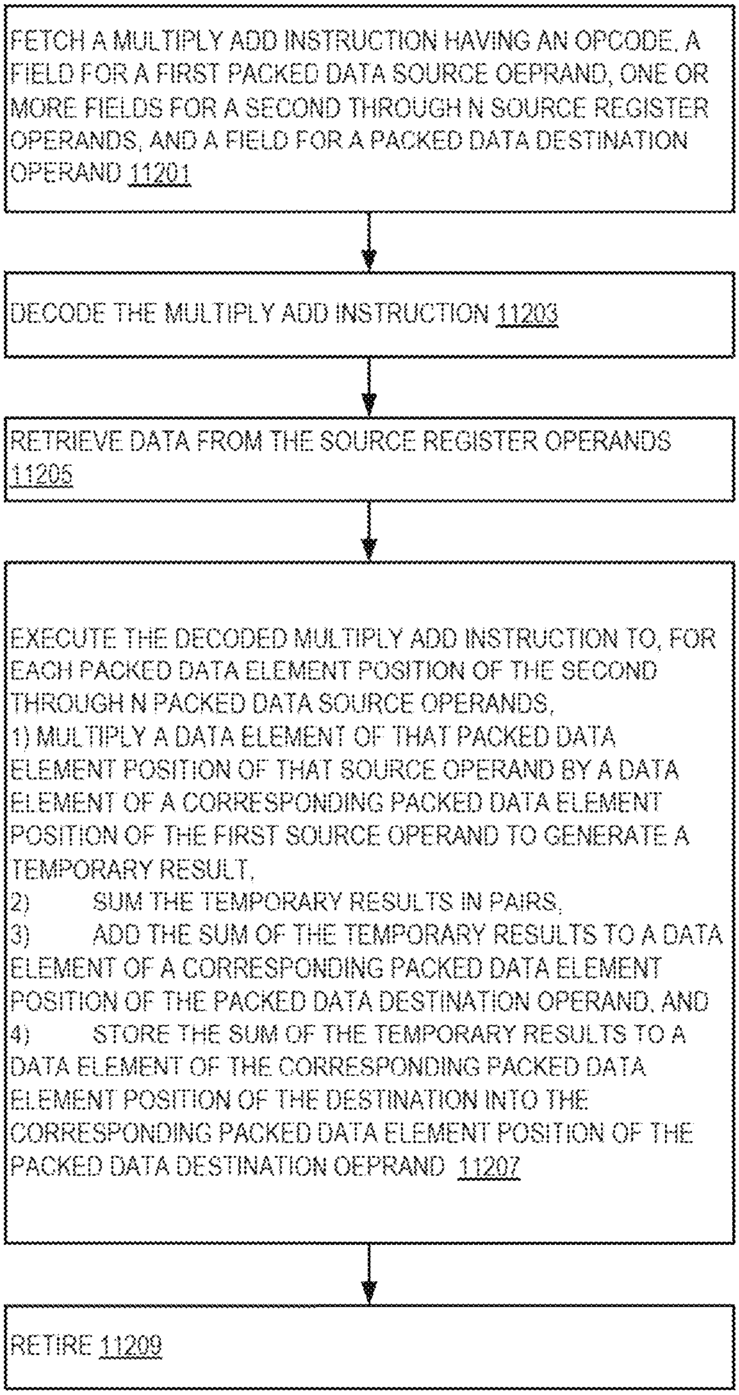

FIG. 112 illustrates an embodiment of method performed by a processor to process a multiply add instruction.

At 11201, an instruction is fetched. For example, a multiply add instruction is fetched. The fused multiply add instruction includes an opcode, field for a first packed data operand (either a memory or register), one or more fields for a second through N packed data source operands, and a packed data destination operand. In some embodiments, the fused multiply add instruction includes a writemask operand. In some embodiments, the instruction is fetched from an instruction cache.

The fetched instruction is decoded at 11203. For example, the fetched multiply add instruction is decoded by decode circuitry such as that detailed herein.

Data values associated with the source operands of the decoded instruction are retrieved at 11205. To avoid the need to read these values repeatedly from the main register file when executing a sequence of multiply add instructions, a copy of these registers is built into the multiplier-adder array itself (as detailed below). The copy is maintained as a cache of the main register file.

At 11207, the decoded instruction is executed by execution circuitry (hardware) such as that detailed herein, to, for each packed data element position of the second through N packed data source operands, 1) multiply a data element of that packed data element position of that source operand by a data element of a corresponding packed data element position of the first source operand to generate a temporary result, 2) sum the temporary results in pairs, 3) add the sum of the temporary results to a data element of a corresponding packed data element position of the packed data destination operand, and 4) store the sum of the temporary results to a data element of the corresponding packed data element position of the destination into the corresponding packed data element position of the packed data destination operand. N is typically indicated by the opcode or a prefix. For example, for octoMADD, N is 9 (such that there are 8 registers for A). The multiplications may be performed in parallel.

In some embodiments, the instruction is committed or retired at 11209.

In some implementations, when an MADD instruction is first encountered, a renamer synchronizes the cached copy with the main register file by injecting micro-operations to copy the main registers into the cache. Subsequent MADD instructions continue to use the cached copies as long as they remain unchanged. Some implementations anticipate the use of the limited range of registers by the octomadd instruction and broadcast writes to both the main register file and the cached copy at the time that the register values are produced.

FIGS. 113A-C illustrate exemplary hardware for performing a MADD instruction. FIG. 113A shows components to execute an MADD instruction. FIG. 113B shows a subset of these components. In particular, a plurality of multiplication circuits 11323 are used to multiply the packed data elements of the source registers with each multiplication circuit 11323 coupled to a summation circuit 11327. Each summation circuit feeds the summation circuit 11327 in a chain fashion. A selector 11321 is used to select between an external input or a feedback of a summation circuit. A register file is embedded within the multiple-adder array as a part of a register file and read multiplexer 11325. Specific registers are hardwired to each column of multiplier-adders.

FIG. 113B shows a register file and read multiplexer 11325. The register file 11327 is a plurality of registers to store A as a cache (e.g., 4 or 8 registers). The correct register is selected using read mux 11329.

An expected use of the octomadd instruction is as follows:

```
// compute C += A*B
// A is loaded as an 8*8 tile in REG0-7
// B is loaded as a 1*8 tile from memory
// C is loaded and stored as a 24*8 tile in REG 8-31
for (outer loop) {
  load [24,8] tile of C matrix into REG 8-31 // 24 loads
    for (middle loop) {
      load [8,8] tile of A matrix into REG 0-7 // 8 loads
        for (inner loop) {
        // 24 iterations
        REG [8-31 from inner loop] += REG 0-7 * memory[inner loop];
        // 1 load
        }
      }
    store [24,8] tile of C matrix from REG8-31 // 24 stores
}
```

The inner loop contains 24 octomadd instructions. Each reads one "B" operand from memory and sums to one of 24 "C" accumulators. The middle loop loads the 8 "A" registers with a new tile. The outer loop loads and stores the 24 "C" accumulators. The inner loop may be unrolled and prefetching added to achieve high utilization (>90%) of the octomadd hardware.

The figures below detail exemplary architectures and systems to implement embodiments of the above. In particular, aspects (e.g., registers, pipelines, etc.) of core types discussed above (such as out-of-order, scalar, SIMD) are described. Additionally, systems and systems on a chip implementations are shown including co-processors (e.g., accelerators, cores). In some embodiments, one or more hardware components and/or instructions described above are emulated as detailed below, or implemented as software modules.

Exemplary Register Architecture

FIG. 125 is a block diagram of a register architecture 12500 according to one embodiment of the invention. In the embodiment illustrated, there are 32 vector registers 12510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format QAC00 operates on these overlaid register file as illustrated in the below tables.

| Adjustable Vector Length | Class | Operations | Registers |
|---|---|---|---|
| Instruction Templates that do not include the vector length field QAB59B | A (FIG. QABA; U = 0) | QAB10, QAB15, QAB25, QAB30 | zmm registers (the vector length is 64 byte) |
| | B (FIG. QABB; U = 1) | QAB12 | zmm registers (the vector length is 64 byte) |
| Instruction templates that do include the vector length field QAB59B | B (FIG. QABB; U = 1) | QAB17, QAB27 | zmm, ymm, or xmm registers (the vector length is 64 byte, 32 byte, or 16 byte) depending on the vector length field QAB59B |

In other words, the vector length field QAB59B selects between a maximum length and one or more other shorter lengths, where each such shorter length is half the length of the preceding length; and instructions templates without the vector length field QAB59B operate on the maximum vector length. Further, in one embodiment, the class B instruction templates of the specific vector friendly instruction format QAC00 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 12515—in the embodiment illustrated, there are 8 write mask registers (k0 through k7), each 64 bits in size. In an alternate embodiment, the write mask registers 12515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 12525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 12545, on which is aliased the MMX packed integer flat register file 12550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 126A is a block diagram illustrating both an exemplary in-order pipeline and an exemplary register renaming, out-of-order issue/execution pipeline according to embodiments of the invention. FIG. 126B is a block diagram illustrating both an exemplary embodiment of an in-order architecture core and an exemplary register renaming, out-of-order issue/execution architecture core to be included in a processor according to embodiments of the invention. The solid lined boxes in FIGS. 126A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 126A, a processor pipeline 12600 includes a fetch stage 12602, a length decode stage 12604, a decode stage 12606, an allocation stage 12608, a renaming stage 12610, a scheduling (also known as a dispatch or issue) stage 12612, a register read/memory read stage 12614, an execute stage 12616, a write back/memory write stage 12618, an exception handling stage 12622, and a commit stage 12624.

FIG. 126B shows processor core 12690 including a front end unit 12630 coupled to an execution engine unit 12650, and both are coupled to a memory unit 12670. The core 12690 may be a reduced instruction set computing (RISC) core, a complex instruction set computing (CISC) core, a very long instruction word (VLIW) core, or a hybrid or alternative core type. As yet another option, the core 12690 may be a special-purpose core, such as, for example, a network or communication core, compression engine, coprocessor core, general purpose computing graphics processing unit (GPGPU) core, graphics core, or the like.

The front end unit 12630 includes a branch prediction unit 12632 coupled to an instruction cache unit 12634, which is coupled to an instruction translation lookaside buffer (TLB) 12636, which is coupled to an instruction fetch unit 12638, which is coupled to a decode unit 12640. The decode unit 12640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 12640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 12690 includes a microcode ROM or other medium that stores microcode for certain macroinstructions (e.g., in decode unit 12640 or otherwise within the front end unit 12630). The decode unit 12640 is coupled to a rename/allocator unit 12652 in the execution engine unit 12650.

The execution engine unit 12650 includes the rename/allocator unit 12652 coupled to a retirement unit 12654 and a set of one or more scheduler unit(s) 12656. The scheduler unit(s) 12656 represents any number of different schedulers, including reservations stations, central instruction window, etc. The scheduler unit(s) 12656 is coupled to the physical register file(s) unit(s) 12658. Each of the physical register file(s) units 12658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 12658 comprises a vector registers unit, a write mask registers unit, and a scalar registers unit. These register units may provide architectural vector registers, vector mask registers, and general purpose registers. The physical register file(s) unit(s) 12658 is overlapped by the retirement unit 12654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 12654 and the physical register file(s) unit(s) 12658 are coupled to the execution cluster(s) 12660. The execution cluster(s) 12660 includes a set of one or more execution units 12662 and a set of one or more memory access units 12664. The execution units 12662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 12656, physical register file(s) unit(s) 12658, and execution cluster(s) 12660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 12664). It should also be understood that where separate pipelines are used, one or more of these pipelines may be out-of-order issue/execution and the rest in-order.

The set of memory access units 12664 is coupled to the memory unit 12670, which includes a data TLB unit 12672 coupled to a data cache unit 12674 coupled to a level 2 (L2) cache unit 12676. In one exemplary embodiment, the memory access units 12664 may include a load unit, a store address unit, and a store data unit, each of which is coupled to the data TLB unit 12672 in the memory unit 12670. The instruction cache unit 12634 is further coupled to a level 2 (L2) cache unit 12676 in the memory unit 12670. The L2 cache unit 12676 is coupled to one or more other levels of cache and eventually to a main memory. By way of example, the exemplary register renaming, out-of-order issue/execution core architecture may implement the pipeline 12600 as follows: 1) the instruction fetch 12638 performs the fetch and length decoding stages 12602 and 12604; 2) the decode unit 12640 performs the decode stage 12606; 3) the rename/allocator unit 12652 performs the allocation stage 12608 and renaming stage 12610; 4) the scheduler unit(s) 12656 performs the schedule stage 12612; 5) the physical register file(s) unit(s) 12658 and the memory unit 12670 perform the register read/memory read stage 12614; the execution cluster 12660 perform the execute stage 12616; 6) the memory unit 12670 and the physical register file(s) unit(s) 12658 perform the write back/memory write stage 12618; 7) various units may be involved in the exception handling stage 12622; and 8) the retirement unit 12654 and the physical register file(s) unit(s) 12658 perform the commit stage 12624.

The core 12690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 12690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 12634/12674 and a shared L2 cache unit 12676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 127A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 127A is a block diagram of a single processor core, along with its connection to the on-die interconnect network 12702 and with its local subset of the Level 2 (L2) cache 12704, according to embodiments of the invention. In one embodiment, an instruction decoder 12700 supports the x86 instruction set with a packed data instruction set extension. An L1 cache 12706 allows low-latency accesses to cache memory into the scalar and vector units. While in one embodiment (to simplify the design), a scalar unit 12708 and a vector unit 12710 use separate register sets (respectively, scalar registers 12712 and vector registers 12714) and data transferred between them is written to memory and then read back in from a level 1 (L1) cache 12706, alternative embodiments of the invention may use a different approach (e.g., use a single register set or include a communication path that allow data to be transferred between the two register files without being written and read back).

The local subset of the L2 cache 12704 is part of a global L2 cache that is divided into separate local subsets, one per processor core. Each processor core has a direct access path to its own local subset of the L2 cache 12704. Data read by a processor core is stored in its L2 cache subset 12704 and can be accessed quickly, in parallel with other processor cores accessing their own local L2 cache subsets. Data written by a processor core is stored in its own L2 cache subset 12704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 127B is an expanded view of part of the processor core in FIG. 127A according to embodiments of the invention. FIG. 127B includes an L1 data cache 12706A part of the L1 cache 12704, as well as more detail regarding the vector unit 12710 and the vector registers 12714. Specifically, the vector unit 12710 is a 16-wide vector processing unit (VPU) (see the 16-wide ALU 12728), which executes one or more of integer, single-precision float, and double-precision float instructions. The VPU supports swizzling the register inputs with swizzle unit 12720, numeric conversion with numeric convert units 12722A-B, and replication with replication unit 12724 on the memory input. Write mask registers 12726 allow predicating resulting vector writes.

FIG. 128 is a block diagram of a processor 12800 that may have more than one core, may have an integrated memory controller, and may have integrated graphics according to embodiments of the invention. The solid lined boxes in FIG. 128 illustrate a processor 12800 with a single core 12802A, a system agent 12810, a set of one or more bus controller units 12816, while the optional addition of the dashed lined boxes illustrates an alternative processor 12800 with multiple cores 12802A-N, a set of one or more integrated memory controller unit(s) 12814 in the system agent unit 12810, and special purpose logic 12808.

Thus, different implementations of the processor 12800 may include: 1) a CPU with the special purpose logic 12808 being integrated graphics and/or scientific (throughput) logic (which may include one or more cores), and the cores 12802A-N being one or more general purpose cores (e.g., general purpose in-order cores, general purpose out-of-order cores, a combination of the two); 2) a coprocessor with the cores 12802A-N being a large number of special purpose cores intended primarily for graphics and/or scientific (throughput); and 3) a coprocessor with the cores 12802A-N being a large number of general purpose in-order cores. Thus, the processor 12800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 12800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 12806, and external memory (not shown) coupled to the set of integrated memory controller units 12814. The set of shared cache units 12806 may include one or more mid-level caches, such as level 2 (L2), level 3 (L3), level 4 (L4), or other levels of cache, a last level cache (LLC), and/or combinations thereof. While in one embodiment a ring based interconnect unit 12812 interconnects the integrated graphics logic 12808 (integrated graphics logic 12808 is an example of and is also referred to herein as special purpose logic), the set of shared cache units 12806, and the system agent unit 12810/integrated memory controller unit (s) 12814, alternative embodiments may use any number of well-known techniques for interconnecting such units. In one embodiment, coherency is maintained between one or more cache units 12806 and cores 12802-A-N.

In some embodiments, one or more of the cores 12802A-N are capable of multi-threading. The system agent 12810 includes those components coordinating and operating cores 12802A-N. The system agent unit 12810 may include for example a power control unit (PCU) and a display unit. The PCU may be or include logic and components needed for regulating the power state of the cores 12802A-N and the integrated graphics logic 12808. The display unit is for driving one or more externally connected displays.

The cores 12802A-N may be homogenous or heterogeneous in terms of architecture instruction set; that is, two or more of the cores 12802A-N may be capable of execution the same instruction set, while others may be capable of executing only a subset of that instruction set or a different instruction set.

Exemplary Computer Architectures

FIGS. 129-132 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 129, shown is a block diagram of a system 12900 in accordance with one embodiment of the present invention. The system 12900 may include one or more processors 12910, 12915, which are coupled to a controller hub 12920. In one embodiment the controller hub 12920 includes a graphics memory controller hub (GMCH) 12990 and an Input/Output Hub (IOH) 12950 (which may be on separate chips); the GMCH 12990 includes memory and graphics controllers to which are coupled memory 12940 and a coprocessor 12945; the IOH 12950 couples input/output (I/O) devices 12960 to the GMCH 12990. Alternatively, one or both of the memory and graphics controllers are integrated within the processor (as described herein), the memory 12940 and the coprocessor 12945 are coupled directly to the processor 12910, and the controller hub 12920 in a single chip with the IOH 12950.

The optional nature of additional processors 12915 is denoted in FIG. 129 with broken lines. Each processor 12910, 12915 may include one or more of the processing cores described herein and may be some version of the processor 12800.

The memory 12940 may be, for example, dynamic random access memory (DRAM), phase change memory (PCM), or a combination of the two. For at least one embodiment, the controller hub 12920 communicates with the processor(s) 12910, 12915 via a multi-drop bus, such as a frontside bus (FSB), point-to-point interface such as QuickPath Interconnect (QPI), or similar connection 12995.

In one embodiment, the coprocessor 12945 is a special-purpose processor, such as, for example, a high-throughput MIC processor, a network or communication processor, compression engine, graphics processor, GPGPU, embedded processor, or the like. In one embodiment, controller hub 12920 may include an integrated graphics accelerator.

There can be a variety of differences between the physical resources 12910, 12915 in terms of a spectrum of metrics of merit including architectural, microarchitectural, thermal, power consumption characteristics, and the like.

In one embodiment, the processor 12910 executes instructions that control data processing operations of a general type. Embedded within the instructions may be coprocessor instructions. The processor 12910 recognizes these coprocessor instructions as being of a type that should be executed by the attached coprocessor 12945. Accordingly, the processor 12910 issues these coprocessor instructions (or control signals representing coprocessor instructions) on a coprocessor bus or other interconnect, to coprocessor 12945. Coprocessor(s) 12945 accept and execute the received coprocessor instructions.

Referring now to FIG. 130, shown is a block diagram of a first more specific exemplary system 13000 in accordance with an embodiment of the present invention. As shown in FIG. 130, multiprocessor system 13000 is a point-to-point interconnect system, and includes a first processor 13070 and a second processor 13080 coupled via a point-to-point interconnect 13050. Each of processors 13070 and 13080 may be some version of the processor 12800. In one embodiment of the invention, processors 13070 and 13080 are respectively processors 12910 and 12915, while coprocessor 13038 is coprocessor 12945. In another embodiment, processors 13070 and 13080 are respectively processor 12910 coprocessor 12945.

Processors 13070 and 13080 are shown including integrated memory controller (IMC) units 13072 and 13082, respectively. Processor 13070 also includes as part of its bus controller units point-to-point (P-P) interfaces 13076 and 13078; similarly, second processor 13080 includes P-P interfaces 13086 and 13088. Processors 13070, 13080 may exchange information via a point-to-point (P-P) interface 13050 using P-P interface circuits 13078, 13088. As shown in FIG. 130, IMCs 13072 and 13082 couple the processors to respective memories, namely a memory 13032 and a memory 13034, which may be portions of main memory locally attached to the respective processors.

Processors 13070, 13080 may each exchange information with a chipset 13090 via individual P-P interfaces 13052, 13054 using point to point interface circuits 13076, 13094, 13086, 13098. Chipset 13090 may optionally exchange information with the coprocessor 13038 via a high-performance interface 13092. In one embodiment, the coprocessor 13038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 13090 may be coupled to a first bus 13016 via an interface 13096. In one embodiment, first bus 13016 may be a Peripheral Component Interconnect (PCI) bus, or a bus such as a PCI Express bus or another third generation I/O interconnect bus, although the scope of the present invention is not so limited.

As shown in FIG. 130, various I/O devices 13014 may be coupled to first bus 13016, along with a bus bridge 13018 which couples first bus 13016 to a second bus 13020. In one embodiment, one or more additional processor(s) 13015, such as coprocessors, high-throughput MIC processors, GPGPU's, accelerators (such as, e.g., graphics accelerators or digital signal processing (DSP) units), field programmable gate arrays, or any other processor, are coupled to first bus 13016. In one embodiment, second bus 13020 may be a low pin count (LPC) bus. Various devices may be coupled to a second bus 13020 including, for example, a keyboard and/or mouse 13022, communication devices 13027 and a storage unit 13028 such as a disk drive or other mass storage device which may include instructions/code and data 13030, in one embodiment. Further, an audio I/O 13024 may be coupled to the second bus 13020. Note that other architectures are possible. For example, instead of the point-to-point architecture of FIG. 130, a system may implement a multi-drop bus or other such architecture.

Referring now to FIG. 131, shown is a block diagram of a second more specific exemplary system 13100 in accordance with an embodiment of the present invention. Like elements in FIGS. 130 and 131 bear like reference numerals, and certain aspects of FIG. 130 have been omitted from FIG. 131 in order to avoid obscuring other aspects of FIG. 131.

FIG. 131 illustrates that the processors 13070, 13080 may include integrated memory and I/O control logic ("CL") 13072 and 13082, respectively. Thus, the CL 13072, 13082 include integrated memory controller units and include I/O control logic. FIG. 131 illustrates that not only are the memories 13032, 13034 coupled to the CL 13072, 13082, but also that I/O devices 13114 are also coupled to the control logic 13072, 13082. Legacy I/O devices 13115 are coupled to the chipset 13090.

Referring now to FIG. 132, shown is a block diagram of a SoC 13200 in accordance with an embodiment of the present invention. Similar elements in FIG. 128 bear like reference numerals. Also, dashed lined boxes are optional features on more advanced SoCs. In FIG. 132, an interconnect unit(s) 13202 is coupled to: an application processor 13210 which includes a set of one or more cores 12802A-N, which include cache units 12804A-N, and shared cache unit(s) 12806; a system agent unit 12810; a bus controller unit(s) 12816; an integrated memory controller unit(s) 12814; a set or one or more coprocessors 13220 which may include integrated graphics logic, an image processor, an audio processor, and a video processor; an static random access memory (SRAM) unit 13230; a direct memory access (DMA) unit 13232; and a display unit 13240 for coupling to one or more external displays. In one embodiment, the coprocessor(s) 13220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 13030 illustrated in FIG. 130, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 133 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 133 shows a program in a high level language 13302 may be compiled using an x86 compiler 13304 to generate x86 binary code 13306 that may be natively executed by a processor with at least one x86 instruction set core 13316. The processor with at least one x86 instruction set core 13316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 13304 represents a compiler that is operable to generate x86 binary code 13306 (e.g., object code) that can, with or without additional linkage processing, be executed on the processor with at least one x86 instruction set core 13316. Similarly, FIG. 133 shows the program in the high level language 13302 may be compiled using an alternative instruction set compiler 13308 to generate alternative instruction set binary code 13310 that may be natively executed by a processor without at least one x86 instruction set core 13314 (e.g., a processor with cores that execute the MIPS instruction set of MIPS Technologies of Sunnyvale, CA and/or that execute the ARM instruction set of ARM Holdings of Sunnyvale, CA). The instruction converter 13312 is used to convert the x86 binary code 13306 into code that may be natively executed by the processor without an x86 instruction set core 13314. This converted code is not likely to be the same as the alternative instruction set binary code 13310 because an instruction converter capable of this is difficult to make; however, the converted code will accomplish the general operation and be made up of instructions from the alternative instruction set. Thus, the instruction converter 13312 represents software, firmware, hardware, or a combination thereof that, through emulation, simulation or any other process, allows a processor or other electronic device that does not have an x86 instruction set processor or core to execute the x86 binary code 13306.

Example implementations, embodiments, and particular combinations of features and aspects are detailed below. These examples are instructive, not limiting.

Example 1. A system including: a plurality of heterogeneous processing elements; a hardware heterogeneous scheduler to dispatch instructions for execution on one or more of the plurality of heterogeneous processing elements, the instructions corresponding to a code fragment to be processed by the one or more of the plurality of heterogeneous processing elements, such that the instructions are native instructions to at least one of the one or more of the plurality of heterogeneous processing elements.

Example 2: The system of example 1, such that the plurality of heterogeneous processing elements comprises an in-order processor core, an out-of-order processor core, and a packed data processor core.

Example 3: The system of example 2, such that the plurality of heterogeneous processing elements further comprises an accelerator.

Example 4: The system of any of examples 1-3, such that the hardware heterogeneous scheduler further including: a program phase detector to detect a program phase of the code fragment; such that the plurality of heterogeneous processing elements includes a first processing element having a first microarchitecture and a second processing element having a second microarchitecture different from the first microarchitecture; such that the program phase is one of a plurality of program phases, including a first phase and a second phase and the dispatch of instructions is based on part on the detected program phase; and such that processing of the code fragment by the first processing element is to produce improved performance per watt characteristics as compared to processing of the code fragment by the second processing element.

Example 5: The system of any of examples 1-4, such that the hardware heterogeneous scheduler further comprises: a selector to select a type of processing element of the plurality of processing elements to execute the received code fragment and schedule the code fragment on a processing element of the selected type of processing elements via dispatch.

Example 6: The system of example 1, such that the code fragment is one or more instructions associated with a software thread.

Example 7: The system of any of examples 5-6, such that for a data parallel program phase the selected type of processing element is a processing core to execute single instruction, multiple data (SIMD) instructions.

Example 8: The system of any of examples 5-7, such that for a data parallel program phase the selected type of processing element is circuitry to support dense arithmetic primitives.

Example 9: The system of any of examples 5-7, such that for a data parallel program phase the selected type of processing element is an accelerator.

Example 10: The system of any of examples 5-9, such that a data parallel program phase comprises data elements that are processed simultaneously using a same control flow.

Example 11: The system of any of examples 5-10, such that for a thread parallel program phase the selected type of processing element is a scalar processing core.

Example 12: The system of any of examples 5-11, such that a thread parallel program phase comprises data dependent branches that use unique control flows.

Example 13: The system of any of examples 2-12, such that for a serial program phase the selected type of processing element is an out-of-order core.

Example 14: The system of any of examples 2-13, such that for a data parallel program phase the selected type of processing element is a processing core to execute single instruction, multiple data (SIMD) instructions.

Example 15: The system of any of examples 1-14, such that the hardware heterogeneous scheduler is to support multiple code types including compiled, intrinsics, assembly, libraries, intermediate, offload, and device.

Example 16: The system of any of examples 5-15, such that the hardware heterogeneous scheduler is to emulate functionality when the selected type of processing element cannot natively handle the code fragment.

Example 17: The system of any of examples 1-15, such that the hardware heterogeneous scheduler is to emulate functionality when a number of hardware threads available is oversubscribed.

Example 18: The system of any of examples 5-15, such that the hardware heterogeneous scheduler is to emulate functionality when the selected type of processing element cannot natively handle the code fragment.

Example 19: The system of any of examples 5-18, such that the selection of a type of processing element of the plurality of heterogeneous processing elements is transparent to a user.

Example 20: The system of any of examples 5-19, such that the selection of a type of processing element of the plurality of heterogeneous processing elements is transparent to an operating system.

Example 21: The system of any of examples 1-20, such that the hardware heterogeneous scheduler is to present a homogeneous multiprocessor programming model to make each thread appear to a programmer as if it is executing on a scalar core.

Example 22: The system of example 21, such that the presented homogeneous multiprocessor programming model is to present an appearance of support for a full instruction set.

Example 23: The system of any of examples 1-22, such that the plurality of heterogeneous processing elements is to share a memory address space.

Example 24: The system of any of examples 1-23, such that the hardware heterogeneous scheduler includes a binary translator that is to be executed on one of the heterogeneous processing elements.

Example 25: The system of any of examples 5-24, such that a default selection of a type of processing element of the plurality of heterogeneous processing elements is a latency optimized core.

Example 26: The system of any of examples 1-25, such that the heterogeneous hardware scheduler to select a protocol to use on a multi-protocol interface for the dispatched instructions.

Example 27: The system of any of example 26, such that a first protocol supported by the multi-protocol bus interface comprises a memory interface protocol to be used to access a system memory address space.

Example 28: The system of any of examples 26-27, such that a second protocol supported by the multi-protocol bus interface comprises a cache coherency protocol to maintain coherency between data stored in a local memory of the accelerator and a memory subsystem of a host processor including a host cache hierarchy and a system memory.

Example 29: The system of any of examples 26-28, such that a third protocol supported by the multi-protocol bus interface comprises a serial link protocol supporting device discovery, register access, configuration, initialization, interrupts, direct memory access, and address translation services.

Example 30: The system of example 29, such that the third protocol comprises the Peripheral Component Interface Express (PCIe) protocol.

Example 31: A system including: a plurality of heterogeneous processing elements in a heterogeneous processor including an accelerator; memory to store program code which is executable by at least one of plurality of heterogeneous processing elements in a heterogeneous processor, the program code including: a heterogeneous scheduler to dispatch instructions for execution on one or more of the plurality of heterogeneous processing elements, the instructions corresponding to a code fragment to be processed by the one or more of the plurality of heterogeneous processing elements, such that the instructions are native instructions to at least one of the one or more of the plurality of heterogeneous processing elements.

Example 32: The system of example 31, such that the plurality of heterogeneous processing elements comprises an in-order processor core, an out-of-order processor core, and a packed data processor core.

Example 33: The system of example 32, such that the plurality of heterogeneous processing elements further comprises an accelerator.

Example 34: The system of any of examples 31-33, such that the heterogeneous scheduler further including: a program phase detector to detect a program phase of the code fragment; such that the plurality of heterogeneous processing elements includes a first processing element having a first microarchitecture and a second processing element having a second microarchitecture different from the first microarchitecture; such that the program phase is one of a plurality of program phases, including a first phase and a second phase and the dispatch of instructions is based on part on the detected program phase; and such that processing of the code fragment by the first processing element is to produce improved performance per watt characteristics as compared to processing of the code fragment by the second processing element.

Example 35: The system of any of examples 31-34, such that the heterogeneous scheduler further comprises: a selector to select a type of processing element of the plurality of processing elements to execute the received code fragment and schedule the code fragment on a processing element of the selected type of processing elements via dispatch.

Example 36: The system of any of examples 31-35, such that the code fragment is one or more instructions associated with a software thread.

Example 37: The system of any of examples 34-36, such that for a data parallel program phase the selected type of processing element is a processing core to execute single instruction, multiple data (SIMD) instructions.

Example 38: The system of any of examples 34-37, such that for a data parallel program phase the selected type of processing element is circuitry to support dense arithmetic primitives.

Example 39: The system of any of examples 34-38, such that for a data parallel program phase the selected type of processing element is an accelerator.

Example 40: The system of any of examples 34-39, such that a data parallel program phase comprises data elements that are processed simultaneously using a same control flow.

Example 41: The system of any of examples 30-35, such that for a thread parallel program phase the selected type of processing element is a scalar processing core.

Example 42: The system of any of examples 30-36, such that a thread parallel program phase comprises data dependent branches that use unique control flows.

Example 43: The system of any of examples 30-37, such that for a serial program phase the selected type of processing element is an out-of-order core.

Example 44: The system of any of examples 30-38, such that for a data parallel program phase the selected type of processing element is a processing core to execute single instruction, multiple data (SIMD) instructions.

Example 45: The system of any of examples 31-44, such that the heterogeneous scheduler supports multiple code types including compiled, intrinsics, assembly, libraries, intermediate, offload, and device.

Example 46: The system of any of examples 31-45, such that the heterogeneous scheduler is to emulate functionality when the selected type of processing element cannot natively handle the code fragment.

Example 47: The system of any of examples 31-46, such that the heterogeneous scheduler is to emulate functionality when a number of hardware threads available is oversubscribed.

Example 48: The system of any of examples 31-47, such that the heterogeneous scheduler is to emulate functionality when the selected type of processing element cannot natively handle the code fragment.

Example 50: The system of any of examples 31-49, such that the selection of a type of processing element of the plurality of heterogeneous processing element is transparent to a user.

Example 51: The system of any of examples 31-50, such that the selection of a type of processing element of the plurality of heterogeneous processing element is transparent to an operating system.

Example 52: The system of any of examples 31-51, such that the heterogeneous scheduler to present a homogeneous programming model to make each thread appear to a programmer as if it is executing on a scalar core.

Example 53: The system of any of examples 52, such that the presented homogeneous multiprocessor programming model to present an appearance of support for a full instruction set.

Example 54a: The system of any of examples 31-53, such that the plurality of heterogeneous processing elements to share a memory address space.

Example 54b: The system of any of examples 31-53, such that the heterogeneous scheduler includes a binary translator that is to be executed on one of the heterogeneous processing elements.

Example 55: The system of any of examples 31-54, such that a default selection of a type of processing element of the plurality of heterogeneous processing elements is a latency optimized core.

Example 56: The system of any of examples 31-55, such that the heterogeneous software scheduler to select a protocol to use on a multi-protocol interface for the dispatched instructions.

Example 57: The system of any of example 56, such that a first protocol supported by the multi-protocol bus interface comprises a memory interface protocol to be used to access a system memory address space.

Example 58: The system of any of examples 56-57, such that a second protocol supported by the multi-protocol bus interface comprises a cache coherency protocol to maintain coherency between data stored in a local memory of the accelerator and a memory subsystem of a host processor including a host cache hierarchy and a system memory.

Example 59: The system of any of examples 56-58, such that a third protocol supported by the multi-protocol bus interface comprises a serial link protocol supporting device discovery, register access, configuration, initialization, interrupts, direct memory access, and address translation services.

Example 60: The system of example 59, such that the third protocol comprises the Peripheral Component Interface Express (PCIe) protocol.

Example 61: A method including: receiving a plurality of instructions; dispatching the received plurality of instructions for execution on one or more of a plurality of heterogeneous processing elements, the received plurality of instructions corresponding to a code fragment to be processed by the one or more of the plurality of heterogeneous processing elements, such that the plurality of instructions are native instructions to at least one of the one or more of the plurality of heterogeneous processing elements.

Example 62: The method of example 61, such that the plurality of heterogeneous processing elements comprises an in-order processor core, an out-of-order processor core, and a packed data processor core.

Example 63: The method of example 62, such that the plurality of heterogeneous processing elements further comprises an accelerator.

Example 64: The method of any of examples 61-63, further including: detecting a program phase of the code fragment; such that the plurality of heterogeneous processing elements includes a first processing element having a first microarchitecture and a second processing element having a second microarchitecture different from the first microarchitecture; such that the program phase is one of a plurality of program phases, including a first phase and a second phase; and such that processing of the code fragment by the first processing element is to produce improved performance per watt characteristics as compared to processing of the code fragment by the second processing element.

Example 65: The method of any of examples 61-64, further including: selecting a type of processing element of the plurality of processing elements to execute the received code fragment and scheduling the code fragment on a processing element of the selected type of processing elements.

Example 66: The method of any of examples 61-63, such that a code fragment is one or more instructions associated with a software thread.

Example 67: The method of any of examples 64-66, such that for a data parallel program phase the selected type of processing element is a processing core to execute single instruction, multiple data (SIMD) instructions.

Example 68: The method of any of examples 64-66, such that for a data parallel program phase the selected type of processing element is circuitry to support dense arithmetic primitives.

Example 69: The method of any of examples 64-68, such that for a data parallel program phase the selected type of processing element is an accelerator.

Example 70: The method of any of examples 64-69, such that a data parallel program phase is characterized by data elements that are processed simultaneously using a same control flow.

Example 71: The method of any of examples 64-70, such that for a thread parallel program phase the selected type of processing element is a scalar processing core.

Example 72: The method of any of examples 64-71, such that a thread parallel program phase is characterized by data dependent branches that use unique control flows.

Example 73: The method of any of examples 64-72, such that for a serial program phase the selected type of processing element is an out-of-order core.

Example 74: The method of any of examples 64-73, such that for a data parallel program phase the selected type of processing element is a processing core to execute single instruction, multiple data (SIMD) instructions.

Example 75: The method of any of examples 61-74, further including: emulating functionality when the selected type of processing element cannot natively handle the code fragment.

Example 76: The method of any of examples 61-74, further including: emulating functionality when a number of hardware threads available is oversubscribed.

Example 77: The method of any of examples 61-76, such that the selection of a type of processing element of the plurality of heterogeneous processing element is transparent to a user.

Example 78: The method of any of examples 61-77, such that the selection of a type of processing element of the plurality of heterogeneous processing elements is transparent to an operating system.

Example 79: The method of any of examples 61-74, further including: presenting a homogeneous multiprocessor programming model to make each thread appear as if it is executing on a scalar core.

Example 80: The method of example 79, such that the presented homogeneous multiprocessor programming model to present an appearance of support for a full instruction set.

Example 81: The method of any of examples 61-79, such that the plurality of heterogeneous processing elements to share a memory address space.

Example 82: The method of any of examples 61-81, further including: binary translating the code fragment to be executed on one of the heterogeneous processing elements.

Example 83: The method of any of examples 61-82, such that a default selection of a type of processing element of the plurality of heterogeneous processing elements is a latency optimized core.

Example 84: A non-transitory machine readable medium storing instructions which when executed by a hardware processor perform the method of one of examples 51-83.

Example 85: A method including: receiving a code fragment in a heterogeneous scheduler; determining if the code fragment is in a parallel phase; when the code fragment is not in a parallel phase, selecting a latency sensitive processing element to execute the code fragment; when the code fragment is in a parallel phase, determining a type of parallelism, and for a thread parallel code fragment, selecting a scalar processing element to execute the code fragment, and for a data parallel code fragment, determining a data layout of the data parallel code fragment: for a packed data layout selecting one of a single instruction, multiple data (SIMD) processing element and an arithmetic primitive processing element and for a random data layout selecting one of a SIMD processing element that uses gather instructions, a spatial computation array, or a scalar core from an array of scalar cores; and transmitting the code fragment to a processing element for execution.

Example 86: The method of example 85, further including: determining when the code fragment is subject to an offload to an accelerator prior to determining if the code fragment is in a parallel phase; transmitting the code fragment to the accelerator when the code fragment is subject to an offload.

Example 87: The method of any of examples 85-86, such that the determining if the code fragment is in a parallel phase is based on one or more of detected data dependencies, instruction types, and control flow instructions.

Example 88: The method of example 87, such that instructions of a type of single instruction, multiple data instruction indicate a parallel phase.

Example 89: The method of any of examples 85-88, such that each operating system thread handled by the heterogeneous scheduler is assigned a logical thread identifier.

Example 90: The method of example 89, such that the heterogeneous scheduler utilizes striped mapping of logical thread identifiers such that each logical thread identifier is mapped to a tuple of a processing element type, processing element identifier, and thread identifier.

Example 91: The method of example 90, such that a mapping from logical thread identifier to processing element identifier and thread identifier is computed via division and modulo.

Example 92: The method of example 91, such that a mapping from logical thread identifier to processing element identifier and thread identifier is fixed to preserve thread affinity.

Example 93: The method of example 90, such that a mapping from logical thread identifier to processing element type is performed by the heterogeneous scheduler.

Example 94: The method of example 93, such that a mapping from logical thread identifier to processing element type is flexible to accommodate future processing element types.

Example 95: The method of example 91, such that the heterogeneous scheduler is to utilize core groups such that at least one of the core groups comprises at least one out-of-order tuple and scalar and SIMD tuples whose logical thread identifiers map to the same out-of-order tuple.

Example 96: The method of example 95, such that a non-parallel phase is determined by a thread that has a unique page directory base register value among threads that belong to one of the core groups.

Example 97: The method of example 96, such that threads that belong to a process share a same address space, page table, and page directory base register value.

Example 98: The method of any of examples 85-97, further including: detecting an event, such that the event is one of a thread wake-up command; a write to a page directory base register; a sleep command; a phase change in the thread; and one or more instructions indicating a desired reallocation to a different core.

Example 99: The method of example 98, further including: when the event is a thread wake-up command: determining the code fragment is in a parallel phase, counting a number of processing elements that share a same page table base pointer as the thread that woke up; determining whether the number of counted processing elements is greater than one; when the count of the number of processing elements that share a same page table base pointer as the thread that woke up is one, the thread is in a serial phase; and when the count of the number of processing elements that share a same page table base pointer as the thread that woke up is not one, the thread is in a parallel phase.

Example 100: The method of example 98, further including: when the event is a thread sleep command: clearing a run flag associated with the thread, counting a number of threads of processing elements that share the same page table base pointer as the affected thread, determining whether an out-of-order processing element is idle; when the page table base pointer is shared by exactly one thread in the core group, then that sharing thread is moved from an out-of-order processing element, when the page table base pointer is shared by more than one thread, then the first running thread of the core group is migrated to the out-of-order processing element.

Example 101: The method of example 100, such that the thread sleep command is one of a halt, wait entry and timeout, or pause command.

Example 102: The method of example 98, further including: when the event is a phase change: when a logical thread identifier of a thread indicates it is running on a scalar processing element and there are SIMD instructions, migrating the thread to a SIMD processing element; when a logical thread identifier of a thread indicates it is running on a SIMD processing element and there are no SIMD instructions, migrating the thread to a scalar processing element.

Example 103: The method of any of examples 85-102, further including: translating the code fragment to better fit the selected processing element prior to transmitting the code fragment.

Example 104: The method of example 103, such that the heterogeneous scheduler includes a binary translator to perform the translating.

Example 105: The method of example 103, such that the heterogeneous scheduler includes a just-in-time compiler to perform the translating.

Example 106: The method of any of examples 85-105, such that the method further comprises the steps of the method of any of the method examples of examples 61-83.

Example 107: A system including: a plurality of heterogeneous processing elements; a heterogeneous scheduler to determine a phase of a code fragment and transmit the code fragment to one of the plurality of heterogeneous processing elements for execution based at least in part on the determined phase.

Example 108: The system of example 107, such that the heterogeneous scheduler to: determine the code fragment is in a parallel phase; when the code fragment is not in a parallel phase, selecting a latency sensitive processing element to execute the code fragment; when the code fragment is in a parallel phase, determining a type of parallelism, and for a thread parallel code fragment, selecting a scalar processing element to execute the code fragment, and for a data parallel code fragment, determining a data layout of the data parallel code fragment: for a packed data layout selecting one of a single instruction, multiple data (SIMD) processing element and an arithmetic primitive processing element, and for a random data layout selecting one of a SIMD processing element that uses gather instructions, a spatial computation array, or a scalar core from an array of scalar cores.

Example 109: The system of example 108, such that the heterogeneous scheduler is to further: determine when the code fragment is subject to an offload to an accelerator prior to determining if the code fragment is in a parallel phase; transmit the code fragment to the accelerator when the code fragment is subject to an offload.

Example 110: The system of any of examples 108-109, such that the heterogeneous scheduler is to further: determine if the code fragment is in a parallel phase is based on one or more of detected data dependencies, instruction types, and control flow instructions.

Example 111: The system of example 110, such that instructions of a type of single instruction, multiple data instruction indicate a parallel phase.

Example 112: The system of any of examples 108-111, such that each operating system thread handled by the heterogeneous scheduler is assigned a logical thread identifier.

Example 113: The system of example 112, such that the heterogeneous scheduler is to utilize striped mapping of logical thread identifiers such that each logical thread identifier is mapped to a tuple of a processing element type, processing element identifier, and thread identifier.

Example 114: The system of example 112, such that a mapping from logical thread identifier to processing element identifier and thread identifier is computed via division and modulo.

Example 115: The system of example 114, such that a mapping from logical thread identifier to processing element identifier and thread identifier is fixed to preserve thread affinity.

Example 116: The system of example 115, such that a mapping from logical thread identifier to processing element type is performed by the heterogeneous scheduler.

Example 117: The system of example 116, such that a mapping from logical thread identifier to processing element type is flexible to accommodate future processing element types.

Example 118: The system of example 108-117, such that the heterogeneous scheduler is to utilize core groups such that a core group comprises at least one out-of-order tuple and scalar and SIMD tuples whose logical thread identifiers map to the same out-of-order tuple.

Example 119: The system of example 118, such that a non-parallel phase is determined by a thread that has a unique page directory base register value among threads that belong to one of the core groups.

Example 120: The system of example 119, such that threads that belong to a process share a same address space, page table, and page directory base register value.

Example 121: The system of any of examples 108-120, such that the heterogeneous scheduler is to: detect an event, such that the event is one of a thread wake-up command; a write to a page directory base register; a sleep command; a phase change in the thread; and one or more instructions indicating a desired reallocation.

Example 122: The system of example 121, such that the heterogeneous scheduler is to: when the event is a thread wake-up command: determine the code fragment is in a parallel phase, count a number of processing elements that share a same page table base pointer as the thread that woke up; determine whether the number of counted processing elements is greater than one; when the count of the number of processing elements that share a same page table base pointer as the thread that woke up is one, the thread is in a serial phase; and when the count of the number of processing elements that share a same page table base pointer as the thread that woke up is not one, the thread is in a parallel phase.

Example 123: The system of example 121, such that the heterogeneous scheduler is to: when the event is a thread sleep command: clear a run flag associated with the thread; count a number of threads of processing elements that share the same page table base pointer as the affected thread; determine whether an out-of-order processing element is idle; when the page table base pointer is shared by exactly one thread in the core group, then that sharing thread is moved from an out-of-order processing element, when the page table base pointer is shared by more than one thread, then the first running thread of the group is migrated to the out-of-order processing element.

Example 124: The system of example 123, such that the thread sleep command is one of a halt, wait entry and timeout, or pause command.

Example 125: The system of example 121, such that the heterogeneous scheduler is to: when the event is a phase change: when a logical thread identifier of a thread indicates it is running on a scalar processing element and there are SIMD instructions, migrate the thread to a SIMD processing element; when a logical thread identifier of a thread indicates it is running on a SIMD processing element and there are no SIMD instructions, migrate the thread to a scalar processing element.

Example 126: The system of any of examples 108-125, such that the heterogeneous scheduler to: translate the code fragment to better fit the selected processing element prior to transmitting the code fragment.

Example 127: The system of example 126, such that the heterogeneous scheduler includes a binary translator stored in a non-transitory machine-readable medium to perform the translating upon execution.

Example 128: The system of example 126, such that the heterogeneous scheduler includes a just-in-time compiler stored in a non-transitory machine-readable medium to perform the translating upon execution.

Example 129: A system of any of examples 108-128, further including: memory to store program code which is executable by at least one of plurality of heterogeneous processing elements in a heterogeneous processor to provide the heterogeneous scheduler.

Example 130: The system of any of examples 108-128, such that the heterogeneous scheduler comprises circuitry.

Example 131: A processor including: a processor core, the processor core including: a decoder to decode at least one instruction native to the processor core; one or more execution units to execute at least one decoded instruction, the at least one decoded instruction corresponding to an acceleration begin instruction, the acceleration begin instruction to indicate a start of a region of code to be offloaded to an accelerator.

Example 132: The processor of example 131, such that the region of code is to be offloaded based on whether a target accelerator is coupled to the processor core and available to process the region of code, such that, when the target accelerator is not coupled to the processor core to process the region of code, the region of code is to be processed by the processor core.

Example 133: The processor of example 131, such that in response to execution of the at least one decoded instruction corresponding to the acceleration begin instruction, the processor core is to transition from a first mode of execution to a second mode of execution.

Example 134: The processor of example 133, such that, in the first mode of execution, the processor core is to check for self-modifying code, and in the second mode of execution, the processor core is to disable a check for self-modifying code.

Example 135: The processor of example 134, such that, to disable a self-modifying code check, self-modifying code detection circuitry is disabled.

Example 136: The processor of any one of examples 133-135, such that, in the first mode of execution, memory consistency model restrictions are weakened by relaxing memory ordering requirements.

Example 137: The processor of any one of examples 133-136, such that, in the first mode of execution, floating point semantics are altered by setting a floating point control word register.

Example 138: A method including: decoding an instruction native to the processor core; executing the decoded instruction corresponding to an acceleration begin instruction, the acceleration begin instruction to indicate a start of a region of code to be offloaded to an accelerator.

Example 139: The method of example 138, such that the region of code is to be offloaded based on whether a target accelerator is coupled to the processor core and available to process the region of code, such that when the target accelerator is not coupled to the processor core to process the region of code, the region of code is to be processed by the processor core.

Example 140: The method of example 138, such that in response to execution of the decoded instruction corresponding to the acceleration begin instruction, the processor core is to transition from a first mode of execution to a second mode of execution.

Example 141: The method of example 140, such that, in the first mode of execution, the processor core is to check for self-modifying code, and in the second mode of execution, the processor core is to disable a check for self-modifying code.

Example 142: The method of example 141, such that, to disable a self-modifying code check, self-modifying code detection circuitry is disabled.

Example 143: The method of any one of examples 140-142, such that, in the first mode of execution, memory consistency model restrictions are weakened by relaxing memory ordering requirements.

Example 144: The method of any one of examples 140-143, such that, in the first mode of execution, floating point semantics are altered by setting a floating point control word register.

Example 145: A non-transitory machine-readable medium storing an instruction which when executed by a processor causes the processor to perform a method, the method including: decoding an instruction native to the processor core; executing the decoded instruction corresponding to an acceleration begin instruction, the acceleration begin instruction to indicate a start of a region of code to be offloaded to an accelerator.

Example 146: The method of example 145, such that the region of code is to be offloaded based on whether a target accelerator is coupled to the processor core and available to process the region of code, such that when the target accelerator is not coupled to the processor core to process the region of code, the region of code is to be processed by the processor core.

Example 147: The method of example 145, such that in response to execution of the decoded instruction corresponding to the acceleration begin instruction, the processor core is to transition from a first mode of execution to a second mode of execution.

Example 148: The method of example 147, such that, in the first mode of execution, the processor core is to check for self-modifying code, and in the second mode of execution, the processor core is to disable a check for self-modifying code.

Example 149: The method of example 148, such that, to disable a self-modifying code check, self-modifying code detection circuitry is disabled.

Example 150: The method of any one of examples 148-149, such that, in the first mode of execution, memory consistency model restrictions are weakened by relaxing memory ordering requirements.

Example 151: The method of any one of examples 148-150, such that, in the first mode of execution, floating point semantics are altered by setting a floating point control word register.

Example 152: A system including: a processor core, the processor core including: a decoder to decode at least one instruction native to the processor core; one or more execution units to execute at least one decoded instruction, the at least one decoded instruction corresponding to an acceleration begin instruction, the acceleration begin instruction to indicate a start of a region of code to be offloaded to an accelerator.

Example 153: The system of example 152, such that the region of code is to be offloaded based on whether a target accelerator is coupled to the processor core and available to process the region of code, such that, when the target accelerator is not coupled to the processor core to process the region of code, the region of code is to be processed by the processor core.

Example 154: The system of example 152, such that in response to execution of the at least one decoded instruction corresponding to the acceleration begin instruction, the processor core is to transition from a first mode of execution to a second mode of execution.

Example 155: The system of example 154, such that, in the first mode of execution, the processor core is to check for self-modifying code, and in the second mode of execution, the processor core is to disable a check for self-modifying code.

Example 156: The system of example 155, such that, to disable a self-modifying code check, self-modifying code detection circuitry is disabled.

Example 157: The processor of any one of examples 152-156, such that, in the first mode of execution, memory consistency model restrictions are weakened by relaxing memory ordering requirements.

Example 158: The processor of any one of examples 152-157, such that, in the first mode of execution, floating point semantics are altered by setting a floating point control word register.

Example 159: A processor including: a processor core, the processor core including: a decoder to decode an instruction native to the processor core; one or more execution units to execute the decoded instruction corresponding to an acceleration end instruction, the acceleration end instruction to indicate an end of a region of code to be offloaded to an accelerator.

Example 160: The processor of example 159, such that the region of code is to be offloaded based on whether a target accelerator is coupled to the processor core and available process the region of code, such that, when the target accelerator is not coupled to the processor core to receive and process the region of code, the region of code is to be processed by the processor core.

Example 161: The processor of example 159, such that the region of code is delineated by an execution of a decoded instruction corresponding to an acceleration begin instruction which is to transition the processor core from a first mode of execution to a second mode of execution.

Example 162: The processor of example 161, such that, in the first mode of execution, the processor is to check for self-modifying code, and in the second mode of execution, the processor is to disable a check for self-modifying code.

Example 163: The processor of example 162, such that, to disable a self-modifying code check, self-modifying code detection circuitry is disabled.

Example 164: The processor of any one of examples 161-163, such that, in the first mode of execution, memory consistency model restrictions are weakened.

Example 165: The processor of any one of examples 161-164, such that, in the first mode of execution, floating point semantics are altered by setting a floating point control word register.

Example 166: The processor of any one of examples 159-165, such that, the execution of the accelerator begin instruction gates execution of the region of code on the processor core until the accelerator end instruction is executed.

Example 167: A method including: decoding an instruction native to the processor core; executing the decoded instruction corresponding to an acceleration end instruction, the acceleration end instruction to indicate an end of a region of code to be offloaded to an accelerator.

Example 168: The method of example 167, such that the region of code is to be offloaded based on whether a target accelerator is coupled to the processor core and available process the region of code, such that, when the target accelerator is not coupled to the processor core to receive and process the region of code, the region of code is to be processed by the processor core.

Example 169: The method of example 167, such that the region of code is delineated by an execution of a decoded instruction corresponding to an acceleration begin instruction which is to transition the processor core from a first mode of execution to a second mode of execution.

Example 170: The method of example 169, such that, in the first mode of execution, the processor is to check for self-modifying code, and in the second mode of execution, the processor is to disable a check for self-modifying code.

Example 171: The method of example 170, such that, to disable a self-modifying code check, self-modifying code detection circuitry is disabled.

Example 172: The method of any one of examples 169-171, such that, in the first mode of execution, memory consistency model restrictions are weakened.

Example 173: The method of any one of examples 169-172, such that, in the first mode of execution, floating point semantics are altered by setting a floating point control word register.

Example 174: The method of any one of examples 167-173, such that, the execution of the accelerator begin instruction gates execution of the region of code on the processor core until the accelerator end instruction is executed.

Example 175: A non-transitory machine-readable medium storing an instruction which when executed by a processor causes the processor to perform a method, the method including: decoding an instruction native to the processor core; executing the decoded instruction corresponding to an acceleration end instruction, the acceleration end instruction to indicate an end of a region of code to be offloaded to an accelerator.

Example 176: The non-transitory machine-readable medium of example 175, such that the region of code is to be offloaded based on whether a target accelerator is coupled to the processor core and available process the region of code, such that, when the target accelerator is not coupled to the processor core to receive and process the region of code, the region of code is to be processed by the processor core.

Example 177: The non-transitory machine-readable medium of example 175, such that the region of code is delineated by an execution of a decoded instruction corresponding to an acceleration begin instruction which is to transition the processor core from a first mode of execution to a second mode of execution.

Example 178: The non-transitory machine-readable medium of example 177, such that, in the first mode of execution, the processor is to check for self-modifying code, and in the second mode of execution, the processor is to disable a check for self-modifying code.

Example 179: The non-transitory machine-readable medium of example 178, such that, to disable a self-modifying code check, self-modifying code detection circuitry is disabled.

Example 180: The non-transitory machine-readable medium of any one of examples 177-179, such that, in the first mode of execution, memory consistency model restrictions are weakened.

Example 181: The non-transitory machine-readable medium of any one of examples 177-180, such that, in the first mode of execution, floating point semantics are altered by setting a floating point control word register.

Example 182: The non-transitory machine-readable medium of any one of examples 175-181, such that, the execution of the accelerator begin instruction gates execution of the region of code on the processor core until the accelerator end instruction is executed.

Example 183: A system including: a processor core, the processor core including: a decoder to decode an instruction native to the processor core; one or more execution units to execute the decoded instruction corresponding to an acceleration end instruction, the acceleration end instruction to indicate an end of a region of code to be offloaded to an accelerator; an accelerator to execute the offloaded instructions.

Example 184: The system of example 183, such that the region of code is to be offloaded based on whether a target accelerator is coupled to the processor core and available process the region of code, such that, when the target accelerator is not coupled to the processor core to receive and process the region of code, the region of code is to be processed by the processor core.

Example 185: The system of example 184, such that the region of code is delineated by an execution of a decoded instruction corresponding to an acceleration begin instruction which is to transition the processor core from a first mode of execution to a second mode of execution.

Example 186: The system of example 185, such that, in the first mode of execution, the processor is to check for self-modifying code, and in the second mode of execution, the processor is to disable a check for self-modifying code.

Example 187: The system of example 186, such that, to disable a self-modifying code check, self-modifying code detection circuitry is disabled.

Example 188: The system of any one of examples 185-187, such that, in the first mode of execution, memory consistency model restrictions are weakened.

Example 189: The system of any one of examples 185-188, such that, in the first mode of execution, floating point semantics are altered by setting a floating point control word register.

Example 190: The system of any one of examples 183-190, such that, the execution of the accelerator begin instruction gates execution of the region of code on the processor core until the accelerator end instruction is executed.

Example 191: A system including: an accelerator to execute a thread;

a processor core; and a memory having stored therein, software to implement a heterogeneous scheduler, such that, when executed by the processor core, the heterogeneous scheduler is to: detect a code sequence in a thread suitable for potential execution on the accelerator, select the accelerator to execute the detected code sequence, transmit the detected code sequence to the selected accelerator.

Example 192: The system of example 191, further including: a plurality of heterogeneous processing elements to execute program phases of the thread not suitable for execution by the accelerator.

Example 193: The system of any of examples 191-192, such that the heterogeneous scheduler further comprises: a pattern matcher to recognize the code sequence by comparing the code sequence to a predetermined set of patterns.

Example 194: The system of example 193, such that the predetermined set of patterns are stored in the memory.

Example 195: The system of any of examples 191-194, such that the heterogeneous scheduler to use performance monitoring to recognize code that does have a pattern match and adjust an operating mode associated with the thread by configuring the processor core to do one or more of the following: ignore self-modifying code is ignored, weaken memory consistency model restrictions, alter floating point semantics, change performance monitoring, and alter architectural flag usage.

Example 196: The system of any of examples 191-195, such that the heterogeneous scheduler further comprises a translation module to translate the recognized code into accelerator code for the accelerator to execute.

Example 197: The system of any of examples 191-196, such that the processor core comprises: pattern matching circuitry to detect a code sequences in the thread using stored patterns.

Example 198: The system of any of examples 191-197, such that the processor core to maintain a running status of each thread executing in the system.

Example 199: The system of any of examples 191-197, such that the heterogeneous scheduler to maintain a status of each thread executing in the system.

Example 200: The system of any of examples 191-199, such that the heterogeneous scheduler to select the accelerator based on one or more of processor element information, tracked threads, and detected code sequences.

Example 201: A system including: a plurality of heterogeneous processing elements; an heterogeneous scheduler circuit coupled to the plurality of processing elements, the heterogeneous scheduler circuit including: a thread and processing element tracker table to maintain a running status of each thread executing and each processing element; a selector to select a type of processing element of the plurality of heterogeneous processing elements to process a code fragment and schedule the code fragment on one of the plurality of heterogeneous processing elements for execution based on the status from the thread and processing element tracker and processing element information.

Example 202: The system of example 201, further including: memory to store software executable by a processor core, the software to detect a code sequence in a thread for potential execution on an accelerator that is one of the plurality of heterogeneous processing elements coupled to the heterogeneous scheduler circuit.

Example 203: The system of example 202, such that the software pattern matcher to recognize the code sequence from a stored pattern.

Example 204: The system of any of examples 201-203, such that the heterogeneous scheduler is to translate the recognized code into accelerator code.

Example 205: The system of any of examples 201-204, such that the selector is a finite state machine executed by the heterogeneous scheduler circuit.

Example 206: A method including: executing a thread; detecting a pattern in the executing thread; translating the recognized pattern to accelerator code; and transferring the translated pattern to an available accelerator for execution.

Example 207: The method of example 206, such that the pattern is recognized using a software pattern matcher.

Example 208: The method of example 206, such that the pattern is recognized using a hardware pattern match circuit.

Example 209: A method including: executing a thread; detecting a pattern in the executing thread; adjusting an operating mode associated with the thread to use relaxed requirements based on the pattern.

Example 210: The method of example 209, such that the pattern is recognized using a software pattern matcher.

Example 211: The method of example 209, such that the pattern is recognized using a hardware pattern match circuit.

Example 212: The method of example 209, such that in the adjusted operating mode one or more of the following is applied: self-modifying code is ignored, memory consistency model restrictions are weakened, floating point semantics are altered, performance monitoring is changed, and architectural flag usage is altered.

Example 213: A system including: a decoder to decode an instruction native to the processor core; one or more execution units to execute the decoded instruction, one or more of the decoded instructions corresponding to an acceleration begin instruction, the acceleration begin instruction to cause entry into a different mode of execution for instructions that follow the acceleration begin instruction in a same thread.

Example 214: The system of example 213, such that the acceleration begin instruction includes a field to specify a pointer to a memory data block, such that a format of the memory data block includes a sequence number field to indicate progress prior to an interrupt.

Example 215: The system of any of examples 213-214, such that the acceleration begin instruction includes a block class identifier field to specify predefined translations of code stored in memory.

Example 216: The system of any of examples 213-215, such that the acceleration begin instruction includes an implementation identifier field to indicate a type of hardware to use for execution.

Example 217: The system of any of examples 213-216, such that the acceleration begin instruction includes a save state area size field to indicate a size and format of a state save area which is to store registers that will be modified after the acceleration begin instruction executes.

Example 218: The system of any of examples 213-217, such that the acceleration begin instruction includes a field for local storage area size, such that the local storage area is to provide storage beyond registers.

Example 219: The system of example 218, such that the local storage area size is defined by an immediate operand of the acceleration begin instruction.

Example 220: The system of example 218, such that the local storage area is to not be accessed outside of the instructions that follow the acceleration begin instruction.

Example 221: The system of any of examples 213-220, such that for instructions within the different mode of execution a memory dependency type is definable.

Example 222: The system of example 221, such that the definable memory dependency type comprises one of: an independent type, in which store-load and store-store dependencies are guaranteed not to exist; a potentially dependent access to the local storage area type, in which loads and stores to the local storage area may be dependent upon each other, but are independent from other loads and stores; a potentially dependent type, in which hardware will dynamically check and enforce dependencies between instructions; and an atomic type, in which loads and stores are dependent among themselves and memory is updated atomically.

Example 223: The system of any of examples 213-222, further including: memory to store: save state including registers to be used, flags to be updated, and implementation specification information; and local storage to be used during execution beyond registers.

Example 224: The system of example 223, such that each instance of parallel execution gets its own local storage.

Example 225: A method including: entering a different, relaxed mode of execution for a thread; writing, to a save state area, registers to be used during execution of the thread during the different, relaxed mode of execution; reserving local storage to be used per parallel execution in the thread during the different, relaxed mode of execution; executing a block of the thread and track instructions within the different, relaxed mode of execution; determining if an end of the different mode of execution has been reached based on an execution of an accelerator end instruction; when the end of the different mode of execution has been reached, restoring registers and flags from the save state area; and when the end of the different mode of execution has not been reached, updating the local storage with intermediate results.

Example 226: The method of example 225, such that during the different, relaxed mode execution one or more of the following is occurs: self-modifying code is ignored, memory consistency model restrictions are weakened, floating point semantics are altered, performance monitoring is changed, and architectural flag usage is altered.

Example 227: The method of examples 225 or 226, such that the different mode of execution is entered based on an execution of an accelerator begin instruction.

Example 228: The method of example 225, such that the different mode of execution is entered based on a determined pattern.

Example 229: The method of any of examples 225-228, such that a size and format of the state save area which is to store registers that will be modified after an accelerator begin instruction executes is defined in a memory block pointed to by the accelerator begin instruction.

Example 230: The method of any of examples 225-229, further including:

translating the thread or a part thereof prior to execution.

Example 231: The method of example 230, such that the thread or a part thereof is translated into an accelerator code Example 232: The method of example 230 or 231, such that the translated thread or the translated part of the thread is executed by an accelerator.

Example 233: The method of any of examples 213-232, such that an instruction of the block is tracked by updating a sequence number in a memory block associated with said block of the thread.

Example 234: The method of any of examples 223-233, such that a sequence number of the block of the thread is updated, as an instruction successfully executes and is retired.

Example 235: The method of any of examples 223-234, such that an end of the different mode of execution has been reached when an accelerator end instruction executes and retires.

Example 236: The method of any of examples 223-235, such that when the end of the different mode of execution has not been reached as determined by an accelerator end instruction executing, attempting to use intermediate results to try to execute portions of the block.

Example 237: The method of example 236, such that a non-accelerator processing element is used to execute with the intermediate results after an exception or interrupt.

Example 238: The method of any of examples 223-237, such that when an end of the different mode of execution has not been reached, rolling back execution to a point when accelerator usage began.

Example 239: A system including: a decoder to decode an instruction having an opcode, a field for a first packed data source operand, one or more fields for second through N packed data source operands, and a field for a packed data destination operand; execution circuitry to execute the decoded instruction to, for each packed data element position of the second through N packed data source operands, 1) multiply a data element of that packed data element position of that packed data source operand by a data element of a corresponding packed data element position of the first packed data source operand to generate a temporary result, 2) sum the temporary results, 3) add the sum of the temporary results to a data element of a corresponding packed data element position of the packed data destination operand, and 4) store the sum of the temporary results to a data element of the corresponding packed data element position of the packed data destination operand into the corresponding packed data element position of the packed data destination operand.

Example 240: The system of example 239, such that N is indicated by the opcode.

Example 241: The system of any of examples 239-240, such that values of the source operands are copied into registers of a multiply-adder array.

Example 242: The system of any of examples 239-241, such that the execution circuitry includes a binary tree reduction network.

Example 243: The system of any of examples 242, such that the execution circuitry is a part of an accelerator.

Example 244: The system of example 242, such that the binary tree reduction network comprises a plurality of multiply circuits coupled to a first set of summation circuits in pairs, such that the first set of summation circuits are coupled to a second set of summation circuits that is coupled to a third set of summation circuits that is also coupled to the data element of a corresponding packed data element position of the packed data destination operand.

Example 245: The system of example 244, such that each multiplication is processed in parallel.

Example 246: The system of any of examples 239-245, such that the packed data elements correspond to elements of one or more matrices.

Example 247: A method including: decoding an instruction having an opcode, a field for a first packed data source operand, one or more fields for second through N packed data source operands, and a field for a packed data destination operand; executing the decoded instruction to, for each packed data element position of the second through N packed data source operands, 1) multiply a data element of that packed data element position of that packed data source operand by a data element of a corresponding packed data element position of the first packed data source operand to generate a temporary result, 2) sum the temporary results, 3) add the sum of the temporary results to a data element of a corresponding packed data element position of the packed data destination operand, and 4) store the sum of the temporary results to a data element of the corresponding packed data element position of the packed data destination operand into the corresponding packed data element position of the packed data destination operand.

Example 248: The method of example 247, such that N is indicated by the opcode.

Example 249: The method of any of examples 247-248, such that values of the source operands are copied into registers of a multiply-adder array.

Example 250: The method of any of examples 247-249, such that the execution circuitry includes a binary tree reduction network.

Example 251: The method of example 247, such that the binary tree reduction network comprises a plurality of multiply circuits coupled to a first set of summation circuits in pairs, such that the first set of summation circuits are coupled to a second set of summation circuits that is coupled to a third set of summation circuits that is also coupled to the data element of a corresponding packed data element position of the packed data destination operand.

Example 252: The method of example 251, such that each packed data operand has eight packed data elements.

Example 253: The method of example 251, such that each multiplication is processed in parallel.

Example 254: The method of any of examples 247-253, such that the packed data elements correspond to elements of one or more matrices.

Example 255: A non-transitory machine-readable medium storing an instruction which when executed by a processor causes the processor to perform a method, the method including: decoding an instruction having an opcode, a field for a first packed data source operand, one or more fields for second through N packed data source operands, and a field for a packed data destination operand; executing the decoded instruction to, for each packed data element position of the second through N packed data source operands, 1) multiply a data element of that packed data element position of that packed data source operand by a data element of a corresponding packed data element position of the first packed data source operand to generate a temporary result, 2) sum the temporary results, 3) add the sum of the temporary results to a data element of a corresponding packed data element position of the packed data destination operand, and 4) store the sum of the temporary results to a data element of the corresponding packed data element position of the packed data destination operand into the corresponding packed data element position of the packed data destination operand.

Example 256: The non-transitory machine-readable medium of example 255, such that N is indicated by the opcode.

Example 257: The non-transitory machine-readable medium of any of examples 255-256, such that values of the source operands are copied into registers of a multiply-adder array.

Example 258: The non-transitory machine-readable medium of any of examples 255-257, such that the execution circuitry includes a binary tree reduction network.

Example 259: The non-transitory machine-readable medium of example 258, such that the binary tree reduction network comprises a plurality of multiply circuits coupled to a first set of summation circuits in pairs, such that the first set of summation circuits are coupled to a second set of summation circuits that is coupled to a third set of summation circuits that is also coupled to the data element of a corresponding packed data element position of the packed data destination operand.

Example 260: The non-transitory machine-readable medium of example 259, such that each packed data operand has eight packed data elements.

Example 261: The non-transitory machine-readable medium of example 259, such that each multiplication is processed in parallel.

Example 262: The non-transitory machine-readable medium of any of examples 255-261, such that the packed data elements correspond to elements of one or more matrices.

Example 263: A method including: decoding an instruction having an opcode, a field for a first packed data source operand, one or more fields for a second through N packed data source register operands, and a field for a packed data destination operand; executing the decoded instruction to, for each packed data element position of the second through N packed data source operands, 1) multiply a data element of that packed data element position of that packed data source operand by a data element of a corresponding packed data element position of the first packed data source operand to generate a temporary result, 2) sum the temporary results in pairs, 3) add the sum of the temporary results to a data element of a corresponding packed data element position of the packed data destination operand, and 4) store the sum of the temporary results to a data element of the corresponding packed data element position of the packed data destination operand.

Example 264: The method of example 263, such that N is indicated by the opcode.

Example 265: The method of any of examples 263-264, such that values of the source operands are copied into registers of a multiply-adder array.

Example 266: The method of example 265, such that the execution circuitry is binary tree reduction network.

Example 267: The method of example 266, such that the binary tree reduction network comprises a plurality of multiply circuits coupled to a first set of summation circuits in pairs, such that the first set of summation circuits are coupled to a second set of summation circuits that is coupled to a third set of summation circuits that is also coupled to the data element of a corresponding packed data element position of the packed data destination operand.

Example 268: The method of any of examples 263-267, such that each packed data operand has eight packed data elements.

Example 269: The method of any of examples 268-268, such that each multiplication is processed in parallel.

Example 270: A non-transitory machine-readable medium storing an instruction which when executed by a processor causes the processor to perform a method, the method including: decoding an instruction having an opcode, a field for a first packed data source operand, one or more fields for a second through N packed data source register operands, and a field for a packed data destination operand; executing the decoded instruction to, for each packed data element position of the second through N packed data source operands, 1) multiply a data element of that packed data element position of that packed data source operand by a data element of a corresponding packed data element position of the first packed data source operand to generate a temporary result, 2) sum the temporary results in pairs, 3) add the sum of the temporary results to a data element of a corresponding packed data element position of the packed data destination operand, and 4) store the sum of the temporary results to a data element of the corresponding packed data element position of the packed data destination operand.

Example 271: The non-transitory machine-readable medium of example 270, such that N is indicated by the opcode.

Example 272: The non-transitory machine-readable medium of any of examples 270-271, such that values of the source operands are copied into registers of a multiply-adder array.

Example 273: The non-transitory machine-readable medium of example 272, such that the execution circuitry is binary tree reduction network.

Example 274: The non-transitory machine-readable medium of example 272, such that the binary tree reduction network comprises a plurality of multiply circuits coupled to a first set of summation circuits in pairs, such that the first set of summation circuits are coupled to a second set of summation circuits that is coupled to a third set of summation circuits that is also coupled to the data element of a corresponding packed data element position of the packed data destination operand.

Example 275: The non-transitory machine-readable medium of any of examples 270-274, such that each packed data operand has eight packed data elements.

Example 276: The non-transitory machine-readable medium of any of examples 270-275, such that each multiplication is processed in parallel.

Example 277: A system including: a decoder to decode an instruction having an opcode, a field for a first packed data source operand, one or more fields for a second through N packed data source register operands, and a field for a packed data destination operand; execution circuitry to execute the decoded instruction to, for each packed data element position of the second through N packed data source operands, 1) multiply a data element of that packed data element position of that packed data source operand by a data element of a corresponding packed data element position of the first packed data source operand to generate a temporary result, 2) sum the temporary results in pairs, 3) add the sum of the temporary results to a data element of a corresponding packed data element position of the packed data destination operand, and 4) store the sum of the temporary results to a data element of the corresponding packed data element position of the packed data destination operand.

Example 278: The system of example 277, such that N is indicated by the opcode.

Example 279: The system of any of examples 277-278, such that values of the source operands are copied into registers of a multiply-adder array.

Example 280: The system of example 279, such that the execution circuitry is binary tree reduction network.

Example 281: The system of example 279, such that the binary tree reduction network comprises a plurality of multiply circuits coupled to a first set of summation circuits in pairs, such that the first set of summation circuits are coupled to a second set of summation circuits that is coupled to a third set of summation circuits that is also coupled to the data element of a corresponding packed data element position of the packed data destination operand.

Example 282: The system of any of examples 277-281, such that each packed data operand has eight packed data elements.

Example 283: The system of any of examples 277-282, such that each multiplication is processed in parallel.

Example 284: A system including: an accelerator including a multi-protocol bus interface to couple the accelerator to a host processor, the accelerator including one or more processing elements to process commands; a shared work queue including a plurality of entries to store work descriptors submitted by a plurality of clients, a work descriptor including an identification code to identify a client which submitted the work descriptor, at least one command to be executed by the one or more processing elements, and addressing information; an arbiter to dispatch work descriptors from the shared work queue, in accordance with a specified arbitration policy, to the one or more processing elements, such that each of the one or more processing elements to receive work descriptors dispatched from the arbiter, to perform source and destination address translations, read source data identified by the source address translations, execute the at least one command to generate destination data, and write the destination data to a memory using the destination address translation.

Example 285: The system of example 284, such that the plurality of clients comprises one or more of user-mode applications submitting direct user-mode input/output (IO) requests to the accelerator; kernel-mode drivers running in virtual machines (VMs) sharing the accelerator; and/or software agents running in multiple containers.

Example 286: The system of example 285, such that at least one client of the plurality of clients comprises a user-mode application or container executed within a VM.

Example 287: The system of any of examples 284-286, such that the clients comprise one or more of peer input/output (IO) agents and/or software chained offload requests.

Example 288: The system of example 287, such that at least one of the peer IO agents comprises a network interface controller (NIC).

Example 289: The system of any of examples 284-288, further including: an address translation cache to store virtual to physical address translations usable by the one or more processing elements.

Example 290: The system of any of examples 284-289, such that the specified arbitration policy comprises a first-in-first-out policy.

Example 291: The system of any of examples 284-290, such that the specified arbitration policy comprises a Quality of Service (QOS) policy in which work descriptors of a first client are given priority over work descriptors of a second client.

Example 292: The system of example 291, such that a work descriptor of the first client is to be dispatched to the one or more processing elements ahead of a work descriptor of the second client, even if the work descriptor of the second client is received in the shared work queue ahead of the work descriptor of the first client.

Example 293: The system any of examples 284-292, such that the identification code comprises a process address space identifier (PASID) to identify an address space in system memory allocated to the client.

Example 294: The system of any of examples 284-293, further including: one or more dedicated word queues, each dedicated work queue including a plurality of entries to store work descriptors submitted by a single client associated with the dedicated work queue.

Example 295: The system of example 294, further including: a group configuration register to be programmed to combine two or more of the dedicated work queues and/or shared work queues into a group, the group to be associated with the one or more of the processing elements.

Example 296: The system of example 295, such that the one or more processing elements are to process work descriptors from the dedicated work queues and/or shared work queues in the group.

Example 297: The system of any of examples 284-296, such that a first protocol supported by the multi-protocol bus interface comprises a memory interface protocol to be used to access a system memory address space.

Example 298: The system of any of examples 284-297, such that a second protocol supported by the multi-protocol bus interface comprises a cache coherency protocol to maintain coherency between data stored in a local memory of the accelerator and a memory subsystem of the host processor including a host cache hierarchy and system memory.

Example 299: The system of any of examples 284-298, such that a third protocol supported by the multi-protocol bus interface comprises a serial link protocol supporting device discovery, register access, configuration, initialization, interrupts, direct memory access, and address translation services.

Example 300: The system of example 299, such that the third protocol comprises the Peripheral Component Interface Express (PCIe) protocol.

Example 301: The system of any of examples 284-300, further including: an accelerator memory to store the source data to be processed by the processing elements and to store the destination data resulting from processing by the one or more processing elements.

Example 302: The system of example 301, such that the accelerator memory comprises a High Bandwidth Memory (HBM).

Example 303: The system of example 301, such that the accelerator memory is assigned a first portion of a system memory address space used by the host processor.

Example 304: The system of example 303, further including: a host memory assigned a second portion of the system memory address space.

Example 305: The system of example 304, further including: bias circuitry and/or logic to indicate, for each block of data stored in the system memory address space, whether data contained within the block is biased toward the accelerator.

Example 306: The system of example 305, such that each block of data comprises a memory page.

Example 307: The system of example 305, such that the host is to refrain from processing data biased toward the accelerator without first transmitting a request to the accelerator.

Example 308: The system of example 307, such that the bias circuitry and/or logic includes a bias table including one bit to be set per fixed-size block of data to indicate a bias towards the accelerator.

Example 309: The system of any of examples 301-308, such that the accelerator comprises: a memory controller to communicate with coherence controllers of the host processor to perform one or more data coherency transactions associated with data stored in the accelerator memory.

Example 310: The system of example 309, such that the memory controller is to operate in a device bias mode to access blocks of data stored in the accelerator memory which are set to a bias toward the accelerator, such that when in the device bias mode, the memory controller is to access the accelerator memory without consulting a cache coherence controller of the host processor.

Example 311: The system of example 309, such that the memory controller is to operate in a host bias mode to access blocks of data which are set to a bias toward the host processor, such that when in host bias mode, the memory controller is to send all requests to accelerator memory through a cache coherence controller in the host processor.

Example 312: The system of any of examples 284-311, such that the shared work queue is to store at least one batch descriptor, which identify a batch of work descriptors.

Example 313: The system of example 312, further including: a batch processing circuit to process the batch descriptors by reading the batch of work descriptors from memory.

Example 314: The system of example 292, such that a work descriptor is to be added to the dedicated work queue responsive to the host processor executing a first type of instruction and such that the work descriptor is to be added to the shared work queue responsive to the host processor executing a second type of instruction.

Example 315: A method including: placing a first set of memory pages in a device bias; allocating the first set of memory pages from a local memory of an accelerator device coupled to a host processor; transferring operand data to the allocated pages from a core of the host processor or an input/output agent; processing the operands by the accelerator device using the local memory to generate results; and converting the first set of memory pages from the device bias to a host bias.

Example 316: The method of example 315, such that placing the first set of memory pages in a device bias comprises updating for the first set of memory pages in a bias table to indicate that the pages are in accelerator device bias.

Example 317: The method of any of examples 315-316, such that updating entries comprises setting a bit associated with each page in the first set of memory pages.

Example 318: The method of any of examples 315-317, such that, once set to device bias, the first set of memory pages are guaranteed not to be cached in host cache memory.

Example 319: The method of any of examples 315-318, such that allocating the first set of memory pages comprises initiating a driver or application programming interface (API) call.

Example 320: The method of any of examples 315-319, such that to process the operands, the accelerator device executes commands and processes data directly from its local memory.

Example 321: The method of any of examples 315-320, such that transferring operand data to the allocated pages comprises submitting one or more work descriptors to the accelerator device, the work descriptors identifying or including the operands.

Example 322: The method of example 321, such that the one or more work descriptors may cause allocated pages to be flushed from a host processor cache upon a command.

Example 323: The method of any of examples 315-323, such that the host processor is permitted to access, cache and share the results when the first set of memory pages are set to the host bias.

The invention claimed is:

1. An apparatus comprising:

a decoder to decode an enqueue command instruction;

execution circuitry, where execution of the enqueue command instruction causes the execution circuitry to:

generate a work descriptor based, at least in part, on data from a source operand of the enqueue command instruction, the work descriptor comprising a plurality of fields including an operation field to specify one or more operations to be performed, a flag to indicate whether the work descriptor can be processed in parallel with one or more other work descriptors, and an address field associated with the one or more operations; and store the work descriptor to a work queue.

2. The apparatus of claim 1 further comprising:

an accelerator to read the work descriptor from the work queue and to perform the one or more operations based on the operation field and in accordance with the flag.

3. The apparatus of claim 2, wherein the accelerator comprises:

an arbiter to select the work descriptor from the work queue; and an engine to process the work descriptor responsive to selection by the arbiter, the engine to perform the one or more operations based on the operation field.

4. The apparatus of claim 3, wherein the arbiter is to select the work descriptor from the work queue ahead of one or more other work descriptors in accordance with a priority associated with the work descriptor, the work queue, or both.

5. The apparatus of claim 2, wherein:

if the flag has a first value, the accelerator is to wait to execute the one or more operations until operations associated with prior work descriptors have completed, and if the flag has a second value, the accelerator is to execute the one or more operations in parallel with one or more of the operations associated with prior work descriptors.

6. The apparatus of claim 2, wherein the accelerator is to produce a result of the one or more operations and to store the result based on the address field.

7. The apparatus of claim 6, wherein the result comprises a completion record stored at an address indicated by the address field, the completion record to include result data for the one or more operations and a status field indicating status of the one or more operations.

8. The apparatus of claim 1, wherein the address field comprises an address space identifier or a process address space identifier (PASID) to identify a region of memory allocated to store data associated with the work descriptor.

9. The apparatus of claim 1, wherein the work queue comprises a location in a system memory or a local memory of a device which is to process the work descriptor.

10. The apparatus of claim 1, wherein the work descriptor further comprises a user/supervisor field to indicate whether a request which caused the work descriptor to be generated originated from program code operating at a first privilege level or a second privilege level.

11. A method comprising:

decoding an enqueue command instruction on a processor;

executing, on the processor, the enqueue command instruction;

generate a work descriptor in response to execution of the enqueue command instruction, the work descriptor generated based, at least in part, on data from a source operand of the enqueue command instruction, the work descriptor comprising a plurality of fields including an operation field to specify one or more operations to be performed, a flag to indicate whether the work descriptor can be processed in parallel with one or more other work descriptors, and an address field associated with the one or more operations; and store the work descriptor to a work queue.

12. The method of claim 11 further comprising:

reading the work descriptor from the work queue by an accelerator; and performing the one or more operations based on the operation field and in accordance with the flag.

13. The method of claim 12 further comprising:

selecting the work descriptor from the work queue by an arbiter of the accelerator; and processing the work descriptor by an engine of the accelerator to perform the one or more operations based on the operation field.

14. The method of claim 13 wherein selecting the work descriptor is performed in accordance with a priority associated with the work descriptor, the work queue, or both.

15. The method of claim 11 further comprising:

waiting to execute the one or more operations until operations associated with prior work descriptors have completed if the flag has a first value; and executing the one or more operations in parallel with one or more of the operations associated with prior work descriptors if the flag has a second value.

* * * * *